(12) United States Patent
Parker et al.

(10) Patent No.: US 11,390,996 B2
(45) Date of Patent: Jul. 19, 2022

(54) ELONGATED TUBULAR ARTICLES FROM WET-LAID WEBS

(71) Applicant: Eastman Chemical Company, Kingsport, TN (US)

(72) Inventors: Kenny Randolph Parker, Afton, TN (US); Charles Stuart Everett, Kingsport, TN (US); Melvin Glenn Mitchell, Penrose, NC (US); Koushik Ghosh, Kingsport, TN (US); Mounir Izallalen, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 245 days.

(21) Appl. No.: 16/522,964

(22) Filed: Jul. 26, 2019

(65) Prior Publication Data

US 2020/0063349 A1 Feb. 27, 2020

Related U.S. Application Data

(60) Provisional application No. 62/721,866, filed on Aug. 23, 2018.

(51) Int. Cl.
| | |
|---|---|
| *D21H 13/06* | (2006.01) |
| *A47G 21/18* | (2006.01) |
| *D21H 25/00* | (2006.01) |
| *D21H 15/04* | (2006.01) |
| *D21H 11/14* | (2006.01) |

(Continued)

(52) U.S. Cl.
CPC .............. *D21H 13/06* (2013.01); *A47G 21/18* (2013.01); *D21H 11/14* (2013.01); *D21H 15/04* (2013.01); *D21H 21/14* (2013.01); *D21H 23/04* (2013.01); *D21H 25/005* (2013.01); *B31C 3/00* (2013.01);
(Continued)

(58) Field of Classification Search
USPC ...... 162/141, 146, 157.1, 157.6, 157.7, 158, 162/164.1
See application file for complete search history.

(56) References Cited

U.S. PATENT DOCUMENTS

| | | | |
|---|---|---|---|
| 1,631,750 A | 6/1927 | McIntosh | |
| 1,683,347 A | 9/1928 | Gray et al. | |

(Continued)

FOREIGN PATENT DOCUMENTS

| | | |
|---|---|---|
| CA | 677852 A | 1/1964 |
| CA | 2815601 A1 | 5/2012 |

(Continued)

OTHER PUBLICATIONS

Smook, Gary A., Handbook of Pulp and Paper Terminology, Angus Wilde Publications, 1990, p. 134. (Year: 1990).*

(Continued)

*Primary Examiner* — Dennis R Cordray
(74) *Attorney, Agent, or Firm* — Polly C. Owen; Dennis V. Carmen

(57) ABSTRACT

Embodiments of the present invention relate to elongated tubular members that include at least one layer comprising a cellulose ester. In some cases, the cellulose ester may be in the form of staple fibers. The layer may be formed via a wet-laid fiber web that may also include cellulose fibers. The elongated tubular members may be suitable for use with food and/or beverage items as, for example, drinking straws or other similar items.

8 Claims, 31 Drawing Sheets

(51) Int. Cl.
*D21H 23/04* (2006.01)
*D21H 21/14* (2006.01)
*F16L 11/16* (2006.01)
*F16L 11/24* (2006.01)
*B31C 3/00* (2006.01)
*B65H 18/00* (2006.01)
*D21F 11/00* (2006.01)

(52) U.S. Cl.
CPC .............. *B65H 18/00* (2013.01); *D21F 11/00* (2013.01); *F16L 11/16* (2013.01); *F16L 11/24* (2013.01)

(56) References Cited

U.S. PATENT DOCUMENTS

| | | |
|---|---|---|
| 1,698,049 A | 1/1929 | Clarke et al. |
| 1,829,585 A | 10/1931 | Dreyfus et al. |
| 1,880,560 A | 10/1932 | Webber et al. |
| 1,880,808 A | 10/1932 | Clarke et al. |
| 1,984,147 A | 12/1934 | Malm |
| 2,129,052 A | 9/1938 | Fordyce |
| 2,346,258 A | 4/1944 | Hooper |
| 2,357,962 A | 9/1944 | Leeman |
| 2,477,000 A | 7/1949 | Osborne |
| 2,620,853 A | 12/1952 | Boese |
| 2,779,251 A | 1/1957 | Murphy |
| 2,887,429 A | 5/1959 | Griggs et al. |
| 2,934,278 A | 4/1960 | Roberson |
| 2,976,205 A | 3/1961 | Snead et al. |
| 3,014,832 A | 12/1961 | Donnelly |
| 3,047,456 A | 7/1962 | Ucci et al. |
| 3,057,755 A | 10/1962 | Malm et al. |
| 3,118,622 A | 1/1964 | Jones |
| 3,173,830 A | 3/1965 | Wise et al. |
| 3,305,183 A | 2/1967 | Morden |
| 3,323,732 A | 6/1967 | Dalzell, Jr. et al. |
| 3,325,345 A | 6/1967 | Hider |
| 3,326,480 A | 6/1967 | Jones |
| 3,342,921 A | 9/1967 | Brundige et al. |
| 3,344,016 A | 9/1967 | Moggio et al. |
| 3,353,239 A | 11/1967 | Heijnis |
| 3,426,764 A | 2/1969 | Pearman |
| 3,533,416 A * | 10/1970 | Brooks ................ A24D 3/0283 131/342 |
| 3,571,870 A | 3/1971 | Dixon et al. |
| 3,617,201 A | 11/1971 | Berni et al. |
| 3,730,830 A | 5/1973 | Driscoll |
| 3,778,341 A | 12/1973 | Plummer et al. |
| 3,813,740 A | 6/1974 | Heijnis |
| 3,953,283 A | 4/1976 | Wing et al. |
| 4,004,330 A | 1/1977 | Stanley |
| 4,040,856 A | 8/1977 | Litzinger |
| 4,047,862 A | 9/1977 | Keith |
| 4,095,318 A | 6/1978 | Abbott et al. |
| 4,274,914 A | 6/1981 | Keith et al. |
| 4,289,130 A | 9/1981 | Usami et al. |
| 4,460,647 A | 7/1984 | Keith |
| 4,488,932 A | 12/1984 | Eber et al. |
| 4,500,968 A | 2/1985 | Bialkowski |
| 4,869,782 A | 9/1989 | Nelson et al. |
| 4,913,773 A | 4/1990 | Knudsen et al. |
| 4,943,349 A | 7/1990 | Gomez |
| 4,969,976 A | 11/1990 | Reed |
| 4,973,382 A | 11/1990 | Kinn et al. |
| 5,011,573 A | 4/1991 | Niemi |
| 5,025,538 A | 6/1991 | Saleh |
| 5,102,502 A | 4/1992 | Reinhardt et al. |
| 5,114,537 A | 5/1992 | Scott et al. |
| 5,167,373 A | 12/1992 | Bohn et al. |
| 5,171,308 A | 12/1992 | Gallagher et al. |
| 5,213,030 A | 5/1993 | Bolstad |
| 5,425,508 A | 6/1995 | Chaney |
| 5,505,888 A | 4/1996 | Mitchell et al. |
| 5,567,078 A | 10/1996 | Meinander |
| 5,573,640 A | 11/1996 | Frederick et al. |
| 5,631,078 A | 5/1997 | Ellery et al. |
| 5,662,773 A | 9/1997 | Frederick et al. |
| 5,758,669 A | 6/1998 | Taniguchi et al. |
| 5,779,736 A | 7/1998 | Frederick et al. |
| 5,779,859 A | 7/1998 | Carter et al. |
| 5,863,811 A | 1/1999 | Kawai et al. |
| 5,870,988 A | 2/1999 | Fujimori et al. |
| 5,893,525 A | 4/1999 | Gingras |
| 5,927,287 A | 7/1999 | Matsumura et al. |
| 5,979,460 A | 11/1999 | Matsumura |
| 6,010,595 A | 1/2000 | Mitchell et al. |
| 6,056,854 A | 5/2000 | Woodrum |
| 6,120,645 A | 9/2000 | Loser et al. |
| 6,184,373 B1 | 2/2001 | Bernard et al. |
| 6,228,895 B1 | 5/2001 | Buchanan et al. |
| 6,290,813 B1 | 9/2001 | Woodrum |
| 6,309,509 B1 | 10/2001 | Buchanan et al. |
| 6,328,850 B1 | 12/2001 | Phan et al. |
| 6,348,133 B1 | 2/2002 | Woodrum |
| 6,571,802 B1 | 6/2003 | Yamashita |
| 6,762,138 B2 | 7/2004 | Ferreira et al. |
| 7,152,288 B1 | 12/2006 | Sanderson et al. |
| 7,423,003 B2 | 9/2008 | Volpenhein et al. |
| 7,585,442 B2 | 9/2009 | Caenen et al. |
| 7,666,274 B2 | 2/2010 | Williams et al. |
| 7,779,525 B2 | 8/2010 | Matthew |
| 7,967,952 B2 | 6/2011 | Williams et al. |
| 8,268,122 B2 | 9/2012 | Walter et al. |
| 8,512,519 B2 | 8/2013 | Gupta et al. |
| 8,513,147 B2 | 8/2013 | Gupta et al. |
| 8,801,899 B1 | 8/2014 | Reed et al. |
| 8,871,052 B2 | 10/2014 | Parker et al. |
| 8,906,200 B2 | 12/2014 | Parker et al. |
| 8,916,024 B2 | 12/2014 | Ban et al. |
| 8,920,520 B2 | 12/2014 | Garrett et al. |
| 8,961,739 B2 | 2/2015 | Salminen |
| 9,051,684 B2 | 6/2015 | Hua et al. |
| 9,127,404 B2 | 9/2015 | Tamai et al. |
| 9,133,583 B2 | 9/2015 | Ballinger |
| 9,175,440 B2 | 11/2015 | Parker et al. |
| 9,179,709 B2 | 11/2015 | Sebastian |
| 9,273,417 B2 | 3/2016 | Gupta et al. |
| 9,289,013 B2 | 3/2016 | Taniguchi et al. |
| 9,303,357 B2 | 4/2016 | Clark et al. |
| 9,410,287 B2 | 8/2016 | Gustavsson |
| 9,453,305 B2 | 9/2016 | Imppola et al. |
| 9,611,591 B2 | 4/2017 | Chou et al. |
| 9,617,685 B2 | 4/2017 | Clark et al. |
| 9,677,224 B2 | 6/2017 | Faufau et al. |
| 9,797,094 B2 | 10/2017 | Luo et al. |
| 9,809,929 B2 | 11/2017 | Kohler et al. |
| 10,273,634 B2 | 4/2019 | Hietaniemi et al. |
| 10,307,309 B2 | 6/2019 | Viens et al. |
| 10,443,167 B2 | 10/2019 | Soyama et al. |
| 10,532,123 B2 | 1/2020 | Viens et al. |
| 10,532,545 B2 | 1/2020 | Fushimi et al. |
| 10,967,315 B2 | 4/2021 | Chung et al. |
| 10,981,096 B2 | 4/2021 | Barlow, Jr. et al. |
| 2003/0093047 A1 | 5/2003 | Nguyuen et al. |
| 2004/0062907 A1 | 4/2004 | Lindsay et al. |
| 2004/0099389 A1 | 5/2004 | Chen et al. |
| 2004/0118540 A1 | 6/2004 | Gamier et al. |
| 2004/0144510 A1 | 7/2004 | Mauler |
| 2004/0214702 A1 | 10/2004 | Stroud, Jr. et al. |
| 2004/0241274 A1 | 12/2004 | Odajima et al. |
| 2004/0258910 A1 | 12/2004 | Haile et al. |
| 2005/0045296 A1 | 3/2005 | Adam et al. |
| 2006/0191655 A1 | 8/2006 | Nunn et al. |
| 2007/0107863 A1 | 5/2007 | Edwards et al. |
| 2007/0169903 A1 | 7/2007 | Covarrubias et al. |
| 2008/0311815 A1 | 12/2008 | Gupta et al. |
| 2010/0126686 A1 | 5/2010 | Parviainen et al. |
| 2010/0272938 A1 | 10/2010 | Mitchell et al. |
| 2011/0247772 A1 | 10/2011 | Kincaid et al. |
| 2012/0175074 A1 | 7/2012 | Gupta et al. |
| 2012/0183861 A1 | 7/2012 | Gupta et al. |
| 2012/0184164 A1 | 7/2012 | Gupta et al. |
| 2012/0219766 A1 | 8/2012 | Gupta et al. |

(56) References Cited

U.S. PATENT DOCUMENTS

| | | | |
|---|---|---|---|
| 2012/0251597 A1 | 10/2012 | Gupta et al. | |
| 2012/0302119 A1 | 11/2012 | Clark et al. | |
| 2012/0302120 A1 | 11/2012 | Clark et al. | |
| 2012/0305015 A1 | 12/2012 | Sebastian et al. | |
| 2013/0066250 A1 | 3/2013 | Neron et al. | |
| 2013/0139980 A1 | 6/2013 | Ban et al. | |
| 2013/0192779 A1 | 8/2013 | Parker et al. | |
| 2013/0192780 A1 | 8/2013 | Parker et al. | |
| 2013/0193085 A1 | 8/2013 | Parker et al. | |
| 2013/0239344 A1 | 9/2013 | Stolarz, Jr. et al. | |
| 2013/0240133 A1 | 9/2013 | Roberston et al. | |
| 2013/0284388 A1 | 10/2013 | Ballinger | |
| 2013/0299108 A1 | 11/2013 | Gupta et al. | |
| 2014/0000823 A1 | 1/2014 | Salminen | |
| 2014/0311694 A1 | 10/2014 | Clark et al. | |
| 2014/0311695 A1 | 10/2014 | Clark et al. | |
| 2015/0027651 A1 | 1/2015 | Jehn-Rendu et al. | |
| 2015/0129143 A1 | 5/2015 | Hawkins | |
| 2015/0201674 A1* | 7/2015 | Dooly | A24F 40/42 53/432 |
| 2015/0351976 A1 | 12/2015 | Viens et al. | |
| 2015/0354139 A1 | 12/2015 | Geisen et al. | |
| 2015/0375149 A1 | 12/2015 | McLeod et al. | |
| 2015/0376818 A1 | 12/2015 | McLeod et al. | |
| 2016/0243522 A1 | 8/2016 | Rottger et al. | |
| 2016/0369457 A1 | 12/2016 | Jogikalmath et al. | |
| 2017/0009401 A1 | 1/2017 | O'Brien Stickney et al. | |
| 2017/0043565 A1 | 2/2017 | Fushimi et al. | |
| 2017/0088698 A1 | 3/2017 | Collins et al. | |
| 2017/0130400 A1 | 5/2017 | Konishi et al. | |
| 2017/0328006 A1 | 11/2017 | Tausche et al. | |
| 2018/0142419 A1 | 5/2018 | Rouse et al. | |
| 2018/0280847 A1 | 10/2018 | Barlow, Jr. et al. | |
| 2018/0327974 A1 | 11/2018 | Lewis et al. | |
| 2019/0059443 A1 | 2/2019 | Bachmann et al. | |
| 2019/0247244 A1 | 8/2019 | Viens et al. | |
| 2019/0284760 A1 | 9/2019 | Hoekstra et al. | |
| 2019/0309480 A1 | 10/2019 | Luo et al. | |
| 2020/0002847 A1 | 1/2020 | Steach et al. | |
| 2020/0002858 A1 | 1/2020 | Steach et al. | |
| 2020/0010980 A1 | 1/2020 | Steach et al. | |
| 2020/0040254 A1 | 2/2020 | Collins et al. | |
| 2020/0054975 A1 | 2/2020 | Belmont et al. | |
| 2020/0254371 A1 | 8/2020 | Yung et al. | |
| 2020/0299882 A1 | 9/2020 | Baer et al. | |
| 2020/0299900 A1 | 9/2020 | Everett et al. | |
| 2020/0347549 A1 | 11/2020 | Bilodeau et al. | |

FOREIGN PATENT DOCUMENTS

| | | |
|---|---|---|
| EP | 0 101 319 A2 | 2/1984 |
| EP | 0 335 576 A2 | 10/1989 |
| EP | 0 709 037 A2 | 5/1996 |
| EP | 0 829 576 A2 | 3/1998 |
| EP | 2 907 493 A1 | 8/2015 |
| EP | 2 985 375 A1 | 2/2016 |
| EP | 3 128 070 A1 | 2/2017 |
| EP | 3556937 A1 | 10/2019 |
| JP | 2003-119613 A | 4/2003 |
| JP | 2006-111979 A | 4/2006 |
| JP | 2008-190077 A | 8/2008 |
| JP | 5712422 B2 | 5/2015 |
| JP | 6235380 B2 | 11/2017 |
| JP | 6496705 B2 | 4/2019 |
| KR | 10-2016-0099910 A | 8/2016 |
| KR | 20170112525 A | 10/2017 |
| WO | WO 88/02048 A1 | 3/1988 |
| WO | WO 91/16119 A1 | 10/1991 |
| WO | WO 93/02247 A1 | 2/1993 |
| WO | WO 97/20985 A1 | 6/1997 |
| WO | WO 03/044279 A1 | 5/2003 |
| WO | WO 2007/078537 A1 | 7/2007 |
| WO | WO 2008/144304 A1 | 11/2008 |
| WO | WO 2014/048638 A1 | 4/2014 |
| WO | WO 2018/051275 A2 | 3/2018 |
| WO | WO 2018/110059 A1 | 6/2018 |
| WO | WO 2020/041253 A1 | 2/2020 |
| WO | WO 2020/041257 A1 | 2/2020 |
| WO | WO 2020/041272 A1 | 2/2020 |
| WO | WO 2020/046627 A2 | 3/2020 |

OTHER PUBLICATIONS

Co-pending U.S. Appl. No. 16/522,962, filed Jul. 26, 2019; Mitchell et al.
Co-pending U.S. Appl. No. 16/522,936, filed Jul. 26, 2019; Mitchell et al.
Co-pending U.S. Appl. No. 16/522,953, filed Jul. 26, 2019; Everett et al.
Co-pending U.S. Appl. No. 16/522,923, filed Jul. 26, 2019; Everett et al.
Co-pending U.S. Appl. No. 16/522,929, filed Jul. 26, 2019; Everett et al.
Co-pending U.S. Appl. No. 16/522,931, filed Jul. 26, 2019; Everett et al.
Co-pending U.S. Appl. No. 16/522,961, filed Jul. 26, 2019; Everett et al.
Co-pending U.S. Appl. No. 16/522,997, filed Jul. 26, 2019; Mitchell et al.
Co-pending U.S. Appl. No. 16/522,956, filed Jul. 26, 2019; Everett et al.
Co-pending U.S. Appl. No. 16/522,994, filed Jul. 26, 2019; Everett et al.
Co-pending U.S. Appl. No. 16/522,944, filed Jul. 26, 2019; Mitchell et al.
Co-pending U.S. Appl. No. 16/522,988, filed Jul. 26, 2019; Parker et al.
Co-pending U.S. Appl. No. 16/522,952, filed Jul. 26, 2019; Everett et al.
Co-pending U.S. Appl. No. 16/522,983, filed Jul. 26, 2019; Everett et al.
Co-pending U.S. Appl. No. 16/522,975, filed Jul. 26, 2019; Mitchell et al.
Co-pending U.S. Appl. No. 16/522,969, filed Jul. 26, 2019; Everett et al.
Co-pending U.S. Appl. No. 16/522,965, filed Jul. 26, 2019; Mitchell et al.
Co-pending U.S. Appl. No. 16/522,947, filed Jul. 26, 2019; Everett et al.
Co-pending U.S. Appl. No. 16/522,942, filed Jul. 26, 2019; Everett et al.
Co-pending U.S. Appl. No. 16/522,937, filed Jul. 26, 2019; Everett et al.
Co-pending U.S. Appl. No. 16/522,932, filed Jul. 26, 2019; Everett et al.
Co-pending U.S. Appl. No. 16/523,005, filed Jul. 26, 2019; Parker et al.
Co-pending U.S. Appl. No. 16/522,972, filed Jul. 26, 2019; Parker et al.
Co-pending U.S. Appl. No. 16/522,966, filed Jul. 26, 2019; Parker et al.
Co-pending U.S. Appl. No. 16/522,973, filed Jul. 26, 2019; Parker et al.
Co-pending U.S. Appl. No. 16/522,978, filed Jul. 26, 2019; Parker et al.
Co-pending U.S. Appl. No. 16/522,934, filed Jul. 26, 2019; Everett et al.
Co-pending U.S. Appl. No. 16/523,002, filed Jul. 26, 2019; Parker et al.
Co-pending U.S. Appl. No. 16/523,007, filed Jul. 26, 2019; Everett et al.
Co-pending U.S. Appl. No. 16/522,985, filed Jul. 26, 2019; Everett et al.
Co-pending U.S. Appl. No. 16/522,989, filed Jul. 26, 2019; Everett et al.
ASTM D1577-07; Standard Test Methods for Linear Density of Textile Fibers, 2018.

(56) References Cited

OTHER PUBLICATIONS

ASTM D3412/D3412M-13; Standard Test Method for Coefficient of Friction, Yarn to Yarn, 2019.
ASTM D3937-12; Standard Test Method for Crimp Frequency of Manufactured Staple Fibers, 2018.
ASTM D6400; Standard Specification for Labeling of Plastics Designed to be Aerobically Composted in Municipal or Industrial Facilities, 2019.
ASTM F316; Standard Test Methods for Pore Size Characteristics of Membrane Filters by Bubble Point and Mean Flow Pore Test, 2011.
Ghosh, Ajit K.; "Fundamentals of Paper Drying—Theory and Application from Industrial Perspective;" Evaporation, Condensation and Heat Transfer; InTech; 2011; pp. 535-582.
Hölter, et al.; "New Aspects of Cellulose Acetate Biodegradation;" Rhodia Acetow; ST 13; Sep. 10, 2017.
Åslund, P.; "On suction box dewatering mechanisms;" Royal Institute of Technology School of Chemical Science and Engineering Department of Fibre and Polymer Technology; Doctoral Thesis; 2008; pp. 1-43.
Notification of Transmittal of the International Search Report and the Written Opinion of the International Searching Authority with dated Dec. 5, 2019 for International Application No. PCT/US2019/047176.
Notification of Transmittal of the International Search Report and the Written Opinion of the International Searching Authority with dated Dec. 6, 2019 for International Application No. PCT/US2019/047184.
Notification of Transmittal of the International Search Report and the Written Opinion of the International Searching Authority with dated Dec. 6, 2019 for International Application No. PCT/US2019/047170.
Notification of Transmittal of the International Search Report and the Written Opinion of the International Searching Authority with dated Dec. 6, 2019 for International Application No. PCT/US2019/047175.
Notification of Transmittal of the International Search Report and the Written Opinion of the International Searching Authority with dated Dec. 6, 2019 for International Application No. PCT/US2019/047180.
Notification of Transmittal of the International Search Report and the Written Opinion of the International Searching Authority with dated Dec. 6, 2019 for International Application No. PCT/US2019/047183.
Notification of Transmittal of the International Search Report and the Written Opinion of the International Searching Authority with dated Dec. 5, 2019 for International Application No. PCT/US2019/047209.
Notification of Transmittal of the International Search Report and the Written Opinion of the International Searching Authority dated Dec. 6, 2019 for International Application No. PCT/US2019/047192.
USPTO Office Action dated Sep. 16, 2020 received in co-pending U.S. Appl. No. 16/522,953.
USPTO Office Action dated May 27, 2021 received in co-pending U.S. Appl. No. 16/522,953.
USPTO Office Action dated Jun. 12, 2020 received in co-pending U.S. Appl. No. 16/522,923.
USPTO Office Action dated Dec. 22, 2020 received in co-pending U.S. Appl. No. 16/522,923.
USPTO Office Action dated Aug. 6, 2020 received in co-pending U.S. Appl. No. 16/522,929.
USPTO Office Action dated Mar. 15, 2021 received in co-pending U.S. Appl. No. 16/522,929.
USPTO Office Action dated Nov. 30, 2020 received in co-pending U.S. Appl. No. 16/522,931.
USPTO Office Action dated Nov. 25, 2020 received in co-pending U.S. Appl. No. 16/522,961.
USPTO Office Action dated May 26, 2021 received in co-pending U.S. Appl. No. 16/522,961.
USPTO Office Action dated Aug. 6, 2020 received in co-pending U.S. Appl. No. 16/522,997.
USPTO Office Action dated Jan. 28, 2021 received in co-pending U.S. Appl. No. 16/522,997.
USPTO Office Action dated May 7, 2021 received in co-pending U.S. Appl. No. 16/522,997.
USPTO Office Action dated Nov. 25, 2020 received in co-pending U.S. Appl. No. 16/522,956.
Co-pending U.S. Appl. No. 17/303,602, filed Jun. 3, 2021; Everett et al.
USPTO Office Action dated Jun. 11, 2020 received in co-pending U.S. Appl. No. 16/522,994.
USPTO Office Action dated Dec. 23, 2020 received in co-pending U.S. Appl. No. 16/522,994.
USPTO Office Action dated Apr. 14, 2020 received in co-pending U.S. Appl. No. 16/522,994.
USPTO Office Action dated Nov. 20, 2020 received in Co-pending U.S. Appl. No. 16/522,944.
USPTO Office Action dated Sep. 15, 2020 received in co-pending U.S. Appl. No. 16/522,952.
USPTO Office Action dated May 11, 2021 received in co-pending U.S. Appl. No. 16/522,952.
USPTO Office Action dated Aug. 14, 2020 received in co-pending U.S. Appl. No. 16/522,983.
USPTO Office Action dated May 24, 2021 received in co-pending U.S. Appl. No. 16/522,975.
USPTO Office Action dated Jul. 10, 2020 received in co-pending U.S. Appl. No. 16/522,965.
USPTO Office Action dated May 11, 2021 received in co-pending U.S. Appl. No. 16/522,965.
USPTO Office Action dated Feb. 19, 2021 received in co-pending U.S. Appl. No. 16/522,947.
USPTO Office Action dated Mar. 26, 2021 received in co-pending U.S. Appl. No. 16/522,942.
USPTO Office Action dated Aug. 17, 2020 received in co-pending U.S. Appl. No. 16/522,937.
USPTO Office Action dated Apr. 12, 2021 received in co-pending U.S. Appl. No. 16/522,937.
USPTO Office Action dated Mar. 23, 2021 received in co-pending U.S. Appl. No. 16/522,932.
USPTO Office Action dated Sep. 29, 2020 received in co-pending U.S. Appl. No. 16/523,005.
USPTO Office Action dated Mar. 16, 2021 received in co-pending U.S. Appl. No. 16/523,005.
USPTO Office Action dated May 27, 2021 received in co-pending U.S. Appl. No. 16/522,966.
USPTO Office Action dated May 25, 2021 received in co-pending U.S. Appl. No. 16/522,973.
USPTO Office Action dated Oct. 2, 2020 received in co-pending U.S. Appl. No. 16/522,978.
USPTO Office Action dated Jun. 7, 2021 received in co-pending U.S. Appl. No. 16/522,978.
USPTO Office Action dated Jul. 10, 2020 received in co-pending U.S. Appl. No. 16/522,934.
USPTO Office Action dated Mar. 29, 2021 received in co-pending U.S. Appl. No. 16/522,934.
USPTO Office Action dated Jun. 11, 2020 received in co-pending U.S. Appl. No. 16/523,007.
USPTO Office Action dated Dec. 23, 2020 received in co-pending U.S. Appl. No. 16/523,007.
USPTO Office Action dated Apr. 14, 2021 received in co-pending U.S. Appl. No. 16/523,007.
USPTO Office Action dated Aug. 5, 2020 received in co-pending U.S. Appl. No. 16/522,989.
USPTO Office Action dated Mar. 16, 2021 received in co-pending U.S. Appl. No. 16/522,989.
Kumar et al., in "Multiple-Input Multiple-Output Paper Machine System Control Using Fuzzy-PID Tuned Controller," Springer, Proceedings of Fifth International Conference on Soft computing for Problem Solving, Advances in Intelligent Systems and Computing 437, pp. 145-155. (Year: 2016).
M Hubbe "Mini-Encyclopedia of Papermaking Wet-End Chemistry: Prat Two: Definitions and Concepts. Wet End, "Internet URL:

(56) References Cited

OTHER PUBLICATIONS https://projects.ncsu.edu/project/hubbepaperchem/Defnitns/WetEnd.htm. Downloaded on 2021, p. 1. (Year: 2021).

Smook; "Handbook for Pulp & Paper Technologies;" Angus Wilde Publications; Second Edition; 2001; pp. 228-263.

Notification of Transmittal of the International Search Report and the Written Opinion of the International Searching Authority dated Mar. 20, 2020 for International Application No. PCT/US2019/047166.

Notification of Transmittal of the International Search Report and the Written Opinion of the International Searching Authority dated Mar. 27, 2020 for International Application No. PCT/US2019/047158.

Notification of Transmittal of the International Search Report and the Written Opinion of the International Searching Authority dated Mar. 27, 2020 for International Application No. PCT/US2019/047168.

Notification of Transmittal of the International Search Report and the Written Opinion of the International Searching Authority dated Mar. 27, 2020 for International Application No. PCT/US2019/047157.

* cited by examiner

ELONGATED TUBULAR ARTICLES FROM WET-LAID WEBS

CROSS REFERENCE TO RELATED APPLICATIONS

This application claims priority under 35 U.S.C. 119(e) to U.S. Provisional Application Ser. No. 62/721,866 filed Aug. 23, 2018, which is incorporated herein by reference in its entirety.

FIELD OF THE INVENTION

The present invention relates Compositions, and wet laid articles made from the Compositions, containing cellulose fibers and cellulose ester fibers, as well as wet laid processes using the Compositions.

BACKGROUND

Recently, the increasing popularity of convenience food, such as fast food, casual dining, and pre-made meals, has increased the need for single-use containers and packaging. At the same time, heightened environmental awareness on the part of consumers and manufacturers, coupled with increasing energy costs, has shifted attention toward items formed from sustainable materials that are also environmentally non-persistent.

Thus, a need exits for environmentally non-persistent articles suitable for use in a wide variety of applications, including food, beverage, and packaging. Advantageously, the material would exhibit desirable properties such as strength, water impermeability, and durability while in use, but would break down rapidly and with minimal environmental impact upon disposal.

SUMMARY OF THE INVENTION

In some embodiments, the present invention concerns an elongated tubular member suitable for use with food and/or beverage items, said tubular member comprising at least one layer formed from a wet-laid fiber web, wherein said layer comprises cellulose fibers and at least one cellulose ester.

In some embodiments, the present invention concerns a drinking straw formed from at least one fiber-containing layer formed from a wet-laid web, wherein said fiber-containing layer is shaped to form a hollow tube and is at least partially coated and/or impregnated with at least one water-proofing agent, and wherein said fiber-containing layer comprises cellulose ester staple fibers.

In some embodiments, the present invention concerns a method of forming an elongated tubular member from a wet-laid fiber web. The method comprises (a) forming a wet-laid fiber web from a slurry comprising cellulose ester staple fibers, cellulose fibers, and at least one liquid; (b) removing at least a portion of said liquid from said wet-laid fiber web to form a fiber-containing sheet; (c) rolling said fiber-containing sheet into a tubular shape; and (d) while said fiber-containing sheet is in said tubular shape, adhering the edges of said fiber-containing sheet to one another to form a tubular member.

In some embodiments, the present invention concerns use of a wet-laid fiber web for making an elongated tubular member, wherein the wet-laid fiber web comprises cellulose fibers and cellulose ester staple fibers.

In some embodiments, the present invention concerns use of a wet-laid fiber web for making a drinking straw, wherein the wet-laid fiber web comprises cellulose fibers and cellulose ester staple fibers.

DETAILED DESCRIPTION OF THE INVENTION

Figure 1:
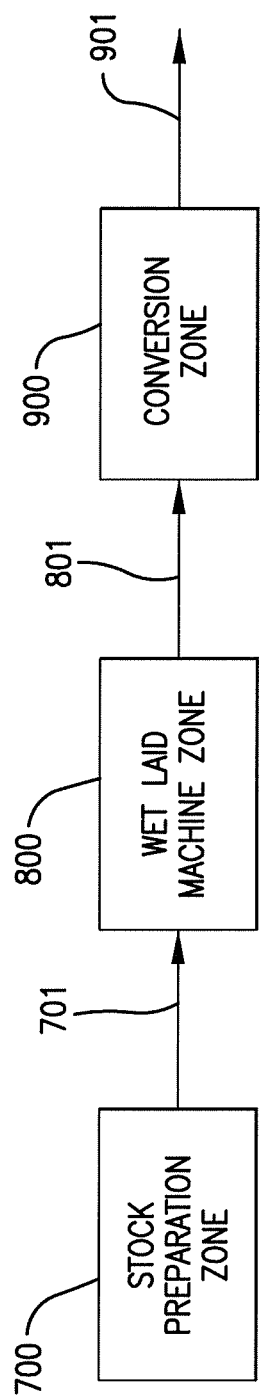
FIG. 1 is a block flow diagram of a wet laid process for making wet laid webs.

There is now provided a Composition containing cellulose fibers and synthetic cellulose fibers comprising cellulose ester staple fibers, wherein the cellulose ester fibers have one or a combination of the following features: a denier per filament (DPF) of less than 3.0, a cut length of less than 6 mm, a non-round shape, and/or crimped (used throughout as "Composition"). The Compositions as used throughout this description can be present at any one or more process steps or zones, or in any one or more vessels or pipes, in a stock preparation process or a wet laid machine process, as well as in any wet laid articles. The Compositions can be present as feeds to, within, or as effluents from a hydropulper, any blending vessel, a refiner, a machine chest, a stuff box, a hydrocyclone, a pressure screen, the basis weight valve, fan pumps, in the headbox, on the wire, in the presses, dryers, sizing press, as sheets on rolls, in a broke vessel, in a calender, or as consumer articles, and any steps in between. The wet laid articles can contain and be obtained from the Compositions and can be formulated with the Compositions.

The Compositions contain cellulose fibers and cellulose ester fibers at least a portion of which are cellulose ester staple fibers ("CE staple fibers").

As used herein, the cellulose fibers are fibers obtained from plant-based sources of cellulose that have not been further chemically derivatized with functional groups. Cellulose fibers can be virgin or from waste/recycle sources.

The CE staple fibers and filaments made therefrom are synthetic fibers that are derivatives of cellulose obtained by a synthetic process; however, as used herein, exclude the regenerated celluloses or other cellulose based derivates such as viscose, rayon, and lyocell cellulosic fibers.

A "100% Cellulose Comparative composition" is a composition in which the fiber component is 100% cellulose fibers and is in all other respects the same as a reference Composition, including consistency, cellulose fiber type, formulation ingredients and quantities, stock preparation process conditions, and refining conditions, and any other applicable conditions, unless a condition is specifically expressed as a difference. For example, if the reference is to a sheet or wet laid product, then to be the same in all other respects the 100% Cellulose Comparative Composition would also be a sheet or wet laid product; or if the reference is to a composition containing waste/recycle and virgin cellulose fibers, to be the same in all respects the 100% Cellulose Comparative Composition would also contain the same proportion of waste/recycle cellulose fibers to virgin cellulose fibers.

A "cellulose fiber" can include virgin or waste/recycle fibers, and can be fibrillated or non-fibrillated.

"Co-refining" or "Co-refined" means that at least a cellulose fiber and a CE staple fiber are refined in the presence of each other, and cellulose fibers and CE staple fibers present in a feed stream to a refiner are deemed to be co-refined. A co-refined cellulose fiber means that the cellulose fiber is refined in the presence of a CE staple fiber, and a co-refined CE staple fiber means a CE staple fiber that has been co-refined in the presence of a cellulose fiber.

The "consistency" is a measure of the solids concentration in a liquid stream, and can be determined drying a representative sample of the liquid stream and dividing the weight of the oven dried solids to the weight of the representative sample.

A "machine direction" or "MD" is the direction the web moves on a wet laid machine or with respect to wet laid articles, the direction on the article corresponding to the direction the article moved on a wet laid machine. The "cross direction" or "CD" means the direction crossing or perpendicular to the MD of the web or sheet.

A "non-woven web" is a web made from fibers without weaving or knitting operations.

A "Post-Addition" or "Post-Addition Composition" is a combination of fibrillated or refined cellulose fibers and CE staple fibers in which the CE staple fibers have not been co-refined with the cellulose fibers and the CE staple fibers are combined with the cellulose fibers only after the cellulose fibers have been refined and the cellulose fibers are not further refined. The CE staple fibers are deemed not to have been co-refined with cellulose fibers if the feed to the refiner does not contain CE staple fibers. When used in the context of a comparison, the Post Addition Composition is identical to a reference Composition, except that the CE staple fibers are not present during refining and are combined with cellulose fibers only after the cellulose fibers are refined. The cellulose fibers in the Post Addition Composition are refined under the same process conditions as the reference Composition, and the consistency of the cellulose fiber furnish fed to the refiner is the same as the consistency of the reference Composition feed to the refiner. After the cellulose fibers have been refined, the CE staple fibers are added to the refined cellulose furnish and the consistency of the blend is adjusted to have the same consistency as the reference Composition. Post-Addition CE staple fibers are CE staple fibers added to cellulose fibers after the cellulose fibers have been refined without any further refining of the cellulose fibers.

A "thick stock" has a solids content (or stock consistency) of at least 2.0 wt. %.

A "thin stock" has a solids content (or stock consistency) of less than 2.0 wt. %.

The term "virgin" means stock or fibers that have not been used for their intended end use, provided that the fibers, when contained in a wet laid web or other article, have not yet been inked or de-inked.

A "wet laid non-woven product" is a product in which at least 50 wt. % of the fibers have an L/D of more than 300.

The term "waste/recycle" means fibers or stock obtained from products that have been processed into a wet laid web or other article and additionally have been either printed, or used by a consumer for its intended purpose.

A "wet laid process" is a process in which fibers dispersed in a liquid, such as water, at any consistency, are deposited onto a wire, drying matt, or filter on which the liquid is drained or removed to form a web that is either dried or thermally bonded. A wet laid process can be distinguished from a dry laid process which employs air-laid, carding techniques, or needlepunch techniques.

A "wet laid product" or "wet laid web" is a product made by a wet laid process, and can include non-woven products, and can also include paper-like products in which at least 50 wt. % of the fibers have an L/D of 300 or less.

The word "can" is equivalent to "may" or "is able to . . . ."

Whenever a claim recites a compositional feature that is quantified in terms of a comparison between the inventive composition and a comparative composition (e.g. a 100% cellulose comparative composition or a Post Addition composition), the claimed feature is deemed satisfied for purposes of infringement, whether or not the comparison is actually practiced or carried out, provided that, if the comparison were actually carried out, the claimed feature would be satisfied.

Raw Materials: The Cellulose Fibers

One of the ingredients in the Composition is cellulose fibers. The cellulose fibers are obtained from a source of cellulose. The term cellulose is meant to include the unbranched polymer of D-glucose (anhydroglucose) obtained from a plant source. Cellulose and the cellulosic fibers include at least one polymer of unbranched D-glucose and can optionally also include hemicellulose and/or lignin. Individual cellulose polymer chains associate to form thicker microfibrils which, in turn, associate to form fibrils which are arranged into bundles. The bundles form fibers which are visible as components of the plant cell wall when viewed at high magnification under a light microscope or scanning electron microscope.

The term hemicellulose refers to a heterogeneous group of low molecular weight carbohydrate polymers that are associated with cellulose in wood. Hemicelluloses are generally branched polymers, in contrast to cellulose which is a linear polymer. The principal, simple sugars that combine to form hemicelluloses are: D-glucose, D-xylose, D-mannose, L-arabinose, D-galactose, D-glucuronic acid and D-galacturonic acid.

Lignin is a complex aromatic polymer and comprises about 20% to 40% of wood where it occurs as an amorphous polymer. Lignins can be grouped into three broad classes, including softwood or coniferous (gymnosperm), hardwood (dicotyledonous angiosperm), and grass or annual plant (monocotyledonous angiosperm) lignins. Softwood lignins are often characterized as being derived from coniferyl alcohol or guaiacylpropane (4-hydroxy-3-methoxyphenyl-propane) monomer. Hardwood lignins contain polymers of 3,5-dimethoxy-4-hydroxyphenylpropane monomers in addition to the guaiacylpropane monomers. The grass lignins contain polymers of both of these monomers, plus 4-hydroxyphenylpropane monomers. Hardwood lignins are much more heterogeneous in structure from species to species than the softwood lignins when isolated by similar procedures.

Representative sources of cellulose fibers include, but are not limited to, wood and non-wood plants having sources of cellulose such as soy, rice, cotton, cereal straw, flax, bamboo, reeds, esparto grass, jute, flax, sisal, abaca, hemp, bagasse, kenaf, Sabai grass, milkweed floss fibers, pineapple leaf fibers, switch grass, lignin-containing plants, and the like. The source of cellulose fibers can be virgin or waste/recycle cellulose fibers, or a combination thereof.

Typical fiber lengths for a variety of pulped cellulosic fibers are set forth in Table 1 below:

TABLE 1

| Unbeaten, Unbleached Pulp Fibers | | |
|---|---|---|
| | Fiber Length (mm) | Fibers/gram (×10,000) |
| Hardwood | | |
| Red Alder | 1.25 | 81.6 |
| Aspen | 1.05 | 118.9 |
| Sweet Gum | 1.65 | 24.2 |
| American Elm | 1.35 | 108.3 |
| Black Gum | 1.85 | 22.35 |
| Paper Birch | 1.51 | 76.12 |
| American Beech | 1.18 | 75.96 |
| Shagbark Hickory | 1.29 | 97.5 |
| Sugar Maple | 0.85 | 127.9 |
| White Oak | 1.25 | 68.91 |
| Softwood | | |
| Douglas-fir | 3.4 | 18 |
| Hemlock | 3.0 | 28 |
| Spruce-pine | 3.0 | 36 |
| Cedar | 3.8 | 42 |

Hardwood and softwood fibers can be blended into a single article to achieve a desired combination of strength, whiteness, writing surface or other required characteristics. The mixed characteristics of recovered fibers makes them particularly suited to applications such as paper, newsprint and packaging. Examples of different sources of hardwoods and softwoods, and their attributes, are described in Table 2.

TABLE 2

| Feature | Hardwood Trees | Softwood Trees |
|---|---|---|
| Type of tree | Oaks, beeches, poplars, birches and *eucalyptus* | Mainly pine and spruce |
| Usage | In Europe it is mostly birches (found in Sweden, Norway, the UK and Spain) and *eucalyptus* (found in Portugal, Spain and Norway) that are used for papermaking. In the Americas hardwoods (SBHK) are found primarily in the southeastern USA. *Eucalyptus* (TBHK) is grown primarily in Brazil for papermaking. | In Europe pine is found in the UK, Norway, Finland, France, Spain, Portugal and Greece. Spruce is found in the UK, Finland, Norway and Sweden. Softwood for high strength (NBSK) is found in Canada. Softwood for high bulk (SBSK) is found in the southeastern USA. |
| Type of fiber | Short | Long |
| Average length of fibers | 1 mm | 3 mm |
| Features | Achieving bulk, smoothness, opacity | Providing additional strength. Also suitable for writing and printing |
| Typical products | Writing papers, printing papers, tissue papers | Shipping containers, grocery bags, corrugated boxes |

Kraft softwood fiber is a low yield fiber made by the well-known Kraft (sulfate) pulping process from coniferous material and includes Northern and Southern softwood Kraft fiber, Douglas fir Kraft fiber and so forth. Kraft softwood fibers generally have a lignin content of less than 5 percent by weight, a length weighted average fiber length of greater than 2 mm, as well as an arithmetic average fiber length of greater than 0.6 mm. Kraft hardwood fiber is made by the Kraft process from hardwood sources, i.e., Eucalyptus, and has generally a lignin content of less than 5 percent by weight. Kraft hardwood fibers are shorter than Softwood fibers, typically having a length weighted average fiber length of less than 1.2 mm and an arithmetic average length of less than 0.5 mm or less than 0.4 mm.

Waste/recycle fiber may be used as the sole source of the cellulose fiber in the Composition, or it may be added to virgin cellulose fibers in the Composition and in any amount. While any suitable waste/recycle fiber may be used, waste/recycle fiber with relatively low levels of groundwood can be employed in many cases, such as office waste that contains less than 15% by weight lignin content, or less than 10% by weight lignin content. Newsprint waste can contain high quantities of lignin, such as above 10 wt. %, or 20-40 wt. % lignin.

In one or any of the embodiments mentioned, cellulose fibers can be fed to a hydropulper as a pulp containing water or as dried pulped material (e.g. as sheets or bales obtained from pulped cellulose). Any method for obtaining a pulp is suitable in the wet laid process. A pulp is a composition containing water and liberated plant based cellulose fibers processed by any of the many pulping processes familiar to one experienced in the art including sulfate, sulfite, polysulfide, soda pulping, BCTMP, PGW, TMP, CTMP, APMP, etc. as further described below. The production of a pulp starts with a source of cellulose as mentioned above, and when a wood source is used, first the wood is debarked, chipped, and optionally depithed. The chipped wood is then subjected to mechanical, chemical, or a combination of chemical and mechanical processes to make the pulp. For many wet laid processes, such as the manufacture of paper, tissues, and cardboards, a mechanically processed pulp is employed. Mechanical pulp is the refining of wood chips in the presence of atmospheric conditions, steam treatment, chemical treatment or steam/chemical treatment. Mechanical pulping obtains a mixture of fibers and fiber fragments without removing the lignin yielding a lower quality paper with a higher tendency to discolor over time. Examples of suitable mechanical processes for obtaining pulp include the bleached chemical thermomechanical pulp (BCTMP) process, the pressure groundwood pulping process (PGW), thermomechanical pulp processes (TMP), chemithermomechanical pulp processes (CTMP) and alkaline peroxide mechanical pulp processes (APMP). PGW pulp utilizes all the wood and is useful to make newsprint and where high quality over a long-life span is not required since such pulp contains impurities that can discolor weaken the paper strength. TMP pulps can also be used in newsprint and are usually stronger than PGW, and therefore also find uses in tissue and paperboard. The CTMP pulps use a combination of mechanical processing and chemical processes by applying sodium sulfite, carbonate or hydroxide to soften the pulp.

The pulp can be further processed in a pulp mill to remove additional impurities through washing, screening, and subjected to additional defibering or de-knotting.

A full chemical pulp process dissolves lignin and hemi-cellulose from the cellulose fibers using a cooking liquor, pressure and steam. Paper made from chemical pulps are also known as wood-free papers because they do not contain mechanical pulp lignin, which deteriorates over time. The pulp can also be bleached to produce white paper. Chemical pulps can be more easily bleached than mechanical pulps because the chemical processes generally remove much of the lignin and hemi-cellulose from the cellulose source.

The whiteness of pulp is measured by its ability to reflect monochromatic light in comparison to a known standard (usually magnesium oxide). An instrument commonly used is the Zeiss Elrephro reflectance meter which provides a diffuse light source. Fully bleached sulfite pulps can test as high as 94%, and unbleached Kraft pulp as low as 15% Elrephro units.

Unbleached pulps exhibit a wide range of brightness values. The sulfite process produces relatively bright chemical pulps, up to 65%, whereas those produced by Kraft, soda and semichemical processes can be rather dark.

Whether the pulp is mechanically or chemically processed, the pulp can be bleached if desired by chemical means including the use of chlorine, chlorine dioxide, oxygen, peracids, sodium hypochlorite, hydrogen and alkaline peroxide, and so forth. Desirably, oxygen is employed in the bleaching process and avoid the use of any process using chlorine. Bleached pulps processed without elemental chlorine or hypochlorite are referred to as (ECF) of Elemental Chlorine Free. An even more stringent bleach sequence has been achieved when mills go to (TCF) or Totally Chlorine Free.

A convenient table of the categories of pulp is set forth in Table 3.

TABLE 3

| Abbreviation | Type | Description |
| --- | --- | --- |
| Mechanical Pulps | | |
| RMP | Refiner Mechanical Pulp | Raw wood chips refined and discharged at atmospheric pressure |
| TMP | Thermomechanical Pulp | Steamed raw chips refined unpressured and again under no pressure. |
| CMP | Chemical Mechanical Pulp | Chemically treated chips refined at atmospheric pressure. |
| CTMP | ChemiThermoMechanical Pulp | Steamed, chemically treated chips refined under pressure and again under no pressure |

TABLE 3-continued

| Abbreviation | Type | Description |
| --- | --- | --- |
| Full Chemical Pulps | | |
| So | Soda Pulp | Chips cooked under pressure with strong NaOH |
| K | Kraft Pulp | Chips cooked with strong NaOH plus $Na_2S$ |

Mechanical pulps are used primarily in the production of newsprint and magazine. Full chemical pulps are used to produce printing/writing paper, sanitary/household, packaging material and specialty papers.

Waste/recycle paper pulp can also be used in the Compositions to make wet laid products. Paper recycling processes can use paper/board obtained from either chemically or mechanically produced pulp. By mixing the waste sources of paper/board with water and applying mechanical action the hydrogen bonds in the paper can be broken and fibers separated again. Recycled papers can be made from 100% recycled materials or blended with virgin pulp, although they are (generally) not as strong nor as bright as papers made from the latter. Most paper made from waste/recycle paper contains a proportion of virgin fiber for the sake of strength and quality.

There are two main classifications of waste/recycled fiber, any or both of which can be used as a source of cellulose fiber in the Composition:
  (i) Pre-consumer waste—This is offcut and processing waste, such as guillotine trims and envelope blank waste; it is generated outside the paper mill and could potentially go to landfill and is a genuine recycled fiber source; it includes de-inked pre-consumer (recycled material that has been printed but did not reach its intended end use, such as waste from printers and unsold publications). This category is included within the meaning of waste/recycle pulp or paper/board.
  (ii) Postconsumer waste—This is fiber from paper that has been used for its intended end use and includes office waste, magazine papers and newsprint. As the vast majority of this material has been printed—either digitally or by more conventional means such as lithography, offset, or rotogravure—it will either be recycled as printed paper or go through a de-inking process first. This category is included within the meaning of waste/recycle pulp or paper/board.

Mill broke or internal mill waste incorporates any sub-standard or grade-change paper made within the paper mill itself, which then goes back into the manufacturing system to be re-pulped back into paper. Such out-of-specification paper is not sold and is therefore often not classified as genuine reclaimed recycled fiber, however most paper mills have been reusing their own waste fiber for many years, long before recycling became common. For purposes of clarity, this category of waste is referred to as "broke" pulp and is not classified as waste/recycle paper or waste/recycle pulp as used throughout this description.

In sum, the pulp sources containing the cellulosic fiber to make the Compositions and wet laid products are not limited, and may comprise a blend of conventional fibers (whether derived from virgin pulp or waste/recycle sources) and high coarseness lignin-rich tubular fibers, such as bleached chemical thermomechanical pulp (BCTMP), thermomechanical pulp (TMP), chemithermomechanical pulp (CTMP) alkaline peroxide mechanical pulp (APMP) and the groundwood pulp (GWD), in each case bleached or unbleached, deinked, and can be processed chemically by the Kraft method to make Kraft pulps (both sulfate and sulfite) and bleached Kraft pulps. Recycled pulps may or may not be bleached in the recycling stage. Any of the pulps described above which have not previously been subjected to bleaching may be bleached as described herein to provide a bleached pulp material.

The Composition can be a furnish, can be suitable as a feed or in any composition prior to refining, can contain virgin non-fibrillated cellulose fibers, can contain refined cellulose fibers, can contain co-refined cellulose fibers (which can include broke), and can include a combination of non-fibrillated virgin and waste/recycle cellulose fibers. In one or any of the embodiments mentioned, the source of cellulosic fiber is obtained from wood, whether hardwood, softwood, or a combination thereof.

In one embodiment or in any of the mentioned embodiments, the Composition contains pulped cellulose fibers, or is obtained by combining pulped cellulose fibers to the CE staple fibers.

In one embodiment or in any of the mentioned embodiments, pulped cellulose fibers are combined with CE staple fibers, or are present in the Composition, or are present in the wet laid products containing the Composition or obtained from the Composition in an amount of at least 60 wt. %, or greater than 70 wt. %, or at least 71 wt. %, or at least 72 wt. %, or at least 75 wt. %, or at least 80 wt. %, or at least 90 wt. %, or at least 95 wt. %, or at least 98 wt. %, or at least 99 wt. %, or 100 wt. %, based on the weight of all cellulose fibers (not including CE staple fibers) in the Composition or wet laid product. At 100 wt. %, no unpulped cellulose fibers are present.

In one embodiment or in any of the mentioned embodiments, wood pulp is present in the Composition or wet laid products containing or obtained from the composition in an amount of at least 60 wt. %, or greater than 70 wt. %, or at least 75 wt. %, or at least 80 wt. %, or at least 90 wt. %, or at least 95 wt. %, or at least 98 wt. %, or at least 99 wt. %, or 100 wt. %, in each case based on the weight of all cellulose fibers (not including CE staple fibers) in the Composition or wet laid product. The remainder of the cellulose fibers can non-pulped and non-wood pulped, and desirably are pulped cellulose fibers obtained from non-wood plant-based sources.

In one embodiment or in any of the mentioned embodiments, non-wood cellulose fibers are present in the Composition or wet laid products containing or obtained from the composition in an amount of at less than 95 wt. %, or not more than 80 wt. %, or not more than 60 wt. %, or not more than 50 wt. % or not more than 40 wt. % or not more than 30 wt. % or not more than 25 wt. % or not more than 20 wt. % or not more than 15 wt. % or not more than 10 wt. %, in each case based on the weight of all cellulose fibers in the Composition or wet laid product. The remainder of the cellulose fibers can wood sourced cellulose fibers, desirably pulped wood sourced cellulose fibers. In this embodiment or in any of the mentioned embodiments, the percentage of pulped non-wood cellulose fibers can be at least 30 wt. %, or at least 40 wt. %, or at least 50 wt. %, or at least 60 wt. %, or at least 70 wt. %, or at least 80 wt. %, or at least 90 wt. %, or at least 95 wt. %, based on the weight of all cellulose fibers in the Composition.

In an embodiment or in any one of the embodiments, the Composition fed to a refiner, or the effluent from a refiner, or the Composition, or wet laid products containing or obtained from the Composition, contain less than 5 wt. %, or not more than 3 wt. %, or not more than 1 wt. %, or not more than 0.5 wt. %, or not more than 0.25 wt. %, or not more than 0.1 wt. %, or not more than 0.01 wt. %, or not more than 0.001 wt. %, or not more than 0.0001 wt. %, of fiber bundles, based on the weight of the Composition.

In an embodiment or in any one of the mentioned embodiments, the Composition contains virgin non-fibrillated cellulose fibers, or co-refined virgin cellulose fibers, in an amount of at least 25 wt. %, or at least 50 wt. %, or at least 50 wt. %, or at least 60 wt. %, or at least 70 wt. %, or at least 80 wt. %, or at least 90 wt. %, or at least 95 wt. %, or at least 98 wt. % or 100 wt. %, based on the weight of all cellulose fibers in the composition.

In another embodiment or in any of the mentioned embodiments, the Composition contains waste/recycle cellulose fibers, or co-refined waste/recycle cellulose fibers, in an amount of at least 25 wt. %, or at least 50 wt. %, or at least 50 wt. %, or at least 60 wt. %, or at least 70 wt. %, or at least 80 wt. %, or at least 90 wt. %, or at least 95 wt. %, or at least 98 wt. %, or 100 wt. %, based on the weight of all cellulose fibers in the composition.

The Composition can also contain a mix of virgin cellulose fibers and waste/recycle cellulose fibers.

As mentioned above, the Composition contains at least a cellulose fiber. Desirably, in an embodiment or in any of the mentioned embodiments, described throughout, the cellulose fiber contained in the Composition are either:
  a) virgin non-fibrillated cellulose fibers, or
  b) fibrillated waste/recycle cellulose fibers, or
  c) co-refined cellulose fibers, or
  d) virgin fibrillated cellulose fibers
  e) a combination of two or more of the above.

A virgin non-fibrillated cellulose fiber is a fiber that has either not been subjected to any refining operation at all, or is a fiber that has not been subjected to beating or refining after preparation of a commercial pulp product that is ready for use or received to a wet laid process facility (e.g. ready as a feed to a stock preparation zone in a wet laid process). While the pulp may have minimal or marginal degree of fibrillation imparted to the cellulose fibers in the pulp preparation step, nevertheless, non-fibrillated cellulose fibers are those fibers that are not subjected to beating or refining after the pulp preparation step. In many instances, the degree of fibrillation imparted, if any, during the pulp preparation process, is insufficient to produce a wet laid product that is fit for use. The wet laid process as referred throughout the description does not include the processes for making pulp from wood or other plants by any of the methods described above, e.g. BCTMP, TMP, CTMP, APMP, GWD, and the Kraft method. Although some of these processes for preparing pulps can result in minor amounts of fibrillation of cellulose, the degree of fibrillation is ineffective to obtain useful wet laid products. Compositions containing virgin non-fibrillated cellulose are useful as feeds to a refining operation as discussed in greater detail below.

Virgin fibrillated cellulose fibers are cellulose fibers that, after having been pulped, are subjected to a refining operation to fibrillate the fibers.

Co-refined cellulose fibers are those in which the cellulose fibers have been fibrillated by the action of a refiner in the presence of CE staple fibers. The co-refined cellulose fibers can be virgin, waste/recycle fibers, or a combination thereof. We have found that the wet laid products containing or obtained by Post Addition Compositions are inferior in some respects, as discussed further below, relative to the same wet laid products containing or obtained by co-refined Compositions.

The waste/recycle cellulose fibers used in the Compositions can be either fibrillated or non-fibrillated, but in most cases, the fibers have already been fibrillated when made as virgin products.

For convenience, any reference to a Composition includes cellulose present as any one of a) and/or b) above prior to refining, and includes b), c) and/or d) above after refining, unless the context dictates otherwise.

Raw Materials: The Cellulose Ester Fibers

The cellulose ester staple fiber ("CE staple fiber") in the Composition and wet laid products containing or obtained by the Composition are a form of a CE polymer. Suitable CE polymers include cellulose derivatized with a reactive compound to generate at least one ester linkage at the hydroxyl site on the cellulose backbone, such as cellulose acetate, cellulose diacetate, cellulose triacetate, cellulose propionate, cellulose butyrate, cellulose acetate formate, cellulose acetate propionate, cellulose acetate butyrate, cellulose propionate butyrate, and mixtures thereof. Although described herein with reference to "cellulose acetate," it should be understood that one or more of the above cellulose acid esters or mixed esters may also be used to form the fibers. Various types of cellulose esters are described, for example, in U.S. Pat. Nos. 1,698,049; 1,683,347; 1,880,808; 1,880,560; 1,984,147, 2,129,052; and 3,617,201, each of which is incorporated herein by reference to the extent not inconsistent with the present disclosure. As used herein, regenerated cellulose (e.g., viscose, rayon, or lyocell) and the fibers made therefrom are not classified as CE polymers or CE staple fibers.

In one embodiment or in any of the mentioned embodiments, the CE staple fibers are desirably virgin CE staple fibers. Cellulose ester fibers obtained from other sources are typically contaminated with additives or printing material. For example, cellulose ester fibers obtained from cigarette filters have plasticizers such as triacetin, which, as explained below, can contribute to agglomeration of the Composition in refining or flocculation of the resulting web. Printing material applied to cellulose ester fibers renders them undesirable unless first subjected to a de-inking process.

In one embodiment or in any of the mentioned embodiments, the CE staple fibers are desirably not refined, or non-fibrillated, upon combining them with cellulose fibers, or prior to feeding the Composition to a refiner. Thus, the Composition can contain a combination of cellulose fibers and non-fibrillated CE staple fibers, meaning that the CE staple fibers have not been refined to fibrillate the CE staple fibers. A process for cutting filaments to make the CE staple fibers is not considered a refining process or one which fibrillates the CE staple fibers. It is desirable not to refine the CE staple fibers separately from cellulose fibers, since the CE staple fibers will be combined with cellulose fibers and the combination will be subjected to refining, or the non-fibrillated CE staple fibers will be added after the cellulose fibers have been refined, in each case necessary to obtain one or more of the effects of the invention. A non-fibrillated CE staple fiber is one which contains less than an average of not more than 3 fibrils/staple fiber, or not more than an average of 2 fibrils/staple fiber, or not more than an average of 1 fibril/staple fiber, or not more than an average of 1 fibril/staple fiber, or not more than an average of 0.5 fibril/staple fiber, or not more than an average of 0.25 fibril/staple fiber, or not more than an average of 0.1 fibril/staple fiber, or not more than an average of 0.05 fibril/staple fiber, or not more than an average of 0.01 fibril/staple fiber, or not more than an average of 0.001 fibril/staple fiber, or not more than an average of 0.0001 fibril/staple fiber. Alternatively, or in addition, a non-refined CE staple fiber is one which has not undergone a refining operation. The Composition can include CE staple fibers which are either non-fibrillated, non-refined, or both. For example, Compositions made at any stage before refining as described below include non-fibrillated, or non-refined, or both non-fibrillated and non-refined CE staple fibers. After subjecting the combination of cellulose esters and CE staple fibers to refining, the CE staple fibers, while no longer considered non-refined, can optionally continue to be considered non-fibrillated since the CE staple fiber is not conditioned to become subject to fibrillation; or by virtue of a lower consistency, the CE staple fiber will not substantially fibrillate.

The cellulose ester can have a degree of substitution that is not limited, although a degree of substitution in the range of from 1.8 to 2.9 is desirable. As used herein, the term "degree of substitution" or "DS" refers to the average number of acyl substituents per anhydroglucose ring of the cellulose polymer, wherein the maximum degree of substitution is 3.0. In some cases, the cellulose ester used to form fibers as described herein may have a degree of substitution of at least 1.8, or at least 1.90, or at least 1.95, or at least 2.0, or at least 2.05, or at least 2.1, or at least 2.15, or at least 2.2, or at least 2.25, or at least 2.3 and/or not more than about 2.9, or not more than 2.85, or not more than 2.8, or not more than 2.75, or not more than 2.7, or not more than 2.65, or not more than 2.6, or not more than 2.55, or not more than 2.5, or not more than 2.45, or not more than 2.4, or not more than 2.35. Desirably, at least 90, or at least 91, or at least 92, or at least 93, or at least 94, or at least 95, or at least 96, or at least 97, or at least 98, or at least 99 percent of the cellulose ester has a degree of substitution of at least 2.15, or at least 2.2, or at least 2.25. Typically, acetyl groups can make up at least about 1, 5, 10, 15, 20, 25, 30, 35, 40, 45, 50, 55, or 60 percent and/or not up to 100% or not more than about 99, or not more than 95, or not more than 90, or not more than 85, or not more than 80, or not more than 75, or not more than 70 percent of the total acyl substituents. Desirably, greater than 90 weight percent, or greater than 95%, or greater than 98%, or greater than 99%, and up to 100 wt. % of the total acyl substituents are acetyl substituents (C2). The cellulose ester can have no acyl substituents having a carbon number of greater than 2.

In an embodiment or in any of the mentioned embodiments, the DS of the cellulose ester polymer is not more than 2.5, or not more than 2.45. Both the industrial and home compostability of CE staple fibers is most effective when made with cellulose esters having a DS of not more than 2.5. Additionally, those CE staple fibers made with cellulose ester polymers having a DS of not more than 2.5 are also soil biodegradable under the ISO 17566 test method.

The cellulose ester may have a weight-average molecular weight (Mw) of not more than 90,000, measured using gel permeation chromatography with N-methyl-2-pyrrolidone (NMP) as the solvent. In some case, the cellulose ester may have a molecular weight of at least about 10,000, at least about 20,000, 25,000, 30,000, 35,000, 40,000, or 45,000 and/or not more than about 100,000, 95,000, 90,000, 85,000, 80,000, 75,000, 70,000, 65,000, 60,000, or 50,000.

Desirably, the CE staple fibers are mono-component fibers, meaning that there are no discrete phases, such as islands, domains, or sheaths of alternate polymers in the fiber other than the CE polymer. For example, a monocomponent fiber can be entirely made of CE polymer, or a melt blend of a CE polymer and a different polymer. Desirably, at least 60% of the composition of the CE staple fibers are CE polymers, or at least 70%, or at least 75%, or at least 80%, or at least 90%, or at least 92%, or at least 95%, or at least 98%, or at least 99%, or 100% by weight of the CE staple fibers are CE polymers, based on the weight of all polymers in the fiber having a number average molecular weight of over 500 (or alternatively based on the weight of all polymers used to spin filaments from which the CE staple fibers are made). For clarity, these percentages do not exclude spin or cutting finishes applied to the filaments once spun or other additives which have a number average molecular weight of less than 500.

The cellulose ester may be formed by any suitable method, and desirably the CE staple fibers are obtained from filaments formed by the solvent spun method, which is a method distinct from a precipitation method or emulsion flashing. In a solvent spun method, the cellulose ester flake is dissolved in a solvent, such as acetone or methyl ethyl ketone, to form a "solvent dope," which can be filtered and sent through a spinnerette to form continuous cellulose ester filaments. In some cases, up to about 3 wt. % or up to 2 wt %, or up to 1 weight percent, or up to 0.5 wt. %, or up to 0.25 wt. %, or up to 0.1 wt. % based on the weight of the dope, of titanium dioxide or other delusterant may be added to the dope prior to filtration, depending on the desired properties and ultimate end use of the fibers, or alternatively, no titanium dioxide is added. The continuous cellulose ester filaments are then cut to the desired length leading to CE staple fibers having low cut length variability, and consistent L/D ratios, and the ability to supply them as dry fibers. By contrast, cellulose ester forms made by the precipitation method have low length consistency, have a random shape, a wide DPF distribution, have a wide L/D distribution, cannot be crimped, and are supplied wet.

In some cases, the solvent dope or flake used to form the CE staple fibers may include few or no additives in addition to the cellulose ester. Such additives can include, but are not limited to, plasticizers, antioxidants, thermal stabilizers, pro-oxidants, acid scavengers, inorganics, pigments, and colorants. In some cases, the CE staple fibers as described herein can include at least about 90, or at least 90.5, or at least 91, or at least 91.5, or at least 92, or at least 92.5, or at least 93, or at least 93.5, or at least 94, or at least 94.5, or at least 95, or at least 95.5, or at least 96, or at least 96.5, or at least 97, or at least 97.5, or at least 98, or at least 98.5, or at least 99, or at least 99.5, or at least 99.9, or at least 99.99, or at least 99.995, or at least 99.999 percent cellulose ester, based on the total weight of the fiber. The fibers may include or contain not more than 10, or not more than 9.5, or not more than 9, or not more than 8.5, or not more than 8, or not more than 7.5, or not more than 7, or not more than 6.5, or not more than 6, or not more than 5.5, or not more than 5, or not more than 4.5, or not more than 4, or not more than 3.5, or not more than 3, or not more than 2.5, or not more than 2, or not more than 1.5, or not more than 1, or not more than 0.5, or not more than 0.1, or not more than 0.01, or not more than 0.005, or not more than 0.001 weight percent of plasticizers, or optionally all additives, in the cellulose ester polymer or deposited onto the cellulose ester fiber or contained on or in the CE staple fiber, including but not limited to the specific additives listed herein.

At the spinnerette, the solvent dope can be extruded through a plurality of holes to form continuous cellulose ester filaments. At the spinnerette, filaments may be drawn to form bundles of several hundred, or even thousand, individual filaments. Each of these bundles, or bands, may include at least 100, or at least 150, or at least 200, or at least 250, or at least 300, or at least 350, or at least 400 and/or not more than 1000, or not more than 900, or not more than 850, or not more than 800, or not more than 750, or not more than 700 fibers. The spinnerette may be operated at any speed suitable to produce filaments, which are then assembled into bundles having desired size and shape.

Multiple bundles may be assembled into a filament band such as, for example, a crimped or uncrimped tow band. The filament band may be of any suitable size and, in some embodiments, may have a total denier of at least about 10,000, or at least 15,000, or at least 20,000, or at least 25,000, or at least 30,000, or at least 35,000, or at least 40,000, or at least 45,000, or at least 50,000, or at least 75,000, or at least 100,000, or at least 150,000, or at least 200,000, or at least 250,000, or at least 300,000. Alternatively, or in addition, the total denier of the tow band can be not more than about 5,000,000, or not more than 4,500,000, or not more than 4,000,000, or not more than 3,500,00, or not more than 3,000,000, or not more than 2,500,000, or not more than 2,000,000, or not more than 1,500,000, or not more than 1,000,000, or not more than 900,000, or not more than 800,000, or not more than 700,000, or not more than 600,00, or not more than 500,000, or not more than 400,000, or not more than 350,000, or not more than 300,000, or not more than 250,000, or not more than 200,000, or not more than 150,000, or not more than 100,000, or not more than 95,000, or not more than 90,000, or not more than 85,000, or not more than 80,000, or not more than 75,000, or not more than 70,000.

We have found that any one of the cut length, shape, denier per filament, and crimp of the CE staple fiber influences one or more properties of wet laid products containing or obtained by the Compositions, such as surface smoothness, water drainage rates, absorbency, stiffness, liquid and air permeability even with the same or smaller pore sizes, nonwoven density, light-weighting, re-wettability, softness, tensile strength, in each case relative to Post-Addition CE staple instead of co-refining, or 100% cellulose Comparative compositions, or compositions made with cellulose ester fibers outside of the described features below, or any combination of these relative comparisons. Each of these CE staple fiber features are discussed in further detail below.

The individual filaments which are spun in a generally longitudinally aligned manner and which ultimately form the tow band, are of a particular size. The linear denier per filament (weight in g of 9000 m fiber length), or DPF, of the CE filaments and of the corresponding CE staple fibers, are desirably within a range of 0.5 to less than 3. The particular method for measurement is not limited, and include ASTM 1577-07 using the FAVIMAT vibroscope procedure if filaments can be obtained from which the staple fibers are cut, or a width analysis using any convenient optical microscopy or Metso.

The DPF can also be correlated to the maximum width of a fiber. The maximum width of a fiber is measured as the longest outermost diameter dimension, and in the case of any fiber than is not round, a convenient method for measuring the longest outer diameter is to spin the fiber. Table 4 illustrates a convenient correlation of DPF to maximum widths (or outer diameter) of the fibers, regardless of shape and including multi-lobal shapes.

TABLE 4

| DPF | Approximate width (microns) |
|---|---|
| 1.6 | 22 |
| 2.0 | 25 |
| 2.4 | 28 |
| 2.8 | 30 |
| 3.2 | 32 |
| 3.6 | 34 |
| 4.0 | 36 |

Desirably, the DPF of the filaments, and of the CE staple fibers, are within a range of 1.0 to 2.8, or 1.0 to 2.5, or 1.0 to 2.2, or 1.0 to 2.1, or more desirably from 1.0 to 2.0, or 1.0 to less than 2.0, or 1.0 to 1.9, or 1.1 to 1.9, or 1.1 to 1.8. We have found that handsheets made with the Compositions in which the CE staple fibers have a DPF of less than 3 have increased air permeability relative to those made with fibers at 3 DPF or more.

In another embodiment or in any one of the mentioned embodiments, the maximum width of the fibers are less than 31 microns, or not more than 30 microns, or not more than 28 microns, or not more than 27 microns, or not more than 26 microns, or not more than 25 microns, or not more than 24.5 microns, or not more than 24 microns. In one embodiment or in any of the mentioned embodiments, the minimum widths, or diameters of the fibers are more than 1 micron (1000 nanometers), or at least 2 microns (2000 nanometers), or at least 3 microns, or at least 4 microns, or at least 5 microns, or at least 7 microns, or at least 9 microns, or least 10 microns, or at least 12 microns, or at least 15 microns, or at least 17 microns, or at least 18 microns, or at least 20 microns.

In one embodiment or in any of the mentioned embodiments, at least 70%, or at least 80%, or at least 85%, or at least 90%, or at least 95%, or at least 97% of the CE staple fibers have a DPF within +/−20% of any one of the above stated DPF. Alternatively, at least 70%, or at least 80%, or at least 85%, or at least 90%, or at least 95%, or at least 97% of the CE staple fibers have a DPF within +/−15% of any one of the above stated DPF; or at least 70%, or at least 80%, or at least 85%, or at least 90%, or at least 95%, or at least 97% of the CE staple fibers have a DPF within +/−10% of any one of the above stated DPF. Desirably, at least 85%, or at least 90%, or at least 95%, or at least 97% of the CE staple fibers have a DPF within +/−15%, or within +/−10% of any one of the above stated DPF.

In one embodiment or in any of the mentioned embodiments, the DPF can have a small distribution span satisfying the following formula:

$$\frac{d90 - d10}{d50} * 100 \leq S$$

where d is based on the median DPF, $d_{90}$ is the value at which 90% of the fibers have a DPF less than target DPF, $d_{10}$ is the value at which 10% of the fibers have a DPF less than the target DPF, $d_{50}$ is the value at which 50% of the fibers have a DPF less than the target DPF and 50% of fibers have a DPF more than the target DPF, and S is 40%, or 35%, or 30%, or 25%, or 20%, or 15%, or 13%, or 10%, or 8%, or 7%.

The individual cellulose ester filaments discharged from the spinnerette, and the CE staple fibers, may have any suitable transverse cross-sectional shape. Exemplary cross-sectional shapes include, but are not limited to, round or other than round (non-round). Non-round shapes include Y-shaped or other multi-lobal shapes such as I-shaped (dog bone), closed C-shaped, X-shaped, or crenulated shapes. When a cellulose ester filament, or CE staple fiber, has a multi-lobal cross-sectional shape, it may have at least 3, or 4, or 5, or 6 or more lobes. In some cases, the filaments may be symmetric along one or more, two or more, three or more, or four or more axes, and, in other embodiments, the filaments may be asymmetrical. As used herein, the term "cross-section" generally refers to the transverse cross-section of the filament measured in a direction perpendicular to the direction of elongation of the filament. The cross-section of the filament may be determined and measured using Quantitative Image Analysis (QIA). Staple fibers will have a cross-section similar to the filaments from which they are formed without mechanically deforming the staple fibers.

In some embodiments, the cross-sectional shape of an individual cellulose ester filament and the CE staple fibers may be characterized according to its deviation from a round cross-sectional shape. In some cases, this deviation from perfectly round can be characterized by the shape factor of the filament, which is determined by the following formula: Shape Factor=Average Cross Sectional Perimeter/(4π×Average Cross-Sectional Area)½. The shape factor of filament or CE staple fibers having a perfect round cross-sectional shape is 1. In some embodiments, the shape factor of the individual cellulose ester filaments or CE staple fibers is at least about 1, 1.1, 1.15, 1.2, 1.25, 1.3, 1.35, 1.4, 1.45, 1.5, 1.55, 1.6, 1.65, 1.7, 1.75, 1.8, 1.85, 1.9, 1.95, or 2. In addition or in the alternative, the shape factor of the cellulose ester filaments and CE staple fibers is not more than about 5, 4.8, 4.75, 4.5, 4.25, 4, 3.75, 3.5, 3.25, 3, 2.75, 2.5, 2.25, 2, 1.75, 1.5, or 1.25. The shape factor can be calculated from the cross-sectional area of a filament, which can be measured using QIA. As used herein, a round shape would have a shape factor of less than 1.25, while a non-round shape would have a shape factor of 1.25 or more.

In one embodiment or in any of the mentioned embodiments, desirably, the shape of the CE staple fiber is:
 a) other than round, or
 b) has a shape factor of at least 1.25, or at least 1.3, or at least 1.5, or at least 2, or
 c) is multi-lobal shaped, such as a Y shape, or a crenulated shape, or
 d) any combination of any two or more of the above.

The air permeability of wet laid products tend to decrease when made with compositions containing round shaped CE staple fibers. However, should one desire a density of at least 0.450 g/cc wet laid product having significantly improved water permeability over a 100% Cellulose Comparative composition, a round shaped fiber can used, e.g. shape factor of less than 1.25, or cut from filaments solvent spun through round holes, or targeted as round.

In one embodiment or in any of the mentioned embodiments, at least 70%, or at least 80%, or at least 85%, or at least 90%, or at least 95%, or at least 97%, or at least 99% of the CE staple fibers have the stated shape.

After multiple bundles are assembled into a filament yarn (or tow band), it may be passed through a crimping zone wherein a patterned wavelike shape may be imparted to at least a portion, or substantially all, of the individual filaments. In some cases, the filaments may not be crimped, and the uncrimped filaments may be passed directly from the spinnerette to a drying zone. When used, the crimping zone includes at least one crimping device for mechanically crimping the filament yarn. Filament yarns desirably are not crimped by thermal or chemical means (e.g., hot water baths, steam, air jets, or chemical coatings), but instead are mechanically crimped using a suitable crimper. One example of a suitable type of mechanical crimper is a "stuffing box" or "stutter box" crimper that utilizes a plurality of rollers to generate friction, which causes the fibers to buckle and form crimps. Other types of crimpers may also be suitable. Examples of equipment suitable for imparting crimp to a filament yarn are described in, for example, U.S. Pat. Nos. 9,179,709; 2,346,258; 3,353,239; 3,571,870; 3,813,740; 4,004,330; 4,095,318; 5,025,538; 7,152,288; and 7,585,442, each of which is incorporated herein by reference to the extent not inconsistent with the present disclosure. In some cases, the crimping step may be performed at a rate of at least about 50 m/min (75, 100, 125, 150, 175, 200, 225, 250 m/min) and/or not more than about 750 m/min (475, 450, 425, 400, 375, 350, 325, or 300 m/min).

In one embodiment or in any of the mentioned embodiments, the crimped CE staple fibers have an average effective length that is not more than 85 percent of the actual length of the crimped CE staple fibers. The effective length refers to the maximum dimension between any two points of a fiber and the actual length refers the end-to-end length of a fiber if it were perfectly straightened. If a fiber is straight, its effective length is the same as its actual length. However, if a fiber is curved and/or crimped, its effective length will be less than its actual length, where the actual length is the end-to-end length of the fiber if it were perfectly straightened. In one embodiment or in any one of the embodiments described herein, the crimped fibers have an average effective length that is not more than 80, or not more than 75, or not more than 65, or not more than 50, or not more than 40, or not more than 30, or not more than 20 percent of the actual length of the bent fibers.

The low DPF CE staple fibers can be susceptible to breakage when cut from the filaments, or when further processed, compared to the normal frequency of crimps imparted to higher denier fibers typically used in cigarette filter tow. Crimping is a useful component of the CE staple fiber to enhance cohesion and entanglement with the cellulosic fibers and with each other. However, given the low DPF of the fibers, a low frequency of crimps is desirable to minimize fiber breakage when the filaments are cut to staple and when they are further processed or handled prior to their combination with the cellulosic fibers, and also to retain a high degree of retained tenacity. As used herein, the term "retained tenacity" refers to the ratio of the tenacity of a crimped filament (or staple fiber) to the tenacity of an identical but uncrimped filament (or staple fiber), expressed as a percent. For example, a crimped fiber having a tenacity of 1.3 gram-force/denier (g/denier) would have a retained tenacity of 87 percent if an identical but uncrimped fiber had a tenacity of 1.5 g/denier.

In one embodiment or in any of the mentioned embodiments, the crimped cellulose ester filaments are capable of having a retained tenacity of at least about 40%, or at least 50%, or at least 60%, or at least 65%, or at least 70%, or at least 75%, or at least 80%, or at least 85%, or at least 90%, or at least 95%.

Crimping may be performed such that the continuous filaments from which the CE staple fibers are cut and/or the CE staple fibers themselves have a crimp frequency of at least 5, or at least 7, or at least 10, or at least 12, or at least 13, or at least 15, or at least 17, and up to 30, or up to 27, or up to 25, or up to 23, or up to 20, or up to 19 crimps per inch (CPI), measured according to ASTM D3937-12. Higher than 30 CPI tends to result in excess breakage in the cutting of filaments to staple at the small cut lengths described below, and also reduces their retained tenacity. Fewer than 5 CPI will result in too few CE staple fibers manifesting a crimp at the small cut lengths described below. Desirably, the average CPI of the filaments used to make the CE staple fibers is a value from 7 to 30 CPI, or 10 to 30 CPI, or 10 to 27 CPI, or 10 to 25 CPI, or 10 to 23 CPI, or 10 to 20 CPI, or 12 to 30 CPI, or 12 to 27 CPI, or 12 to 25 CPI, or 12 to 23 CPI, or 12 to 20 CPI, or 15 to 30 CPI, or 15 to 27 CPI, or 15 to 25 CPI, or 15 to 23 CPI, or 15 to 20 CPI.

In one embodiment or in any of the mentioned embodiments, the ratio of the crimp frequency CPI to DPF can be greater than about 2.75:1, or greater than 2.80:1, or greater than 2.85:1, or greater than 2.90:1, or greater than 2.95:1, or greater than 3.00:1, or greater than 3.05:1, or greater than 3.10:1, or greater than 3.15:1, or greater than 3.20:1, or greater than 3.25:1, or greater than 3.30:1, or greater than 3.35:1, or greater than 3.40:1, or greater than 3.45:1, or greater than 3.50:1. In some cases, this ratio may be even higher, such as, for example, greater than about 4:1, or greater than 5:1, or greater than 6:1, or greater than or greater than 7:1 particularly when, for example, the fibers being crimped are relatively fine.

The ratio of the CPI to the DPF is a useful measure to ensure that the proper CPI is imparted for a given DPF and retain the balance of necessary crimp frequency and tenacity for a given DPF. Examples of desirable ratios of CPI:DPF include from 4:1 to 20:1, and especially 5:1 to 14:1, or 7:1 to 12:1.

When crimped, the crimp amplitude of the fibers may vary and can, for example, be at least about 0.5, or at least 0.6, or at least 0.7, or at least 0.85, or at least 0.90, or at least 0.93, or at least 0.96, or at least 0.98, or at least 1.00, or at least 1.04, in each case mm. Additionally, or in the alternative, the crimp amplitude of the fibers can be up to 1.75, or up to 1.70, or up to 1.65, or up to 1.55, or up to 1.35, or up to 1.28, or up to 1.24, or up to 1.15, or up to 1.10, or up to 1.03, or up to 0.98 mm, or up to 0.85 mm, or up to 0.75 mm, or up to 0.7 mm.

Additionally, the final staple fibers may have a crimp ratio of at least about 1:1. As used herein, "crimp ratio" refers to the ratio of the non-crimped tow length to the crimped tow length. In some embodiments, the staple fibers may have a crimp ratio of at least about 1:1, at least about 1.1:1, at least about 1.125:1, at least about 1.15:1, or at least about 1.2:1.

Figure 4:
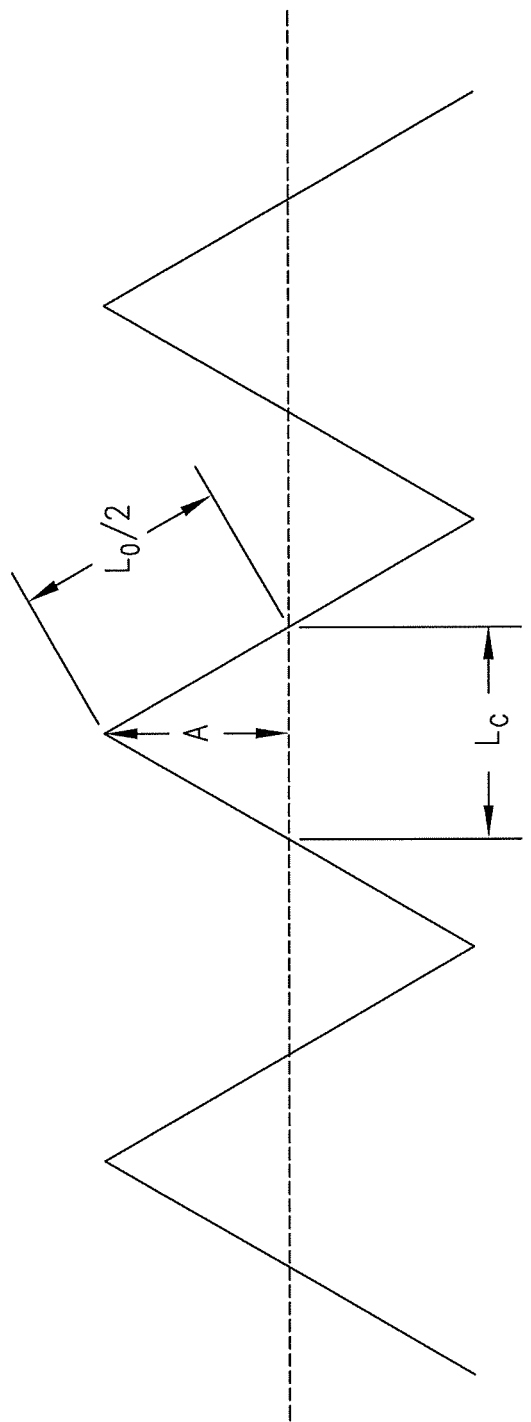
FIG. 4 is a diagram of crimps applied to a fiber describing the basis for calculating the crimp amplitude and crimp ratio.

Crimp amplitude and crimp ratio are measured according to the following calculations, with the dimensions referenced being shown in FIG. 4: Crimped length (Lc) is equal to the reciprocal of crimp frequency (1/crimp frequency), and the crimp ratio is equal to the straight length (L0) divided by the crimped length (L0:Lc). The amplitude (A) is calculated geometrically, as shown in FIG. 4, using half of the straight length (L0/2) and half of the crimped length (Lc/2). The uncrimped length is simply measured using conventional methods.

Desirably, the CE staple fibers and/or the filaments from which the CE staple fibers are derived, are crimped to improve the freeness of Compositions and the air permeability and thickness of the wet laid products containing or obtained by the Composition relative to compositions that employ uncrimped fibers.

In one embodiment or in any of the mentioned embodiment, the crimped CE staple fibers desirably can have one or more of the following features:
  a) a crimp frequency of 10 to 30 CP, or 10 to 25 CPI, or 10 to 23 CPI, or 10 to 20 CPI, or 12 to 30 CPI, or 12 to 27 CPI, or 12 to 25 CPI, or 12 to 23 CPI, or 12 to 20 CPI crimps per inch, or
b) a crimp amplitude of at least 0.5 mm, or
c) an average effective length that is not more than 75% of the actual length, or
d) a retained tenacity of at least 80%, or
e) a CPI:DPF of 5:1 to 14:1, or 7:1 to 12:1, or
f) any combination of two or more of the above.

After crimping (or, if not crimped, after spinning), the fibers may further be dried in a drying zone in order to reduce the moisture and/or solvent content of the filament yarn or tow band. In one embodiment or in any of the mentioned embodiments, the CE staple fibers are dry, as further explained below.

In one embodiment or in any of the mentioned embodiment, the CE staple fibers are combined with cellulose fibers and/or water as dry CE staple fibers. A dry CE staple fiber will have a moisture content of not more than 30 wt. % moisture, or not more than 25 wt. % moisture, as determined by oven dryness. The final moisture content, or level of dryness, of the filament yarn (or tow band), and of the CE staple fibers, particularly between cutting and combining with cellulose fibers, or upon combining with or adding to cellulose fibers and/or water or into a Composition, or as fed to a hydropulper, or in bales, can be less than 1 wt. %, and desirably is at least about 1 wt. %, or at least 2 wt. %, or at least 3 wt. %, or at least 3.5 wt. %, or at least 4 wt. %, or at least 4.5 wt. %, or at least 5 wt. %, or at least 5.5 wt. %, or at least 6 wt. %, based on the total weight of the yarn or staple fibers and/or not more than about 20 wt. %, or not more than 18 wt. %, or not more than 16 wt. %, or not more than 13 wt. %, or not more than 10 wt. %, or not more than 9 wt. %, or not more than 8 wt. %, or not more than 7 wt. %, or not more than 6.5 wt. %, based on the weight of the filament yarn or the staple fibers, as determined by oven dryness. Suitable ranges include, but are not limited to, 3-20, or 3-18, or 3-16, or 3-13, or 3-10, or 3-9, or 3-8, or 3-7, or 3-6.5, or 4-20, or 4-18, or 4-16, or 4-13, or 4-10, or 4-9, or 4-8, or 4-7, or 4-6.5, or 5-20, or 5-18, or 5-16, or 5-13, or 5-10, or 5-9, or 5-8, or 5-7, or 5.5-20, or 5.5-18, or 5.5-16, or 5.5-13, or 5.5-10, or 5.5-9, or 6-20, or 6-18, or 6-16, or 6-13, or 6-10, in each case as wt. % based on the weight of the CE staple fiber.

In another embodiment or in any one of the mentioned embodiments, the CE staple fibers, prior to or upon their combination with cellulose fibers or prior to their addition into a hydropulper vessel, have no liquid added to them and/or their moisture content is the equilibrium moisture of the surrounding non-moisture-controlled environment.

The CE staple fibers have the advantage of not requiring their maintenance as a slurry or emulsion (e.g. greater than 30 wt % water) during shipping as well as reducing shipping weight and its associated costs. Any suitable type of dryer can be used such as, for example, a forced air oven, a drum dryer, or a heat setting channel. The dryer may be operated at any temperature and pressure conditions that provide the requisite level of drying without damaging the yarn.

Once dried, the filament yarn (or tow band) may be fed to a cutting zone without first baling, or may be optionally baled and the resulting bales may be introduced into a cutting zone, wherein the yarn or tow band may be cut into staple fibers. Any suitable type of cutting device may be used that is capable of cutting the filaments to a desired length without excessively damaging the fibers. Examples of cutting devices can include, but are not limited to, rotary cutters, guillotines, stretch breaking devices, reciprocating blades, and combinations thereof. Once cut, the cellulose ester fibers may be baled or otherwise bagged or packaged for subsequent transportation, storage, and/or use.

The cut length can be determined by any suitable reliable method. Commonly used optical instruments include the Metso FS-5 and the Optest FQA. The data output of these devices can provide information such as the average length and length distribution curve.

The cut length referred to herein can be the average cut length or the set point on the cutter to designate the target cut length. The CE staple fiber length is generally in the range of at least 1.5 mm and up to 20 mm. Examples of desirable cut lengths include a cut length of at least 2 mm, or at least 2.5 mm, and not more than about 10 mm, or not more than 8 mm, or not more than 6 mm, or not more than 5 mm, or not more than or less than 4.5 mm, or not more than or less than 4.0 mm, or not more than 3.8 mm, or not more than 3.5 mm, or not more than 3.3 mm. Examples of cut length ranges include from 2 to 10 mm, or 2.5 to 8 mm, or 2.0 to 6 mm, or from 1.5 to less than 6.0, or from 2.0 to less than 6.0, or from about 3 to 6 mm, or from 2.5 to 5 mm, or from 2.5 to 4.5 mm, or from 2.5 to 4 mm, or from 2.5 to less than 4 mm, or from 2.5 to 3.8 mm, or from 2.5 to 3.5 mm. To obtain some of the benefits described below, the cut length of the CE staple fibers is desirably less than 6 mm, or not more than 5.5 mm, or not more than 5.0 mm, or not more than 4.5 mm, or not more than or less than 4 mm.

In one embodiment or in any of the mentioned embodiments, at least 70%, or at least 80%, or at least 85%, or at least 90%, or at least 95%, or at least 97% of the CE staple fibers have a cut length within +/−20% of any one of the above stated cut lengths. Alternatively, at least 70%, or at least 80%, or at least 85%, or at least 90%, or at least 95%, or at least 97% of the CE staple fibers have a cut length within +/−15% of any one of the above stated cut lengths; or at least 70%, or at least 80%, or at least 85%, or at least 90%, or at least 95%, or at least 97% of the CE staple fibers have a cut length within +/−10% of any one of the above stated cut lengths. Desirably, at least 85%, or at least 90%, or at least 95%, or at least 97% of the CE staple fibers have a cut length within +/−15%, or within +/−10% of any one of the above stated cut lengths.

In one embodiment or in any of the mentioned embodiments, the cut length can have a small distribution span satisfying the following formula:

$$\frac{d90 - d10}{d50} * 100 \le S$$

where d is based on the median cut length, $d_{90}$ is the value at which 90% of the fibers have a cut length less than target cut length, $d_{10}$ is the value at which 10% of the fibers have a cut length less than the target cut length, $d_{50}$ is the value at which 50% of the fibers have a cut length less than the target cut length and 50% of fibers have a cut length more than the target cut length, and S is 40%, or 35%, or 30%, or 25%, or 20%, or 15%, or 13%, or 10%, or 8%, or 7%.

The CE staple fibers are fibers rather than particles. As such, the CE staple fibers have an aspect ratio (L/D) of at least 1.5:1, or at least 2:1, or at least 2.5:1, or at least 3:1, or at least 3.5:1, or at least 4:1, or at least 5:1, or at least 6:1, or at least 7:1, or at least 8:1, or at least 9:1, or at least 10:1, or at least 20:1, or at least 30:1, or at least 40:1, or at least 50:1.

In one or any of the embodiments mentioned, at least a portion of the CE staple fibers are retained on a 40 mesh.

Because the CE staple fibers are fibers having cut lengths of at least 1.5 mm, at least 50%, or at least 60%, or at least 80%, or at least 90%, or at least 95%, or at least 97% by weight of the CE staple fibers will not pass through, or be retained on a 40 mesh (0.420 mm openings). Since some of the CE staple fibers poured onto a 40 mesh can be vertically oriented, they can pass through but others oriented off of the vertical will be retained since their cut length is at least 1.5 mm and quickly form a mat to retain all remaining fibers.

In one or any of the embodiments mentioned, the ratio of CE staple fiber cut length to DPF is less than 10:1, or not more than 8:1, or not more than 5:1, or not more than 4:1, or not more than 3.1, optionally further with Compositions containing CE staple fibers having a cut length of less than 6 mm. This ratio is a useful way to define a fiber both in terms of its cut length and DPF relationship, and we have found that both features affect one of more of the properties identified above. The ratio of cut length:DPF can be not more than 2.95:1, or not more than 2.9:1, or not more than 2.85:1 or not more than 2.8:1 or not more than 2.75:1 or not more than 2.6:1 or not more than 2.5:1 or not more than 2.3:1 or not more than 2.0:1. In one or any of the embodiments mentioned, the cut length:DPF is not more than 3.5:1, or not more than 3.3:1, or not more than 3:1, or not more than 2.95:1, or not more than 2.8:1, or not more than 2.5:1 at a cut length of less than 6 mm, or not more than 5 mm, or not more than 4 mm.

In one or any of the embodiments mentioned, the CE staple fibers can have any one or more of the following features:
a) a cut length of less than 6.0 mm, or 2.0 to 5 mm, or
b) an aspect ratio L/D of at least 5:1, or at least 10:1, or
c) a cut length:DPF ratio of not more than 4, or not more than 3.5, or
d) at least 80% of the CE staple fibers have a cut length within +/−20% of any one of the above stated cut lengths, or
e) the CE staple fibers have a distribution span satisfying the following formula:

$$\frac{d90 - d10}{d50} * 100 \le S$$

where S is 20%, or 15%, or 13%, or 10%, or 8%, or 7%, or
f) any combination of two or more of any of the above.

Any suitable type of cutting device may be used that can cut the filaments to a desired length without excessively damaging the fibers. Examples of cutting devices can include, but are not limited to, rotary cutters, guillotines, stretch breaking devices, reciprocating blades, and combinations thereof. Once cut, the staple fibers may be baled or otherwise bagged or packaged for subsequent transportation, storage, and/or use.

The fiber to fiber coefficient of dynamic friction ("F/F CODF") and the fiber to metal coefficient of dynamic friction ("F/M CODF") can be influenced by the application of a finish on the filaments used to make the CE staple fibers and present on the CE staple fibers. A finish applied to the CE filaments, also called "fiber finish" or "spin finish," refers to any suitable type of coating that, when applied to a fiber filament modifies friction exerted by and on the fiber, and alters the ability of the fibers to move relative to one another and/or relative to a metal surface. Finishes are not the same as adhesives, bonding agents, or other similar chemical additives which, when added to fibers, prevent movement between the fibers by adhering them to one another. Finishes, when applied, continue to permit the movement of the fibers relative to one another and/or relative to other surfaces while modifying the ease of this movement by increasing or decreasing the frictional forces.

In one or any of the embodiments mentioned, if a spin or cutting finish is applied to the filaments and/or present on the CE staple fibers, the finish decreases the F/F CODF and/or the F/M CODF, relative to the same fiber without a finish. A finish which decreases the F/F CODF and/or F/M CODF on the fibers can decrease the potential for the fibers to agglomerate or flocculate with each other during refining and/or exiting the refiner, or to decrease the potential of the fibers to agglomerate on the metal surfaces of the refiner.

The CE staple fibers may exhibit a fiber-to-fiber staple pad friction coefficient of friction of at least about 0.10, 0.15, 0.20, 0.25, 0.30, 0.35, 0.40, 0.45, or 0.50 and/or not more than about 1, 0.95, 0.90, 0.85, 0.80, 0.75, 0.70, 0.65, 0.60, 0.55, or 0.50, measured as described in U.S. Pat. No. 5,863,811, the entire disclosure of which is incorporated herein by reference to the extent not inconsistent with the present disclosure. Additionally, or in the alternative, the CE staple fibers may exhibit a fiber-to-metal staple pad friction coefficient of friction of at least about 0.10, 0.15, 0.20, or 0.25 and/or not more than about 0.55, 0.50, 0.45, 0.40, 0.35, or 0.30, measured as described in U.S. Pat. No. 5,683,811. In some cases, the CE staple fibers may exhibit a F/F coefficient of dynamic friction ("F/F CODF"), measured on the filament yarn from which they are cut according to ASTM D3412, of at least about 0.01, 0.02, 0.03, 0.04, 0.05, or 0.06 or 0.1, or 0.11, or 0.12, or 0.13 and/or not more than about 0.20, or 0.18, or 0.15, 0.14, 0.13, 0.12, 0.11, 0.10, 0.09, 0.08, 0.07, or 0.06.

In one or any of the embodiments mentioned, the CE staple fibers can have an untwisted F/F CODF (also called a fiber to fiber sliding friction) between 0.11 to 0.20 as measured by ASTM D3412/3412M-13 on the filament yarn from which they are cut. To determine the F/F CODF of the filaments, uncrimped continuous filaments are formed that have the same Composition, denier, shape, and CPI as the filaments used to make the CE staple fiber, or if available, the continuous filaments used to make the CE staple fiber are used, and formed into a filament yarn, and conditioned at 70° F. and 65% relative humidity for 24 hours before testing. The filament yarn is measured according to ASTM D3412/3412M-13, with the exception that only 1 twist is used, the rate is at 20 m/min, and the yarn is tested on a Constant Tension Transport with Electronic Drive (CTT-E) at an input tension of 10 grams. The values obtained by this method are deemed to be the F/F CODF of the CE staple fibers. The F/F CODF can be from 0.11 to 0.20, or from 0.11 to less than 0.20, or from 0.11 to 0.19, or from 0.11 to 0.18, or from 0.11 to 0.17, or from 0.11 to 0.16, or from 0.11 to 0.15, or from 0.12 to 0.20, or from 0.12 to less than 0.20, or from 0.12 to 0.19, or from 0.12 to 0.18, or from 0.12 to 0.17, or from 0.12 to 0.16, or from 0.12 to 0.15.

Frictional forces are exerted through the fiber to metal contact at many stages of the wet laid production process, such as refining, pumping, screening, cleaning, blending, etc. These frictional forces can result in weakening of the fiber to the point of breakage, resulting in the development of short fiber content. Desirably, the F/M CODF is not more than 0.70, or not more than 0.65, or not more than 0.60, or not more than 0.59, or not more than 55, or not more than 0.52, or nor more than 0.50, or not more than 0.48, or not more than 0.47. Desirable ranges include 0.30 to 0.80, or 0.30 to 0.70, or 0.30 to 0.65, or 0.30 to 0.60, or 0.40 to 0.80, or 0.40 to 0.70, or 0.40 to 0.65, or 0.40 to 0.60, or 0.45 to 0.80, or 0.45 to 0.70, or 0.45 to 0.65, or 0.45 to 0.60, or 0.48 to 0.80, or 0.48 to 0.70, or 0.48 to 0.65, or 0.48 to 0.60, or 0.50 to 0.80, or 0.50 to 0.70, or 0.50 to 0.65, or 0.50 to 0.60.

In one or any of the embodiments mentioned, it is not necessary to apply an anti-static finish that decreases the static electricity potential on the fibers without also decreasing the F/F CODF and/or F/M CODF. While one may apply a finish which has the dual function of decreasing the F/F CODF and reducing the static charge on the fibers, it is not necessary to separately apply a sole purpose anti-static finish once the filament yarn already has the desired F/F CODF properties since the CE staple fibers will be dispersed in water and as such, the potential for static build up is negligible if non-existent in the stock or machine zone. However, an anti-static finish can be present on the CE staple fibers and applied to the filament yarn from which the CE staple fibers are cut if one desires to obtain anti-static properties in the wet laid articles made with the Compositions and the anti-static finish is retained on the CE staple fibers through the wet laid process for making the article.

In the case one applies an anti-static finish, the CE staple fibers can have a static electricity charge of less than 1.0 at 65% relative humidity. The test method for determining the static electricity charge of the CE staple fibers is as follows. The sample is a filament yarn used to make the staple fibers. The filament yarn is exposed to a controlled environment at 65% relative humidity at 70° F. for 24 hours to condition the filament yarn. A two (2) foot section of the filament yarn is secured at one end, the other end is held by hand while rubbing the secured section of the filament yarn back and forth along the whole 2-foot section for 3 cycles using the side of a wooden #2 pencil. The static electricity charge imparted to the filaments are measured using a Simco Electrostatic Fieldmeter Model FMX-003 or equivalent device. The static electricity charge on the CE staple fibers, measured as noted above, can be no more than 1.0, or no more than 0.98, or no more than 0.96, or no more than 0.90, or no more than 0.85, or no more than 0.80, or no more than 0.78, or no more than 0.75, or no more than 0.70, or no more than 0.68, or no more than 0.58, or no more than 0.60, or no more than 0.58, or no more than 0.55, or no more than 0.50.

Any suitable method of applying a finish may be used and can include, for example, spraying, wick application, dipping, or use of squeeze, lick, or kiss rollers.

One or more types of finishes may be used. The cumulative amount of all finish applied, if desired, will depend on the type of finishes, the fiber denier, cut length, and the type of CE used to impart to the CE staple fibers the desired F/F CODF and/or F/M CODF (and static electricity charge if desired). When used, the finishes may be of any suitable type and can be present on the filaments, filament yarns, tow bands, CE staple fibers, and CE staple fibers present in wet laid products and Compositions. Suitable amounts of finish on the CE staple fibers can be at least about 0.01, or at least 0.02, or at least 0.05, or at least 0.10, or at least 0.15, or at least 0.20, or at least 0.25, or at least 0.30, or at least 0.35, or at least 0.40, or at least 0.45, or at least 0.50, or at least 0.55, or at least 0.60 percent finish-on-yarn (FOY) relative to the weight of the dried CE staple fiber. Alternatively, or in addition, the cumulative amount of finish may be present in an amount of not more than about 2.5, or not more than 2.0, or not more than 1.5, or not more than 1.2, or not more than 1.0, or not more than 0.9, or not more than 0.8, or not more than 0.7 percent finish-on-yarn (FOY) based on the total weight of the dried fiber. The amount of finish on the fibers as expressed by weight percent may be determined by solvent extraction. As used herein "FOY" or "finish on yarn" refers to the amount of finish on the yarn less any added water, and in the context of the Compositions, the percentage on yarn or tow would be deemed to correspond to the percentage on the CE staple fibers present in the Compositions. If a finish is applied, the desired cumulative amount of finish on the fibers is from 0.10 to 1.0, or 0.10 to 0.90, or 0.10 to 0.80, or 0.10 to 0.70, or 0.15 to 1.0, or 0.15 to 0.90, or 0.15 to 0.80, or 0.15 to 0.70, or 0.20 to 1.0, or 0.20 to 0.90, or 0.20 to 0.80, or 0.20 to 0.70, or 0.25 to 1.0, or 0.25 to 0.90, or 0.25 to 0.80, or 0.25 to 0.70, or 0.30 to 1.0, or 0.30 to 0.90, or 0.30 to 0.80, or 0.30 to 0.70, each as % FOY.

The CE staple fibers and the wet laid products containing the CE staple fibers can include little or no plasticizer. In some embodiments, the CE staple fibers in the Compositions, or the CE staple fibers added to the Compositions, or the wet laid products, or the combination thereof, contain not more than, or have added not more than, 5, or not more than 4.5, or not more than 4, or not more than 3.5, or not more than 3, or not more than 2.5, or not more than 2, or not more than 1.5, or not more than 1, or not more than 0.5, or not more than 0.25, or not more than 0.10, or nor more than 0.05, or not more than 0.01 wt. % plasticizer, based on the total weight of the CE staple fibers; or the Compositions contain CE staple fibers onto which no plasticizer has been added, or the wet laid product, whether virgin CE staple fibers or waste/recycle CE staple fibers or both. When present, the plasticizer may be incorporated into the fiber itself by being blended with the solvent dope or cellulose ester flake, or the plasticizer may be applied to the surface of the fiber or filament by spraying, by centrifugal force from a rotating drum apparatus, or by an immersion bath.

Plasticizers are desirably not present on or in the CE staple fibers before being fed to a refiner, and plasticizers desirably are not applied to the filaments from which the CE staple fibers are cut, because plasticizers can increase the tendency of the fibers to agglomerate by the refining operation. Without being bound to a theory, it is believed that the shear forces imparted during refining can increase localized or instantaneous temperatures of the fibers, and since plasticizers depress the glass transition temperature of the polymer, the fibers will have a greater tendency to melt, fuse, or bond, and in the end agglomerate. The hardness of the CE staple fibers desired to assist in fibrillating the cellulose fibers in the refiner can be compromised with the addition of plasticizer.

If present, the plasticizer may be incorporated into the fiber itself by being blended with the solvent dope or cellulose ester flake, or the plasticizer may be applied to the surface of the fiber or filament by spraying, by centrifugal force from a rotating drum apparatus, or by an immersion bath.

Plasticizers are compounds that can decrease the glass transition temperature of a polymer. Examples of plasticizers that are either not present or added to the CE staple fibers before refining (plasticizers can be added post blending to the furnish), or not present in or added to the filaments from which the CE staple fibers are derived, or if present are in low amounts, include, but are not limited to, aromatic polycarboxylic acid esters, aliphatic polycarboxylic acid esters, lower fatty acid esters of polyhydric alcohols, and phosphoric acid esters. Further examples can include, but are not limited to, the phthalate acid acetates such as dimethyl phthalate, diethyl phthalate, dibutyl phthalate, dihexyl phthalate, dioctyl phthalate, dimethoxyethyl phthalate, ethyl phthalylethyl glycolate, butyl phthalylbutyl glycolate, levulinic acid esters, dibutyrates of triethylene glycol, tetraethylene glycol, pentaethylene glycol, tetraoctyl pyromellitate, trioctyl trimellitate, dibutyl adipate, dioctyl adipate, dibutyl sebacate, dioctyl sebacate, diethyl azelate, dibutyl azelate, dioctyl azelate, glycerol, trimethylolpropane, pentaerythritol, sorbitol, glycerin, glycerin (or glyceryl) triacetate (triacetin), diglycerin tetracetate, triethyl phosphate, tributyl sebacate, triethyl phosphate, tributyl phosphate, tributoxyethyl phosphate, triphenyl phosphate, and tricresyl phosphate, diethyl citrate, triethyl citrate, polyethylene glycol, polyethylene adipate, polyethylene succinate, polypropylene glycol, polyglycolic acid, polybutylene adipate, polycaprolactone, polypropiolactone, valerolactone, polyvinylpyrrolidone, and other plasticizers having a weight average molecular weight of 200 to 800.

The amount of plasticizer added to or present on or in the CE staple fibers prior to combining with cellulose, or as a feedstock to a hydropulper, or in bales, or at any process step before refining, and/or the filaments from which the CE staple fibers are derived, is either zero or not more than 2 wt. %, or not more than 1 wt. %, or not more than 0.9 wt. %, or not more than 0.8 wt. %, or not more than 0.7 wt. %, or not more than 0.6 wt. %, or not more than 0.5 wt. %, or not more than 0.4 wt. %, or not more than 0.3 wt. %, or not more than 0.2 wt. %, or not more than 0.1 wt. %, or not more than 0.09 wt. %, or not more than 0.07 wt. %, or not more than 0.05 wt. %, or not more than 0.03 wt. %, or not more than 0.01 wt. %, or not more than 0.007 wt. %, or not more than 0.005 wt. %, or not more than 0.003 wt. %, or not more than 0.001 wt. %, or not more than 0.0007 wt. %, based in each case either as FOY, or based on the weight of the CE staple fibers, or both. Desirably, the amount of plasticizer added is minimal or no plasticizer is added to or present in the filament or CE staple fiber at any stage before refining.

In one embodiment or in any or all of the embodiments mentioned, the CE staple fiber has a continuous matrix or phase of cellulose ester throughout its cross section, and in another embodiment, the CE staple fiber is uniformly cellulose ester, and in yet another embodiment, is also uniformly chemically homogenous. In addition, or alternatively, the CE staple fiber contains more than 96 wt. %, or at least 97 wt. %, or at least 98 wt. %, or at least 99 wt. %, or 100 wt. % cellulose ester polymer based on the weight of the fiber. For example, the CE staple fiber desirably does not have a core/sheath structure. The CE polymers used to make the CE staple fibers, and the CE staple fibers, are desirably not chemically treated to alter the chemical structure of the cellulose ester upon or after the cellulose ester is spun into the filament that is used to cut to form the CE staple fiber, such as to increase the hydroxyl number of the CE staple fiber. For example, the CE staple fibers desirably are not surface hydrolyzed. Surface hydrolysis can increase the number of —OH sites on a cellulose ester to thereby increase hydrogen bonding with cellulose, which in turn increases the stiffness and/or strength of the wet laid product. Such a process, however, adds extra processing steps and is economically impractical. We have found that the co-refining the Compositions can provide the necessary stiffness and/or strength without the necessity for engaging a separate and expensive step of chemically modifying the spun fiber filaments or the CE staple fibers with surface hydrolysis or other chemical treatments which alter their chemical structure. In embodiments where the CE staple fibers are not surface hydrolyzed, for avoidance of doubt, it is meant that they are not surface hydrolyzed when they are present as a fiber, whether as an isolated fiber, as present with other fiber, when made into a furnish, or as present with other fibers in a wet laid product or sheet of paper.

The Compositions and the wet laid articles containing or obtained by the Compositions contain CE staple fibers in an amount of at least 0.25 wt. %, or at least 0.5 wt. %, or at least 0.75 wt. %, or at least 1 wt. %, or at least 2 wt. %, or at least 3 wt. %, or at least 4 wt. %, or at least 5 wt. %, or at least 6 wt. %, or at least 7 wt. %, or at least 8 wt. %, or at least 9 wt. %, or at least 10 wt. %, or at least 12 wt. %, or at least 15 wt. %, or at least 18 wt. %, or at least 20 wt. %, based on the total weight of fibers the Composition. In addition or in the alternative, the amount of CE staple fibers in the Composition can be up to 55 wt. %, or up to 50 wt. %, or up to 45 wt. %, or up to 40 wt. %, or up to 35 wt. %, or up to 30 wt. %, or up to 25 wt. %, or up to 20 wt. %, or up to 18 wt. %, or up to 15 wt. %, or up to 12 wt. %, or up to 10 wt. %, or up to 9 wt. %, or up to 8 wt. %, or up to 7 wt. %, or up to 6 wt. %, or up to 5 wt. %, based on the total weight of the fibers in the Composition, or alternatively, based on the weight of CE staple fibers and cellulose fibers in the Composition.

Examples of suitable ranges of the CE staple fibers in the Composition include from 0.75 to 55, or 0.75 to 40, or 1 to 55, or 1 to 40, or 1 to 20, or 1 to 15, or 2 to 55, or 2 to 40 2 to 20, or 2 to 15, or 2 to 12, or 2 to 10, or 3 to 55, or 3 to 40, or 3 to 25, or 3 to 20, or 3 to 15, or 3 to 12, or 3 to 10, or 4 to 55, or 4 to 40, or 4 to 25, or 4 to 20, or 4 to 15, or 4 to 12, or 4 to 10, in each case based on weight percent of all fibers in the Composition, or alternatively, based on the weight of CE staple fibers and cellulose fibers in the Composition.

The weight ratio of cellulose fibers to CE staple fibers is not particularly limited, and useful ratios include at least 0.8:1, or at least 1:1, or at least 1.5:1, or at least 2:1, or at least 3:1, or at least 3.5:1, or at least 4:1, or at least 4.5:1, or at least 5:1, or at least 7:1, or at least 8:1, or at least 9:1, or at least 15:1. In addition or in the alternative, the weight ratio of cellulose to CE staple fibers can be up to 400:1, or up to 300:1, or up to 200:1, or up to 150:1, or up to 100:1, or up to 50:1, or up to 25:1, or up to 20:1, or up to 15:1, or up to 10:1, or up to 7:1, or up to 5:1, or up to 3:1, or up to 1:1, or up to 0.66:1.

In another embodiment or in any of described embodiments, the CE staple fibers, and/or a wet laid product made with the CE staple fibers, can be biodegradable, meaning that such CE staple fibers are expected to decompose under certain environmental conditions. The degree of degradation can be characterized by the weight loss of a sample over a given period of exposure to certain environmental conditions. In some cases, the cellulose ester polymer used to form the staple fibers, the fibers, or wet laid products containing or obtained by the Composition can exhibit a weight loss of at least about 5, 10, 15, or 20 percent after burial in soil for 60 days and/or a weight loss of at least about 15, 20, 25, 30, or 35 percent after 15 days of exposure in a composter. However, the rate of degradation may vary depending on the particular end use of the fibers, as well as the composition of the wet laid product, and the specific test. Exemplary test conditions are provided in U.S. Pat. Nos. 5,870,988 and 6,571,802, incorporated herein by reference.

In one or any of the embodiments mentioned, the CE staple fibers are repulpable. The term "repulpable," as used herein, refers to any one or more of nonwoven products made with the Composition that has not been subjected to heat setting and is capable of disintegrating at 3,000 rpm at consistencies below 15% after any one or more of 5,000, 10,000, or 15,000 revolutions according to TAPPI Standards.

The wet laid products containing or obtained by the Composition can also exhibit enhanced levels of environmental non-persistence, characterized by better-than-expected degradation under various environmental conditions. Fibers and fibrous wet laid articles can meet or exceed passing standards set by international test methods and authorities for industrial compostability, home compostability, and/or soil biodegradability.

To be considered "compostable," a material must meet the following four criteria: (1) the material must be biodegradable; (2) the material must be disintegrable; (3) the material must not contain more than a maximum amount of heavy metals; and (4) the material must not be ecotoxic. As used herein, the term "biodegradable" generally refers to the tendency of a material to chemically decompose under certain environmental conditions. Biodegradability is an intrinsic property of the material itself, and the material can exhibit different degrees of biodegradability, depending on the specific conditions to which it is exposed. The term "disintegrable" refers to the tendency of a material to physically decompose into smaller fragments when exposed to certain conditions. Disintegration depends both on the material itself, as well as the physical size and configuration of the article being tested. Ecotoxicity measures the impact of the material on plant life, and the heavy metal content of the material is determined according to the procedures laid out in the standard test method.

In one embodiment or in any of the mentioned embodiments, the CE staple fibers, and the wet laid products containing or obtained by the Composition, are industrially compostable, home compostable, or both. In this or on any of the embodiment, the CE staple fibers used, or the wet laid products containing or obtained by the Composition, can satisfy four criteria:
1) biodegrade in that at least 90% carbon content is converted within 180 days;
2) disintigratable in that least 90% the material disintegrates within 12 weeks;
3) does not contain heavy metals beyond the thresholds established under the EN12423 standard; and
4) the disintegrated content supports future plant growth as humus;

where each of these four conditions are tested per the ASTM D6400, or ISO 17088, or EN 13432 method.

The CE staple fibers, and the Compositions containing the CE staple fibers, and/or the wet laid products made thereby can exhibit a biodegradation of at least 70 percent in a period of not more than 50 days, when tested under aerobic composting conditions at ambient temperature (28° C.±2° C.) according to ISO 14855-1 (2012). In some cases, the CE staple fibers, and the Compositions containing the CE staple fibers, and/or the wet laid products made thereby, can exhibit a biodegradation of at least 70 percent in a period of not more than 49, 48, 47, 46, 45, 44, 43, 42, 41, 40, 39, 38, or 37 days when tested under these conditions, also called "home composting conditions." These conditions may not be aqueous or anaerobic. In some cases, the CE staple fibers, and the Compositions containing the CE staple fibers, and/or the wet laid products made thereby, can exhibit a total biodegradation of at least 71, or at least 72, or at least 73, or at least 74, or at least 75, or at least 76, or at least 77, or at least 78, or at least 79, or at least 80, or at least 81, or at least 82, or at least 83, or at least 84, or at least 85, or at least 86, or at least 87, or at least 88 percent, when tested under according to ISO 14855-1 (2012) for a period of 50 days under home composting conditions. This may represent a relative biodegradation of at least about 95, or at least 97, or at least 99, or at least 100, or at least 101, or at least 102, or at least 103 percent, when compared to cellulose subjected to identical test conditions.

To be considered "biodegradable," under home composting conditions according to the French norm NF T 51-800 and the Australian standard AS 5810, a material must exhibit a biodegradation of at least 90 percent in total (e.g., as compared to the initial sample), or a biodegradation of at least 90 percent of the maximum degradation of a suitable reference material after a plateau has been reached for both the reference and test item. The maximum test duration for biodegradation under home compositing conditions is 1 year. The CE staple fibers, and the Compositions containing the CE staple fibers, and the products made thereby, may exhibit a biodegradation of at least 90 percent within not more than 1 year, measured according 14855-1 (2012) under home composting conditions. In some cases, the CE staple fibers, and the Compositions containing the CE staple fibers, and/or the wet laid products made thereby, may exhibit a biodegradation of at least about 91, or at least 92, or at least 93, or at least 94, or at least 95, or at least 96, or at least 97, 9 or at least 8, or at least 99, or at least 99.5 percent within not more than 1 year, or the fibers may exhibit 100 percent biodegradation within not more than 1 year, measured according 14855-1 (2012) under home composting conditions.

Additionally, or in the alternative, the CE staple fibers, and the Compositions containing the CE staple fibers, and/or the wet laid products made thereby, may exhibit a biodegradation of at least 90 percent within not more than about 350, or not more than 325, or not more than 300, or not more than 275, or not more than 250, or not more than 225, or not more than 220, or not more than 210, or not more than 200, or not more than 190, or not more than 180, or not more than 170, or not more than 160, or not more than or not more than 150, or not more than 140, or not more than 130, or not more than 120, or not more than 110, or not more than 100, or not more than 90, or not more than 80, or not more than 70, or not more than 60, or not more than 50 days, measured according 14855-1 (2012) under home composting conditions. In some cases, the CE staple fibers, and the Compositions containing the CE staple fibers, and/or the wet laid products made thereby, can be at least about 97, or at least 98, or at least 99, or at least 99.5 percent biodegradable within not more than about 70, or not more than 65, or not more than 60, or not more than 50 days of testing according to ISO 14855-1 (2012) under home composting conditions. As a result, the CE staple fibers, and the Compositions containing the CE staple fibers, and/or the wet laid products made thereby may be considered biodegradable according to, for example, French Standard NF T 51-800 and Australian Standard AS 5810 when tested under home composting conditions.

The CE staple fibers, and the Compositions containing the CE staple fibers, and/or the wet laid products made thereby can exhibit a biodegradation of at least 60 percent in a period of not more than 45 days, when tested under aerobic composting conditions at a temperature of 58° C. (±2° C.) according to ISO 14855-1 (2012). In some cases, they can exhibit a biodegradation of at least 60 percent in a period of not more than 44, or not more than 43, or not more than 42, or not more than 41, or not more than 40, or not more than 39, or not more than 38, or not more than 37, or not more than 36, or not more than 35, or not more than 34, or not more than 33, or not more than 32, or not more than 31, or not more than 30, or not more than 29, or not more than 28, or not more than 27 days when tested under these conditions, also called "industrial composting conditions." These may not be aqueous or anaerobic conditions. In some cases, the CE staple fibers, and the Compositions containing the CE staple fibers, and/or the wet laid products made thereby can exhibit a total biodegradation of at least about 65, or at least 70, or at least 75, or at least 80, or at least 85, or at least 87, or at least 88, or at least 89, or at least 90, or at least 91, or at least 92, or at least 93, or at least 94, or at least 95 percent, when tested under according to ISO 14855-1 (2012) for a period of 45 days under industrial composting conditions. This may represent a relative biodegradation of at least about 95, or at least 97, or at least 99, or at least 100, or at least 102, or at least 105, or at least 107, or at least 110, or at least 112, or at least 115, or at least 117, or at least 119 percent, when compared to cellulose fibers subjected to identical test conditions.

To be considered "biodegradable," under industrial composting conditions according to ASTM D6400 and ISO 17088, at least 90 percent of the organic carbon in the whole item (or for each constituent present in an amount of more than 1% by dry mass) must be converted to carbon dioxide within 180 days. According to European standard ED 13432 (2000), a material must exhibit a biodegradation of at least 90 percent in total, or a biodegradation of at least 90 percent of the maximum degradation of a suitable reference material after a plateau has been reached for both the reference and test item. The maximum test duration for biodegradability under industrial composting conditions is 180 days. The CE staple fibers, and the Compositions containing the CE staple fibers, and/or the wet laid products made thereby may exhibit a biodegradation of at least 90 percent within not more than 180 days, measured according 14855-1 (2012) under industrial composting conditions. In some cases, the CE staple fibers, and the Compositions containing the CE staple fibers, and/or the wet laid products made thereby may exhibit a biodegradation of at least about 91, or at least 92, or at least 93, or at least 94, or at least 95, or at least 96, or at least 97, or at least 98, or at least 99, or at least 99.5 percent within not more than 180 days, or the fibers may exhibit 100 percent biodegradation within not more than 180 days, measured according 14855-1 (2012) under industrial composting conditions.

Additionally, or in the alternative, the CE staple fibers, and the Compositions containing the CE staple fibers, and/or the wet laid products made thereby may exhibit a biodegradation of least 90 percent within not more than about 175, or not more than 170, or not more than 165, or not more than 160, or not more than 155, or not more than 150, or not more than 145, or not more than 140, or not more than 135, or not more than 130, or not more than 125, or not more than 120, or not more than 115, or not more than 110, or not more than 105, or not more than 100, or not more than 95, or not more than 90, or not more than 85, or not more than 80, or not more than 75, or not more than 70, or not more than 65, or not more than 60, or not more than 55, or not more than 50, or not more than 45 days, measured according 14855-1 (2012) under industrial composting conditions. In some cases, the CE staple fibers, and the Compositions containing the CE staple fibers, and/or the wet laid products made thereby can be at least about 97, 98, 99, or 99.5 percent biodegradable within not more than about 65, or not more than 60, or not more than 55, or not more than 50, or not more than 45 days of testing according to ISO 14855-1 (2012) under industrial composting conditions. As a result, the CE staple fibers, and the Compositions containing the CE staple fibers, and/or the wet laid products made thereby may be considered biodegradable according ASTM D6400 and ISO 17088 when tested under industrial composting conditions.

The CE staple fibers, and the Compositions containing the CE staple fibers, and/or the wet laid products made thereby may exhibit a soil biodegradation of at least 60 percent within not more than 130 days, measured according to ISO 17556 (2012) under aerobic conditions at ambient temperature. In some cases, the CE staple fibers, and the Compositions containing the CE staple fibers, and/or the wet laid products made thereby can exhibit a biodegradation of at least 60 percent in a period of not more than 130, or not more than 120, or not more than 110, or not more than 100, or not more than 90, or not more than 80, or not more than 75 days when tested under these conditions, also called "soil composting conditions." These may not be aqueous or anaerobic conditions. In some cases, the CE staple fibers, and the Compositions containing the CE staple fibers, and/or the wet laid products made thereby can exhibit a total biodegradation of at least about 65, or at least 70, or at least 72, or at least 75, or at least 77, or at least 80, or at least 82, or at least 85 percent, when tested under according to ISO 17556 (2012) for a period of 195 days under soil composting conditions. This may represent a relative biodegradation of at least about 70, or at least 75, or at least 80, or at least 85, or at least 90, or at least 95 percent, when compared to cellulose fibers subjected to identical test conditions.

In order to be considered "biodegradable," under soil composting conditions according the OK biodegradable SOIL conformity mark of Vinçotte and the DIN Geprüft Biodegradable in soil certification scheme of DIN CERTCO, a material must exhibit a biodegradation of at least 90 percent in total (e.g., as compared to the initial sample), or a biodegradation of at least 90 percent of the maximum degradation of a suitable reference material after a plateau has been reached for both the reference and test item. The maximum test duration for biodegradability under soil composting conditions is 2 years. The CE staple fibers, and the Compositions containing the CE staple fibers, and/or the wet laid products made thereby may exhibit a biodegradation of at least 90 percent within not more than 2 years, 1.75 years, 1 year, 9 months, or 6 months measured according ISO 17556 (2012) under soil composting conditions. In some cases, the CE staple fibers, and the Compositions containing the CE staple fibers, and/or the wet laid products made thereby may exhibit a biodegradation of at least about 91, or at least 92, or at least 93, or at least 94, or at least 95, or at least 96, or at least 97, or at least 98, or at least 99, or at least 99.5 percent within not more than 2 years, or the fibers may exhibit 100 percent biodegradation within not more than 2 years, measured according ISO 17556 (2012) under soil composting conditions.

Additionally, or in the alternative, CE staple fibers, and the Compositions containing the CE staple fibers, and/or the wet laid products made thereby may exhibit a biodegradation of at least 90 percent within not more than about 700, 650, 600, 550, 500, 450, 400, 350, 300, 275, 250, 240, 230, 220, 210, 200, or 195 days, measured according 17556 (2012) under soil composting conditions. In some cases, the CE staple fibers, and the Compositions containing the CE staple fibers, and/or the wet laid products made thereby can be at least about 97, or at least 98, or at least 99, or at least 99.5 percent biodegradable within not more than about 225, or not more than 220, or not more than 215, or not more than 210, or not more than 205, or not more than 200, or not more than 195 days of testing according to ISO 17556 (2012) under soil composting conditions. As a result, the CE staple fibers, and the Compositions containing the CE staple fibers, and/or the wet laid products made thereby may meet the requirements to receive The OK biodegradable SOIL conformity mark of Vinçotte and to meet the standards of the DIN Geprüft Biodegradable in soil certification scheme of DIN CERTCO.

In some cases, CE staple fibers, and the Compositions containing the CE staple fibers, and/or the wet laid products made thereby may include less than 1, or not more than 0.75, or not more than 0.50, or not more than 0.25 weight percent of components of unknown biodegradability, based on the weight of the CE staple fiber. In some cases, the fibers or fibrous wet laid articles described herein may include no components of unknown biodegradability.

In addition to being the CE staple fibers being biodegradable under industrial and/or home composting conditions, the wet laid products, including wet laid non-woven articles may also be compostable under home and/or industrial conditions. As described previously, a material is considered compostable if it meets or exceeds the requirements set forth in EN 13432 for biodegradability, ability to disintegrate, heavy metal content, and ecotoxicity. The CE staple fibers or fibrous wet laid articles described herein may exhibit sufficient compostability under home and/or industrial composting conditions to meet the requirements to receive the OK compost and OK compost HOME conformity marks from Vinçotte.

In some cases, the CE staple fibers, and the Compositions containing the CE staple fibers, and the products made thereby, may have a volatile solids concentration, heavy metals and fluorine content that fulfill all of the requirements laid out by EN 13432 (2000). Additionally, the CE staple fibers may not cause a negative effect on compost quality (including chemical parameters and ecotoxicity tests).

In some cases, the CE staple fibers, and the Compositions containing the CE staple fibers, and/or the wet laid products made thereby can exhibit a disintegration of at least 90 percent within not more than 26 weeks, measured according to ISO 16929 (2013) under industrial composting conditions. In some cases, the fibers or fibrous wet laid articles may exhibit a disintegration of at least about 91, or at least 92, or at least 93, or at least 94, or at least 95, or at least 96, or at least 97, or at least 98, or at least 99, or at least 99.5 percent under industrial composting conditions within not more than 26 weeks, or the fibers or wet laid articles may be 100 percent disintegrated under industrial composting conditions within not more than 26 weeks. Alternatively, or in addition, the CE staple fibers, and the Compositions containing the CE staple fibers, and/or the wet laid products made thereby may exhibit a disintegration of at least 90 percent under industrial composting conditions within not more than about 26, or not more than 25, or not more than 24, or not more than 23, or not more than 22, or not more than 21, or not more than 20, or not more than 19, or not more than 18, or not more than 17, or not more than 16, or not more than 15, or not more than 14, or not more than 13, or not more than 12, or not more than 11, or not more than 10 weeks, measured according to ISO 16929 (2013). In some cases, the CE staple fibers, and the Compositions containing the CE staple fibers, and/or the wet laid products made thereby may be at least 97, or at least 98, or at least 99, or at least 99.5 percent disintegrated within not more than 12, or not more than 11, or not more than 10, or not more than 9, or not more than 8 weeks under industrial composting conditions, measured according to ISO 16929 (2013).

In some cases, the CE staple fibers, and the Compositions containing the CE staple fibers, and/or the wet laid products made thereby can exhibit a disintegration of at least 90 percent within not more than 26 weeks, measured according to ISO 16929 (2013) under home composting conditions. In some cases, the CE staple fibers, and the Compositions containing the CE staple fibers, and/or the wet laid products made thereby may exhibit a disintegration of at least about 91, or at least 92, or at least 93, or at least 94, or at least 95, or at least 96, or at least 97, or at least 98, or at least 99, or at least 99.5 percent under home composting conditions within not more than 26 weeks, or the fibers or wet laid articles may be 100 percent disintegrated under home composting conditions within not more than 26 weeks. Alternatively, or in addition, the CE staple fibers, and the Compositions containing the CE staple fibers, and/or the wet laid products made thereby may exhibit a disintegration of at least 90 percent within not more than about 26, or not more than 25, or not more than 24, or not more than 23, or not more than 22, or not more than 21, or not more than 20, or not more than 19, or not more than 18, or not more than 17, or not more than 16, or not more than 15 weeks under home composting conditions, measured according to ISO 16929 (2013). In some cases, the CE staple fibers, and the Compositions containing the CE staple fibers, and/or the wet laid products made thereby may be at least 97, or at least 98, or at least 99, or at least 99.5 percent disintegrated within not more than 20, or not more than 19, or not more than 18, or not more than 17, or not more than 16, or not more than 15, or not more than 14, or not more than 13, or not more than 12 weeks, measured under home composting conditions according to ISO 16929 (2013).

The Compositions containing the CE staple fibers, and/or the wet laid products made thereby can achieve higher levels of biodegradability and/or compostability without use of additives that have traditionally been used to facilitate environmental non-persistence of similar fibers. Such additives can include, for example, photodegradation agents, biodegradation agents, decomposition accelerating agents, and various types of other additives. Despite being substantially free of these types of additives, the CE staple fibers, and the Compositions containing the CE staple fibers, and/or the wet laid products made thereby have been found to exhibit enhanced biodegradability and compostability when tested under industrial, home, and/or soil conditions, as discussed previously.

In some embodiments, the CE staple fibers, and the Compositions containing the CE staple fibers, and/or the wet laid products made thereby may be substantially free of photodegradation agents added after the CE staple fibers are combined with cellulose fibers, or added during or after cellulose fibers have been hydropulped in a stock preparation zone. Optionally, one of the CE staple fibers themselves, the Compositions, the wet laid products containing or made with the Compositions, or any combination thereof, may contain not more than about 1, or not more than 0.75, or not more than 0.50, or not more than 0.25, or not more than 0.10, or not more than 0.05, or not more than 0.025, or not more than 0.01, or not more than 0.005, or not more than 0.0025, or not more than 0.001 weight percent of photodegradation agent, based on the total weight of the fiber, or the CE staple fibers may include no photodegradation agents. Examples of such photodegradation agents include, but are not limited to, pigments which act as photooxidation catalysts and are optionally augmented by the presence of one or more metal salts, oxidizable promoters, and combinations thereof. Pigments can include coated or uncoated anatase or rutile titanium dioxide, which may be present alone or in combination with one or more of the augmenting components such as, for example, various types of metals. Other examples of photodegradation agents include benzoins, benzoin alkyl ethers, benzophenone and its derivatives, acetophenone and its derivatives, quinones, thioxanthones, phthalocyanine and other photosensitizers, ethylene-carbon monoxide copolymer, aromatic ketone-metal salt sensitizers, and combinations thereof.

In some embodiments, the CE staple fibers, and the Compositions containing the CE staple fibers, and/or the wet laid products made thereby may be substantially free of biodegradation agents and/or decomposition agents. For example, the CE staple fibers, and the Compositions containing the CE staple fibers, and/or the wet laid products made thereby may include not more than about 1, or not more than 0.75, or not more than 0.50, or not more than 0.25, or not more than 0.10, or not more than 0.05, or not more than 0.025, or not more than 0.01, or not more than 0.005, or not more than 0.0025, or not more than 0.0020, or not more than 0.0015, or not more than 0.001, or not more than 0.0005 weight percent of biodegradation agents and/or decomposition agents, based on the total weight of the fiber, or the fibers may include no biodegradation and/or decomposition agents. Examples of such biodegradation and decomposition agents include, but are not limited to, salts of oxygen acid of phosphorus, esters of oxygen acid of phosphorus or salts thereof, carbonic acids or salts thereof, oxygen acids of phosphorus, oxygen acids of sulfur, oxygen acids of nitrogen, partial esters or hydrogen salts of these oxygen acids, carbonic acid and its hydrogen salt, sulfonic acids, and carboxylic acids.

Other examples of such biodegradation and decomposition agents include an organic acid selected from the group consisting of oxo acids having 2 to 6 carbon atoms per molecule, saturated dicarboxylic acids having 2 to 6 carbon atoms per molecule, and lower alkyl esters of said oxo acids or said saturated dicarboxylic acids with alcohols having from 1 to 4 carbon atoms. Biodegradation agents may also comprise enzymes such as, for example, a lipase, a cellulase, an esterase, and combinations thereof. Other types of biodegradation and decomposition agents can include cellulose phosphate, starch phosphate, calcium secondary phosphate, calcium tertiary phosphate, calcium phosphate hydroxide, glycolic acid, lactic acid, citric acid, tartaric acid, malic acid, oxalic acid, malonic acid, succinic acid, succinic anhydride, glutaric acid, acetic acid, and combinations thereof.

The CE staple fibers, and the Compositions containing the CE staple fibers, and/or the wet laid products made thereby may also be substantially free of several other types of additives that have been added to other synthetic fibers to encourage environmental non-persistence. Examples of these additives can include, but are not limited to, polyesters, including aliphatic and low molecular weight (e.g., less than 5000) polyesters, enzymes, microorganisms, water soluble polymers, water-dispersible additives, nitrogen-containing compounds, hydroxy-functional compounds, oxygen-containing heterocyclic compounds, sulfur-containing heterocyclic compounds, anhydrides, monoepoxides, and combinations thereof. In some cases, the CE staple fibers, and the Compositions containing the CE staple fibers, and/or the wet laid products made thereby may include not more than about 0.5, or not more than 0.4, or not more than 0.3, or not more than 0.25, or not more than 0.1, or not more than 0.075, or not more than 0.05, or not more than 0.025, or not more than 0.01, or not more than 0.0075, or not more than 0.005, or not more than 0.0025, or not more than 0.001 weight percent of these types of additives, based on the weight of the CE staple fibers, or based on the weight of all fibers. The CE staple fibers may be free of the addition of any of these types of additives.

In an example, a wet laid product can be compostable in industrial environment (in accordance with EN 13432 or ASTM D6400) meeting the following four criteria:
1. Biodegradation determined by measuring the carbon dioxide produced by the sample under controlled composting conditions following ISO 14855-1:2012, where the sample is mixed with compost and placed in a bioreactor at 58° C. under continuous flow of humidified air. At the exit, the $CO_2$ concentration is measured and related to the theoretical amount that could be produced regarding the carbon content of the sample.
2. Disintegration as evaluated on a pilot-scale by simulating a real composting environment following ISO 16929:2013, where the samples in their final form are mixed with fresh artificial bioresidue. Oxygen concentration, temperature and humidity are regularly controlled. After 12 weeks, the resulting composts are sieved and the remaining amount of material in pieces >2 mm, if any, is determined.
3. Ecotoxicity of the resulting compost is evaluated in plants following OECD 208 (2006), where the sample material in powder form is added to a bioreactor with fresh bioresidue following the same procedure as in the disintegration test. A comparison is made with the compost resulting from blank bioreactors and bioreactors containing the material tested with regards to plant seedling emergence and growth. Both parameters higher than 90% with respect to the blank compost passes the test.
4. Lacking metals, where each product is identified and characterized including at least: Information and identification of the constituents, presence of regulated metals (Zn, Cu, Ni, Cd, Pb, Hg, Cr, Mo, Se, As, Co) and other hazardous substances to the environment (F), and content in total dry and volatile solids.

The wet laid products described in embodiment can also be compostable in industrial and backyard or home composting conditions.

Compostability of CE staple fibers with a DS of 2.5 or below can be achieved without adding any biodegradation and decomposition agents, e.g. hydrolysis assistant or any intentional degradation promoter additives.

The wet laid products can be biodegradable in soil medium in accordance with ISO 17556:2003 testing protocol.

If desired, biodegradation and decomposition agents, e.g. hydrolysis assistant or any intentional degradation promoter additives can be added to a wet laid product or be contained within the CE staple fibers. The decomposition agent can be chosen in such a way that it does not impact the article shelf-life or does not impact the plant-growth when it is a part of the soil. Those additives can promote hydrolysis by releasing acidic or basic residues, and/or accelerate photo or oxidative degradation and/or promote the growth of selective microbial colony to aid the disintegration and biodegradation in compost and soil medium. In addition to promoting the degradation, these additives can have an additional function such as improving the processability of the article or improving mechanical properties.

Examples of decomposition agents include inorganic carbonate, synthetic carbonate, nepheline syenite, talc, magnesium hydroxide, aluminum hydroxide, diatomaceous earth, natural or synthetic silica, calcined clay, and the like. If used, it is desirable that these fillers are dispersed well in the polymer matrix. The fillers can be used singly, or in a combination of two or more.

Examples of aromatic ketones used as an oxidative decomposition agent include benzophenone, anthraquinone, anthrone, acetylbenzophenone, 4-octylbenzophenone, and the like. These aromatic ketones may be used singly, or in a combination of two or more.

Examples of the transition metal compound used as an oxidative decomposition agent include salts of cobalt or magnesium, such as aliphatic carboxylic acid (C12 to C20) salts of cobalt or magnesium, or cobalt stearate, cobalt oleate, magnesium stearate, and magnesium oleate. These transition metal compounds can be used singly, or in a combination of two or more.

Examples of rare earth compounds used as an oxidative decomposition agent include rare earths belonging to periodic table Group 3A, and oxides thereof. Specific examples thereof include cerium (Ce), yttrium (Y), neodymium (Nd), rare earth oxides, hydroxides, rare earth sulfates, rare earth nitrates, rare earth acetates, rare earth chlorides, rare earth carboxylates, and the like. More specific examples thereof include cerium oxide, ceric sulfate, ceric ammonium Sulfate, ceric ammonium nitrate, cerium acetate, lanthanum nitrate, cerium chloride, cerium nitrate, cerium hydroxide, cerium octylate, lanthanum oxide, yttrium oxide, Scandium oxide, and the like. These rare earth compounds may be used singly, or in a combination of two or more.

Examples of basic additives selected can be at least one basic additive is selected from the group consisting of alkaline earth metal oxides, alkaline earth metal hydroxides, alkaline earth metal carbonates, alkali metal carbonates, alkali metal bicarbonates, ZηO and basic Al2O3. The at least one basic additive can be MgO, Mg(OH)2, MgCO3, CaO, Ca(OH)2, CaCO3, NaHCO3, Na2CO3, K2CO3, ZηO KHCO3 or basic Al2O3. In one aspect, MgO, ZηO, CaO and Al2O3 can be employed.

Examples of organic acid additives include acetic acid, propionic acid, butyric acid, valeric acid, citric acid, tartaric acid, oxalic acid, malic acid, benzoic acid, formate, acetate, propionate, butyrate, valerate citrate, tartarate, oxalate, malate, maleic acid, maleate, phthalic acid, phthalate, benzoate, and combinations thereof.

Examples of other hydrophilic polymer or biodegradation promoter may include glycols, polyethers, and polyalcohols or other biodegradable polymers such as poly(glycolic acid), poly(lactic acid), polydioxanes, polyoxalates, poly(α-esters), polycarbonates, polyanhydrides, polyacetals, polycaprolactones, poly(orthoesters), polyamino acids, aliphatic polyesters such as poly(butylene)succinate, poly(ethylene) succinate, starch, regenerated cellulose, or aliphatic-aromatic polyesters such as PBAT.

Examples of suitable plasticizers that can promote disintegration consist of dimethyl sebacate, glycerol, monostearate, Sorbitol, erythritol, glucidol, mannitol. Sucrose, ethylene glycol, propylene glycol, diethylene glycol, triethylene glycol, diethylene glycol dibenzoate, dipropylene glycol dibenzoate, triethylene glycol caprate caprylate, butylene glycol, pentamethylene glycol, hexamethylene glycol, diisobutyl adipate, oleic amide, erucic amide, palmitic amide, dimethyl acetamide, dimethyl Sulfoxide, methyl pyrrolidone, tetramethylene Sulfone, oxamonoacids, oxa diacids, polyoxa diacids, diglycolic acids, triethyl citrate, acetyl triethyl citrate, tri-n-butyl citrate, acetyl tri-n-butyl citrate, acetyl tri-n-hexyl citrate, alkyl lactates, phthalate polyesters, adipate polyesters, glutate polyesters, diisononyl phthalate, diisodecyl phthalate, dihexyl phthalate, alkyl alylether diester adipate, dibutoxy ethoxyethyl adipate, and mixtures thereof.

In an embodiment or in any of the mentioned embodiments, the solids content in the Composition is predominantly a fiber content. For example, the weight of fibers is more than 50 wt. %, or at least 60 wt. %, or least 70 wt. %, or at least 80 wt. %, or at least 85 wt. %, or at least 90 wt. %, or at least 95 wt. %, or at least 96 wt. % based on the weight of all polymers (including solids made from polymers) or based on the weight of all solids in the Composition, or wet laid products containing or made from the Composition.

In an embodiment or in any of the mentioned embodiments, the CE staple fibers and cellulose fibers in combination make up at least 50 wt. %, or at least 60 wt. %, or at least 70 wt. %, or at least 75 wt. %, or at least 80 wt. %, or at least 90 wt. %, or at least 95 wt. %, or at least 98 wt. %, or at least 99 wt. %, or at least 99.5 wt. %, or 100 wt. % of all the fibers present in the Compositions and/or wet laid articles of the invention, or in the alternative, of all solids in the Composition or in the alternative based on the weight or all polymers (including solids made from polymers) in the Composition.

In an embodiment or in any of the mentioned embodiments, the wet laid products containing or obtained from the Composition contain at least 55 wt. % fibers, or at least 60 wt. % fibers, or at least 70 wt. % fibers, or at least 80 wt. % fibers, or at least 85 wt. % fibers, or at least 90 wt. % fibers, or at least 95 wt. % fibers, or at least 96 wt. % fibers, or at least 97 wt. % fibers, or at least 98 wt. % fibers, or at least 99 wt. % fibers, based on the weight of the wet laid web or article. These fibers are any fibrous material, including but not limited to cellulose fibers and CE staple fibers and, if present, any other fibers such as those mentioned below.

Raw Materials: Other Fibers

In addition to the CE staple fibers, other synthetic fibers may be included in the Compositions and wet laid articles. For purposes of distinguishing between CE staple fibers, cellulose, and other synthetic fibers, as used herein, the other synthetic fibers are those fibers that are, at least in part, synthesized or derivatized through chemical reactions, or regenerated. Other types of synthetic fibers suitable for use in a blend with CE staple fibers can include, but are not limited to, rayon, viscose, mercerized fibers or other types of regenerated cellulose (conversion of natural cellulose to a soluble cellulosic derivative and subsequent regeneration) such as lyocell (also known as Tencel), Cupro, Modal, acetates such as polyvinylacetate, glass, polyamides including nylon, polyesters such as those polyethylene terephthalate (PET), polycyclohexylenedimethylene terephthalate (PCT) and other copolymers, olefinic polymers such as polypropylene and polyethylene, polycarbonates, poly sulfates, poly sulfones, polyethers, polyacrylates, acrylonitrile copolymers, polyvinylchloride (PVC), polylactic acid, polyglycolic acid, sulfopolyester fibers, and combinations thereof.

In some cases, the synthetic fibers, other than the CE staple fibers, may be single-component fibers, while, in other cases, the other synthetic fibers can be multicomponent fibers containing islands in a sea, or sheaths, or discrete domains of two or more polymers. Desirably, the other synthetic fibers are single-component fibers.

One or more synthetic fibers other than the CE staple fibers, if present, may be present in an amount of at least 0.25 wt. %, or at least 0.5 wt. %, or at least 0.75 wt. %, or at least 1 wt. %, or at least 2 wt. %, or at least 3 wt. %, or at least 4 wt. %, or at least 5 wt. %, or at least 6 wt. %, or at least 7 wt. %, or at least 8 wt. %, or at least 9 wt. %, or at least 10 wt. %, and up to 30 wt. %, or up to 25 wt. %, or up to 20 wt. %, or up to 18 wt. %, or up to 15 wt. %, or up to 12 wt. %, or up to 10 wt. %, or up to 9 wt. %, or up to 8 wt. %, or up to 7 wt. %, or up to 6 wt. %, or up to 5 wt. %, or up to 4 wt. %, or up to 3 wt. %, or up to 2 wt. %, based on the total weight of all fibers in the Composition.

The weight ratio of CE staple fibers to other synthetic fibers can be 1:0 to 1:2, or 1:0 to 1:1.5, or 1:0 to 1:1.15, or 1:0 to 1:1, or 1:0 to 1:0.9, or 1:0 to 1:0.6, or 1:0 to 1:0.4, or 1:0 to 1:0.3, or 1:0 to 1:0.2, or 1:0 to 1:0.1, or 1:0 to 1:0.05, or 1:0 to 1:0.025, or 1:0 to 1:0.01, based on the weight of CE staple fibers and any other synthetic fibers.

Desirably, the Compositions do not contain any kinds of fibers other than cellulose fibers and CE staple fibers, especially those Compositions present at any stage before refining. The amount of synthetic fibers other the CE staple fibers is desirably not more than 5 wt. %, or not more than 2 wt. %, or not more than 1 wt. %, or not more than 0.5 wt. %, or not more than 0.25 wt. %, or not more than 0.1 wt. %, or not more than 0.05 wt. %, or zero %, based on the weight of all synthetic fibers in the Composition, or in the alternative, based on the weight of all the fibers in the Composition. A variety of other synthetic fibers present in the Composition during refining can cause agglomeration or lack of homogeneity in the Composition post refining. If other synthetic fibers are added to enhance one or more properties of a wet laid product, it is desirable to combine them with a Composition that has already been co-refined.

The Process

The wet laid process includes one or more zones for making wet laid products. While many zones are described for a representative example of a wet laid process since advantages can be seen in several zones, not all the zones are required to make a wet laid product. Further, the order of the zones as described is a representative example the order of each zone can be altered if desired depending upon the particular manufacturer's needs, products to be made, and equipment constraints.

As shown in FIG. 1, a typical wet laid process can be described as a stock preparation zone 700 from which a Composition is fed through a line 761 to a wet laid machine zone 800, from which the product is delivered to customers as a finished product, or if further processing is required, by a delivery means 871, such as truck, rail car, fork lift, belts, etc., to an optional conversion zone 1000, the conversion zone being external to the wet laid machine zone facility or integrated with it. Finished product (that requires no additional chemical or mechanical treatment) can be furnished and delivered from the wet laid machine zone 800 or from the conversion zone 1000 through a similar delivery means 1001 as from the machine zone 800.

Figure 2:
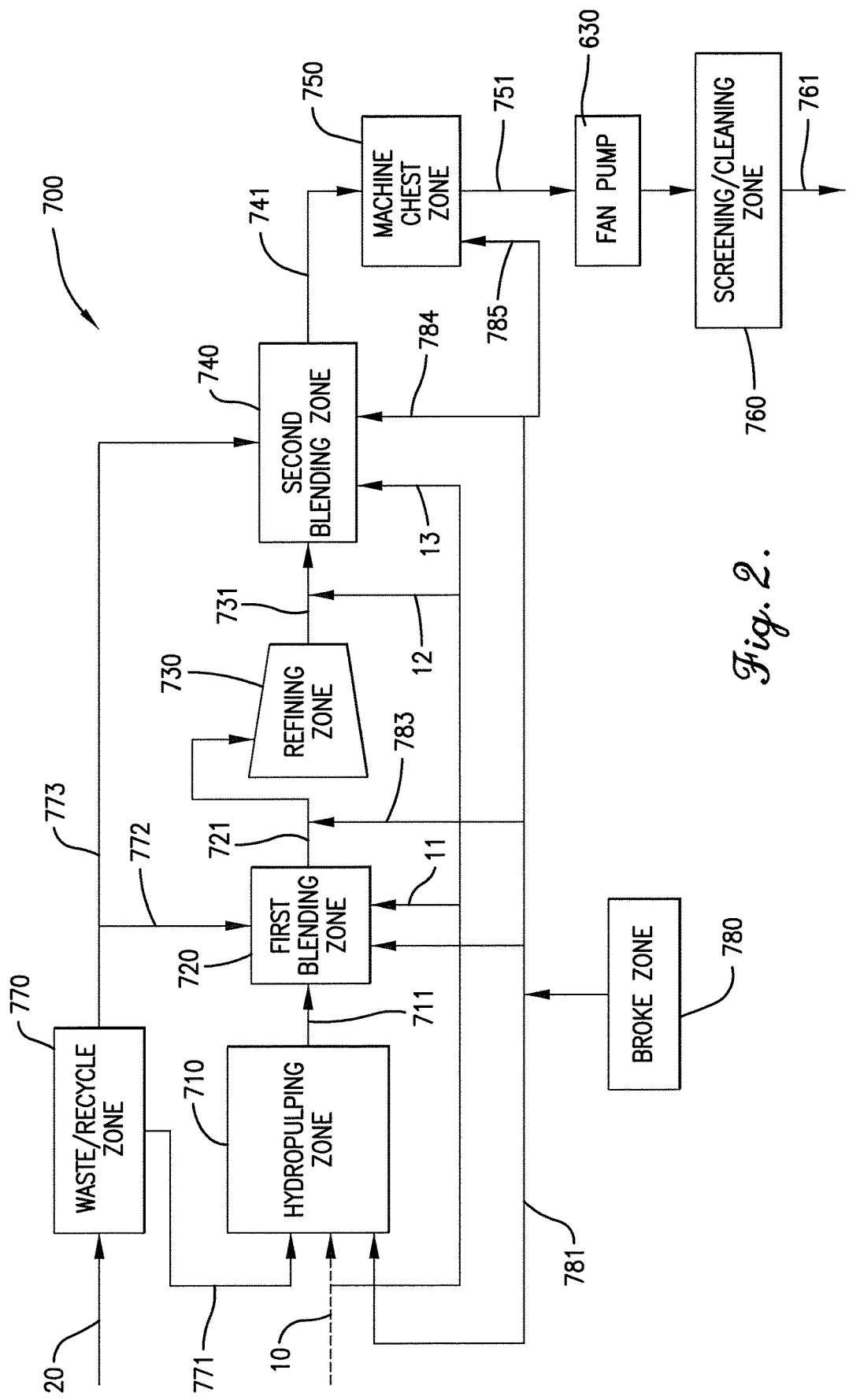
FIG. 2 is a block flow diagram of a stock preparation process.

The process as shown in FIG. 2 is one example of a stock preparation zone 700. Any known or conventional process configuration for making wet laid products is suitable, and desirably, at least a Refining Zone is present. The configuration of the stock preparation zone 700 includes a Refining Zone 730 and one or more optional zones; for example, a Hydropulping Zone 710, a First Blending Zone 720, a Second Blending Zone 740, a Machine Chest Zone 750, and a screening/cleaning zone 760. Waste/recycle pulped fiber sheets can be fed to a waste/recycle hydropulper in the waste/recycle Hydropulping Zone 770m that can in turn feed the first Hydropulper Zone 710, or the First Blending Zone 720, or a Second Blending Zone 740. Broke zone 780 can feed the first Hydropulper Zone 710 through line 781, or the First Blending Zone 720 through line 782, as a feed to the Refiner Zone 730 through line 783, to the Second Blending Zone 740 through line 784, or to the Machine Chest Zone 750 through line 785.

Figure 3:
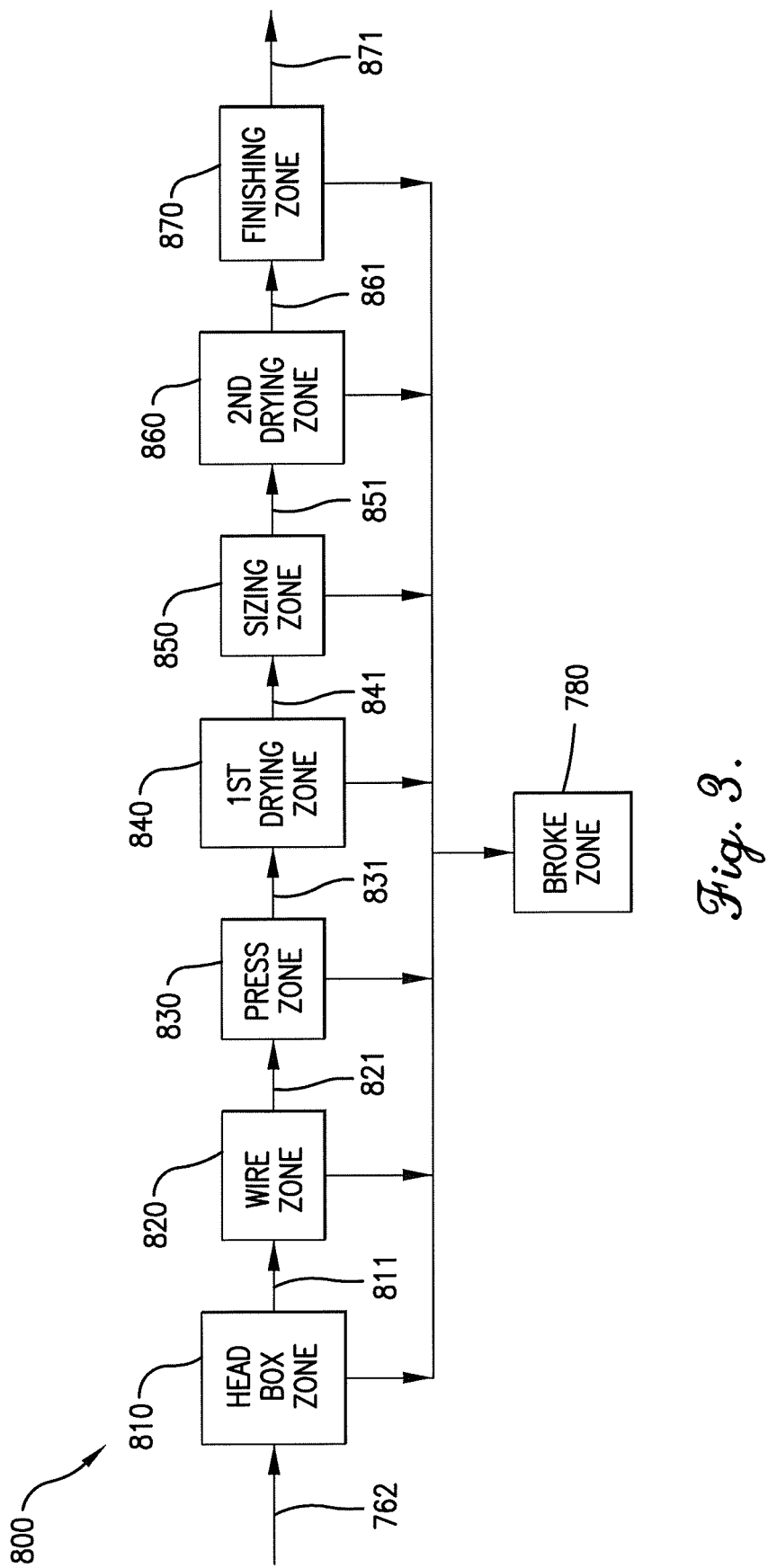
FIG. 3 is a block flow diagram of a wet laid machine process.

As shown in FIG. 3, the wet laid machine zone 800 can include a head box zone 810, a Wire Zone 820, a Press Zone 830, a First Drying Zone 840, a Sizing Zone 850, a second drying zone 860 and a finishing zone 870. The broke zone 780 collects waste pulp, and trim and paper when the machine line is not processing finished product, from one or more of the zones in the wet laid machine zone 800.

The stock preparation zone 700, the wet laid machine zone 800, and the conversion zone 1000, along with the processes, materials, Compositions, and flows are described in more detail below with reference to the Figures.

Stock Preparation: Hydropulping Zone

Pulp mills and wet laid facilities, such as paper mills and non-woven mills, may exist separately or as integrated operations. An integrated mill is one that conducts pulp manufacturing on the site of the wet laid facility, or within 2 miles or even ½ mile of each other. Nonintegrated mills have no capacity for pulping but must bring pulp to the mill from an outside source. Integrated mills have the advantage of using common auxiliary systems for both pulping and papermaking such as steam, electric generation, and wastewater treatment. Transportation costs are also reduced. Nonintegrated mills require less land, energy, and water than integrated mills. Their location can, therefore, be in a more urban setting where they are closer to large work force populations and perhaps to their customers.

In the stock preparation zone 700, the Composition containing the fibers and optional pigments, additives and chemistries are combined and diluted with water in preparation as a feed to the wet laid machine zone 800. The raw materials are generally warehoused, at least a portion combined in a hydropulper and hydropulped (if delivered to the mill in dry bale form), optionally blended with some or all additives, refined, blended with pigments, additives, synthetic fibers, and waste/recycle pulp, then cleaned/screened to give the desired furnish for a particular grade of paper. This Composition is then pumped to the machine chest in preparation as a feed to the wet laid machine zone 800. Optionally, the blended Composition can be pumped from the machine chest as a thick stock through a tickle refiner, stuff box, and lastly through a basis weight valve which controls the fiber delivery to the head box in the wet laid machine.

The typical start for making wet laid products is to stage the ingredients, such as in a warehouse. Due to the large quantity of pulp required to supply a modern paper machine, adequate warehouse space should be available with a detailed and accurate inventory control systems. Some larger paper machines require hydropulper loadings of truck trailer amounts of fiber in a single batch. An integrated facility may retain the pulped cellulose fibers in aqueous suspension containing about 4-20 wt. % solids that is then pumped to the Hydropulping Zone 710. The integrated facility, or a non-integrated facility, may also store compressed bales of dried pulped cellulose having a moisture content from 3 to 18 wt. % as sources of feed to the hydropulper.

In the Hydropulping Zone 710, the cellulose fibers are dispersed. A hydropulping vessel in the Hydropulping Zone 710 is fed through line 10 with a source of virgin cellulose fibers, and optionally through line 10 or other feed line 771 with waste/recycle source of cellulose fiber to make a furnish in the hydropulper. Compressed bales of dried cellulose fiber, and/or the aqueous suspension of cellulose fibers, are fed to the hydropulper and dispersed in water.

In one or any of the embodiments mentioned, the feed of cellulose fibers to the hydropulper is virgin non-fibrillated cellulose fibers, optionally dry cellulose fiber having a moisture content of less than 60 wt. %. The Compositions can contain water, and "furnishes" and "stock" and like terminology refer to Compositions including at least:
  (i) Cellulose fibers, CE staple fibers, or a combination thereof;
  (ii) Water; and
  (iii) optionally additives, wet strength resins, de-bonders and the like for making wet laid products.

There are a variety of different kinds of compositions suitable as isolated compositions, as feed streams, as effluents, present in any vessel or line or equipment at any stage, or used to make any wet laid product, or contained in any wet laid product after draining water and drying. In one embodiment, or in any of the embodiments mentioned throughout the description, the Composition can be made by combining virgin cellulose fibers, CE staple fibers having a DPF of less than 3 that are either dry, obtained from solvent spun filaments, or both, and water, and the weight of fibers in the Composition is more than 50 wt. % based on the weight of all solids in said Composition. In another embodiment, or in any of the embodiments mentioned throughout the description, the Composition can contain or be made by combining virgin cellulose fibers, CE staple fibers having a DPF of less than 3 and an average length of less than 6 mm, in which those CE staple fibers are added either dry, obtained from solvent spun filaments, or both, and water. In another embodiment, or in any of the embodiments mentioned throughout the description, the Composition can contain or be made by combining virgin cellulose fibers, crimped CE staple fibers, and water. In another embodiment, or in any of the embodiments mentioned throughout the description, the Composition can contain or be made by combining virgin cellulose fibers, non-round, crimped CE staple fibers having a denier per filament DPF of less than 3, an average length of less than 6 mm, and water.

There is also provided a process for making a furnish composition by combining virgin cellulose fibers, CE staple fibers, and water in a hydropulping vessel, and agitating the cellulose fibers, CE staple fibers, and water to obtain a furnish composition having a consistency of less than 50 wt. %.

The order of combination or addition of any of these ingredients is not limited.

The form of the cellulose fibers fed to the hydropulper in the Hydropulping Zone 710 is not particularly limited and includes sheets, emulsions, slushes, slurries, dispersions, flakes, or chopped particulate solid matter. The Hydropulping Zone 710 may include a staging warehouse for storing and feeding solid pulped cellulose fibers, such as in the form of sheets, to the hydropulper. The sheet form of cellulose fibers is typical for many wet laid facilities, even those that are integrated. Thick sheets of pulped cellulose fibers can be stacked in a warehouse in the form of bales or cubes, typically compressed, and of any dimension.

The dimensions of the bale containing sheets of cellulose fibers can be anything that a hydropulper can accept, and generally have dimensions equivalent to the dimensions of the stacked sheets of cellulose. Suitable bale sizes are not limited, but generally are from at least (width×length×height in feet) 1'×1'×1' and up to 4'×4'×4', and more typical from 2.0'×2.0'×2' up to 3.5'×3.5'×3.5', or about 47 inches by 30 inches (optionally up to any desired height), +/−4" in any dimension. Each sheet in the bale desirably has the same width and length as the bale, and the bale height is comprised of the height of the stacked sheets (discounting packaging). Once the sheets are stacked, they can optionally be compressed and strapped or packaged. The straps and packaging are typically removed before feeding the bale to the hydropulper. The bales of stacked sheets of cellulose have the advantage of being flat on all sides and compact and small, making their stacking during shipment efficient, unlikely to tip, and stackable in most any means of transport including trucks, train cars, trailers, and ships.

In whatever form present, a solid cellulose fiber source of feed to the hydropulper or any other vessel in the stock preparation zone can be as dry feed. A dry feed of cellulose fibers, meaning the dryness of a bale, sheets containing cellulose fibers, or loose cellulose fibers, has a moisture content of less than 60 wt. % based on oven dryness. A dry feed of cellulose fibers is distinguished from an aqueous feed of cellulose fibers as a slurry. A dry feed of cellulose fibers can have a moisture content of about 60 wt. % or less, or from 1 to 60 wt. %, or 1 to 55 wt. %, or 1 to 50 wt. %, or 1 to 45 wt. %, or 1 to 30 wt. %, or 1 to 25 wt. %, or 1 to 20 wt. %, 3-20 wt. %, or 3-18 wt. %, or 3-16 wt. %, or 3-13 wt. %, or 3-10 wt. %, or 4-20 wt. %, or 4-18 wt. %, or 4-16 wt. %, or 4-13 wt. %, or 4-10 wt. %, or 5-20 wt. %, or 5-18 wt. %, or 5-16 wt. %, or 5-13 wt. %, or 5-10 wt. %, or 6-20 wt. %, or 6-18 wt. %, or 6-16 wt. %, or 6-13 wt. %, or 6-10 wt. %, the remainder being solids.

In another embodiment or in any of the mentioned embodiments, the cellulose fibers can be measured by air dry % solids. Air dry % solids is the condition of a fiber when its moisture content is at equilibrium with ambient atmosphere. For purposes of determining the air dry % solids, the ambient atmosphere is deemed to have a 10% moisture content and a 90% oven bone dry fiber weight content. In other words, a 100% air dry is equivalent to an oven bone dry fiber weight of 90% and 10% moisture; and a 90% air dry is equivalent to an oven bone dry fiber weight of 81% and 19% moisture. Air dry can be determined according to TAPPI 201-cm-93. The solid cellulose fibers can have an air dry % solids of at least 45%, or at least 53%, or at least 60%, or at least 70%, or at least 85%, or at least 88%, or at least 90%, or at least 93%, or at least 94%, or at least 95%, or at least 96%, or at least 97%, or at least 98%, or at least 99%, or 100%. In this or in any of the mentioned embodiments, the cellulose fiber feed can be a pulped cellulose fiber feed. The amount of moisture within and outside the expressed ranges can vary depending on the humidity of the storage facility and the transportation means.

The number of sheets per bale is not particularly limited. The number of sheets can be at least 10, or at least 20, or at least 30, or at least 50, or at least 75, or at least 100, or at least 150, or at least 200. In addition, or in the alternative, the number of sheets can be up to 400, or up to 350, or up to 300.

Alternatively, if a pulping facility is integrated with a wet laid facility, the pulped cellulose does not need to be dried and solidified, but rather can be fed directly from the pulping facility as a slush, dispersion, or furnish containing water, to a Hydropulping Zone 710 in the wet laid facility or to the First Blending Zone 720. Such a supply of cellulose pulp fibers can comprise about more than 50 wt % water and up to 50 wt. % solids.

In the hydropulper, individual cellulose fibers are liberated from a source of cellulose fibers either by mechanical action, or both mechanical and chemical action. The source of cellulose, if received at the wet laid facility as a solid, is repulped in a Hydropulper Zone 710 by feeding the solid pulped cellulose into a hydropulper in the Hydropulping Zone 710 and blending the cellulose with water under agitation, generally mechanical agitation using an impeller, blade, or agitator to provide shear forces and break up, separate, and disperse the solid cellulose fibers into a furnish. The extent of re-pulping should enable the slurry to be pulped so that the individual fibers are completely separated from each other (deflaking).

The consistency of the Composition will vary throughout the wet laid process. In one or any of the embodiments mentioned, the consistency of the Composition at any point in the wet laid process (both stock preparation 700 and machine zone 800) is more than 0.05 wt. %, or at least 0.1 wt. %, or at least 0.2 wt %, or at least 0.3 wt. %, or at least 0.4 wt. %. That minimum consistency can be maintained in and from a hydropulper, to or from the refiner, or throughout the stock preparation process up to or in the headbox or as deposited onto the wire, or throughout the entire wet laid process.

The cellulose sheets should be completely broken down into individual fibers separated from each other. In general, the consistency of the Composition within and/or exiting the hydropulper in the Hydropulping Zone 710 is less than 50 wt. %, or not more than 40 wt. %, or not more than 30 wt. %, or not more than 25 wt. %, or not more than 23 wt. %, or not more than 22 wt. %, or not more than 21 wt. %, or not more than 20 wt. %, or not more than 15 wt. %, or not more than 13 wt. %, or not more than 10 wt. %, or not more than 8 wt. %, or not more than 7 wt. %, or not more than 6 wt. %, or not more than 5.5 wt. %, or not more than 5.1 wt. %, or not more than 4.8 wt. %, or not more than 4.6 wt. %, and in each case more than 0.05 wt. %, desirably at least 0.5 wt. %, or at least 1 wt. %, or at least 2 wt. %. In one or any of the embodiments mentioned, the consistency within or as an effluent 711 from the hydropulper or as a feed 721 to a refiner in the Refining Zone 730, is within the range of from 0.1 to 8.0 wt. %, or 0.25 to 8.0 wt. %, or 0.5 to 8.0%, or from 1 to 7 wt. %, or from 1 to 6 wt. %, or from 1 to 5.5 wt. %, or from 1.5 to 5.1 wt. %, or from 2 to 4.8 wt. %, or from 2 to 4.6%, based on the weight of the Composition.

In one or any of the embodiments mentioned, the furnish consistency within the hydropulper or stream 711 can be high and diluted downstream, and therefore, can be within the range of from 10 to 50 wt. %, or from 10 to 30 wt. %, or from 10 to 25 wt. %, or from 12 to 23 wt. %, or from 13 to 22 wt. %, or from 14 to 21 wt. %, or from 15 to 20 wt. %. Suitable methods for measuring the furnish consistency of cellulosic materials are known to the skilled person.

A hydropulper is a large vessel mounted with a means for providing active shear forces, typically through a blade, to break up and disperse the cellulose. Examples of hydropulper sizes range from small ones in the range of 4000 to 10,000 gallon vessels with an L/D of 0.5:1 to 10:1, or 0.5:1 to 8:1, or 0.5:1 to 6:1, or 0.5:1 to 4:1 or 1:1 to 3:1 and larger sizes of 20,000 to 80,000 gallons, or 30,000 to 60,000 gallons with an L/D from 0.5:1 to 10:1, or 0.5:1 to 8:1, or 0.5:1 to 6:1, or 0.5:1 to 4:1, or 1:1 to 3:1. Usually a hydropulper(s) is operated to a frequency which keeps the machine zone 800 operating in a continuous mode. Depending on the layout, the hydropulper can be operated in batch, semi-batch, or continuous mode, and typically will operate in the batch mode. The Hydropulping Zone 710 can contain one or more hydropulpers to ensure that the machine zone 750 operates in a continuous mode.

The hydropulper can be operated with or without the application of thermal energy. In one embodiment or in any of the mentioned embodiments, thermal energy is applied to the hydropulper to facilitate de-fiberization or deflaking. In this case, the thermal set point on a hydropulper can be at least 40° C., or at least 45° C., or at least 50° C., and in each case less than 90° C., or not more than 80° C., or not more than 70° C., or not more than 65° C., or not more than 60° C.

In another embodiment or in any of the mentioned embodiment, the hydropulper is desirably operated without applied thermal energy. Hydropulping can be performed at ambient temperature within the range of from 20° C. to 65° C., or from 20° C. to less than 50° C. Further, the hydropulping step can be performed at a pH value of from 5 to 13, or from 5 to 12, or from 5 to 9, or from 6 to 11, or from 6 to 10, or from 7 to 9.

In one or any of the embodiments mentioned, the Composition can have a consistency of at least 1 wt. % and up to 30 wt. % (or any of the ranges described above), containing:
a) cellulose fibers, and
b) CE staple fibers, and
c) water In addition to a feed of virgin cellulose fibers, a feed of fibers from waste/recycle sources can be combined with the CE staple fibers. The combination can occur in a variety of methods, and one example is as a feed 771 to the hydropulper 710. The feed of waster/recycle fibers, sheets, or pulp to the stock preparation zone have been pulped, typically in a separate waste/recycle facility, to a form suitable as a feed to a stock preparation zone in a wet laid facility for making consumer products. These waste/recycle facilities accept waste paper and paperboard products, described further below, and subject them to pulping, screening/cleaning, typically flotation and de-inking, and forming operations to make thick sheets. For an integrated facility, the forming step can be avoided and supplied as a furnish to the stock preparation zone. Unless the context dictates otherwise, a waste/recycle stream or feed means a source of waste/recycle fibers that have already been pulped, cleaned, and optionally de-inked, ready as a feed to a stock preparation zone in a wet laid facility making sheet products for end use consumers or for converters who can subject the sheets to further coating, calendering, or non-destructive treatment.

The waste/recycle composition feed to any zone, including the waste/recycle zone 770, in any form including as a sheet, bale, or furnish, can be contain from 0 wt. % to 60 wt. % CE staple fibers, or from 0.75 to 55, or 0.75 to 40, or 1 to 55, or 1 to 40, or 1 to 20, or 1 to 15, or 2 to 55, or 2 to 40 2 to 20, or 2 to 15, or 2 to 12, or 2 to 10, or 3 to 55, or 3 to 40, or 3 to 25, or 3 to 20, or 3 to 15, or 3 to 12, or 3 to 10, or 4 to 55, or 4 to 40, or 4 to 25, or 4 to 20, or 4 to 15, or 4 to 12, or 4 to 10 wt. % CE staple fibers, based on the weight of a sheet or bale of waste/recycle feed), or based on the weight of all fibers in an aqueous waste/recycle feed.

There are a variety of different kinds of compositions containing waste/recycle fiber that are suitable as isolated compositions, as feed streams, as effluents, present in any vessel or line or equipment at any stage, or used to make any wet laid product, or contained in any wet laid product after draining water and drying. In one embodiment, or in any of the embodiments mentioned throughout the description, the Composition can contain or be made by combining waste/recycle cellulose fibers, CE staple fibers having a DPF of less than 3, and water. In another embodiment, or in any of the embodiments mentioned throughout the description, the Composition can contain or be made by combining waste/recycle cellulose fibers, cellulose ester CE staple fibers having a DPF of less than 3 and an average length of less than 6 mm, and water. In another embodiment, or in any of the embodiments mentioned throughout the description, the Composition can contain or be made by combining waste/recycle cellulose fibers, crimped CE staple fibers, water. In another embodiment, or in any of the embodiments mentioned throughout the description, the Composition can contain or be made by combining waste/recycle cellulose fibers, non-round, crimped, CE staple fibers having a DPF of less than 3, an average length of less than 6 mm, and water.

A waste/recycle cellulose fiber feed can be obtained from a variety of sources. One source is pre-consumer waste, in which trims, offcut, and envelope waste generated outside of a wet laid facility that is eligible for landfill has not reached its intended consumer use, and includes de-inked pre-consumer material; and post-consumer waste that includes office waste, magazines, newsprint, paper board, and other paper based products that been used for their intended use, and also includes de-inked waste. The major categories of waste/recycle feeds to a wet laid facility can be generalized as follows: OCC, a post-consumer waste sourced from old corrugated containers that can be accepted by wet laid facilities to make recycle content shipping boxes and packaging, such as shoe and cereal boxes; ONP, a post-consumer waste sourced from used old newspapers that can be accepted by wet laid facilities to make recycle content newsprint, and for making paperboard, tissue and other products; Office Waste, a post-consumer waste sourced from printing and writing papers collected from offices, businesses, and homes; Mixed paper, a post-consumer waste sourced from a variety of paper types, including mail, paperboard, magazines, catalogues, telephone books, etc., accepted by wet laid facilities to make a variety of products, including paperboard and tissue, and mixed with virgin cellulose to make any type of paper products; and High Grade De-inked Paper, a pre-consumer waste that can accepted by a wet laid facility to make to make higher grade paper products for printing, writing, and in tissue.

The more specific grades of cellulose fibers obtained from waste/recycle paper are those designated by the Institute of Scrap Recycling Industries. There are generally 51 grades, classified as follows: Mixed Paper Materials: Grade 1; Soft Mixed Paper: Grade 2 of sorted and clean paper types; Hard Mixed Paper: Grade 3 of clean and sorted papers having less than 10% groundwood; Boxboard Cuttings: Grade 4; Mill Wrappers: Grade 5; News: Grade 6 is newspaper; News, De-Ink Quality: Grade 7 (ONP) fresh and sorted newspapers that are not sunburned relatively free of magazines; Special News, De-Ink Quality: Grade 8 (ONP); Over-Issue News: Grade 9 (OI or OIN) of unused, overrun newspaper; Magazines: Grade 10 (OMG) of coated magazines, catalogues, and other similar materials; Corrugated Containers: Grade 11 (OCC) containers having liners of test liner or Kraft; Double Sorted Corrugated: Grade 12 (DS OCC) containers generated from supermarkets and/or industrial or commercial facilities having liners of test liner or Kraft and free of boxboard, off-shore corrugated, plastic, and wax; New Double-Lined Kraft Corrugated Cuttings: Grade 13 (DLK) New corrugated cuttings having liners of Kraft without treated liners or medium, slabbed or hogged medium, butt rolls or insoluble adhesives; Fiber Cores: Grade 14 paper cores made from linerboard and/or chipboard, single or multiply plies; Used Brown Kraft: Grade 15 of used brown Kraft bags free of unwanted liners and original content; Mixed Kraft Cuttings: Grade 16 new brown Kraft cuttings, sheets and bag scrap that doesn't contain stitched paper; Carrier Stock: Grade 17 printed or unprinted unbleached new drink carrier sheets and cuttings: New Colored Kraft: Grade 18 new colored Kraft cuttings, sheets and bag scrap; Grocery Bag Scrap (KGB): Grade 19; Kraft Multiwall Bag Scrap: Grade 20; New Brown Kraft Envelope Cuttings: Grade 21 of unprinted brown Kraft envelopes, cuttings or sheets; Mixed Groundwood Shavings: Grade 22 of magazine, catalogs and printed-matter trim; Telephone Directories: Grade 23; White Blank News (WBN): Grade 24 of unprinted cuttings and sheets of white newsprint or other uncoated white groundwood paper of similar quality; Groundwood Computer Printout (GWCPO): Grade 25 of groundwood papers used in data-processing machines (e.g. laser printing); Publication Blanks (CPB): Grade 26 of unprinted cuttings or sheets of white coated or filled groundwood content paper; Flyleaf Shavings: Grade 27 of printed trim from catalogs, magazines and other similar print materials; Coated Soft White Shavings (SWS): Grade 28 unprinted coated or uncoated shavings and sheets of white groundwood-free print paper material; Hard White Shavings (HWS): Grade 30 shavings or sheets of unprinted, untreated white paper that doesn't contain groundwood; Hard White Envelope Cuttings (HWEC): Grade 31 of shavings or sheets of uncoated, untreated and unprinted white envelope paper free from groundwood; New Colored Envelope Cuttings: Grade 33 of groundwood-free cuttings, shavings or sheets of uncoated, untreated bleachable colored envelope paper; Semibleached Cuttings: Grade 35 of untreated and unprinted that are ground-wood free such as untreated milk carton stock or manila tag or folders; Unsorted Office Paper (UOP): Grade 36 unprinted or print paper material generated in an office that can include document-destruction material; Sorted Office Paper (SOP): Grade 37 office paper that is primarily white and colored paper groundfree and unbleached fiber; Manifold Colored Ledger (MCL): Grade 39 of shavings, cuttings and sheets of industrial-generated, groundwood-free printed or unprinted and colored or white; Sorted White Ledger (SWL): Grade 40; Manifold White Ledger (MWL): Grade 41 of sheets, cuttings and shavings of industrial-generated unprinted or printed groundwood free white paper; Computer Printout (CPO): Grade 42; Coated Book Stock (CBS): Grade 43; Coated Groundwood Sections (CGS): Grade 44; Printed Bleached Board Cuttings: Grade 45; Misprinted Bleached Board: Grade 46; Unprinted Bleached Board: Grade 47; #1 Bleached Cup Stock (#1 Cup): Grade 48 cup base stock uncoated or coated; #2 Printed Bleached Cup Stock (#2 Cup): Grade 49 untreated and printed formed cups and cup die cuts; Unprinted Bleached Plate Stock: Grade 50 of groundwood free bleached uncoated or coated, untreated and non-printed plate cuttings and sheets; Printed Bleached Plate Stock: Grade 51; Aseptic Packaging and Gable-Top Cartons: Grade 52 of liquid packaging board containers including empty, used, polyethylene (PE)-coated, printed one-side aseptic and gable-top cartons containing no less than 70% bleached chemical fiber; Mixed Paper (MP): Grade 54 of all paper and paperboard of various qualities not limited to the type of fiber content; Sorted Residential Papers (SRP): Grade 56 of sorted newspapers, junk mail, magazines, printing and writing papers and other acceptable papers generated from residential programs; Sorted Clean News (SCN): Grade 58 of sorted newspapers from source separated collection programs, converters, drop-off centers and paper drives containing the normal percentages of roto gravure, colored and coated sections.

Any one of these mentioned grades and categories are suitable feeds of waste/recycle fibers to be combined with CE staple fibers, optionally with virgin cellulose fibers. The size of the cellulose fibers and degree of fibrillation present on cellulose fibers in waste/recycle feedstocks to a wet laid facility can vary by the source of waste. Further, cellulose fibers from waste/recycle sources are already fibrillated to varying degrees from their original production in a wet laid facility, and waste/recycle facilities also pulp the waste/recycle paper with mechanical action that can damage the fibers by breaking or shearing them that will further reducing the fiber size or over-fibrillation contributing to a decrease in the freeness of the pulp, and that in turn leads to a slower drainage rate, or reduced machine speed, or increasing susceptible to breakage in the machine zone, reduced absorbency as a product, and poor ink resolution.

By the use of CE staple fibers in the Composition, the freeness of the pulp can be improved as is further discussed below. Further, the operator can gauge the source of the waste/recycle feedstock and determine that it is either suitable to add to a hydropulper as a 100% waste/recycle feed to a refiner where it is subjected to yet another fibrillation operation, or suitable to add to a hydropulper where it is combined with virgin cellulose and together they are refined, or added to a stream downstream of the refiner, such as in a second blending zone 740 so as not to subject the waste/recycle fibers to further fibrillation.

In an embodiment or in any of the embodiments mentioned, the amount of waste/recycle cellulose fibers can be at least 1 wt. %, or at least 5 wt. %, or at least 10 wt. %, or at least 15 wt. %, or at least 20 wt. %, or at least 25 wt. %, or at least 30 wt. %, or at least 35 wt. %, or at least 40 wt. %, or at least 45 wt. %, or at least 50 wt. %, or at least 55 wt. %, or at least 60 wt. %, or at least 65 wt. %, or at least 70 wt. %, or at least 75 wt. %, or at least 80 wt. %, or at least 85 wt. %, or at least 90 wt. %, or at least 95 wt. %, and even 100%, based on the weight of all cellulose fibers present in the Composition or based on the weight of all cellulose fibers in the wet laid product. The quantity of waste/recycle is particularly high in wet laid processes for making paperboard/card board.

An example of these options is shown in FIG. 2, where waste/recycle fibers can be fed directly to a hydropulper in Hydropulping Zone 710 through a feeding means 10 and there combined with CE staple fibers. Alternatively, or in addition, the waste/recycle fibers can be fed through feeding means 10 (or a different feed means) directly into the hydropulper in the Hydropulping Zone 710, or separately to a feed means 20 to a second hydropulper in a Waste/Recycle Hydropulping Zone 770 and there hydropulped to a desired consistency in the second hydropulper. From the Waste/Recycle Hydropulping Zone 770, the pulped waste/recycle fibers can be fed either to the first Hydropulping Zone 710 through line 771, to a vessel in First Blending Zone 720 through line 772, or to a vessel in the Second Blending Zone 740 through line 773, and in any one or more of these zones combined with CE staple fiber and optionally but desirably also cellulose fiber.

When the waste/recycle pulp from the waste/recycle hydropulper zone 770 is fed to the Second Blending Zone 740, it is combined with a cellulose fibers and CE staple fibers that have been co-refined, thereby avoiding any refinement (further fibrillation) of the waste/recycle stream from the second hydropulper in the waste/recycle Hydropulping Zone 770.

In one embodiment or in any of the embodiments prior to and up to the refiner in a Refining Zone 730, the Composition can contain:
  a) waste/recycle cellulose fibers, and
  b) CE staple fibers, and
  c) water, and
  d) optionally and desirably virgin non-fibrillated cellulose fibers.

These Compositions can be contained in a hydrapulper, in a blend vessel prior to refining, or as a feed stream 721 to a refiner in a Refining Zone 730, or in any stream as an effluent from a hydropulper or feed to a blend tank. One or more of the waste/recycle cellulose fibers, CE staple fibers, and virgin non-fibrillated cellulose fibers can be combined or added to a vessel in sheet form in any order.

In one or any of the embodiments mentioned, the Composition can be made obtained by combining together in any order:
  a) a sheet of waste/recycle cellulose fibers containing CE staple fibers, and
  b) virgin non-fibrillated cellulose fibers, and
  c) water.

Stock Preparation: The First Blending Zone

The Composition made in the hydropulping exits the hydropulper in stream 711 as a pulped furnish and can fed to a Refining Zone 730 or first to an optional First Blending Zone 720. The First Blending Zone 720 can be a stirred blending tank or an in-line mixer for adding one or more additives into the stream of the pulped furnish fed to the refiner. The First Blending Zone 720 can also be a useful blend zone for combining waste/recycle fibers through line 772 with the virgin cellulose, leaving one the flexibility of pulping each of those fibers in zones 710 and 770 at different consistencies and developing the final desired consistency to the refiner in a first blend tank in zone 720. Optionally, a feed of CE staple fibers can be fed to the First Blend Zone 720 through line 11 instead of, or in addition to, the Hydropulping Zone 710. Likewise, an optional feed of additional cellulose fibers can be fed to the First Blending Zone 720 through line 11. The additives are typically combined with the pulped furnish in the blending tank or in-line mixer in amounts ranging from greater than 0% (if additives are added) up to 40 wt. %, based on the weight of all the solids in the furnish, and usually present in amounts of 0.5 wt. % to 20 wt. %.

There are a variety of different kinds of Compositions containing one or more additives, where such Compositions are suitable as isolated compositions, as feed streams, as effluents, present in any vessel or line or equipment at any stage, or used to make any wet laid product, or contained in any wet laid product after draining water and drying. In one embodiment, or in any of the embodiments mentioned throughout the description, the Composition can contain or be made by combining non-fibrillated virgin cellulose fibers or waste/recycle cellulose fibers or both; water; and one or more additives such as fillers, internal sizing agents, biocides, process anti-foaming agents, colorants, optical modifiers, or a combination thereof, where the CE staple fibers have a DPF of less than 3, or cut length of less than 6 mm, crimping, non-round with a DPF of less than 3, or a combination of any two or more of these fiber characteristics. In another embodiment, or in any of the embodiments mentioned throughout the description, there is also provided a process of adding one or more additives to a mixture in a blend tank or in-line mixer, and the mixture is the composition stated above.

Examples of additives combined with the pulped cellulose, and optionally the CE staple fibers if added in the hydropulper or into the First Blending Zone 720, include fillers (e.g., talc or clay), internal sizing agents (e.g., rosin, wax, further starch, glue) and biocides. Fillers are added to improve printing properties, smoothness, brightness, and opacity. Internal sizing agents typically improve the processability of the wet laid products, and water resistance and printability of the final paper, paperboard and/or cardboard. Other additives that can be added include process antifoaming agents, and colorants or optical modifiers such as precipitated calcium carbonate, clay, chalk or titanium dioxide to modify the optical properties of the wet laid product.

The consistency of the Composition (or furnish) within or as an effluent stream from the First Blending Zone 720 is within any of the ranges identified above with respect to the Hydropulping Zone 710. Desirably, the effluent from the First Blending Zone 720 is a low consistency furnish having a consistency of not more than 10 wt. %, or not more than 8 wt. %, or not more than 7 wt. %, or not more than 6 wt. %, or not more than 5.5 wt. %, or not more than 5.1 wt. %, or not more than 4.8 wt. %, or not more than 4.6 wt. %, and in each case more than 0.05 wt. %, desirably at least 0.5 wt. %, or at least 1 wt. %, or at least 1.5 wt. %, or at least 2 wt. %. Desirable consistency ranges include 0.5 to 8.0 wt. %, or from 1 to 7 wt. %, or from 1 to 6 wt. %, or from 1 to 5.5 wt. %, or from 1.5 to 5.1 wt. %, or from 2 to 4.8 wt. %, or from 2 to 4.6 wt. %, based on the weight of the Composition.

CE Staple Fiber Feed Prior to Refining

At least a portion of the CE staple fibers are combined with the cellulose fibers and co-refined. In a co-refining operation, the cellulose fibers are fibrillated. The location and method for the combination of the CE staple fibers and the cellulosic fibers is not limited, and at least a portion of each can be combined conveniently at any point prior to refining cellulosic fibers. A convenient location to combine the cellulosic fibers and the CE staple fibers is in a hydropulper in the Hydropulping Zone 710 using the same feed means in or on line 10, or a second feed means (not shown). The CE staple fibers may, in addition or in the alternative, be fed to a tank or in-line mixer to the optional First Blending Zone 720 through or on line 11, or to stream 711 or 721 feeding the Refining Zone 730, or can be added downstream of the Refining Zone 730 through line 12 into line 731 feeding the Second Blending Zone 740, or to a blend tank in the Second Blending Zone 740 through line 13. It has been unexpectedly found that co-refining the cellulosic fibers with the CE staple fibers can produce wet laid products, as shown by handsheets, exhibiting one or more enhanced properties, such as increased water drainage rates, increased absorbency, increased air permeability even with smaller pore sizes, decreased density at an equivalent basis weight, increased bulk, re-wettability, increased softness, and increased stiffness, improved embossing performance, improved caliper rebound, improved brightness, improved tensile strength relative to other synthetics added to cellulosic fibers, and/or enhanced removal of ink particles from sheet. Further, the CE staple fibers, unlike most other synthetic fibers, is obtained from renewable sources.

Additionally, one or more of these advantages can be achieved using existing equipment that requires no addition of vessels to existing facilities and can, depending on the pre-existing equipment configuration, in some cases require no additional piping, pumps, and/or tie ins to existing piping.

As noted above, the CE staple fibers can be shipped dry as sheets of cellulose ester fibers assembled into bales. Also, bales or rolls containing randomly oriented CE staple fiber can be shipped to a wet laid facility that makes wet laid products, such as market pulp manufacturers that can turn such bales into sheets containing cellulose and CE staple fibers.

In plant configurations that feed sheets or bales of cellulose fibers to a hydropulper, the same feeding means (e.g. conveyer system) can be employed to feed the sheets of CE staple fibers to a hydropulper, representing a true "drop in" addition to the cellulosic feeds without incurring the additional costs of re-configuring or adding vessels and without incurring the high costs of maintaining a wet fiber. Alternatively, instead of sheets or bales of sheets containing CE staple fibers, bales of loose CE staple fibers, optionally compressed, can be fed to any vessel in the stock preparation zone. One means for feeding includes suctioning the CE staple fibers from a bale to the desired vessel. Another method includes depositing the CE staple fibers dry into a stirred vessel that meters the CE staple fibers into a desired vessel for making a pulp.

The form of the CE staple fibers fed to the hydropulper, first blend tank, or to any vessel in the stock preparation zone, is not particularly limited and includes market pulp in the form of sheets, bales of sheets, and slabs; compressed bales of loose CE staple fibers; emulsions; slushes; slurries; dispersions; flakes; or chopped particulate solid matter. Thick sheets of pulped CE staple fibers can be stacked in a warehouse in the form of bales or cubes, typically compressed, and of any dimension.

In an embodiment or in any of the mentioned embodiments, there is provided a bale of sheets containing the CE staple fibers (the "CE sheets" or "CE bales"). This type of bale for cellulose fiber is commonly known as market pulp. The CE sheet will contain at least 1 wt. % CE staple fibers, or at least 5 wt. %, or at least 10 wt. %, or at least 25 wt. %, or at least 35 wt. %, or at least 50 wt. %, or at least 60 wt. %, or at least 75 wt. %, or at least 90 wt. %, or at least 95 wt. %, and up to 100 wt. % CE staple fibers based on the weight of all fibers in the sheet.

The dimensions of the bale containing CE sheets of cellulose fibers can be anything that a hydropulper can accept, and the CE bale will generally have dimensions equivalent to the dimensions of the stacked sheets containing the CE staple fibers. Suitable bale sizes are not limited, but generally are from at least (width×length×height in feet) 12'''×12'''×12''' and up to 120"×120"×120", and more typical within a range of from 20"×20"×12" up to 60"×60"×60", or from 20"×20"×12" up to 42"×42"×30", or from 20"×20"× 12" up to 36"×36"×25", in each case +/−4" in any dimension. In another example, the sheets can be in a width×length range of from 20"×20" up to 60"×60", or from 20"×20" up to 42"×42", or from 20"×20" up to 36"×36", and in each case to any desired height, but typically not exceeding 120" or not exceeding 80", or not exceeding 60", or not exceeding 42". Each sheet in the bale desirably has the same width and length as the bale, and the bale height is comprised of the height of the stacked sheets (discounting packaging).

The number of CE sheets per bale is not particularly limited. The number of stacked CE sheets can be at least 10, or at least 20, or at least 30, or at least 50, or at least 75, or at least 100, or at least 150, or at least 200, and up to 400, or up to 350, or up to 300. The thickness of the sheets in the bale is desirably sufficient to be self-supporting when grasped on any end. Suitable sheet thickness can be at least 1 mm, or at least 1.5 mm, or at least 2 mm, or at least 3 mm. In addition, or in the alternative, the sheet thickness can be up to 26 mm, or up to 20 mm, or up to 15 mm, or up to 12 mm, or up to 10 mm, or up to 8 mm, or up to 6 mm.

The bales of stacked CE sheets can have the advantage of being flat on all sides and compact and small, making their stacking during shipment efficient, unlikely to tip, and stackable in most any means of transport including trucks, train cars, trailers, and ships. In an embodiment or in any of the mentioned embodiments, at least one side of the bale is flat. Desirably, at least two opposing sides are flat where each of those side are the ones with the largest surface area, and in addition, optionally another two opposing sides are flat and in addition, optionally all sides of the bale are flat. To determine whether a side is flat, the following test can be conducted. A platen (flat plate) having a weight of 500 pounds and having at least the length and width dimensions as the side, is placed at rest on the surface of that side within the dimensions of the side, no gap larger than 2 inches between the platen and the entire length of at least three of the four edges on the side in contact with the platen will be present. The measurement is taken on an unstrapped and unpackaged, un-wrapped bale. The gap is desirably not larger than 1.5 inches, or not larger than 1 inch, or not larger than 0.75 inches, or not larger than 0.5 inches, or not larger than 0.25 inches, or not larger than 0.125 inches, or not larger than 0.08 inches. Desirably, the gaps are not larger than any of these values on all four edges. The test can also be satisfied with any platen having a weight of less than the weight of the bale. Gaps that do not run the entire length of an edge are not considered to be gaps. Gaps which vary in size along the edge are considered to have a gap size that corresponds to the smallest gap size along the edge.

While the embodiments above are in relation to sheets, they are equally applicable to slabs, except the slabs have a higher thickness than sheets and fewer slabs are present in a bale. A bale typically contains 2 to 10 slabs, or 2 to 8 slabs, or 2 to 6 slabs. A slab can have a thickness of at least 2 inches, or at least 3 inches, or at least 4 inches, or at least 5 inches, or at least 6 inches, or at least 10 inches, or at least 12 inches, or at least 18 inches, or at least 24 inches. Slabs are typically flash dried and slab pressed using conventional equipment.

Once the sheets are stacked, they can optionally be compressed, strapped, and/or wrapped or otherwise packaged. The straps and packaging are typically removed before feeding the bale to the hydropulper. However, in one embodiment or in any of the mentioned embodiments, the material composition of the bale straps and/or the bale packaging are obtained from a cellulose pulp. Optionally, the bale packaging can be obtained from the same grade cellulose fiber pulp as the cellulose fibers to which the CE staple containing sheets will be combined. In this case, the bale can be deposited into a hydropulper without removing the wrapping, particularly if the cellulose pulp from which the wrapping is made are in the same family or grade of cellulose fiber as the cellulose fiber used in the hydropulper, e.g. wrapping or packaging derived from NBSK fiber and NBSK cellulose fiber being hydropulped.

In one embodiment, or in any of the mentioned embodiments, there is provided a compressed bale of the CE staple fibers. CE staple fibers can be compressed under a load, the compressed staple fibers are wrapped while under load optionally in an airtight wrapper and sealed, the wrapped bale is optionally strapped, and the load is released. Vacuum can optionally be applied to the wrapped bale to withdraw air prior to or after sealing.

For example, the CE staple fibers can be introduced into a bale chute containing at least a portion of the wrapping, pressed under the load of platen driven by a ram, and while under the load, wrapped or packaged at least in part. Two wrapper sheets can be used for each bale, one for the bottom pulled up along the sides of the bale, and another for the top that is pulled down to overlap over the bottom wrap. Before or after at least partially wrapping the bale of CE staple fibers, the strapping can be threaded around the bale and through the planten applying the load to restrain the bale while under load.

In whatever form present, a CE staple fiber feed to the hydropulper or any other vessel in the stock preparation zone can be a dry feed, whether as a bale, sheets, or loose fibers. A dry feed of CE staple fibers has a moisture content of less than 30 wt. %. A dry feed of CE staple fibers can have a moisture content of about or 1 to 30 wt. %, or 1 to 25 wt. %, or 1 to 20 wt. %, 3-20 wt. %, or 3-18 wt. %, or 3-16 wt. %, or 3-13 wt. %, or 3-10 wt. %, or 4-20 wt. %, or 4-18 wt. %, or 4-16 wt. %, or 4-13 wt. %, or 4-10 wt. %, or 5-20 wt. %, or 5-18 wt. %, or 5-16 wt. %, or 5-13 wt. %, or 5-10 wt. %, or 6-20 wt. %, or 6-18 wt. %, or 6-16 wt. %, or 6-13 wt. %, or 6-10 wt. %, the remainder being solids. The moisture content can be determined by taking the difference in weight between the pulp sample at ambient conditions and the remaining mass after oven drying the sample at about 105° C. (or no more than 5° C. below its Tg) for a period of time sufficient to reach constant mass.

In another embodiment, the CE staple fibers can have an air dry % solids of at least 78%. The CE staple fibers can have an air dry % solids of at least 78%, or at least 80%, or at least 85%, or at least 88%, or at least 90%, or at least 93%, or at least 94%, or at least 95%, or at least 96%, or at least 97%, or at least 98%, or at least 99%, or 100%. The amount of moisture within and outside the expressed ranges can vary depending on the humidity of the storage facility and the transportation means.

Stock Preparation: Refining Zone

The Composition of CE staple fibers and cellulose fibers are fed to a refiner in the Refining Zone 730 so that at least a portion of the CE staple fibers and at least a portion of the cellulose fibers can be co-refined. The purpose of the refiner is to fibrillate and swell the cellulose fibers resulting in improved bonding during web formation. The shear forces help to break up the cell walls of the cellulose fiber to develop the fibrils. Refining subjects the cellulose and CE staple fibers to tensile, shear, compressive, impact and bending forces. As a result, the cellulose fibers can experience one or more of the following phenomena:
  (i) The cellulose fiber cell walls thickness is reduced,
  (ii) The cellulose fibers develop fibrils that protrude from the fiber and potentially also fibrillae,
  (iii) The fibers deform to induce bends, crimps, kinks, and curls, and
  (iv) The fibers can break thereby reducing their length distribution.

The development of fibrils, fibrillae, and fiber deformation using the CE staple fibers as described above through refining assists with improving one or more of the properties mentioned above.

There are a variety of different kinds of Compositions in which the cellulose fibers and CE staple fibers are co-refined, where such Compositions are suitable as isolated compositions, as feed streams, as effluents, present in any vessel or line or equipment at any stage, or used to make any wet laid product, or contained in any wet laid product after draining water and drying. In one embodiment, or in any of the embodiments mentioned throughout the description, the Composition can contain or be made by co-refining virgin cellulose fibers and CE staple fibers that have either:

i. a DPF of less than 3, or
   ii. an average length of less than 6 mm, or
   iii. crimping, or
   iv. or a combination or any two or more of (i)-(iii).

Such compositions have water and desirably the cellulose fibers and CE staple fibers are co-refined in the presence of water. In another embodiment, or in any of the embodiments mentioned throughout the description, the Composition can contain water, fibrillated virgin cellulose fibers, and co-refined CE staple fibers that have either:

i. a DPF of less than 3, or
   ii. an average length of less than 6 mm, or
   iii. crimping, or
   iv. or a combination or any two or more of (i)-(iii).

In another embodiment, or in any of the embodiments mentioned throughout the description, the Composition can contain water, cellulose fibers, an CE staple fibers, and the cellulose fibers and CE staple fibers are co-refined sufficient to impart to the composition either:

1. a Canadian Standard Freeness of any value further described below;
   2. a Williams Slowness of at least any value as described below, or
   3. a combination of the above.

In each of the above embodiments, the virgin fibers can be replaced with waste/recycle fibers such that the waste/recycle fibers are co-refined with the CE staple fibers, or virgin fibers can be combined with waste/recycle fibers and together co-refined with the CE staple fibers.

In one embodiment or in any of the mentioned embodiments, the CE staple fibers are desirably not fibrillated after co-refining with cellulose fibers. We have observed that the CE staple fibers, upon co-refining with cellulose fibers, do not fibrillate to any significant extent, and certainly not to the degree that cellulose fibers do. One would expect that a Post-Addition composition would demonstrate the same properties as a co-refined Composition, yet, in spite of the lack of fibrillation on the CE staple fibers, one or more of the properties of wet laid products are modified relative to Post Addition compositions, such as the dry tensile strength or tear strength of the wet laid products. A Composition that has been co-refined can contain a combination of cellulose fibers and non-fibrillated CE staple fibers that have each been refined in the presence of each other. A co-refined CE staple fiber can contain an average of not more than 2 fibrils/staple fiber, or not more than an average of 1 fibril/staple fiber, or not more than an average of 1 fibril/staple fiber, or not more than an average of 0.5 fibril/staple fiber, or not more than an average of 0.25 fibril/staple fiber, or not more than an average of 0.1 fibril/staple fiber, or not more than an average of 0.05 fibril/staple fiber, or not more than an average of 0.01 fibrils/staple fiber.

The Composition is fed to the Refining Zone 730 to subject the cellulose fibers and the CE staple fibers to shear forces sufficient to fibrillate and swell the cellulose fibers. In one or any of the embodiments mentioned, the Composition is co-refined by subjecting the cellulose fibers and the CE staple fiber to shear forces for a time sufficient to form a Composition that has:

a) a Canadian Freeness of at most 700, or at most 600, or at most 550, or at most 500, or at most 475, or at most 450, or at most 425, or at most 400, or at most 375, or at most 350, or at most 325, or at most 300, or at least 275, or at most 250; or
   b) a Williams Slowness of at least 5 seconds, or at least 8 seconds, or at least 10 seconds, or at least 15 seconds, or at least 20 seconds, or at least 25 seconds, or at least 40 seconds, or at least 60 seconds, or at least 70 seconds, or at least 80 seconds, or at least 100 seconds, or at least 120 seconds, or at least 140 seconds; or
   c) or a combination of the above.

Examples of maximum CSF and minimum Williams slowness can be 450/20, or 400/40, or 400/70, or 400/100, or 375/40, or 375/80, or 350/100, and so forth. In other examples where the fibers are more lightly refined, the maximum CSF and minimum Williams slowness can be or 700/5, or 600/8, or 550/15, or 550/25, or 550/40, or 500/20, or 475/20, and so forth.

Since the Compositions can have a higher level of freeness at a given refining energy, in another embodiment, regardless of the degree of refining, the minimum Canadian Standard Freeness can be at least 300, or at least 350, or at least 400, or at least 500, or at least 550, or at least 550, and the maximum Williams slowness in seconds can be 160 s, or 140 s, or 100 s, or 80 s, or 60 s, or 40 s, or 20 s, or 15 s, or 10 s. Examples of minimum CSF and maximum Williams slowness include 350/160, or 400/140, or 400/100, or 400/80, or 400/60, or 400/40, or 400/20, or 400/15, or 450/140, or 400/100, or 450/80, or 450/60, or 450/40, or 450/20, or 450/15, 500/140, or 500/100, or 500/80, or 500/60, or 500/40, or 500/20, or 550/60, or 500/20, or 550/15, or 550/10.

In one or any of the embodiments mentioned, the extent of intimate contact and entanglement between cellulose fibers and CE staple fibers in the co-refined Composition is greater than that achieved in a Post-Additions Composition. The extent of refining can, in one embodiment, be reflected in the curl value as determined in a Metso FS5 Fiber Analyzer on wet laid products containing or made from the Composition. The curl value can be improved relative to Post-Addition Composition, and relative to a 100% Cellulose Comparative composition, by an amount of at least 3%, or at least 5%, or at least 8%, or at least 10%. This improvement can be seen with short fiber lengths of under 6 mm.

The curl value of wet laid products containing or obtained by the Composition can be at least 13, or at least 14, or at least 15, or at least 16, or at least 17, as determined by a Metso FS5 Fiber Analyzer.

A high level of refining can be targeted to a CSF of less than 350, and moderate level of refining can be targeted to a CSF of 350 to 450, and a light level of refining can target the CSF to greater than 450 and up to 650 or 700.

The % solids in the Composition fed to and as an effluent from the Refining Zone is desirably a low consistency Composition. Suitable consistency of the Composition fed to the refiner and the effluent from the refiner are not more than 10 wt. %, or not more than 8 wt. %, or not more than 7 wt. %, or not more than 6 wt. %, or not more than 5.5 wt. %, or not more than 5.1 wt. %, or not more than 4.8 wt. %, or not more than 4.6 wt. %, and in each case more than 0.05 wt. %, desirably at least 0.25 wt. %, or at least 0.5 wt. %, or at least 1 wt. %, or at least 1.5 wt. %, or at least 2 wt. %. Desirable consistency ranges include 0.25 to 8.0 wt. %, 0.25 to 7 wt. %, or from 0.25 to 6 wt. %, or from 0.25 to 5.5 wt. %, or from 0.25 to 5.1 wt. %, or from 0.25 to 4.8 wt. %, or from 0.25 to 4.6 wt. %, 0.5 to 7 wt. %, or from 0.5 to 6 wt. %, or from 0.5 to 5.5 wt. %, or from 0.5 to 5.1 wt. %, or from 0.5 to 4.8 wt. %, or from 0.5 to 4.6 wt. %, or from 1 to 7 wt. %, or from 1 to 6 wt. %, or from 1 to 5.5 wt. %, or from 1.5 to 5.1 wt. %, or from 2 to 4.8 wt. %, or from 2 to 4.6 wt. %, based on the weight of the Composition.

Various types of refiners are in use and these can be classified as disk, conical, and beater types.

Pulp beaters are used for batch operations and for lab testing. Typical pulp beaters are the Valley, Hollander, and Jones-Bertram beaters. In these types of batch beaters, refining typically occurs through the mechanical action of bars on a rotating drum opposing a stationary bedplate on a circulating fiber suspension where the cellulose individual fibers are oriented perpendicular to the bars.

In a continuous refining processes, refining typically refers to the mechanical action carried out in continuous conical or disk-type refiner where the fibers move parallel to the bar crossings. Examples of these refiners and their blade elements are shown and described in U.S. Pat. Nos. 5,425, 508; 5,893,525; 7,779,525; 3,118,622; 3,323,732; 3,326, 480; 2,779,251; 3,305,183 and 2,934,278, which are incorporated herein by reference to the extent not inconsistent with the disclosures herein.

Non-limiting examples of continuous refiners that can be used to produce the co-refined Compositions include single and double and multi disk refiners, conical refiners, or conical and disk(s) refiners in combination. Non-limiting examples of double disk refiners include Beloit DD 3000, Beloit DD 4000, Andritz DO refiners, and Leizhan refiners. Non-limiting example of a conical refiner are Sunds JC series of refiners, Escher-Wyss refiners, an Emerson Claflin refiner, or a Jordan refiner.

The actual response to co-refining will depend upon the type of fibers, chemistries, equipment and operating conditions being used. The tear strength of long-fibered pulps generally decreases with refining due to weakening and shortening of the individual fibers. In a typical process for refining fibers consisting of cellulose only, the strength/ toughness parameters (e.g., burst, tensile, folding endurance) increase due to improved fiber-to-fiber bonding; however, the paper furnish itself becomes slower (i.e., more difficult to drain) and the resultant paper sheets become denser (less bulky), with reduced porosity, lower opacity, and lower stiffness.

The design of the refining plates and operating conditions can affect characteristics of co-refinement. With respect to the refining plates, the bar width, groove width, and groove depth of the plates characterize the refiner plates. Suitable examples of fine grooved plates bar widths are 1.3 millimeters or less with a groove width of 2.0 millimeters or less. Fine grooved plates have the advantage of increasing the number of fibrils on cellulose while maintaining fiber length and minimizing the production of fines.

Those of skill in the field of paper making operations are well acquainted with the operating conditions of a refiner suitable to make a well fibrillated stock while maintaining the life of the equipment. Typical parameters adjusted to achieve a well co-refined stock include the hydraulic flow of the furnish, the specific energy applied to refining, the delta of freeness drop over specific energy usage, the refining intensity, and the design of the plate.

The hydraulic flow is optimized to obtain optimized fibrillation and fiber strength, minimizing variations, obtaining a good fiber mat between the plates, and maintaining equipment life. For example, suitable flow rates through the cumulative number of refiners employed is at least equivalent to the operational flow rate demand of the wet laid machine.

The furnish consistency can impact the ability of the stock to get onto the bar edge to refine the fibers. If the consistency is too low, mat formation may be insufficient, the degree of fibrillation may lower than desired, fibers can be cut, and plate life can suffer. Consistency that is too high can plug the refiner, agglomerate the fibers, and lead to poor fibrillation development. In one or any of the embodiments mentioned, the consistency of the Composition fed to the refiner is between 2 wt. % to 7 wt. %, and generally within a range of 3 to about 5 wt. %.

The energy transferred from the refiner motor to the fibers is known as the specific energy applied, and is the motor load (e.g. kilowatts) divided by the production rate (e.g. tons/hr). The specific energy required to result in good fiber development is specific to the fiber type. One advantage of using the Compositions described herein is the ability to employ the same specific applied energy using a co-refined Composition to obtain higher drainage rates relative to a furnish having the same consistency without CE staple fibers.

Increasing the specific energy applied to the furnish assists in the development if improved tensile strength of handsheets made from that furnish up to a certain point after which no significant increase in strength is seen. Further refinement beyond that point may result in a loss of dry tensile strength due to excessive damage to the fibers.

The specific energy applied will vary depending on the wood type, consistency, flow, type of equipment and groove design, and refiner surface clearances. For one pass, suitable specific energy applied for co-refining the CE staple fibers with the cellulose fibers at low consistencies (2-7 wt. %) can be at least 30 kWh/metric ton, or at least 50 kWh/metric ton, and generally not more than 300 kWh/t, or not more than 250 kWh/t, or not more than 200 kWh/t, or not more than 175 kWh/t. In some cases, gross refining energies for multipass or multi-stage operations can be at least 300 kWh/t, or can even be greater than 400 kWh/ton for certain types of wood fibers and applications. In the case of using a Southern mixed hardwood, the gross specific energy can range from 400 to 600 kWh/t, while Southern softwood fibers can require gross specific energy inputs of 750 kWh/Mt or more.

Because one or more of the product properties are enhanced with the addition of CE staple fiber, the operator has flexibility to adjust many variables to obtain a process or product advantage, such as the specific energy, intensity, consistency, plate gap, rotational speed, and flow rate. For example, the drainage rate of the pulp and/or machine speed in zone 800 can be increased while keeping the specific energy applied in refining the same; or increase specific energy to reduce losses in, or maintain, or increase the dry tensile strength of wet laid products containing or made from the Composition relative to a 100% Cellulose Comparative composition while maintaining or increasing Canadian freeness or decreasing Williams slowness; or reduce the specific energy applied to the Composition while improving the CSF or Williams freeness.

The Composition provides a faster drainage rate on the wire. In one embodiment or in any of the mentioned embodiments, the speed of the machine at the wire processing the Composition is increased by at least 0.25%, or at least 0.5%, or at least 0.75%, or at least 1%, relative to the machine speed prior to processing the Composition without change to the applied specific refiner energy. In another embodiment, the specific refining energy applied to the Composition is increased by at least 5%, or at least 10%, relative to the specific refining energy applied to a 100% Cellulose Comparative composition, to obtain a wet laid product having a dry tensile strength that is within 20%, or within 10% of the dry tensile strength of wet laid products containing or made from the Composition made with the 100% Cellulose Comparative composition.

The operator may want to enhance the fiber development to increase strength to a desired target at an equivalent machine speed. Increased refining generally yields a slower draining stock (e.g. lower CSF), which necessitates slower downstream wet laid machine speeds. However, by co-refining the Composition, the drainage rate of the stock can be better preserved across the refiner, (e.g. the drop in CSF is lower) in spite of increased specific applied energy by the refiner. The preservation of drainage rate, over a change to higher refining energy, by use of the Composition can be observed in the higher Canadian freeness after refining relative to stock without the CE staple fiber as the same consistency and higher specific energy applied. Put another way, the drop in CSF with a co-refined Composition is smaller relative to a 100% Cellulose Comparative composition at a at a given specific applied energy. This reduction in the CSF delta with a co-refined composition can be taken advantage of when higher refining energies are applied to develop the fiber and increase one or more strength properties without slowing the machine speed relative to the 100% Cellulose Comparative composition. By co-refining the Composition, the drainage is more efficiently preserved thereby lowering the delta of the Canadian freeness relative to a 100% cellulose pulp at the same consistency and same specific applied energy. The CSF freeness drop is the measure of the freeness of the furnish fed to the refiner less the freeness of the effluent from the refiner. The measure of freeness is the Canadian Standard Freeness test as described below.

With the use of the CE staple fibers described above in combination with a co-refining operation, we have discovered that the CSF freeness is higher relative to the same furnish made without the CE staple fibers keeping the refiner conditions the same. This has the advantage of maintaining the specific energy input and enjoy the benefit of higher machine speed due to the higher CSF (or higher drainage rate) if the paper mill operations are set up to adjust the machine speed. If the paper mill machine is not capacity limited on the dryers and is configured to operate at a fixed throughput, then the operator can take advantage of energy savings by less energy input in the dryer section of the machine as discussed further below.

The delta of CSF freeness drop/specific energy applied using a furnish with CE staple fibers can be lowered relative to the same furnish and consistency without CE staple fibers by 2% or more, or 5% or more, or 10% or more, or 20% or more, or 30% or more, or 35% or more, or 40% or more, or 45% or more, or 50% or more, and is not particularly limited at the upper end, resulting in improved drainage rates holding the specific energy applied the same. The percentage of lowering can be measured by the ((delta without CE staple−delta with CE staple)/delta without CE staple fiber)× 100 while holding the specific energy input the same. For convenience, the control composition without the CE staple fibers can be a 100% Cellulose Comparative composition.

The number of passes through a refiner can vary depending on the desired refined pulp properties (degree of fibrillation) and equipment design. The number of passes through one refiner can be one, or at least two, or from 2 to 25, and usually 6 to 12. If desired, multiple refiners can be used in series to provide the equivalent of a multi-pass operation. With a multi-pass mode, at least a portion of the refined fibers removed from the refining surfaces are recirculated back to the refining surfaces of the refiner for further refining. Suitable amount of refined fibers re-circulated back to the refiner are at least 50 wt. %, or at least 60 wt. %, or at least 70 wt. %, or at least 80 wt. %, or at least 90 wt. % based on the weight of the furnish stream removed from the refiner. From the re-circulation loop, a portion of the refined fibers can be removed as the effluent of the refiner and fed downstream for further processing, with a corresponding amount of unrefined furnish feeding the refiner.

A recirculation loop on a single refiner can be avoided in a multi-pass mode by employing multiple refiners in series, or one may employ multiple refiners in series with at least one of the refiners operating recirculating a portion of the refined pulp.

The refiner can be operated at a refining intensity between about 0.1 and about 0.3 Ws/m per pass, or 0.5 to 9.0 Ws/m total, or 1 to 7 Ws/m total, or 2 to 6 Ws/m total refining intensity across all refiners used. Energy intensity is a measure of how much specific energy in watts is applied across one meter of the plates bar edge and transferred to the pulp in one second, and can also be referred to as the specific edge load (SEL). It is a measure of the specific energy per impact, or the force applied to the fibers during their residence time in the refiner. If desired, the refining intensity per pass can be reduced as the number of passes through a refiner increases. Different types of cellulose respond more efficiently to different intensity ranges. For example, softwoods respond better to higher intensity (or less bar edges at a given power level). The refiner can operate at a specific edge load of between about 0.75 to 4.5 Ws/m for most types of cellulose and waste/recycle cellulose. By using a co-refined furnish containing the CE staple fibers relative to the same furnish without the CE staple fibers, the SEL required to achieve a given Canadian Standard Freeness can be increased by at least 1%, or at least 2%, or at least 5%, or at least 10%, or at least 30%, or at least 40%, or at least 50%. The percentage of increase is measured by the SEL without (CE staple fiber−SEL with CE staple fiber)/SEL without CE staple fiber×100.

The plate residence time to which the Composition is subjected (time the fibers experience passing through the plates) can be at least 0.25 seconds, or at least 0.5 seconds, or at least 1 second, or at least 2 seconds, or at least 4 seconds, and up to 1 minute, or up to 30 seconds, or up to 20 seconds or up to 15 seconds or up to 10 seconds, in each case per pass, optionally at no more than 10 passes. Suitable residence time ranges include 0.25 to 60, or 0.25 to 30, or 0.25 to 20, or 0.25 to 15, or 0.25 to 10, or 0.5 to 60, or 0.5 to 30, or 0.5 to 20, or 0.5 to 15, or 0.5 to 10, or 1 to 60, or 1 to 30, or 1 to 20, or 1 to 15, or 1 to 10, or 2 to 60, or 2 to 30, or 2 to 20, or 2 to 15, or 2 to 10, or 4 to 60, or 4 to 30, or 4 to 20, or 4 to 15, or 4 to 10, in each case per pass and in seconds.

In one or any of the embodiments mentioned, the cumulative residence time that the Composition is co-refined is at least 2 seconds, or at least 4 seconds, or at least 6 seconds, or at least 10 seconds, or at least 15 seconds. Additionally or in the alternative, the cumulative residence time that the Composition is co-refined can be up to 30 minutes, or up to 20 minutes, or up to 15 minutes, or up to 10 minutes, or up to 5 minutes, or up to 2 minutes, or up to 1 minute, or up to 45 seconds, or up to 30 seconds, or up to 15 seconds, or up to 10 seconds. The cumulative residence time of the Composition in a continuous multi-pass refining configuration is the residence time of the Composition between the plates multiplied by the average number of passes the feedstock would experience. Although the majority of the fibers in a continuous multipass configuration would only see one pass where the recirculation ratio is less than 0.5 (as determined in equation 2 below), for purposes of determining the cumulative residence time taking into account all fibers in the feedstock to the refiner, the average number of passes can be calculated as:

$$Pa = \frac{1}{1-R} \quad \text{(eq. 1)}$$

where R is:

$$R = \frac{Fr}{Fr+F} \quad \text{(eq. 2)}$$

and each of Pa, R, Fr, and F are defined as:
Pa=average number of passes
R=recirculation ratio
Fr=mass flow in recirculation loop in mass/time (e.g. tons/hr)
F=mass flow to downstream operations in mass/time (e.g. tons/hr)

In a series or parallel refiner configuration, the cumulative residence time is the residence time of the Composition between the plates in each refiner added together.

The Composition does not need to be heated prior to entry into the refiner. Additionally, heat does not need to be applied to the Composition during refining beyond the heat generated from the mechanical action of the refiner applied to the Composition. If desired, however, thermal energy can be applied to the Composition before entering the refiner, such as through a heat exchanger. Suitable temperatures of the effluent from the refiner can be within the range of up to 150° F., or up to 125° F., or up to 100° F., or up to 80° F.

In one or any of the embodiments described herein, the Composition is refined under conditions effective to obtain a Composition that has a Williams Slowness of under 180 seconds, or under 160 seconds, or under 150 seconds, or under 140 seconds.

When adding a synthetic fiber to cellulose fibers, the composition will generally lose tensile strength relative to a 100% Cellulose Comparative composition. The CE staple fibers described herein, however, can reduce the loss of tensile strength that would be experienced with the use of other synthetic fibers. Additionally, by co-refining, the loss of tensile strength is reduced relative to the Post-Addition Composition. In one or any of the embodiments mentioned, or in any of the embodiments, the Composition is refined under conditions effective to reduce the loss of tensile strength relative to the Post-Addition Composition when each are compared to the tensile strength of the 100% Cellulose Comparative composition. This comparison can be made according to the following equation:

$$R = \frac{Cp - Cr}{Cp} \times 100$$

where
R: is the percent reduction in loss of tensile strength
Cr: is the loss of tensile strength of a co-refined Composition relative to 100% Cellulose Comparative composition.
Cp: is the loss of tensile strength of a Post-Addition Composition relative to 100% Cellulose Comparative composition The percent reduction in the loss of tensile strength R is desirably at least 5%, or at least 10%, or at least 15%, or at least 20%, or at least 25%, or at least 30%.

In one or any of the embodiments mentioned, the Composition is refined under conditions effective to improve the drainage rate of the Composition while minimizing the loss of tensile strength relative to the 100% Cellulose Comparative composition. This feature is expressed as a ratio of drainage rate gain to loss of tensile strength. The drainage rate gain is determined by the Williams Slowness improvement as a percentage between the Composition and the 100 cellulose Comparative composition:

$$Dg = \frac{(Wcomp - Wc)}{Wcomp} \times 100$$

where
Dg: percent drainage rate gain
Wcomp: Williams slowness of the 100% Cellulose Comparative composition
Wc: Williams slowness of the Composition The loss of tensile in tensile strength is determined by the tensile strength of the Composition relative to the tensile strength of the 100% cellulose Composition, and in addition or in the alternative, relative to the Post-Addition composition. Suitable ranges of ratios of the tensile strength of the Composition to the tensile strength of 100% cellulose Composition (and/or Post-Addition Composition), include 0.60:1 up to 1.2:1, or 0.63:1 to 1.2:1, or 0.66:1 to 1.2:1, or 0.70:1 to 1.2:1, or 0.73:1 to 1.2:1, or 0.77:1 to 1.2:1, or 0.83:1 to 1.2:1, or 0.85:1 to 1.2:1, or 0.87:1 to 1.2:1, or 0.90:1 to 1.2:1, or 0.95:1 to 1.2:1, or 0.66:1 to 1.1, or 0.70:1 to 1.1, or 0.73:1 to 1.1, or 0.77:1 to 1.1, or 0.83:1 to 1.1, or 0.85:1 to 1.1, or 0.87:1 to 1.1, or 0.90:1 to 1.1, or 0.92:1 to 1.1:1, or 0.66:1 to 1:1, or 0.70:1 to 1:1, or 0.73:1 to 1:1, or 0.77:1 to 1:1, or 0.83:1 to 1:1, or 0.85:1 to 1:1, or 0.87:1 to 1:1, or 0.90:1 to 1:1, or 0.92:1 to 1:1, or 0.66:1 to 0.95:1, or 0.70:1 to 0.95:1, or 0.73:1 to 0.95:1, or 0.77:1 to 0.80:1, or 0.83:1 to 0.95:1, or 0.85:1 to 0.95:1, or 0.87:1 to 0.95:1, or 0.90:1 to 0.95:1, or 0.92:1 to 0.95:1.

Stock Preparation: Second Blending Zone

The co-refined Composition (commonly known as papermaking stock) can be transferred from the Refining Zone 730 to a Second Blending Zone 740 through stream 731. The Second Blending Zone nomenclature does not imply that the wet laid process contains two blending zones, but rather, is designates as such to distinguish in the event a First Blending Zone 720 is employed. The Second Blending Zone 740 can be the only blending zone in the process. In the Second Blending Zone 740, additives such as brightening agents, dyes, pigments, fillers, retention aids, antimicrobial agents, defoamers, pH control agents, pitch control agents, internal sizing agents, dry or wet strength polymers, adhesives and drainage aids may be added to the Composition, and are typically done so at this stage since some of these additives should not be processed through a refiner. If desired, one or more of these additives can be added to the suction into a machine chest in the Machine Zone or into the suction of the fan pump 680 prior to entry into the headbox 811.

There are a variety of different kinds of co-refined Compositions containing one or more additives, where such Compositions are suitable as isolated compositions, as feed streams, as effluents, present in any vessel or line or equipment at any stage, or used to make any wet laid product, or contained in any wet laid product after draining water and drying. In one embodiment, or in any of the embodiments mentioned throughout the description, the Composition can contain or be made by combining virgin cellulose fibers and CE staple fibers that have been co-refined; water; and one or more additives comprising brightening agents, dyes, pigments, fillers, retention aids, antimicrobial agents, defoamers, pH control agents, pitch control agents, internal sizing agents, dry or wet strength polymers, adhesives, or drainage aids, or a combination thereof, and the CE staple fibers have;
  i. a DPF of less than 3, or
  ii. a cut length of less than 6 mm, or
  iii. crimping, or
  iv. non-round with a DPF of less than 3, or
  v. a combination of any two or more of (i)-(iv).

In another embodiment, or in any of the embodiments mentioned throughout the description, the Composition can contain or be made by combining water, waste/recycle cellulose fibers and CE staple fibers, and optionally virgin cellulose fibers, that have all together been co-refined; water; and one or more additives comprising brightening agents, dyes, pigments, fillers, retention aids, antimicrobial agents, defoamers, pH control agents, pitch control agents, internal sizing agents, dry or wet strength polymers, adhesives, or drainage aids, or a combination thereof, and the CE staple fibers have:
  i. a DPF of less than 3, or
  ii. a cut length of less than 6 mm, or
  iii. crimping, or
  iv. non-round with a DPF of less than 3, or
  v. a combination of any two or more of (i)-(iv).

There is also provided a process in which one or more additives as mentioned throughout this description are added to a mixture in a blend tank, and the mixture contains virgin cellulose fibers and CE staple fibers that have been co-refined, or waste/recycle cellulose fibers and CE staple fibers, and optionally virgin cellulose fibers, that have all together been co-refined; and water, and the CE staple fibers have one or more of the characteristics mentioned above.

In an embodiment or in any of the mentioned embodiments, the content of additives, or polymers (in each case other than fibers), present in the Composition is minor. For example, less than 50 wt. %, or not more than 45 wt. %, or not more than 40 wt. %, or not more than 35 wt. %, or not more than 30 wt. %, or not more than 25 wt. %, or not more than 20 wt. %, or not more than 15 wt. %, or not more than 10 wt. %, or not more than 5 wt. %, or not more than 4 wt. %, or not more than 3 wt. %, or not more than 2 wt. %, or not more than 1 wt. % of solids are additives, or non-fiber polymers.

Blending can be accomplished in mechanically agitated or stirred CSTR vessels, fed with a slurry or dry feed.

Common inorganic pigments consist of clay, talc, calcium carbonate, kaolin, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, aluminum hydroxide, alumina, lithopone, zeolite, magnesium carbonate or magnesium hydroxide, and aluminum trihydrate that are added to modify the optical and surface properties of the paper and board or as a fiber substitute. Common organic pigments include styrene-based plastic pigments, acrylic-based plastic pigments, styrene-acrylic-based plastic pigments, polyethylene, microcapsules, urea resin or melamine resin, and dyes. Dyes include organic compounds having conjugated double bond systems; azo compounds; metallic azo compounds; anthraquinones; triaryl compounds, such as triarylmethane; quinoline and related compounds; acidic dyes (anionic organic dyes containing sulfonate groups, used with organic rations such as alum); basic dyes (cationic organic dyes containing amine functional groups); and direct dyes (acid-type dyes having high molecular weights and a specific, direct affinity for cellulose); as well as combinations of the above-listed suitable dye compounds. The pigments that are most commonly used in the papermaking industry are clay, calcium carbonate and titanium dioxide.

Fillers are added to paper to increase opacity and brightness. Fillers include but are not limited to calcium carbonate (calcite); precipitated calcium carbonate (PCC); calcium sulfate (including the various hydrated forms); calcium aluminate; zinc oxides; magnesium silicates, such as talc; titanium dioxide (TiO2), such as anatase or rutile; clay, or kaolin, consisting of hydrated SiO2 and Al2O3; synthetic clay; mica; vermiculite; inorganic aggregates; perlite; sand; gravel; sandstone; glass beads; aerogels; xerogels; seagel; fly ash; alumina; microspheres; hollow glass spheres; porous ceramic spheres; cork; seeds; lightweight polymers; xonotlite (a crystalline calcium silicate gel); pumice; exfoliated rock; waste concrete products; partially hydrated or un-hydrated hydraulic cement particles; and diatomaceous earth, as well as combinations of such compounds.

A dry and/or wet strength polymer can also be added to the Composition at any point in the process. While a dry/wet strength polymer can be added to the Second Blend Zone 740, a more desirably addition location is to the Machine Chest Zone 600 to avoid any losses through the screening/cleaning zone 760. Dry and/or wet strength polymer are those polymers capable of forming hydrogen bonds to the cellulose fibers, or polymers capable of forming ionic bonds to the cellulose fibers, or polymers capable of covalently bonding to the cellulose fibers.

Internal sizing agents can also be added to the Second Blending Zone 740. Sizing agents can be added to aid in the development of a resistance to penetration of inks and liquids through the paper, as well as aids in maintaining web strength when processed through a sizing press in the wet laid machine zone. To avoid losses of sizing agents through the screening/cleaning zone, the sizing agents are desirably added after exiting the screening/cleaning zone, or to the Machine Chest zone 600, or prior to entering the headbox. Sizing agents in the stock preparation section are desirably internal sizing agents, and can be used for hard-sizing, slack-sizing, or both kinds of sizing.

Sizing agents can be rosin; rosin precipitated with alumina; abietic acid and abietic acid homologues such as neoabietic acid and levopimaric acid; stearic acid and stearic acid derivatives; ammonium zirconium carbonate; silicone and silicone-containing compounds, such as RE-29 available from GE-OS1 and SM-8715, available from Dow Corning Corporation (Midland, Mich.); fluorochemicals of the general structure CF3(CF2)nR, wherein R is anionic, cationic or another functional group, such as Gortex; alkylketene dimer (AKD), such as Aquapel 364, Aquapel (I 752, Heron) 70, Hercon 79, Precise 787, Precise 2000, and Precise 3000, all of which are commercially available from Hercules, Incorporated (Willmington, Del.); and alkyl succinic anhydride (ASA); emulsions of ASA or AKD with cationic starch; ASA incorporating alum; starch; hydroxymethyl starch; carboxymethylcellulose (CMC); polyvinyl alcohol; methyl cellulose; alginates; waxes; wax emulsions; and combinations of such sizing agents.

Sizing agents can include retention aids. Examples of retention aids are cationic polymers such as polyvinylamine polymers, or anionic microparticulate materials such as silica-based particles and clays such as bentonite, including anionic inorganic particles, anionic organic particles, water-soluble anionic vinyl addition polymers, aluminum compounds and combinations thereof.

Starch has many uses in papermaking. For example, it functions as a retention agent, dry-strength agent and surface sizing agent. Starches include but are not limited to amylose; amylopectin; starches containing a combination of amylose and amylopectin, such as 25% amylose and 75% amylopectin (corn starch) and 20% amylose and 80% amylopectin (potato starch); enzymatically treated starches; hydrolyzed starches; heated starches, also known in the art as "pasted starches"; cationic starches, such as those resulting from the reaction of a starch with a tertiary amine to form a quaternary ammonium salt; anionic starches; ampholytic starches (containing both cationic and anionic functionalities); cellulose and cellulose derived compounds; and combinations of these compounds.

In an embodiment or in any of the mentioned embodiments, there is also provided a broke composition containing broke pulp, and the broke pulp contains the co-refined cellulose fibers and CE staple fibers. A broke pulp is is obtained by pulping broke. Broke is a wet laid product, such as web, paper or paperboard that has not been inked and are trimmings and discarded wet laid product due to breaks during its manufacture or otherwise any discarded wet laid product during its manufacture. Wet broke is wet laid product taken from the forming and pressing sections, while dry broke is wet laid product emanating from the dryers, calenders, reel, winder, and/or finishing operations.

Prior to entering the Machine Chest Zone 750, a broke Composition can be added to the Second Blending Zone 740 through line 783 from the Broke Zone 780. Optionally, a broke Composition can be added to the Machine Chest Zone 750.

There are a variety of different kinds of broke Compositions suitable as isolated compositions, as feed streams, as effluents, present in any vessel or line or equipment at any stage, or used to make any wet laid product, or contained in any wet laid product after draining water and drying. In one embodiment, or in any of the embodiments mentioned throughout the description, the broke Composition can contain broke pulp obtained by pulping broke, and broke pulp contains water and fibrillated cellulose fibers and CE staple fibers having:
  i. a DPF of less than 3, or
  ii. a cut length of less than 6 mm, or
  iii. crimping, or
  iv. non-round with a DPF of less than 3, or
  v. a combination of any two or more of (i)-(iv), and There is also provided a stock composition by adding a broke composition to a vessel, pump, or line in the stock preparation zone 700 of a wet laid facility (e.g. to any of the zones in the stock preparation section), in which the broke composition contains broke pulp obtained by pulping broke, and the broke pulp contains the ingredients mentioned above.

A broke handling and re-pulping system is a typical feature in paper making processes. During threading and machine breaks, both wet and dry systems are capable of handling maximum tonnage from the machine. At the same time both systems handle small amounts on a continuous basis (e.g., couch trim at the wet end; winder trim, and slab off returns at the dry end.) Another feature of the broke system is sufficient broke capacity to sustain long periods of upset operation. From a broke pulped storage tank in the Broke Zone 780, a controlled flow is reintroduced into the stock preparation zone 700. One possible location for the introduction of a broke Composition is through line 783 into the Second Blending Zone 740. It is desirable to add a broke Composition after the Refining Zone 730 because the cellulose fibers in the broke Composition have already been refined. However, if desired the broke Composition can also be fed to the hydropulper in the Hydropulping Zone 710 through line 781 and/or to the First Blending Zone 720 through line 782 and/or to the Machine Chest Zone 750 through line 784.

In an embodiment or in any embodiment of mentioned herein, at least a portion of the CE staple fibers in the Composition are obtained from broke compositions. For example, at least 0.5 wt. %, or at least 1 wt. %, or at least 3 wt. %, or at least 5 wt. %, or at least 8 wt. %, or at least 10 wt. % of the CE staple fibers are obtained as CE staple fibers in broke compositions.

Repulping broke is relatively easy at the wet end as the non-dried broke readily disintegrates with low shear agitators. High shear showers and high-volume pumps keep the couch pit under control during sheet breaks and transfers contents to storage. The broke system at the dry end is much more demanding as it is repulping a dried sheet. Higher shear agitators and deflaking equipment are usually required. Recirculation causes the slurried broke to make multiple passes through the shearing equipment.

The broke Composition is comprised of at least fibrillated cellulose fibers, and desirably fibrillated cellulose fibers and the CE staple fibers, and can be co-refined cellulose fibers and CE staple fibers. Any of the aforementioned amounts and ratios of the cellulose fibers and CE staple fibers in the Composition can be applicable to a broke Composition. The weight ratio of CE staple fibers to all fibers in the broke Composition are desirably within 30%, or within 20%, or within 10%, or within 5%, or within 3%, or within 1% of the weight ratio of the CE staple fibers to all fibers in the Composition. The solids concentration in the broke Composition is typically higher than the solids concentration in the Composition in the cleaning/screening zone. The broke consistency generally ranges from 2 to 6 wt. %.

In one embodiment, or in any of the embodiments mentioned throughout the description, there is provided a process for changing over from the manufacture of one type or grade of wet laid product to another (a "change over process") that can be conducted more efficiently as described further below. The changeover process can include:
  a. manufacturing a first wet laid product containing or made by a first Composition that contains fibrillated cellulose fibers and CE staple fibers, and
  b. during the manufacture of the first wet laid product, generating broke (either wet or dry) that is fed to a broke system, and if the broke is dry, is pulped to produce broke pulp, and c. the manufacturer changes compositions from the first composition to a second composition different from the first composition to make a second wet-laid product, and d. between the change over from said first wet laid product to said second wet laid product, the broke system remains operational. The CE staple fibers have:
  vi. a DPF of less than 3, or
  vii. a cut length of less than 6 mm, or
  viii. crimping, or
  ix. non-round with a DPF of less than 3, or
  x. a combination of any two or more of (i)-(iv), In many wet laid facilities, the broke system ties into not only a blending zone after the refiner, but also to a hydropulper that feeds a refiner or into another pre-refiner blend zone. Many types of synthetic fibers cannot be processed through the refiners without causing agglomeration in the refining machines and/or flocculation in the furnish or web. When a wet laid facility utilizes stock containing synthetic fibers that have to be added after the refining system, the wet machine section and dry machine section each generate broke containing the synthetic fibers. When the operator desires to change over to a different second wet laid product, such as a second wet laid product containing no synthetic fibers, the broke system in those cases must be shut down, cleaned out or dumped, and flushed to prevent any synthetic fibers from finding their way into the refining section. A shut down/clean out of the broke may also require a shutdown of the machine section. One advantage of using the CE staple fibers is that the broke system remains operational (e.g. is not be shut down, cleaned out, flushed, and/or dumped to remove synthetic fibers) between a change over from one type of wet laid product to another type of wet laid product, such as one that does not contain a synthetic fiber. Since the CE staple fibers can be fed to a refiner and refined, re-circulation of CE staple fibers throughout the wet laid process is acceptable.

Stock Preparation: Machine Chest Zone

In an embodiment or in any of the mentioned embodiments, the stock preparation process can continue as follows. Any number and type of additional process steps can be provided between each of these steps:

a. providing a thick stock Composition in a machine chest zone;

b. feeding the thick stock to a cleaning/screening zone through a device that regulates the flow rate of thick stock;

c. reducing the consistency of the thick stock fed to the screening/cleaning zone to form a thin stock Composition;

d. subjecting the thin stock Composition to a process for cleaning the thin stock and feeding the cleaned thin stock through screens to form a cleaned and screened thin stock Composition;

e. feeding the cleaned and screened thin stock Composition to a headbox for delivery onto the Wire Zone.

The effluent from the Second Blend Zone 740 is fed through line 741 to a Machine Chest Zone 750 to reduce the variability of the Composition's consistency. Since a variety of pulp batches and pulp sources are used at the front-end feed to the hydropulper, and/or broke added to a Second Blending Zone 740, there can exist variability in consistency, cellulose fiber size, and cellulose fiber type even in a continuous or semi-continuous process. Additives that may be shear sensitive can be added into the machine chest such as the wet/dry strength polymers and starches.

In the Machine Chest Zone 750, the Composition is allowed to level for a retention period sufficient to reduce consistency variability and de-aerate. An on-line basis weight monitor within the Machine Chest Zone 750 can regulate a basis weight valve 610 to regulate the flow rate of the higher consistency Composition effluent (also called thick stock) to the Headbox and thereby provide an on target lower consistency to the Headbox.

In an embodiment, or in any of the embodiments mentioned throughout the description, the process CE staple fibers can be effectively processed within a Composition as a feed to a headbox 810. For example, there is a provided a process in which a thick stock composition in a machine chest is fed to a cleaning/screening zone through a device that regulates the flow rate of thick stock, and the consistency of the thick stock fed to the screening/cleaning zone is reduced to form a thin stock composition prior to entering the any one of the screen or cleaning equipment, followed by subjecting the thin stock composition to a process for cleaning the thin stock and feeding the cleaned thin stock through screens to form a cleaned and screened thin stock composition, and then feeding the cleaned and screened thin stock composition to a headbox. The Composition flowing through this process can be any of the Compositions described above, and desirably those that are co-refined.

The consistency of the Composition effluent from the machine chest is can be from 1-4 wt. %, and typically from 2.0 to 3.5 wt. %, or from 2.2 to 3.1 wt. %, or 2.2-2.8 wt. %, based on the weight of the Composition. The consistency of the Composition in the machine chest is higher than the consistency of the Composition fed to the headbox, and is referred to as the thick stock. From the machine chest, the thick stock Composition can be pumped, optionally through a tickle refiner, to a stuff box to provide a constant head, and lastly through a basis weight valve 610 as shown in FIG. 7, which controls the consistency of the Composition to the headbox in the wet laid machine zone 800 by regulating the flow of the thick stock Composition from the machine chest.

Figure 7:
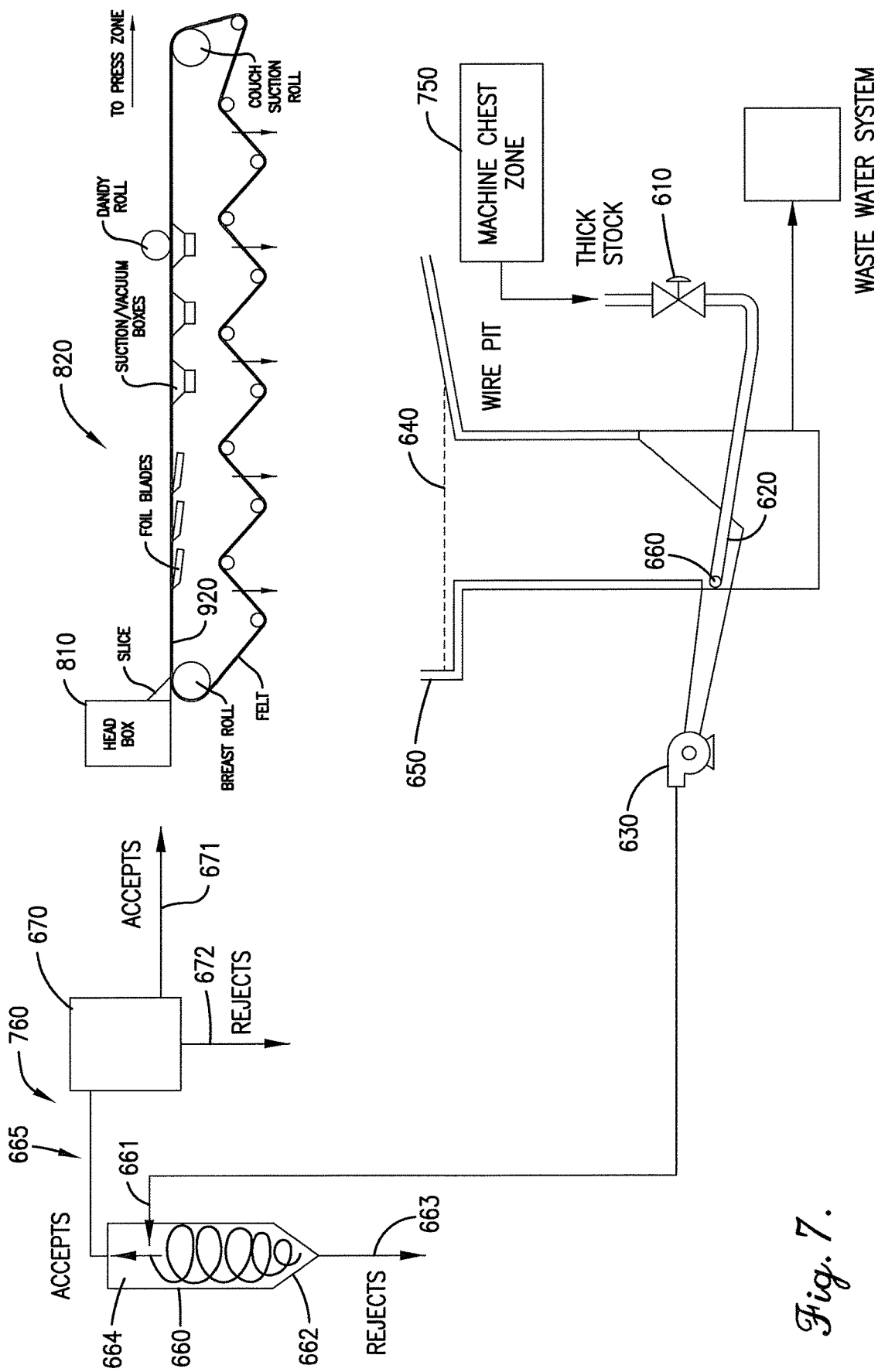
FIG. 7 is an example of the approach flow for controlling the consistency of pulp to a headbox from a machine chest.

As an example of this embodiment, reference can be made to a process shown in FIG. 7. The thick stock from the machine chest whose flow is regulated through a basis weight valve 610 is diluted to a 0.02 to 2.0 wt. %, desirably greater than 0.05 wt. %, or 0.1 to 2.0 wt. %, or 0.2 to 2 wt. %, or 0.5 to 1.5 wt. % consistency at the fan pump 630 by combining with white water 640 from the forming section 650 at the entrance 660 to the fan pump 630, to thereby form a thin stock having a lower consistency that the consistency of the Composition in the machine chest. The white water 640 is obtained from the drainage of water from the Composition on the wire belt 821 and press rolls, which are in the forming section of the wet laid machine zone 800. The white water 640 can be drawn into the fan pump 640 through a venture effect from the flow of Composition through pipe 620 into the fan pump 640. The Composition, now being diluted, is pumped by the fan pump 630 indirectly to the manifold of the headbox 811 in the wet laid machine zone 800. This type of dilution system to the manifold of the headbox is commonly known as the approach flow.

A fan pump 630 is commonly used the mix the dilution whitewater with the higher consistency Composition effluent from the machine chest to make a thin stock, an optionally targeted to the final desired consistency feed to the headbox. The actual consistency of the thin stock to the headbox can vary slightly upon removal of any contaminants from the cleaning and screening processes. Desirably, the consistency of the Composition upon dilution to form a thin stock and prior to entering the cleaning operation is within 20%, or within 15%, or within 10%, or within 8%, or within 5%, or within 3% of the consistency of the thin stock Composition fed to the headbox.

The fan pump will control the flow rate and pressure to the headbox 811. To maintain a uniform flow to the headbox 811, a constant head feed box (or stuff box) is normally employed having a pipe from the stuff box to and through the basis weight valve 610 before the point of dilution to control the flow and consistency. Prior to entering the headbox 811, the Composition is first cleaned and screened in a cleaning/screening zone 760.

Stock Preparation: Cleaning/Screening Zone

After the Machine Chest zone 750, the Composition may be subjected to a step for removing undesirable fibrous and non-fibrous material, typically through the use of one or more screens and centrifugal cleaners in a Cleaning/Screening Zone 760 downstream of the basis weight valve and fan pump. The concentration of the Composition fed to the centrifugal cleaners, or to the screens, or the effluent from each, is up to 2.5 wt. %, or up to 2 wt. %, or up to 1.5 wt. %, and is generally at least 0.2 wt. %, or at least 0.5 wt. % consistency. As shown in FIG. 7, the diluted stock is pumped by, for example, a fan pump 630 to one or more centrifugal cleaners 660 (to remove contaminants based on density), a pressure screen 670 (to remove large material), and then to the headbox 811. There is sometimes a secondary fan pump between the cleaners and screen to assist in pumping. After the pressure screen 760, the Composition enters a manifold where it is drawn off over the width of the paper machine into the headbox 811.

Centrifugal cleaners 660, or hydrocyclones, are used as a means of removing small contaminants and low-density fragments, such as plastics. Centrifuges typically remove sand and grit, dirt, heavy and light contaminants. Unlike centrifuges, the separation in centrifugal cleaners is not induced by rotating the equipment, but by introducing the feed stream at relatively high velocity, tangentially via line 661 into a cylindrical body. This creates a vortex that tends to cause high-density components to move to the wall. The lower portion of the cyclone consists of a convergent cone 66 (although this is not theoretically necessary). Material collected at the wall (the high-density fraction) is discharged from the bottom of the cone as rejects 663. The bulk of the flow (the low-density fraction) forms an inner vortex that rises to the top of the unit and discharges through a central pipe 664 (the vortex finder) as a stream of accepts 665.

The accepts effluent 665 of the centrifugal cleaner 660 can be fed to a screen 670, generally a pressure screen or a rotating pressure screen. The screen 670 can be effective to remove shives (fiber bundles) and other large, hard contaminants from the furnish separated by size. Conventional pressure screens use baskets with either slots or holes to admit the fibrous "accepts" flow 671 and reject the contaminants through a rejects stream 672. Slotted screens usually have a sculptured pattern that helps fibers to become aligned and pass through the screen. Pressure screens are equipped with various types of rotors to continuously re-disperse any fibers that start to accumulate on the screen surface. Because fibers can pass through a slotted screen individually, but not as fiber flocs, papermakers sometimes choose to add retention aids ahead of pressure screens in order to achieve a favorable balance of formation uniformity and adequate retention of fine particles.

Examples of suitable consistencies (solids content) of the Compositions and wet laid articles as they proceed through the stock preparation zone 700 and the wet laid machine zone 800 are described in the following table 5.

TABLE 5

| Process Step | Suitable Consistency Range (% solids based on weight of the Composition or article, remainder liquid or moisture) | Typical Value (% solids based on weight of the Composition or article, remainder liquid or moisture) |
|---|---|---|
| Warehouse: Staging Recipe Ingredients | 88 to 96 wt. % | About 90 wt. % |
| Composition in the hydropulper or effluent from the hydropulper | 0.5 to 10 wt. % | About 3-5 wt. % |
| Composition fed to, in and effluent exiting refiner | 2.5 to 3.5 wt. % | About 3 wt. % |
| Composition within and effluent from Second Blending vessel into which are added additives e.g., sizing: (alum or AKD or ASA), starch, fillers, synthetic fibers | 1-4 wt. % | About 2.5 wt. % |
| Machine Chest | 1-4 wt. % | About 2.5 wt. % |
| Effluent from Cleaning and Screening Zone | About 0.02-1.5 wt. % | 0.5-1.5 wt. % |
| Broke Pulp Composition | 1-4 wt. % | About 2.5 wt. % |
| Composition in headbox and feed to the wire: matt of fibers from suspension | About 0.02-1.5 wt. % | 0.5-1.5 wt. % |
| Composition exiting the couch roll after drainage | 18-22 wt. % | About 20 wt. % |
| Exiting Pressing Zone - squeeze water out/consolidate web | 40-60 wt. % | About 50-55 wt. % |
| Exiting First Drying Zone - evaporate water/bond web | 92-99 wt. % | About 98-99 wt. % |

TABLE 5-continued

| Process Step | Suitable Consistency Range (% solids based on weight of the Composition or article, remainder liquid or moisture) | Typical Value (% solids based on weight of the Composition or article, remainder liquid or moisture) |
| --- | --- | --- |
| Exiting Size Press - e.g., surface size, starch, strength aids | 40-60 wt. % | About 50 wt. % |
| Exiting Second Drying Zone - evaporate water/bond web | 92-95 wt. % | About 92-95 wt. % |
| Calendering | 92-95 wt. % | About 92-95 wt. % |

Wet Laid Machine Zone

The wire width, or the slice width, or the wet laid product width, may vary from about 5 to 40 feet, or 10 feet to 40 feet, or 15 feet to 40 feet, and operate at speeds of at least 25 meters/minute (mpm), or at least 200 mpm, or at least 350 mpm, or at least 500 mpm, or at least 750 mpm, or at least 1000 mpm, or at least 1250 mpm, and up to 2200 mpm, or up to 2100 mpm, or up to 2000 mpm, or up to 1900 mpm. They may produce from 2 tons, or from 5 tons, or from 10 tons, or from 100 tons, or from 250 tons, or from 500 tons, and optionally up to 1200 tons per day of wet laid product. The wet laid basis weight may vary from light tissue (about 10 grams per square meter) to paper board (up to 750 grams per square meter).

After the screen 670, the Composition is fed to a manifold in a headbox where it is spread over and across the width of a slice in the headbox 811. The Composition leaving the headbox 811 slice and deposited onto a continuous loop forming belt (or the wire) is formed into a web (or sheet) by draining the water from the Composition through the wire to form a wet fibrous mat called a wet web, which is then pressed, dried, and wound into a reel of paper on the wet laid machine.

Wet End of Machine Zone: Headbox Zone

Once the desired Composition consistency is obtained suitable for making the desired wet laid products, typically at a consistency of greater than 0.05 wt. % up to 2.0 wt. %, or 0.5 wt. % to 1.5 wt. %, the Composition is fed to a head-box zone 810 to evenly distribute and apply the Composition onto a moving endless wire. In one embodiment, the process includes feeding a Composition to the headbox in the wet end section of a wet laid machine, and the Composition contains cellulose fibers and CE staple fibers, optionally that have been co-refined, and the CE staple fibers have a DPF of less than 3, or a cut length of less than 6 mm, or crimping, or non-round with a DPF of less than 3, or a combination of any two or more of these characteristics.

The primary function of the headbox is to accept the low consistency Composition from the Machine Chest Zone 750 and deliver a very uniform flow across the width of the wire 821. Since the final product design is dependent upon this uniformity and basis weight of the sheet, the flow through the headbox nip and the wire speed are generally matched. Other functions of the headbox can include providing velocity control of the jet leaving the headbox by the pressure in the headbox and breaking up pulp flocs by turbulence within the headbox. These functions can be achieved by causing the stock Composition to flow through several rotating perforated rolls within the headbox or, in more modern head-boxes, past stationary flow elements or weirs. After passing through these turbulence-generating elements, the stock is accelerated in a sharply converging orifice slit called a slice. On leaving the slice, the stock impinges upon the forming screen and quickly becomes a three-dimensional web when deposited onto the wire as the water drainage process commences.

The Composition is capable of remaining homogeneous with minimal or no visible segregation between the CE staple fibers and cellulose from the machine zone to the wire. This feature can be beneficial for any process in which the Composition can experience settling or non-turbulent conditions for a period of time.

The width of the slice is generally the same or slightly less (within 10%) than the width of the wire, and this is dependent on the types of machines employed.

Wet End of Machine Zone: Wire Zone

The Composition leaving the Headbox Zone 810 is deposited onto a traveling wire in the Wire Zone 820. The primary function of the Wire Zone 820 is to drain water from the Composition. Water drainage is generally accomplished by draining water from the Composition deposited onto the wire 821 traveling in the machine direction through gravity, vacuum, or both. The Wire Zone 820 is also known as the formation zone because here the water from the Composition drains through the wire 821, and the fibers spread and interlace or consolidate on the wire to develop a wet sheet or wet web recognizable to the eye as a sheet or mat.

Wires may be divided into several types: Fourdrinier machines, twin-wire formers, and multi-ply formers, roto-formers, verti-formers, and delta-formers. By far the most common type of paper machine in use today is Fourdrinier, although many modern facilities employ a roll blade gap former or verti-former or configuration in which the forming elements are vertically or not horizontally oriented. While the Composition can be employed on any wet laid machine, including any paper or paperboard making machine, for convenience the bulk of this disclosure will be with reference to the Fourdrinier machine wire since this configuration is in common use today. It should be understood, however, that any type or configuration of a water drainage apparatus are suitable to process the Compositions and products made with the Compositions.

The Fourdrinier table of a paper machine includes a forming wire 821, foils 822, vacuum boxes 823, a dandy roll 824, couch roll 825, breast roll 826, tension rolls 827 across which the wire (or fabric) 821 is moved, and other parts, to form the wet laid web 828. As the Composition is deposited onto the wire 821 from the headbox zone 810, the water is generally first drained on the wire by gravity, and as it moves down the line in the machine direction, foil blades 822 under the wire assist in removal of water, along with an optional dandy roll 824 on top of the wire, as well as the application of vacuum to assist with further removal of water as the web moves in the machine direction.

The modern wire is actually a finely woven fabric on which the web is formed. Historically, these fabrics were made from bronze wire. Today most fabrics are made using woven synthetic fibers such as PET polymers fibers. Various types of weave are used to obtain maximum fabric life and to reduce wire marking on the wet sheet.

The foil blades 822 are located under the forming wire 821. The foils 822 are angle and height adjustable. The foils kiss the wire and remove some water through the Bernoulli effect. The foil blade angle, height, and vacuum level are adjusted over the length of the wire, or dewatering table, until a paper dryness of a desired target is achieved. Without the foils, application of vacuum can prematurely cause the formation of a nonuniform web.

After the foil section on the forming table, the moving web on the fabric passes over a series of suction/vacuum boxes 823 and then over a couch suction roll 825. Often, a dandy roll 824 is located on top of the forming fabric 821 before or over the vacuum boxes 823. The dandy roll 824 is an open structured roll covered with wire cloth, resting lightly upon the surface of the web 828. Its function is to assist with removal of water, flatten the top surface of the sheet and improve the finish. A pattern on the dandy roll 824 may leave translucent patterns on the wet paper, in the form of names, insignia or designs, as watermarks. The last roll in the forming section is called the couch roll 825. It is a suction roll to remove additional water and pass the sheet to the press felt in the Press Zone 830.

Figure 5:
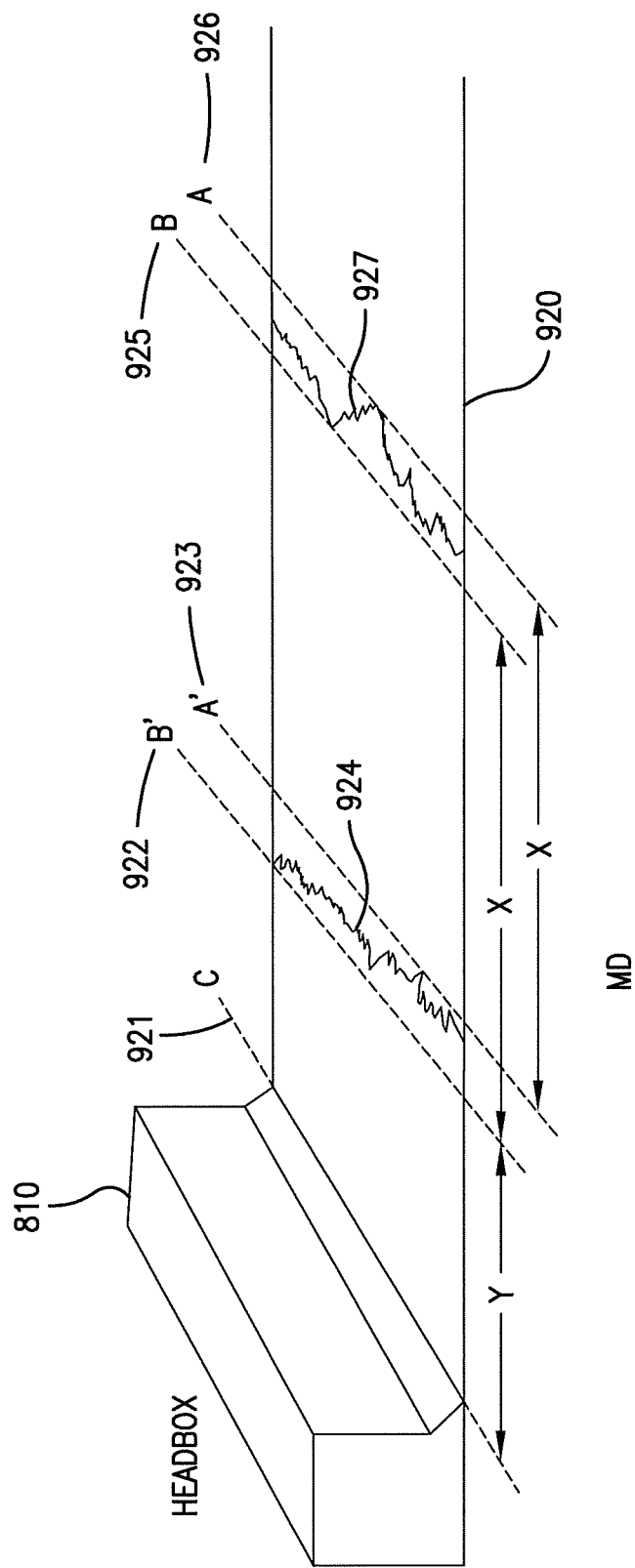
FIG. 5 is a diagrammatic example of the basis for measuring dry line movement on the wire.

The initial paper dryness can be visually observed as the dry line 924, as shown in FIG. 5. The dry line 924 is the line of demarcation between the stock on the wire 821 that is submerged in water and the portion having fibers extending above the depth of the water. The web before the dry line has a glossy look, and as the fibers extend above the water, a matte finish appears to create a line of demarcation is actually quite clear and visually observable with the naked eye as a line roughly perpendicular to the machine direction. The dry line 924 is not a perfectly straight line and can be convoluted. The dry line 924 is usually located a distance from the headbox down the machine direction of the wire and typically in the area of the vacuum boxes. If the dry line 924 is too far down the wire, not enough water has been removed and the sheet may not have enough strength to transfer from the couch roll 825 to the press rolls in press zone 830 without breaking.

There are a variety of variables to control the location of the dry line 924, including the headbox slice opening 812 and jet speed through the slice depositing the stock onto the wire 821, the wire line speed, the degree of vacuum applied, and the degree of refining of the fibers. By employing the CE staple fibers described above and co-refining cellulose fibers in their presence, the drainage rate of water is dramatically improved compared to a refined Composition with the 100% Cellulose Comparative composition.

This improvement in drainage rate provides one with a variety of process and/or product flexibility and options. For example, by using the co-refined Composition, one can increase the line speed while retaining the same dry line location (increased throughput). Many production lines produce wet laid products on the order of tons per day, so even slight line speed increases result in substantially increased production. The increase in line speed is particularly attractive if the machine configuration is dryer limited, or in other words, the line speed cannot be otherwise increased because the dryers are operating at maximum thermal energy output.

By using the co-refined Composition, the line speed can be increased by 0.1% or more, or by 0.25% or more, or by 0.5% or more, or by 0.75% or more, or by 1% or more, or by 1.5% or more, or by 2% or more, or by 3% or more, or by 4% or more, or by 5% or more, and is not limited by how much of an increase on may obtain. Generally, the increase in line speed would be up to 25%, or up to 20%, or up to 15%, or up to 10%, or up to 8%. The increase is relative to the line speed using the 100% Cellulose Comparative composition.

Alternatively, one can allow the dry line to move back toward the headbox and decrease the thermal energy applied in the dryer zones without a decrease in the level of sheet dryness exiting the drying zone. The thermal energy savings advantage is more fully described below in the Dryer Zone sections below. By using the co-refined Composition, the dry line can be moved back toward the headbox without adjusting stock preparation or wet end machine settings by at least 2 inches, or at least 3 inches, or at least 4 inches, or at least 5 inches, or at least 6 inches, or at least 7 inches, or at least 8 inches, or at least 9 inches, or at least 10 inches, or at least 11 inches, or at least 12 inches, or at least 13 inches, or at least 14 inches relative to the location of the dry line location using the 100% Cellulose Comparative composition (the "Reference Dry Line").

As an example of this embodiment, reference is made to FIG. 5, in which the Reference Dry Line 927, representing the dry line observable when processing a 100% Cellulose Comparative composition, is moved back toward the headbox 811 to the actual Dry Line 924 observable when using the co-refined Composition. The movement of the dry line can be measured by a marking a point on the wire crossed by a line perpendicular to the MC intersecting any point on the Reference Dry Line, e.g. line 925 and comparing it to the point on the wire crossed by a line perpendicular to the machine direction touching any point in the actual Dry Line, e.g. 922, and measuring the distance between the Reference Dry Line location and the actual Dry Line location as "x." If the dry lines are not straight as depicted in FIG. 5, the perpendicular lines should be consistently drawn on both the Reference Dry Line and the actual Dry line. For example, if the perpendicular line crosses the point on the Reference Dry Line closest to the headbox 811, then the perpendicular line crossing the actual Dry Line should also be at the point closest to the headbox, e.g. lines 925 and 922. Likewise, if the perpendicular line crosses the point on the Reference Dry Line farthest away from the headbox 811, then the perpendicular line crossing the actual Dry Line should also be at the point farthest away from the headbox, e.g. lines 926 and 923. The movement of the dry line would be calculated as x=distance between B and B', or A and A'.

Should the actual Dry Line be too close to the headbox 811, the formation of the web can suffer. The dry line should remain a distance of "y" from a line 921 parallel and co-extensive with the slice a location "C" on the headbox to the line drawn perpendicular to the MD of the wire intersecting the point on the actual Dry Line closest to the headbox 811, e.g. line 922. The distance "y" should be at least 1 foot, or at least 2 feet, or at least 2.5 feet, or at least 3 feet.

The improvement in drainage rate can also be achieved without the addition of additives for increasing the dewatering rate of pulp stock prior to introducing the Composition to the headbox 811. These additives are commonly known as drainage aids (also known as flocculants) and can be inorganic, organic, or biological. Drainage aids are usually low molecular weight water soluble polymers or resins that have a high cationic charge density, such as water-soluble cationic polymers prepared from polyacrylamide by the Hoffmann reaction and the copolymers thereof, hydrolyzed vinyl-formamides having vinylamine units, polyvinylamines and copolymers thereof.

In one or any of the embodiments mentioned, the drainage rate of the web made with the Composition can be increased without having to significantly change the zeta potential charge to the CE staple fibers, or any of the fibers, or of the Composition. Desirably, no additive is added to the Composition that changes the zeta potential of the CE staple fibers, all the fibers, or of the Composition by more than 4 mV, or by more than 3 mV, or by more than 2.5 mV, or by more than 2 mV, or by more than 1.5 mV or by more than 1 mV. Likewise, retention aids are highly charged, and the Composition need not contain a significant amount of a retention aid, or even no retention aid needs to be added to the Composition.

In one or any of the embodiments mentioned, the change in zeta potential of the Composition fed to, in, or exiting the stuff box or to, in, or exiting the headbox 811 by the addition of any additive is desirably not more than 2 mV, or not more than 1 mV, or not more than 0.5 mV.

The zeta potential is a measure of the extent to which charged particles will interact with each other. For measuring the zeta potential of the Composition containing the fibers, a fiber potential analyzer can be used and can be calculated according to the Helmholtz-Smoluchowski equation, and the reference to determine a change in the zeta potential is the Composition without the subject additive.

The consistency of the sheet comprising the Composition leaving the couch roll, or leaving the Wire Zone 820, or fed to the Press Zone 830, can range from 15 wt. % to 25 wt. %, or from 15 wt. % to 22 wt. %, or 18 wt. % to 22 wt. %.

On a Fourdrinier wire, all the water is removed through one side of the wet sheet, which can lead to differences in sheet properties each side of the sheet, and these two-sided differences are accentuated as the machine speed increases. In response to this issue, the twin wire and multi-ply formers were developed. In twin-wire formers, the water from the stock is drained from both sides of the web between two wire fabrics, and twin wire formers can be horizontal or vertically oriented. The twin wire machine can increase the dewatering rate of the stock and dewater from both sides, giving the resulting sheet more uniform properties throughout the thickness of the sheet.

Multi-ply formers are typically used in the production of paperboard. The most common type are cylinder formers or cylinder mold machines that include a series of screen or mesh covered cylinders, each rotating in a vat of dilute paper stock. Web formation occurs on the screen as a result of suction inside the cylinder which removes the filtrate. This technique provides a more random distribution of the fibers and are also used when processing a stock at higher consistencies. With higher consistencies, a more three-dimensional fiber orientation can be provided, resulting in higher thickness and stiffness in the machine direction. This technique is useful to make food packaging and consumer boxes such as those holding dry laundry detergent.

In another configuration, another Fourdrinier wire section can be mounted above a lower mounted Fourdrinier wire to allow for the manufacture of multi-layer paper and paperboard. These are called top formers and are typically used in multi-ply applications where one layer can be bleached and the other layer is unbleached.

In yet another configuration, the web or sheet can be formed between the wire and a special fabric as it wraps around a forming roll. The web is continuously removed from the forming roll onto a large diameter dryer and peeled off with a doctor blade. This process is used to make tissue paper.

Wet End of Machine Zone: Press Zone

After the sheet leaves the Wire Zone 820, the sheet is taken up into the Press Zone 830 for further dewatering by pressing. In the Press Zone 830, the sheet undergoes compression to squeeze out more water from the sheet. The pressing operation is considered a continuation of the wet end water removal. It is far lower in cost to remove water by mechanical means than by steam evaporation. Small increases in consistency leaving the press is one of the key ways to lower paper machine operating costs. Consistency can be increased if the ease of water removal can be improved from between sheet fibers and the transfer of the water from the sheet surface to the press felt(s).

The nip force can be expressed as pounds per lineal inch ("PLI"), and is calculate from the load applied on the opposing press rolls. The operator can set the force on the loading of the opposing rolls against one another. For example, hydraulic pressure can be introduced into the hydraulic cylinder controlling a pivoting roll that presses against a fixed roll to generate the desired nip force between the fixed and pivoting rolls. The PLI is a measurement expressed as the total force (in pounds) on the web in the z-direction (from top to bottom sides, compressive force) divided by the width (in inches) of the web.

The nip force can be 350-550 PLI for newsprint and bond paper, and 400-6000 for corrugated paperboard and linerboard. The press nip and hydraulic pressure applied to the press is limited by the ease of water drainage from the web. In a flow limited web, excess pressure applied to the web can result in crushing the sheet and blow outs because the water cannot escape from the web without destroying the web at the applied pressure. Slightly excessive pressures without web crushing or destruction can nevertheless result in washing fiber out and deposition onto the felt, or fiber realignment. However, a web made with the co-refined Composition has an improved ability to drain water. Accordingly, an operator can take advantage of the higher draining capability of the Composition by increasing the press pressure, or decreasing the nip gap, while retaining the integrity of the web. In this case, an increased level of water can be removed by the mechanical action of the press to provide a dryer web to the drying zone, thereby substantially reducing operating costs in the first and/or second drying zones.

In one or any of the embodiments mentioned, there is provided a process in which the pressure on the web (PLI) at the press can be increased when a web containing the co-refined Composition is passed through the press rolls relative to the PLI tension that was or would be applied when a web made with either a 100% Cellulose Comparative composition or relative to any wet laid web passed through the press rolls immediately prior to passing the web containing the co-refined Composition through the press rolls. The increase can be at least 2%, or at least 4%, or at least 5%, or at least 8%, or at least 10%, or at least 15%.

In one or any of the embodiments mentioned, there is provided a process in which PLI on the press is higher when a web containing the co-refined Composition is passed through the press rolls without decreasing a target thickness of the web for a desired application, where the thickness of the web product is measured on a winding roll, relative to the PLI that was or would be applied when a web made with either a 100% Cellulose Comparative composition or relative to any wet laid web passed through the press rolls immediately prior to passing the web containing the co-refined Composition through the press rolls. Since a web made from the Composition has a combination of increased bulk and high-water drainage rate, the PLI on the press rolls can be effectively increased to obtain the same target thickness, resulting in improved web dryness. The increase can be at least 0.5%, or at least 1%, or at least 1.5%, or at least 2%, or at least 4%, or at least 5%, or at least 8%, or at least 10%, or at least 15%.

In one or any of the embodiments mentioned, there is provided a process in which the quantity of water removed from a web passed through press rolls is increased relative to a web made from a 100 Cellulose Comparative composition or any Composition without the CE staple fibers co-refined with cellulose, at the same press loading. The increase can be at least 0.5%, or at least 1%, or at least 1.5%, or at least 2%, or at least 3%, or at least 5%, or at least 10%.

In one or any of the embodiments mentioned, there is provided a process for setting a press load in a wet laid process by:
  a) applying a press load sufficient to destroy a web made without the co-refined Composition to obtain a first maximum load at the load point when the web is destroyed;
  b) decreasing the press load relative to the first maximum load to obtain a first applied load with which to process a web made without the co-refined Composition;
  c) repeating steps a) and b) with a web containing or made with the co-refined Composition to obtain a second maximum load and a second applied load;

and the second maximum load exceeds the first maximum load and the second applied load can exceed, be the same as, or be less than the first applied load. In one or any of the embodiments mentioned, the second applied load on the press rolls is higher than the first applied load. Desirably, the second maximum load is at least 0.5%, or at least 1%, or at least 1.5%, or at least 2% higher, or at least 5% higher, or at least 10% higher, or at least 15% higher, or least 20% higher than first maximum load.

The press section mechanically squeezes water from the wet web between rolls to one or more felts, thereby increasing the consistency of the web, and also reduces the bulk or thickness of the web. To provide the desired compression, usually one roll is in a fixed position, while the other mating roll is movable and applies the desired load to the sheet against the fixed roll. The press felts aid in supporting the web sheet and absorbing the water pressed from the web. This compaction assists in subsequent consolidation and bonding of fibers. Sheet consolidation and fiber bonding in the press section helps bond the web.

The material for the press felt, if a felt is used, is not limited, and can include wool or synthetic materials such as polyamide woven fabrics having a thick batt to absorb more water. The rolls can be single (one roll) felted or double felted (both rolls felted). A single felted configuration typically employs a smooth top roll and a bottom felted roll which would make the top side appear smoother. Double felted rolls impart a rougher appearance to both sides of the sheet. The press rolls can be simple with a smooth or texturized surface, or the rolls can be vacuum rolls made of metal and covered with a synthetic material or rubber with a vacuum in the core of the roll.

The felts are on a continuous loop and will pass through the nip of the rolls. As the felt and the sheet pass through the nip, the felt absorbs water from the sheet as water is squeezed from the sheet through the compression forces applied by the rolls. The felt continues its run through a vacuum system/uhle boxes to remove moisture from the felt and continues around returning through the roll nips ready to absorb moisture from the sheet. The felt is a continuous belt loop so that at all times, water from the sheet passing through the roll nip is absorbed onto the felt.

If desired, extended nip presses can be used, which employ a larger composite covered roll on the bottom to extend the residence time of the sheet between the rolls and increasing the dewatering of the sheet. With an extended nip press, the consistency of the sheet leaving the Press Zone 830 can be increased by 20% or more, e.g. from at least 35% with conventional rolls to 42% or more, resulting in thermal energy savings or increased line speeds.

The extent of water removal from the sheet in the Press Zone 830 depends on the line speed and the compression between the press rolls and the condition of the press felts. The web entering the press zone can have a consistency of 15 wt. % to 25 wt. %.

In one or any of the embodiments mentioned, the web upon pressing or leaving the Press Zone 830 can have a consistency of 35 wt. % to 80 wt. %, or from 40 wt. % to 70 wt. %, or from 40 wt. % to 60 wt. %, or from 40 to 55 wt. %, or from 40 to 50 wt. %.

Dry End of Machine Zone: First Drying Zone

The sheet leaves the Press Zone 830 and the First Drying Zone 840 at a consistency noted above. The sheet leaving the First Drying Zone 840 can have a moisture of 5% or less by weight. The dryer causes further water removal from the sheet by evaporation. A typical dryer section consists of from 10 to 70 steam-heated dryer cylinders. The sheet may be held in intimate contact with the heated surfaces by means of dryer felts. The first drying zone 840 begins the "dry-end" of a paper making process. The dry end of the paper making machine typically includes first drying section, optionally a size press, an optional second drying section, a calender, and "jumbo" reels, while the wet end of the paper making machine typically includes the headbox, the wire section, and the presses.

The dryers cause further water removal from the sheet by evaporation using steam heated dryer cylinders, infrared, convection, and/or any other method.

The First Drying Zone 840 includes a heating element. One example of a heating element is an internal steam heated cylinder that evaporates the moisture from the sheet. The First Drying Zone includes multiple steam heated cylinders, including at least 10, or at least 20, or at least 40, and can range from 10 to 80 or 20-70 or 40-70 dryer cylinders. The sheet is held in intimate contact with the heated surfaces by means of dryer felts. A dryer felt presses the sheet against the dryer rolls. Humidity is removed from dryer felt using pocket and hood ventilation (forced air removal). Dryer fabric permeability can impact the rate of water removal.

Examples of suitable outer shell cylinder temperatures are within a range from 100° C. to 140° C. The wet laid web can be heated to in the First Dryer Zone and Second Dryer Zone to a maximum sheet temperature in excess 90° C., or at least 95° C., and up to 100° C. Since drying zones contain a continuum of cylinder temperatures corresponding to the desired heat up, maintenance, and optional cool down profiles, the maximum sheet temperature is the maximum temperature reached within drying zone.

Steam pressures within the cylinder can be at least 10 psig, or at least 20 psig, and generally reach up to 100 psig. Suitable steam pressure for many designs is between 20 to 90 psig.

The dryer section is the most expensive part of a paper machine in the terms of capital cost and operational cost. The First and Second Dryer Zones remove a smaller quantity of water compared to the amount of water removed on the Wire Zone 820 and the Press Zone 830. A value of 1.3 kg steam per 1 kg of water evaporated is typical for modern paper machine. The operational costs for removing water from the sheet in the dryer zones can run between 70-80% of the total cost for removing water, and the capital costs of the dryer section are the highest on the line. Thus, lowering the energy demand and usage in the dryer section can result in significantly overall lowered production and/or capital costs.

In the First Drying Zone 840, the sheet leaving the Press Zone 830 passes through one or more, or 6 or more, or 8 or more, or 10 or more, or 14 or more rotating heated (typically through steam) metal cylinders to evaporate moisture from the sheet and withdraw the moisture through a ventilation system. The cylinders can be divided into groups (or sections) of 2 or more, typically 4-8, with each group having its own drive system to allow for tension adjustments between each group to account for sheet shrinkage as water evaporates from the sheet in the machine direction. The groups can be progressively run at slower rotational speeds in the machine direction to account for the shrinkage that occurs as the sheet moves through the First Dryer Zone 840.

The cylinder configuration can be single or double tiered (two rows of cylinders), desirably double tiered. The cylinders can be felted as single sided felts (only one sheet surface contacts the felt) or double sided where both sheet surfaces contact the felt. Desirably, the configuration is double tiered, and the cylinders are single felted with each group of cylinders alternating the side on which the sheet contacts the felt.

The felt material is not limited. It is typically made of coarse threads and have an open weave to improve heat transfer. In some configurations, the first one or more cylinders in the First and Second Drying Zones 840 and 860 can be unfelted to allow broke to fall onto the floor basement or catch basin, and to assist with threading a new sheet.

Some of the factors influencing the efficiency of achieving the target dryness of the sheet exiting the First Drying Zone 840 are ambient temperature and humidity conditions, energy content of the steam if steam is used as the source of thermal energy, heat and mass transfer coefficients, the moisture content of the sheet entering into the first drying zone 840, the moisture transfer rates from the interior of the web, and water transfer rates from the web surface to the environment, the latter three being dependent on the web properties and Composition.

The most common method for applying thermal energy is the use of steam, with the surface of the cylinder rolls as the heat transfer medium. The cylinder drying method also provided a good support and smoothness to the sheet as it advances forward at high speeds. The material of construction for the shell of the cylinders is desirably one which has a high thermal conductivity, such as carbon steel or iron. The shell thickness will depend on the desired steam pressure ratings. Suitable drying cylinder diameters range from 3 feet to 9 feet, or from 4.5 feet to 6.5 feet, with a shell thickness of ½" to 2".

The heat from steam introduced into the cylinder is released by heat transfer to the cylinder shell and resulting condensation. A difference of 10° C. to 25° C. between steam temperature entering the cylinder at operating pressures and the exterior shell surface temperature, for at least two or more cylinders and desirably at least 70% of the cylinders, is generally within acceptable limits. Steam enters on one end of the cylinder, typically the cylinder cap or head through a steam joint and the condensate exits through a siphon connected to a center pipe within the shell to withdraw the condensate, and exits through a rotary joint on the cylinder head. The condensate in the cylinder is continuously removed to allow for effective heat transfer to the cylinder shell surfaces and to the sheet. The rotation of the cylinder is sufficiently fast to cause the condensate to contact the internal walls of the shell through centrifugal forces. The speed of cylinder rotation desirably meets or exceeds the rimming speed of the condensate within the cylinder for more uniform heat transfer to the shell. Turbulence within the cylinder can also be increased by installation of weirs or turbulence generating bars within the shell in order to improve heat transfer. The condensate and any uncondensed steam can be siphoned from the cylinder and sent to a separator tank or steam trap to separate condensate from steam as low-pressure steam is returned to the boiler section compressors or reboiler or vented.

Many wet laid machines are dryer limited, meaning that the capacity of the dryers limits the rate of machine speed. The dryer limitation is met when the maximum steam profile is reached (temperature gradient of cylinders progressively increasing from the front end to the last cylinder at the back end of the drying zone), and any attempt to increase machine line speed will result in higher moisture content at the reel (final product). Attempts at increasing the Press Zone loading, as noted above, can result in blow out on the sheet. The condensate and steam generation system can be re-designed and re-built, but this option capital intensive and production is lost during down time of the line.

By employing the co-refined Composition, the operator has the flexibility to increase line speed beyond the line speed limited by drying capacity, or a reduction in the steam enthalpy delta (e.g. by reducing pressure drop and/or internal energy changes). The co-refined Composition has a high drainage rate, thereby allowing improved dewatering at the wet end of the machine line through the wire and press zones. As a result, a sheet containing the co-refined Composition can contain less moisture entering the First Drying Zone 840, thereby reducing the quantity of moisture that needs to be removed from the sheet in the First Drying Zone 840 to achieve the same dryness target existing the First Drying Zone 840. Additionally, sheets made with the co-refined Composition have greater permeability, thereby facilitating not only the mass transfer of water from the sheet through gravity and compression, but can also improve evaporation rates of internal moisture captured under the surfaces of the sheet, such as moisture closer to the core of the sheet, as well as surface moisture.

Figure 6:
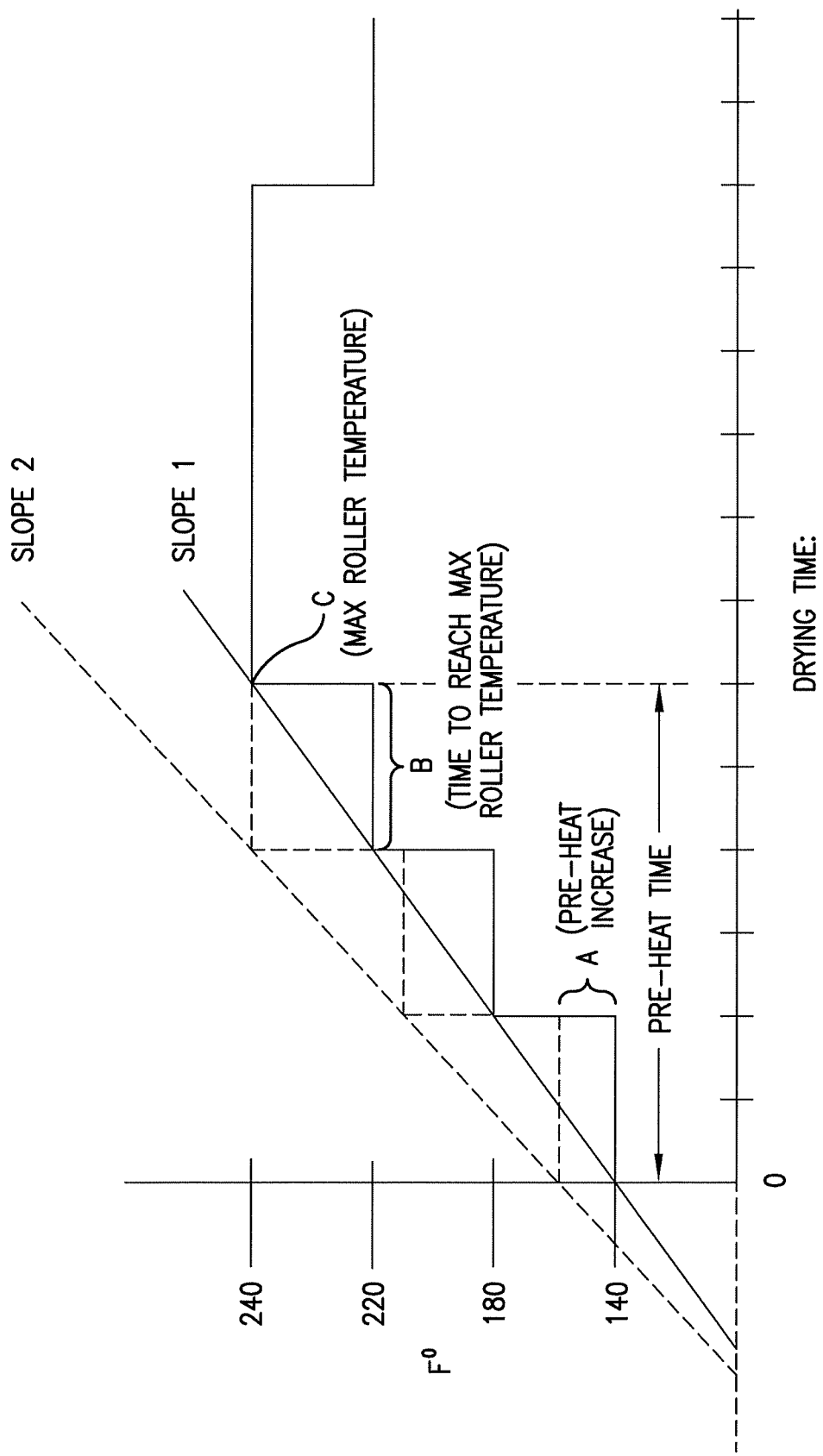
FIG. 6 is a temperature profile adjustment that can be made in a drying zone by using the Composition in the web.

By using a web made with the co-refined Composition that allows moisture to more readily evaporate from the interior and surface of the web, as well as entering the First Drying Zone 840 with a lower moisture content, the temperature profile of the First Drying Zone 840 can be adjusted as illustrated in FIG. 6. The web entering a drying zone cannot come into contact with drying cylinders at the maximum drying temperature. Rather, the web temperature is ramped up over time to a maximum temperature with successively higher drying cylinder temperatures, known as a warm up time or pre-heat time. Slope 1 is a curve representing the drying profile of a web made with a 100%

Cellulose Comparative composition in which the web, in which progressively increasing temperatures are applied to the web through at least a portion of the First Drying Zone 840 as it moves the MD over time as represented on the x axis. Each block increase in temperature represents the temperature increase in successive drying cylinders as the web moves down the line until a maximum drying cylinder temperature C is reached after which the cylinder temperature is no longer increased. The ramp up to the maximum cylinder temperature is the pre-heat phase. By employing a web obtained from Composition, one may adjust the pre-heat phase to reach the maximum cylinder temperature by either:

a) decreasing the pre-heat time to maximum cylinder temperature, or b) increasing the first drying cylinder temperature or the average temperature of the first drying group that the web encounters upon entering the First Drying Zone 840, or c) both a) and b).

Option a) is graphically depicted as Slope 2, in which the temperature of the pre-heat profile is ramped up quicker to achieve maximum cylinder temperature earlier in time, as shown in point B. While the pre-heat temperature profile need not be constant, Slope 2 is an example of a constant increase in temperature at a steeper slope than Slope 1. Option b) is represented in FIG. 6, delta A, as the increase in the first drying cylinder temperature (e.g. by increasing steam pressure), or the average temperature of the first drying group, that the web encounters upon entering the First Drying Zone 840 at time=0. In this case, the y intercept can be increased. In either case, the operator has the option of turning off steam delivery to one or more drying cylinders, thereby saving energy costs.

In one or any of the embodiments mentioned, there is provided a wet-laid process in which the pre-heat time to maximum cylinder temperature is shortened by 0.5 second, or by 1, or by 2, or by 2.5, or by 3, or by 3.5, or by 4 seconds relative to the pre-heat time employed prior to processing the web containing or obtained from the Composition.

In one or any of the embodiments mentioned, there is provided a wet laid process in which the temperature of the first drying cylinder, or average temperature of the first group of cylinders, is increased by at least 3° F., or at least 5° F., or at least 7° F., or at least 10° F., or at least 12° F., or at least 15° F., or at least 18° F., or at least 20° F., or at least 25° F., relative to the pre-heat time employed prior to processing the web containing or obtained from the Composition.

In one or any of the embodiments mentioned, there is provided a wet laid process in which steam delivery to one or more drying cylinders in a First Drying Zone is discontinued upon or during processing a web containing or obtained with the Composition. Desirably, operation of a drying cylinder in a constant evaporation rate zone is discontinued because this is the zone where the cylinders operate the hottest or within 5% of the hottest cylinder.

In yet another embodiment to the above, there is provided a wet laid process in which steam delivery to one or more drying cylinders in a First Drying Zone 840 is increased upon or during processing a web containing or obtained with the Composition.

In a further embodiment, the number of drying cylinders operating at a constant or maximum temperature is increased upon or during processing a web containing or obtained with the Composition.

In one or any of the embodiments mentioned, there is provided a process for increasing the line speed of a sheet moving through a first drying zone 840 in a paper machine by passing a web made with a Composition without the co-refined Composition through a drying zone at a first line speed to obtain a first target dryness, and subsequently passing a web containing the co-refined Composition through the same drying zone at a second line speed to reach or exceed the first target dryness, wherein the second line speed is greater than the first line speed. The second line speed can be operated for at least a day, or at least two consecutive days, or at least 1 consecutive week, or at least 2 consecutive weeks. The second speed can be at least 0.1%, or at least 0.5%, or at least 1%, or at least 2%, or at least 3%, or at least 5%, or at least 8%, or least 10% faster than the first line speed. The increase in not particularly limited, but in many cases, the second speed can be up to 25%, or up to 20%, or up to 15%, or up to 10% faster, or up to 7% faster, or up to 5% faster than the first line speed.

In one or any of the embodiments mentioned, the process includes increasing line speed by processing a web containing the Composition, determining the drop in the level of dryness relative to a target level of dryness, and increasing the line speed to a new line speed to reach the target level of dryness, and thereafter operating at the new line speed. The second line speed can be operated for at least a day, or at least two consecutive days, or at least 1 consecutive week, or at least 2 consecutive weeks.

In one or any of the embodiments mentioned, one can set a line speed of a web containing a co-refined Composition at a basis weight through a First Drying Zone 840 and obtaining a target dryness, where the line speed is greater than the maximum theoretical line speed of a web that does not contain a co-refined Composition to obtain the same target consistency at the same basis weight. The maximum theoretical line speed would be limited by the temperature profile set without blowing out, blistering, tearing or otherwise damaging the sheet properties. The increase in line speed can be at least 1%, or at least 2%, or at least 3%, or at least 5%, or at least 8%, or least 10%, and up to 25%, or up to 20%, or up to 15% faster than the maximum theoretical line speed.

In one or any of the embodiments mentioned, the mass per unit time of the web in the First or Second Drying Zones 840 or 860 can be increased by either increasing the line speed or increasing the basis weight, or both. With the improvement is evaporation of water out of the interior of the web, now the basis weight can also be increased if desired for a particular application. There is provided a wet laid process in which a web containing or obtained from the Composition is passed through a drying zone at a mass/unit time that is greater than the mass/unit time of a web passed through the drying zone prior to the web containing or obtained by the Composition, for the same end application. The increase can be at least 0.1%, or at least 0.2%, or at least 0.3%, or at least 0.5%, or at least 0.8%, or at least 1%, or at least 1.4%, or at least 1.7%, or at least 2%, or at least 2.5%. Additionally, or in the alternative, the increase attributable to an increase in line speed can be up to 25%, or up to 20%, or up to 15%, or up to 10%, or up to 7%, or up to 5%, or up to 4%, or up to 3%, or up to 2%. The increase attributable to an increase in the web's basis weight can be much larger, even beyond 100%.

Any conventional dryer ventilation system can be employed. The dryer groups can be enclosed with a ventilation system to conserve heat. One example of ventilation system is pocket ventilation, which heated air usually supplied to the sheet in the pockets between the cylinders to increase the rate of drying. The ventilation system assists with the removal of evaporated moisture and therefore is an important driving force for the efficiency of evaporation. The efficiency of the ventilation system can be more effective to increase the rate of evaporation than raising the surface temperature of the cylinder shells. The ventilation system can remove evaporated moisture by circulating hot dry air through the pockets of moisture. Such pocket ventilation can be delivered through perforated or slotted tubes along their entire length that face into the pocket. The ventilation system can also control the ambient humidity and reduce humidity variation along the dryer line. A good ventilation system can save costs on drying energy and improve the drying rate. To enhance the effect of controlling humidity and improving the drying rate, a dryer hood can be employed in the space above the dyer section of the paper machine to withdraw the moist air. The length of the hood can commence from the end of the presses to the beginning of the reel take up.

Alternatives to the steam cylinder drying method include the Condebelt drying, Through-Air drying for tissue paper, Air Impinging drying using convection drying, Impulse drying by passing the web through a high temperature press nip, Convective Steam drying, Micro-wave drying, and Infra-red drying. An infra-red system can be used in conjunction with steam cylinder heating. The infra-red system is useful to place toward the end of the first or second dryer zone to dry moisture streaks in the sheet or to flatten a moisture profile across the sheet. For the same purpose, the Press Zone 830 or the beginning of the Drying Zone 840 can also include a water spray or a steam shower to deposit a controlled amount of moisture to the sheet and create a more uniform moisture profile as the sheet travels through the drying elements. A more uniform moisture profile can minimize the formation of curl, cockle, and moisture streaks.

Dry End of Machine Zone: Surface Sizing Zone

The sheet dried in the First Drying Zone 840 can be fed into a Sizing Zone 850 in which the sheet is re-wetted by the addition of surface sizing agents to the sheet. The size press is desirably located between the First and Second Drying Zones 840 and 860, although it can alternatively be located before the calendering zone. The purpose of the sizing press applying surface sizing agents to the sheet are to alter the sheet's resistance to water and/or ink penetration, improve its smoothness, reduce abrasiveness, improves it printability, increase stiffness, reduce porosity, and/or improves its internal bond and surface strength. Sizing agents can be internal when applied in the wet end, such as in the Second Blending Zone 740, or external when applied in the dry end, and such sizing agents are known as surface sizing. Many of the internal sizing agents can be applied as surface sizing agents, and many of the surface sizing agents can also be applied as internal sizing agents.

On the dry end, the sizing agents are generally applied with a sizing press. An example of suitable size presses includes roll applicators passing the sheet through a flooded nip between two rolls. Alternatively, size presses can transfer a film from the roll to the sheet after passing the roll through a bath. The size press can be horizontal, vertical, or angled with respect to the orientation of the sheet as it passed through the nip. The sizing agents can be used for hard-sizing, slack-sizing, or both methods of sizing.

Some size presses also include a coater which applies a coating to the web surface. If a coating is applied, it can be performed in the Sizing Press Zone 850 or in the Finishing Zone 870, before or after winding onto a reel. Coating is a process by which paper or board is coated with a layer containing an agent to improve brightness, opacity, smoothness, printability, and color properties. The coating fills the miniscule pits between the fibers in the base paper, giving it a smooth, flat surface, which can improve the opacity, luster and color-absorption ability. Coating means that a layer is applied to the paper, either directly on the papermaking machine or separately (off machine coating).

Suitable coating devices and methods include an air knife coater, curtain coater, slide lip coater, die coater, blade coater, Bill blade coater, short dwell blade coater, gate roll coater, film transfer coater, bar coater, rod coater, roll coater and size press. In the air knife process, an air jet impinges the web acting like a doctor blade to remove excess coating applied to the web. In a blade coating technique, a flexible doctor blade set to the desired angle removes excess coating across the web. The various blades and rollers ensure the uniform application of the coating.

Different levels of coating are used according to the paper properties that are required. They are divided into light coated, medium coated, high coated. Typical levels of on-line coating for many application ranges from 0.1 to 10 g/m2.

The coating contains one or a mix of agents such as pigments and binders. For example, a type of coating can include fillers such as calcium carbonate, PCC, china clay, and/or chalk, optionally suspended in a binder.

A binder is a chemical compound or polymer that adheres wet laid fibers together or adheres the CE Staple fibers to the pulp fibers, or is an adhesive. The binder is typically a liquid at 25° C. and 1 atm. Suitable binders (or bonding agents) include water-dispersible binders and water-soluble binders. Examples of water-dispersible binders include latexes, conjugated diene-based copolymer latex such as styrene-butadiene copolymer or acrylonitrile-butadiene copolymer (optionally mixed with starch), acrylic-based copolymer latex such as polymers of acrylic acid esters or methacrylic acid esters or methyl methacrylate-butadiene copolymer, vinyl-based copolymer latex such as ethylene-vinyl acetate copolymer or vinyl chloride-vinyl acetate copolymer, polyurethane resin latex, alkyd resin latex, unsaturated polyester resin latex, functional group-modified copolymer latex of these various polymers modified with a carboxyl group or other functional group-containing monomer, and thermosetting synthetic resins such as melamine resin or urea resin. Examples of water-soluble binders include starch derivatives such as oxidized starch, etherified starch or starch phosphate, cellulose derivatives such as methyl cellulose, carboxymethyl cellulose or hydroxyethyl cellulose, polyvinyl acetate, polyvinyl alcohol and polyvinyl alcohol derivatives such as silanol-modified polyvinyl alcohol, natural polymer resins and derivatives thereof such as casein, gelatin or modified gelatin, soybean protein, pullulan, gum arabic, karaya gum or albumin, vinyl polymers such as sodium polyacrylate, sodium alginate, polypropylene glycol, polyethylene glycol, maleic anhydride and copolymers thereof.

In one embodiment or in any of the mentioned embodiments, the binder employed is not one that is capable of imparting hydrolyzability to the wet laid product or sheet. Such binders are the alkali metal salts of water-soluble anionic polymers or alkali metal salts of hydroxides and can surface hydrolyze the CE staple fibers, whether in the composition, wet laid product or sheet. Specific examples of binders that surface hydrolyze the CE Staple fibers are the alkali metal salts of polysaccharides including those having a functional group such carboxyl or sulfonic groups such as sulfates (such as alkyl celluloses such as carboxymethyl cellulose and carboxymethyl ethyl cellulose, carboxymethyl starch, and alginic acid; those having a sulfonic group such as chondroitin sulfate); and polyacrylic acid. In one embodiment or in any of the mentioned embodiments, not more than the following amounts of such surface hydrolyzing binders (e.g. alkali metal salts of water soluble anionic polymers or alkali metal hydroxides) are added to the Compositions or in the process; or the Compositions, processes, and wet laid products do not contain more than, 1 wt. %, or more than 0.5 wt. %, or more than 0.1 wt. %, or more than 0.05 wt. %, or more than 0.01 wt. %, or more than 0.005 wt. %, or more than 0.001 wt. %, or more than 0.0005 wt. %, or do not contain any such surface hydrolyzing binder, or have no such binder added.

In one embodiment or in any of the mentioned embodiments, the Composition, processes described herein, and wet laid articles including paper contain a low alkali metal content, such as not more than not more than 2 µmol, or not more than 1.75 µmol, or not more than 1.5 µmol, or not more than 1.25 µmol, or not more than 1 µmol, or not more than 0.75 µmol, or not more than 0.5 µmol, or not more than 0.25 µmol, or not more than 0.15 µmol, or not more than 0.1 µmol in each case per gram of composition or wet laid product such as paper.

In one embodiment or in any of the mentioned embodiments, the amount of synthetic binder particles is less than 5 wt. %, or not more than 4.5 wt. %, or not more than 4 wt. %, or not more than 3.5 wt. %, or not more than 3 wt. %, or not more than 2.5 wt. %, or not more than 2 wt. %, or not more than 1.5 wt. %, or not more than 1 wt. %, or not more than 0.5 wt. %, or not more than 0.25 wt. %, based on the weight of all fibers in the Composition. In one embodiment or in any of the mentioned embodiments, the Composition does not contain any added binder, or no binders are added to the Composition or added in the process of making a wet laid product.

Not all paper is coated. Uncoated paper is typically used for letterheads, copy paper, or printing paper. Most types of uncoated paper are surface sized to improve their strength. Such paper is used in stationery and lower quality leaflets and brochures.

The use of a high concentration size press is advantageous as it can reduce energy costs and apply sizing agents at high line speeds.

At the sizing press, the sheet is rewetted with the sizing agents and consequently, the sheet exiting the sizing press typically has a moisture content of 10% to 60%, or 20% to 60%, or 30% to 60%. Since the sheet under tension moving at high speeds is re-wetted, sheet breaks at the sizing press are common, particularly if there is a weak spot in the sheet. Size presses that utilize the puddling method of applying the sizing agent, that is, flooding the sheet with the sizing agents through the nip of the size rolls, tend to increase the risk of sheet breakage. Therefore, it is advantageous to employ a coating or film-applicator type of size press in which the sizing agent is metered onto a transfer roll by a blade, smooth roll, or a grooved roll, and the sizing agent is applied to the sheet upon contact with the transfer roll.

One of the variables that can be controlled to reduce the risk of sheet breakage at the size press is to employ a sheet having good dry-strength. Whenever a synthetic fiber is added to cellulose fibers, the dry strength, or tensile strength of the dry sheet, will deteriorate. However, sheets containing or made with the co-refined Compositions have improved dry tensile strength over corresponding sheets made with same CE staple fibers added after refining the cellulose fibers and have improved dry strength over sheets made with many of other types of synthetic fibers without binders added to the cellulose fibers after refining the cellulose fibers. Such synthetic fibers include PET, polypropylene, and acrylics.

The additives added to the Composition in the Second Blending Zone 740 can also be applied as external sizing agents. These include brightening agents, dyes, pigments, antimicrobial agents, starches, and adhesives mentioned above as additives in the Second Blending Zone 740. Examples of different types of sheet products using particular sizing agents include starch applied to linerboards to improve the stiffness and strength of boxes; pigments and binders applied to sheet for magazines and newsprint and printer paper to enhance printability; and a variety of coatings and polymers applied to sheet used for packaging and containers to alter their water resistance and strength.

Examples of pigments include the inorganic and organic pigments described above that can be added to the Second Blending Zone 740.

Starch is a common external sizing agent and has many uses in papermaking. For example, it functions as a retention agent, dry-strength agent and surface sizing agent. Starches can be virgin or modified. Virgin starches include but are not limited to amylose, amylopectin, and mixtures thereof such as 25% amylose and 75% amylopectin (corn starch) and 20% amylose and 80% amylopectin (potato starch). The virgin starches can be obtained from potatoes, wheat, corn, rice, or tapioca. Modified starches include oxidized starch; starch esters; starch ethers; enzymatically treated starches; hydrolyzed starches; heated starches, also known in the art as "pasted starches"; cationic starches, such as those resulting from the reaction of a starch with a tertiary amine to form a quaternary ammonium salt; anionic starches such as the phosphate starches; ampholytic starches (containing both cationic and anionic functionalities); cellulose and cellulose derived compounds; and combinations of these compounds Sizing agents which improve the sheet strength include natural polymers or semi-synthetic polymers such as starch, either in its native or chemically modified form, and synthetic polymers such as copolymers of acrylamide. Examples of suitable sizing agents include starches (oxidized, mill modified) including the cationic and amphoteric starches; poly vinyl alcohol (PVA); polyacrylamide (PAM); polyamido polyamine polymers, further reacted with epichlorohydrin; cationic starches or amphoteric starches; anionic polymers such as a polyacrylic acid, copolymers of acrylamide and acrylic acid, and carboxymethyl cellulose; cationic polymers, such as a cross-linked polyamidoamines, polydiallyldimethylammonium chlorides, linear or branched polyamines, polyethyleneimines, fully or partially hydrolyzed polyvinylamines, copolymers of diallyldimethylammonium chloride and acrylamide, copolymers of 2-acryloylethyltrimethyl-ammonium chloride and acrylamide, cationic guar and other natural gum; polymeric aldehyde-functional compounds, such as glyoxalated polyacrylamides, aldehyde celluloses and aldehyde functional polysaccharides; amphoteric polymers such as terpolymers of acrylamide, acrylic acid, and diallyldimethylammonium chloride, or acrylamide, acrylic acid, and 2-acryloylethyltrimethylammonium chloride; substantially nonionic water-soluble polymers such as nonionic polyethyleneoxide or polyacrylamide; and water-insoluble latexes such as polyvinylacetate or styrene-butadiene copolymers.

Other sizing agents to control the penetration of ink or moisture into the paper product, or its hydrophobicity, include rosin; rosin precipitated with alumina; maleic anhydride; abietic acid and abietic acid homologues such as neoabietic acid and levopimaric acid; stearic acid and stearic acid derivatives; ammonium zirconium carbonate; silicone and silicone-containing compounds, such as RE-29 available from GE-OS1 and SM-8715, available from Dow Corning Corporation (Midland, Mich.); fluorochemicals of the general structure $CF_3(CF_2)nR$, wherein R is anionic, cationic or another functional group, such as Gortex; alkylketene dimer (AKD), such as Aquapel 364, Aquapel (I 752, Heron) 70, Hercon 79, Precise 787, Precise 2000, and Precise 3000, all of which are commercially available from Hercules, Incorporated (Willmington, Del.); and alkyl succinic anhydride (ASA); emulsions of ASA or AKD with cationic starch; ASA incorporating alum; starch; hydroxymethyl starch; carboxymethylcellulose (CMC); polyvinyl alcohol; methyl cellulose; alginates; waxes; wax emulsions; and combinations of such sizing agents.

The sizing agent may be added to the sheet in the form of a dispersion, an emulsion or a suspension, desirably oil-free.

Dry End of Machine Zone: Second Drying Zone

The process desirably includes a Second Drying Zone 960, particularly when a Sizing Press Zone 850 is employed because the sizing press applies moisture to the sheet in an amount sufficient to increase the moisture substantially. The Second Drying Zone 860 can incorporate one or more or all of the features of the First Drying Zone 840. The moisture of the web in and exiting the Second Drying Zone is from 2% to 10%, desirably from 5 wt. % to 8 wt. %.

Dry End of Machine Zone: Finishing Zone

Once the sheet leaves the Second Drying Zone, or the First Drying Zone if no Sizing Press is provided, the sheet can optionally be further processed in a Finishing Zone 870. Typical sheet moisture entering the Finishing Zone 870 ranges from 2% to 10%, or 5% to 8%. The Finishing Zone can include one or more of a calendering zone, reel zone, rewinding zone, and coating zone.

In a calendering zone, the web can be passed through machine calender stack. This stack, optionally a vertical stack, of steel on steel or steel on polymer rolls impart successively higher compression cycles to the paper as the paper passes through the rolls. Normally a dry paper sheet is calendered. The function of the calender stack is to reduce the thickness and to impart a smooth surface to the paper web for good printability. This deformation can be enhanced using heat and moisture. Some sheet compaction always occurs during calendering although in some cases (packaging, board and cardboard) this compaction is not desirable.

After the calender stack, the paper web is wound into a large roll at the end of the paper machine, called a jumbo roll. The calendering and reeling operations are the last part of the continuous paper machine. When the jumbo roll reaches its target weight, the paper is transferred onto a new spool in a continuous mode without machine shut down.

In a rewinding zone, the jumbo roll is transferred to a winder where it is unwound and slit into smaller rolls (Master Rolls) based on customer specifications. In most mills, the rolls then go to a wrapping station, and then into storage.

For even smoother paper surface, an off-machine super-calender can be employed. This is done primarily for magazines and coated papers. The paper passes through rollers, which are alternately hard and soft. Through a combination of heat, pressure and friction, the paper acquires a high luster surface. The paper becomes somewhat compressed during the process and is therefore thinner than its matte finished equivalent.

The following Table 6 describes the different kinds of finishing operations that can be applied to a web depending on its ultimate end use.

TABLE 6

| Type | Description | End Use |
| --- | --- | --- |
| Cast coated paper | Provides the highest gloss surface of all coated papers and boards | Labels, covers, cartons and cards |
| Calendered or glossy paper | Paper that has gone through a glazing process - can be both coated and uncoated | Color printing |
| Machine finished paper | Paper which has been finished on the papermaking machine and is smooth on both sides | Booklets and brochures |
| Lightweight coated | A thin, coated paper, which can be as light as 40 g/m2. | Magazines, brochures and catalogues |
| Matt finished paper | The relative roughness of the paper surface prevents light from being reflected. Can be both coated and uncoated | It is used in all kinds of high-quality print work and is suitable for color printing |
| Machine coated | Paper that has the coating applied whilst it is still on the paper machine | All types of colored print |
| Silk or silk matt finished papers | Like matt finished coated paper the surface is smooth but without reflections, which means that it combines high readability with high image quality | Product Booklets and Brochures |

Properties of the Composition and Wet Laid Products Containing or Obtained by the Composition One or more enhancements are provided by the manufacture of wet laid webs containing the co-refined Compositions. These are described in further detail. The measurement of any reference to a property of the Composition or wet laid products containing or obtained by the Composition throughout this description is determined by the relevant test method referenced in Tables 8 & 9. To obtain a value for a test method of interest, an average of 5 wet laid sheets (not 5 samples from one product) are tested by the relevant test method, except that when a Cobb size or Mean Flow Pore Size method is employed, only 2 wet laid sheets are tested.

Many paper and board grades are sold not by weight but by area. If a producer can make a sheet of paper at a lower density (i.e. at higher bulk) while maintaining stiffness, there is a significant profit incentive to do so. The co-refined Composition adds bulk to a web at the same basis weight of a 100% Cellulose Comparative composition. To take advantage of the benefit of lower density, the basis weight can be decreased while substantially maintaining or improving stiffness. The basis weight is the weight, in pounds, of 500 hundred sheets of paper at its basic size even if trimmed to a smaller size. The basis size of paper for different applications is established, and a few examples are as follows:

Bond, copy paper, ledger paper and rag paper have a basic sheet size of 17×22 inches.

Offset, book, text and coated papers have a basic sheet size of 25×38 inches.

Cover stock has a basic sheet size of 20×26 inches.

Tag stock has a basic sheet size of 24×36 inches.

Index stock has a basic sheet size of 25.5×30.5 inches.

Bristol stock has a basic sheet size of 22.5×28.5 inches.

The basis weight of the wet laid products containing or obtained by the Composition is not limited. Examples include a basis weight of at least 10, or at least 15, or at least 20, or at least 30, or at least 40, or at least 50, or more than 60, or at least 65, or at least 70, or at least 75, or at least 80, or at least 85, or at least 90, or at least 100, or at least 110, in each case g/m$^2$, and/or not more than 750, or not more than 600, or not more than 500, or not more than 400, or not more than 250, or not more than 200, or not more than 100, or not more than 80, or not more than 60, or not more than 40, or not more than 35, or not more than 32, or not more than 30, or not more than 28, or not more than 25, or not more than 23, or not more than 20, or not more than 18, or not more than 15, in each case as g/m2.

In one or any of the embodiments mentioned, there is provided a wet laid web having a density decrease, relative to a wet laid web made with a 100% Cellulose Comparative composition at the same basis weight. The density decrease can be at least 2%, or at least 3%, or at least 4%, or at least 8%, or at least 9%, or at least 10%, or at least 13%, or at least 15%, or at least 20%, or at least 25%, and can be quite high. The density decrease can be higher than 60%, and even higher than 80% depending on how much CE staple fiber is co-refined. For many applications, the density decrease is suitably up to 50% or up to 40%.

In one or any of the embodiments mentioned, there is provided a wet laid web having a density decrease while maintaining or improving Gurley Stiffness, relative to a wet laid web made with a 100% Cellulose Comparative composition at the same basis weight. This embodiment is attractive for paperboard applications where maintaining stiffness is an important consideration. The density decrease can be as mentioned above.

With the ability to decrease density, the wet laid product can be light-weighted by decreasing the basis weight at the same thickness. In one or any of the embodiments mentioned, there is provided a wet laid web having a basis weight decrease while maintaining thickness, relative to a wet laid web made with a 100% Cellulose Comparative composition having a basis weight necessary to obtain the same thickness, or in other words, the thickness of the wet laid product is within +/−5% the thickness of the wet laid web made with the comparative composition for comparison purposes. The basis weight decrease can be at least 0.5%, or at least 1%, or at least 2%, or at least 3%, or at least 4%, or at least 5%, or at least 6%. The basis weight decrease can be as high as 20%. In general, the basis weight decrease can be up to 20%, or up to 15%, or up to 12%, or up to 10%, or up to 8%, or up to 6%.

In one or any of the embodiments mentioned, there is provided a wet laid web having a basis weight decrease while maintaining thickness and maintaining or improving Gurley Stiffness, relative to a wet laid web made with a 100% Cellulose Comparative composition having a basis weight necessary to obtain the same Gurley Stiffness and thickness. There is also provided a wet laid process in which a wet laid web, having a given basis weight, is made that has a target Gurley stiffness and thickness, and modifying the process to reduce the basis weight of the wet laid product to have the same, better, or no more than a 5% reduction in the same target Gurley stiffness and be within +/−5% of the same target thickness.

In any one of the above embodiments relating to density or basis weight, one or more additional properties can be maintained or improved, including opacity as measured by TAPPI T-425, tear strength, and/or air and/or liquid permeability.

The wet laid products containing or obtained from the co-refined Compositions result in products having increased thickness at the same basis weight, and with increased thickness, the product will have an improved R-value of insulation, reduced heat transfer applications, reduced sound transfer, its compressibility, and/or embossing performance. In one or any of the embodiments mentioned, a wet laid product made with the co-refined Composition have a higher insulation R-value than a wet laid product made with a 100% Cellulose Comparative composition at the same basis weight. The insulation value increase can be at least 2% higher, or at least 5% higher, or at least 8% higher, or at least 10% higher. Examples of wet laid products for which higher insulation values are desirable include food packaging boxes such as hot meal delivery boxes, e.g. pizza boxes, and other hot and cold food boxes, and medical packaging to maintain cool temperatures. Such boxes can optionally be lined with insulating material or additional corrugated paperboard as a liner.

The wet laid products containing or obtained by the Composition have improved air permeability. Increased air permeability can have a number of advantages, including improved water drainage, improved evaporation rate from the interior of the web, reduced pressure drop across filter media, faster web machine line speeds, lower residence time of contaminants contacting the fibers such as in an de-inking cell, food packaging requiring good breathability and air permeability, and increased moisture absorption. Air permeability is measured by TAPPI 251 in units of l/min/cm2/bar and ft3/ft2/min.

In one embodiment or in any of the embodiments described throughout, the air permeability of the wet laid products containing or obtained by the Composition is at least 1.2, or at least 1.3, or at least 1.4, or at least 1.5, or at least 1.7, or at least 2.0, or at least 3, or at least 4, or at least 5 ft3/ft2/minute by the TexTest.

In one embodiment or in any of the embodiments described throughout, the Gurley Permeability of the wet laid products containing or obtained by the Composition can be at least 100, or at least 200, or at least 300, or at least 400, or at least 500, or at least 600, or at least 700, or at least 1000, or at least 2000, or at least 3000 l/min/cm2/bar and at basis weights of at least 30 g/m2, or even at basis weights of at least 40 g/m2, or even at basis weights of at least 50 g/m2, or even at basis weights of at least 60 g/m2, or even at basis weights of at least 70 g/m2, or even at basis weights of at least 80 g/m2, or even at basis weights of at least 90 g/m2, or even at basis weights of at least 100 g/m2, or even at basis weights of at least 110 g/m2, or even at basis weights of at least 120 g/m2, or even at basis weights of at least 150 g/m2, or even at basis weights of at least 180 g/m2, or even at basis weights of at least 200 g/m2, or even at basis weights of at least 250 g/m2, or even at basis weights of at least 300 g/m2, or even at basis weights of at least 350 g/m2, or even at basis weights of at least 400 g/m2, or even at basis weights of at least 450 g/m2, or even at basis weights of at least 500 g/m2.

In one or any of the embodiments mentioned, the air permeability of the wet laid products containing or obtained from the co-refined Composition is increased by at least 5%, or at least 7%, or at least 9% or at least 10%, or at least 13%, or at least 15%, or at least 20%, or at least 25%, or at least 50%, or at least 75%, or at least 100%, or at least 150%, or at least 200%, relative to a 100% Cellulose Comparative composition.

In one or any of the embodiments mentioned, the wet laid products containing or obtained by the Composition can be made with a low mean flow pore size. The wet laid products can have a mean flow pore size of 20 or less, or 15 or less, or 12 or less, or 10 microns or less, or 8 microns or less, or 6 microns or less or 4 or less, or 2 microns or less, or 1.5 microns or less, or 1.4 microns or less, or 1.3 microns or less, or 1.25 microns or less, or 1.20 microns or less, or 1.1 microns or less, or 1 micron or less, or 0.8 microns or less. The porosity is measured on a Porometer by the ASTM F-316 test method. Useful products with low pore size include filtrations applications for gas and liquid, such as surgical face masks, air filters, air depth filtration, disposable clothing for excluding biological agents, liquid filtration for size exclusion, filter presses, high pressure liquid depth filtration, coffee filters, each used in the home consumer and industrial markets.

In one or any of the embodiments mentioned, the wet laid products containing or obtained by the Composition can have low mean flow pore size with increased air permeability. A smaller pore size can be achieved by calendering, wet pressing, breaker stack, or any other suitable press method, or with the use of binders, or both. While one would expect lower air permeability with reduced mean flow pore size, the wet laid products, including paper products, containing or obtained by the Composition can have increased permeability (either air and/or liquid) with the same or lower pore size, or at a given pore size, relative to a 100% Cellulose Comparative composition. This feature provides one with the ability to improve on a large variety of end use applications where vapor and/or air permeability combined with size exclusion is desired. Such applications include, for example, surgical or dust masks to both minimize fogging and enhance breathability while excluding many harmful bacteria with the small pore size; high air permeable gas filters; high air permeable wet laid products and especially wet laid non-woven products such as clothing (e.g. jump suits, shirts, and pants) to reduce heat build-up by the wearer while also excluding entry of harmful particles; and food packaging which requires good air permeability while excluding many bacteria. The ratio of mean flow pore size to air permeability can be at less than 1.20, or no more than 1.15, or no more than 1.10, or no more than 1.05, or no more than 1.00, or no more than 0.95, or no more than 0.90, or no more than 0.85, or no more than 0.80, or no more than 0.75, or no more than 0.70, or no more than 0.65, or no more than 0.60, or no more than 0.55, or less than 0.4, or not more than 0.35, or not more than 0.3, where the units of air permeability are (l/min/cm2/bar) and for mean flow pore size are microns.

In one embodiment or in any of the mentioned embodiments, wet laid products having a mean flow pore size of less than 2 microns, or not more than 1.7 microns, or not more than 1.5 microns, or not more 1.3 microns, can have a ratio of mean flow pore size to air permeability of less than 1.20, or no more than 1.15, or no more than 1.10, or no more than 1.05, or no more than 1.00, or no more than 0.95, or no more than 0.90, or no more than 0.85, or no more than 0.80, or no more than 0.75, or no more than 0.70, or no more than 0.65, or no more than 0.60, or no more than 0.55, where the units of air permeability are (l/min/cm2/bar) and the units of mean flow pore size are microns.

In one embodiment or in any of the mentioned embodiments, wet laid products having a mean flow pore size of 2 microns or more, or 2.5 microns or more, or 3 microns or more, can have a ratio of mean flow pore size to air permeability of less than 0.4, or no more than 0.38, or no more than 0.35, or no more than 0.3, or no more than 0.25, or no more than 0.20, or no more than 0.15, or no more than 0.125, or no more than 0.10, where the units of air permeability are (l/min/cm2/bar) and the units of mean flow pore size are microns.

In one or any of the embodiments mentioned, the wet laid web product has an air permeability of at least 200 l/min/cm2/bar and a mean flow pore size of less than 20 microns, or less than 10 microns on a wet laid product having a density within a range of 0.342 to 0.602 g/cm3.

There is also provided an air filter having an increased air flow at a constant pressure drop relative to a 100% Cellulose Comparative composition at the same basis weight. The air filter can have an increase air flow of at least 25%, or at least 50%, or at least 75%, or at least 100%, or at least 150%, or at least 200%, or at least 300%, or at least 500%, or at least 750%, relative to a 100% Cellulose Comparative composition.

A Williams Slowness test is a measure providing one with an indication of the drainage rate of a aqueous composition. Lower numbers mean a faster draining composition. In one or in any of the mentioned embodiments, the Composition and Compositions used to make wet laid products, including the co-refined Composition, can have a Williams Slowness of less than 200, or less than 190, or less than 180, or less than 170, or less than 160, or less than 150, or less than 140, or less than 130 seconds, or less than 100 seconds, or less than 80 seconds, or not more than 70 seconds, or not more than 65 seconds, or not more than 60 seconds, or not more than 50 seconds, or nor more than 40 seconds, or not more than 30 seconds, or not more than 25 seconds, or not more than 20 seconds, or not more than 15 seconds. Desirably, the Composition is refined sufficiently to provide a Composition having a Williams Slowness of at least 5 seconds, or at least 8 seconds, or at least 10 seconds, or at least 15 seconds, or at least 20 seconds, or at least 25 seconds, or at least 40 seconds, or at least 60 seconds, or at least 70 seconds, or at least 80 seconds, or at least 100 seconds, or at least 120 seconds, or at least 140 seconds.

A Canadian Standard Freeness test is also a measure providing one with an indication of the drainage rate of a composition. Higher numbers mean a faster draining composition. In an embodiment or in any of the mentioned embodiments, the Composition and compositions used to make wet laid products, including co-refined Compositions, can have a Canadian Standard Freeness of at least 200, or at least 250, or at least 260, or at least 270, or at least 280, or at least 290, or at least 300, or at least 310, or at least 320, or at least 330, or at least 340, or at least 350, or at least 360 ml. Before refining, the Composition can have a CSF of more than 700, or at least 750, or at least 800. As noted above, after refining, the CSF of the Composition is desirably at most 700, or at most 600, or at most 550, or at most 500, or at most 475, or at most 450, or at most 425, or at most 400, or at most 375, or at most 350, or at most 325, or at most 300, or at most 280.

Gurley Porosity is a measure of the wet laid product's permeability to air and refers to the time (in seconds) required for a given volume of air (100 cc) to pass through a unit area (1 in.2=6.4 cm.2) under standard pressure conditions. The higher the number, the lower the porosity. The Compositions and the products containing or obtained with the Compositions have a lower Gurley Porosity than the 100% Cellulose Comparative composition. Examples of Gurley Porosities obtainable with the Composition are less than 75, or less than 70, or less than 65, or less than 60, or less than 55, or less than 50, or less than 45, or less than 40, or less than 35 seconds.

The wet laid products containing or obtained by the Composition have improved water permeability. Increased water permeability can have a number of advantages, including improved water drainage, improved evaporation rate from the interior of the web, reduced pressure drop across filter media, faster drying time, faster web machine line speeds, lower residence time of contaminants contacting the fibers which is useful in a de-inking cell, and increased amount and rate of liquid and moisture absorption which is useful in a variety of applications such as tea bags and single serve beverage pods/containers. Water permeability is measured by the Water Permeability Method described in Table 8 and measured in units of ml/min/cm2/bar.

In one or any of the embodiments mentioned, the water permeability of the wet laid products containing or obtained by the Composition is at least 1.7, or at least 1.8, or at least 1.9, or at least 2.0 or at least 2.3 or at least 2.5, or at least 3.0 or at least 5 ml/min/cm2/bar and at basis weights of at least 20 g/m2, or at least 25 g/m2, or at least 30 g/m2, or at least 35 g/m2, or at least 40 g/m2, or at least 45 g/m2, or at least 50 g/m2, or even at basis weights of at least 60 g/m2, or even at basis weights of at least 70 g/m2, or at least 75 g/m2, or at least 80 g/m2, or at least 85 g/m2, or at least 90 g/m2, or at least 95 g/m2.

In one or any of the embodiments mentioned, the water permeability of the wet laid products containing or obtained by the Composition, including co-refined Compositions is increased by at least 5%, or at least 8%, or at least 10%, or at least 12%, or at least 15%, or at least 20%, or at least 25%, or at least 50%, or at least 75%, or at least 100%, or at least 150%, or at least 200%, or at least 300%, or at least 400%, relative to a 100% Cellulose Comparative composition.

In one or any of the embodiments mentioned, the wet laid products containing or obtained by the Composition can have smaller mean flow pore size with increased water permeability. A smaller pore size can be achieved by the same methods mentioned above. This feature provides one with the ability to improve on a large variety of end use applications where water permeability combined with size exclusion is desired. Such applications include, for example, liquid filtration such as beer, juices, wine and milk filters to obtain the benefit of maintaining over a longer life span or reducing applied pressure at acceptable flow rates while continuing or improving exclusion of small particles, and desalination pre-filtration.

In one or any of the embodiments mentioned, the wet laid web product has a water permeability of at least 1.7, or at least 1.8, or at least 1.9, or at least 2.0 or at least 2.3 or at least 2.5, or at least 3.0 or at least 5 ml/min/cm2 and a mean flow pore size of less than 20 microns, or less than 15 microns, or less than 10 microns on a web having a density within a range of 0.342 to 0.602 g/cm3.

There is also provided a water filter having an increased water flow at a constant pressure drop relative to a 100% Cellulose Comparative composition at the same basis weight. The water filter can have an increase water flow of at least 25%, or at least 50%, or at least 75%, or at least 100%, or at least 150%, or at least 200%, or at least 300%, or at least 500%, or at least 750%. Optionally, the increased water flow can occur on water filters having a mean flow pore size of less than the 100% Cellulose Comparative composition.

In any one of the embodiments described herein the web (which is any wet laid product or sheet) can have a dry tensile strength of at least 100, or at least 500, or at least 1000, or at least 2000, or at least 2500, or at least 2750, or at least 3000, or at least 4000, or more than 4900, or at least 5000, or at least 6000, or at least 7000, or at least 8000 gram force as measured on a 15 mm wide strip measured according to TAPPI T 494 from handsheets made by either method described below. Unless stated otherwise, any reference to dry tensile strength throughout this description is measured by this method. In addition, or in the alternative, the web can have a dry tensile strength of up to 15,000, or up to 13,000, or up to 12,000, or up to 11,000, or up to 10,000, or up to 9,000-gram force measured as noted above. In one embodiment or in any of the mentioned embodiments, the webs (e.g. wet laid products including sheets) can have a dry tensile strength of at least 163 gram force/mm, or at least 6.6 gram force/mm, or at least 33.3 gram force/mm, or at least 66.6 gram force/mm, or at least 133.3 gram force/mm, or at least 166.6 gram force/mm, or at least 183.3 gram force/mm, or at least 200 gram force/mm, or at least 266.6 gram force/mm, or at least 326.6 gram force/mm, or at least 333.3 gram force/mm, or at least 400 gram force/mm, or at least 466.6 gram force/mm, or at least 533.3 gram force/mm, in each case as measured in the machine (flow) direction or in any direction on a handsheet.

In one embodiment or in any of the mentioned embodiments, the wet laid products are level along the machine and cross direction of the paper. In one embodiment or in any of the mentioned embodiments, the wet laid products are not creped (non-creped). In addition, it is possible to obtain a wet laid product having good tensile strength or any of the other properties described on wet laid products that are non-creped or not creped.

The dry tensile strength of the webs made with the co-refined Composition can be improved relative to the same webs containing or obtained by a Post-Addition Composition. The improvement can be at least 5%, or at least 10%, or at least 13%, or at least 15%, or at least 20% or at least 25%, or at least 30%.

In one embodiment, or in any of the mentioned embodiments, at higher refining energies, the loss in dry tensile strength using co-refined Compositions containing short fiber lengths, i.e. less than 6 mm, is less than that observed with longer fiber lengths, e.g. 6 mm.

In another embodiment or in any of the mentioned embodiments, wet laid products containing or obtained by Compositions having low amounts of CE staple fibers and which are highly refined can not only maintain the same dry tensile strength of a 100% Cellulose Comparative composition, but can also exceed its strength. Conventional experience is that, in general, the dry tensile strength of a wet laid product will decrease with the addition of synthetic fibers, and the loss of tensile strength is greater or less depending on the type of fiber added. However, it is now possible to maintain and actually increase the dry tensile strength of a wet laid product, as determined on a handsheet, with the use of the CE staple fibers at higher refining energies and low levels of CE staple fiber. There is now provided a wet laid product containing cellulose and a CE staple fiber or made thereby, having a dry tensile strength that is the same as or greater than a 100% Cellulose Comparative composition. The increase can be at least 2%, or at least 4%, or at least 5%, or at least 7%.

In an embodiment, there is also provided a wet laid product containing cellulose and a CE staple fiber or made thereby, having a dry tensile strength that is greater than a 100% Cellulose Comparative composition. This is also possible without the use of only moderate refining energies and also with the use of moderate or higher loadings of the CE staple fibers. There is also provided a wet laid product containing cellulose and a CE staple fiber or made thereby, having a dry tensile strength that is greater than a 100% Cellulose Comparative composition by at least 2%, or at least 4%, or at least 5%, or at least 7%, or at least 10%, or at least 12%, or at least 15%, or at least 18%, or at least 20%, or at least 23%, or at least 25%, or at least 28%, or at least 30%, or at least 32%, or at least 35%.

In an embodiment, there is also provided a wet laid product containing cellulose and a CE staple fiber or made thereby, having a dry tensile strength that is improved over a 100% Cellulose composition by at least 250 gF, or at least 500 gF, or at least 750 gF, or at least 1000 gF, or at least 1500 gF, or at least 2000 gF, or at least 2250 gF, or at least 2500 gF, or at least 2750 gF, or at least 3000 gF.

There is also provided a wet laid product containing cellulose and a CE staple fiber or made thereby, having a dry tensile strength that is greater than a 100% Cellulose Comparative composition by at least 2%, or at least 4%, or at least 5%, or at least 7%, or at least 10%, or at least 12%, or at least 15%, or at least 18%, or at least 20%, or at least 23%, or at least 25%, or at least 28%, or at least 30%, or at least 32%, or at least 35%, in which the wet laid product contains at least 5 wt. %, or at least 8 wt. %, or at least 10 wt. %, or at least 12 wt. %, or at least 15 wt. % CE staple fiber.

There is also provided a wet laid product containing cellulose and a CE staple fiber or made thereby, having a dry tensile strength that is greater than a 100% Cellulose Comparative composition by at least 2%, or at least 4%, or at least 5%, or at least 7%, or at least 10%, or at least 12%, or at least 15%, or at least 18%, or at least 20%, or at least 23%, or at least 25%, or at least 28%, or at least 30%, or at least 32%, or at least 35%, in which the wet laid product contains at least 5 wt. %, or at least 8 wt. %, or at least 10 wt. %, or at least 12 wt. %, or at least 15 wt. % CE staple fiber, and which was refined to a Canadian Standard Freeness not below 300, or not below 325, or not below 350, or not below 375, or not below 400.

The stiffness of the wet laid products containing or obtained with crimped CE staple fibers can be improved relative to a 100% Cellulose Comparative composition. The improvement in Gurley stiffness can be at least 5%, or at least 10%, or at least 15%, or at least 20%, or at least 30%, or at least 35%, or at least 50%, or at least 60%, or at least 70%, relative to a 100% Cellulose Comparative composition.

The Gurley stiffness of a wet laid product can be determined by using a Gurley Stiffness tester with either of the following methods:
a) Method 1: sample from the sheet is 2"×2.5", and weight is 5 grams at the 4-inch setting; or
b) Method 2: sample is 1"×1", and weight is 50 gram at 2 inch setting.

When a handsheet is tested, there is no machine or cross direction, therefore only one sample per sheet needs to be tested, run one time forward and one time backward. When a wet laid product produced from a continuous line has MD or CD values which vary from each other, the values for each property described herein apply to any of the MD or CD properties.

In any of the embodiments described above, the web can have a Gurley stiffness, in mg force, of at least 150 mg, or at least 160 mg, or at least 170 mg, or at least 180 mg, or at least 190 mg, or at least 200 mg, or at least 210 mg, or at least 220 mg, or at least 230 mg, or at least 190 mg, or at least 190 mg, in each case at a thickness of at least 100 microns, or at least 150 microns.

In any of the embodiments described above, the web can have a Gurley stiffness, in mg force per microns thickness, of at least 1.0, or at least 1.05, or at least 1.08, or at least 1.1 or at least 1.13, or at least 1.15, or at least 1.18, or at least 1.2, or at least 1.23, or at least 1.25, or at least 1.27, or at least 1.3, or at least 1.32, or at least 1.35, or at least 1.37, or at least 1.4 mg force/microns thickness.

In an embodiment or in any of the mentioned embodiments, the wet laid products can have thicknesses suitable for their intended application. The wet laid products can have a thickness of at least 0.04 mm, or at least 0.05 mm, or at least 0.06 mm, or at least 0.07 mm, or at least 0.08 mm, or at least 0.09 mm, or at least 0.1 mm, or at least 0.12 mm, or at least 0.14 mm, or at least 0.20 mm, or at least 0.25 mm, or at least 0.3 mm, or at least 0.5 mm, or at least 0.65, or at least 0.70 mm, or at least 0.8 mm.

In one embodiment or any of the embodiments mentioned, the wet laid products exhibit a combination of increased dry tensile strength and either:
a. Increased stiffness, or
b. Increased burst strength, or
c. increased bulk, or
d. a combination of any one of a.-c
in each case relative to a 100% Cellulose composition.

In one embodiment or any of the embodiments mentioned, the wet laid products exhibit a combination of increased dry tensile strength and increased Gurley stiffness, relative to a 100% Cellulose composition. The stiffness can improve by at least 100, or at least 200, or at least 300 mg force, or at least 15%, or at least 20%, or at least 25%, or at least 30%, or at least 35%. The dry tensile strength can improve by at least 1500 gF, or at least 2000 gF, or at least 2250 gF, or at least 2500 gF, or at least 2750 gF, or at least 3000 gF, or at least 10%, or at least 12%, or at least 15%, or at least 18%, or at least 20%, or at least 23%, or at least 25%, or at least 28%, or at least 30%, or at least 32%, or at least 35%.

In one embodiment or any of the embodiments mentioned, the wet laid products exhibit a combination of increased dry tensile strength and increased Mullen burst strength, relative to a 100% Cellulose composition. The Mullen burst strength can improve by at least 5, or at least 8, or at least 10, or at least 12, or at least 15 psi, or at least 15%, or at least 20%, or at least 25%, or at least 30%, or at least 35%. The dry tensile strength can improve by at least 1500 gF, or at least 2000 gF, or at least 2250 gF, or at least 2500 gF, or at least 2750 gF, or at least 3000 gF, or at least 10%, or at least 12%, or at least 15%, or at least 18%, or at least 20%, or at least 23%, or at least 25%, or at least 28%, or at least 30%, or at least 32%, or at least 35%.

In one embodiment or any of the embodiments mentioned, the wet laid products exhibit a combination of increased dry tensile strength and increased bulk, or thickness, relative to a 100% Cellulose composition. The thickness can improve by at least 5, or at least 10, or at least 15, or at least 20, or at least 25 microns, or by at least 5%, or at least 10%. The dry tensile strength can improve by at least 1500 gF, or at least 2000 gF, or at least 2250 gF, or at least 2500 gF, or at least 2750 gF, or at least 3000 gF, or at least 10%, or at least 12%, or at least 15%, or at least 18%, or at least 20%, or at least 23%, or at least 25%, or at least 28%, or at least 30%, or at least 32%, or at least 35%.

In any of the embodiments mentioned, the dry tensile strength can be maintained or improvements relative to a 100% Cellulose composition can be at a basis weight of at least 35 gsm, or at least 40 gsm, or at least 50 gsm, or at least 75 gsm, or at least 80 gsm, or at least 100 gsm, or at least 120 gsm, or at least 150 gsm.

In any of the embodiments mentioned, the combination of dry tensile strength and any one or a combination of the bulk, Mullen burst, or Gurley stiffness can be maintained or improvements relative to a 100% Cellulose composition can be at a basis weight of at least 35 gsm, or at least 40 gsm, or at least 50 gsm, or at least 75 gsm, or at least 80 gsm, or at least 100 gsm, or at least 120 gsm, or at least 150 gsm.

In one or any of the embodiments mentioned, the co-refined Compositions made into wet laid Compositions and products may also exhibit improved water absorbance relative to a 100 cellulose Comparative composition. The water absorbance can be determined by the TAPPI T-558 Cobb size test method, modified as noted below Table 8. Since the wet laid products containing or obtained by the Composition are highly permeable to water and have excellent water drainage, the water would escape from the ring clamped to the bowl. The test method is, therefore, modified to cut the sample to the size of the circumference of the ring, which is 135 mm diameter. The improvement in water absorbance, relative to 100% Cellulose Comparative compositions, can be at least 3%, or at least 5%, or at least 7%, or at least 10%, or at least 12%, or at least 15%, or at least 18%, or at least 20%.

The absorbance of wet laid products containing or obtained by the Composition can be high, which has the advantage of good water uptake on a variety of products, including paper towels. The absorbance can be at least 120 g water/m2, or at least 125, or at least 130, or at least 135 g water/m2, according to the Cobb size TAPPi T-558 test method.

Even with good water absorbency, the wet laid products containing or obtained by the Composition can also have good water drainage characteristics, particularly with CE staple fibers having a DPF of less than 3.0. The wet laid products containing or obtained by the Composition can have a Cobb size of at least 120, or at least 125, or at least 130, each in g water/m2, and a Williams Slowness of less than 150 seconds, or less than 140 seconds, or less than 130 seconds, or less than 125 seconds. The wet laid products containing or obtained by the Composition can have a Cobb size of at least 120, or at least 125, or at least 130, each in g water/m2, and a Canadian Standard Freeness, of at least 275, or at least 300, or at least 315, each in ml.

The water absorbency of the wet laid products containing or obtained by the Composition is improved by at least 5%, or at least 10%, or at least 15%, or at least 20%, or at least 25%, or at least 40%, or at least 50%, or at least 75%, or at least 100%, relative to a 100 cellulose Comparative composition (e.g. by definition at about the same basis weight).

In one or any of the embodiments mentioned, the wet laid Compositions and products may also exhibit improved water absorbency after a first use (re-absorbency or rewet). The water re-uptake is an important consideration in the ability of a consumer to squeeze water from a saturated wet laid product, and re-use the same product to continue absorbing water after a first or multiple uses. The test method for determining the ability of a wet laid product to absorb water after a first use is described in Example 16. The water absorbency of the wet laid products containing or obtained by the Composition after a first use or rewet is improved by at least 1%, or at least 2%, or at least 5%, or at least 10%, relative to a 100 cellulose Comparative composition after its first use.

In an embodiment or in any of the mentioned embodiments, the wet laid products containing or obtained by the Composition can have a wet thickness response of a least 0.5%, or at least 1%, or at least 1.5%, or at least 2%, or at least 3%, or at least 5%, or at least 7%, or at least 10%, or at least 12%, relative to their dry thickness. The test method for measuring wet thickness retention is further described in Table 8 below and is summarized as measuring the thickness of the handsheet sample. Conduct Cobb Size and water permeability on the same sample in accordance with the procedures describe in and below Table 8, dry the sample (which has been saturated twice) and then measure sample thickness again. The original thickness is subtracted from the second (wetted sample) thickness and that result is divided by the original dry sample thickness. The result is expressed in %.

In an embodiment, or in any of the mentioned embodiments, the wet laid products containing or obtained by the Composition can have a wet thickness response where the thickness increased relative to a 100% Cellulose Comparative composition. The increase can be at least 0.75%, or at least 2%, or at least 5%, or at least 10%, or at least 15%, or at least 20%, or at least 40%, or at least 50%.

In any one of the embodiments, in spite of the use of a synthetic fiber, the burst strength of the wet laid products containing or obtained from the co-refined Compositions can be maintained relative to a 100% Cellulose Comparative composition, and are improved relative to Post-Addition Compositions. The burst strength can be determined by testing a handsheet using the Mullen Burst TAPPI T403 method reported in psig. For example, a drop in the Burst strength of the wet laid products can be no more than 20%, or no more than 15%, or no more than 10%, or no more than 5% below the Burst strength of the 100% Cellulose Comparative composition and can be the same as or more than the Burst strength of the 100% Cellulose Comparative composition. The Mullen Burst strength of the wet laid products containing or obtained from a co-refined Composition can be at least 10%, or at least 20%, or at least 30%, or at least 40%, or at least 50%, or at least 60% higher than the Post-Addition compositions.

The wet laid products can have a Mullen Burst strength of at least 70 psig, or at least 75, or at least 78, or at least 80 psig.

The co-refined Compositions can be made into wet laid products having good and/or improved softness. Softness can be measured as Gurley softness on a Gurley machine by measuring the air flow across the surface of a sheet using the APPITA/AS 1301-420 test method on a Gurley 4190 S-P-S machine with a soft plate, 4 outstanding raised rods, and a 0.34-pound weight reported in seconds/100 ml. The products made with the co-refined Compositions can have a lower density and higher thickness at a given basis weight with a rougher surface, relative to a 100% Cellulose Comparative Composition, contributing to improved softness.

The improvement in softness of the products made with the co-refined Composition, relative to 100% Cellulose Comparative compositions, can be at least 5%, or at least 8%, or at least 10%, or at least 12%, or at least 15%, or at least 20%, or at least 23%, or at least 25%.

In one or any of the embodiments mentioned, the wet laid products containing or obtained by the co-refined Composition can have both a better softness relative to 100% Cellulose Comparative compositions, while maintaining or having an improved dry tensile strength relative to a Post-Addition Composition.

In one embodiment or in any of the mentioned embodiments, the wet laid product containing or obtained by co-refining the Composition and further containing a plasticizer has an improved or better softness and maintains or improves its tensile strength, relative to a 100% Cellulose Comparative Composition and/or relative to a 100% Cellulose Comparative Composition containing the same type and amount of plasticizer. The amount of plasticizer added can be 1-10 wt. %, or 2-9, or 3-8, or 4-7, or 5-7, in each case wt. % based on the dry weight of the wet laid product. The plasticizer may be added at the size press or in the drying zone or prior to the paper reel. Suitable examples of plasticizers are those mentioned above.

In one or any of the embodiments mentioned, the wet laid products containing or obtained by the Composition can, in spite of using synthetic fibers, maintain and even improve its internal tear resistance relative to a 100% Cellulose Comparative composition, as measured by TAPPI T414, modified by either method to reduce variability:
  a) Method 1: 2 sections are cut out from each of 5 sheets to create a stack set 1 and 2, where each section is large enough to perform 3 tears on each section (e.g. 2×4 inches). Three tear tests are performed on set 1, and the value is divided by 5. Repeat for set 2 and average the values, or
  b) Method 2: 3 sections are cut out from one sheet to create a set 1 having a stack of 3 sections. One tear test is conducted on set 1. Repeat the procedure for the remaining 4 sheets, and average the values obtained.

In one embodiment or in any of the mentioned embodiments, the loss in internal tear resistance of these wet laid products containing or obtained by co-refined Compositions can be no more than 10%, or no more than 5%, and can be increased by at least 5% or at least 7%, or at least a 10% increase, relative to the 100% Cellulose Comparative composition; and in a web made with a Post-Addition Composition, can be at least 5%, or at least 10%, or at least 15% increase relative to 100% Cellulose Comparative composition. The improvement is more evident when the wet laid products containing or obtained with the Compositions have been lightly refined.

In one embodiment or in any of the mentioned embodiments, suitable tear resistance values obtainable with the wet laid products containing or obtained by the Composition can be at least 100, or at least 105, or at least 110-gram force.

In one or any of the embodiments mentioned, the wet laid products containing or obtained by the Composition have high Elrepho brightness, particularly when the cellulose fiber portion of the Composition is a waste/recycle cellulose fiber. The Compositions can have a better brightness than 100% cellulose and recycled deinked paper. The wet laid products containing or obtained with the co-refined Composition can have a brightness that is at least 1 point, or at least 2 points more than a 100% Cellulose Comparative composition, with the increase not attributable to optical brighteners.

In one embodiment or in any of the mentioned embodiments, the wet laid products containing or obtained by the Composition can have high brightness of at least 80, or at least 85, or at least 89, or at least 90, or at least 91, without optical brightners present, or at least 98, or at least 100 or at least 110 with optical brighteners present (e.g. $TiO_2$).

In one or any of the embodiments mentioned, the wet laid products containing or obtained by the Composition have high brightness, particularly when the cellulose fiber portion of the Composition is a waste/recycle cellulose fiber. The degree of brightness of a wet laid product composition is at least 1%, or at least 1.5%, or at least 2%, or at least 3%, or at least 5%, or at least 7% higher than the 100% Cellulose Comparative composition.

In one or any of the embodiments mentioned, the degree of brightness of a wet laid product composition containing or obtained by the Composition in which at least 20 wt. %, or at least 50 wt. %, or at least 75 wt. %, or 100 wt. % of the cellulose fibers in the Composition are waste/recycle cellulose fibers, is at least 2%, or at least 3%, or at least 5%, or at least 7%, or at least 10%, or at least 15%, or at least 20% higher than a 100% Cellulose Comparative composition made of the same amount and type of waste/recycle cellulose fibers.

In one or any of the embodiments mentioned, the wet laid products containing or obtained by the Composition have resistance to brightness reversion. Brightness reversion is the loss of brightness of a wet laid product as it yellows during storage over time, particularly in ultraviolet light. The brightness reverted with reference to the initial brightness can be less than 5%, or not more than 4%, or not more than 3%, or not more than 2.5%, or not more than 2.2%, or not more than 2%, or not more than 1.8%, or not more than 1.6%, or not more than 1.5%, or not more than 1.4%, or not more than 1.3%, or not more than 1.2% or not more than 1.1%, or not more than 1%, or not more than 0.9%, or not more than 0.8%, or not more than 0.7%, or not more than 0.6%, or not more than 0.5%, over any one of 3, 5, or 10 days.

Products

There are a wide variety of wet laid products that can be made from or contain the Composition.

In one embodiment or in any of the mentioned embodiments, the single layer of the wet laid products, or each layer of a multi-layered wet laid products, is obtained without deposition of an aqueous composition containing fibers onto a web. Desirably, all fibers that are used to form a web are deposited onto the wire with no additional deposition of fibers onto the web formed on the wire.

In an embodiment or in any of the mentioned embodiments, the fiber distribution of cellulose fibers and CE staple fibers relative to each other throughout a cross-section of any one layer of the wet laid product is substantially or completely homogeneous and/or random. Desirably, one cannot identify a high concentration of either CE staple fibers or cellulose fibers relative to each other throughout the thickness of the wet laid web or product.

The variety of products that can be made using the Composition in a wet laid process include paper products such as office paper, newsprint and magazine, printing and writing paper, sanitary, tissue/toweling, packaging/container board, specialty papers, apparel, bleached board, corrugated medium, wet laid molded products, unbleached Kraft, decorative laminates, security paper and currency, grand scale graphics, specialty products, and food and drink products.

Newsprint is mainly used for printing newspapers, flyers, and advertisements and is produced in large quantities. It is made largely from mechanical pulp and/or recovered paper, sometimes including a small amount of filler. The thickness of the paper can vary according to the usage: weights typically range from 40 to 52 $g/m^2$ but can be as much as 65 $g/m^2$. Newsprint is machine-finished or slightly calendered, white or slightly colored, and is used in reels for printing.

Magazine paper is coated or uncoated bleached Kraft paper, suitable for printing or other graphic purposes that can be high gloss bleached coated paper.

Printing and writing paper can be coated or uncoated, suitable for printing or other graphic purposes, optionally at least 90% of the fiber used comes from chemical pulp. Uncoated wood free paper can be made from a variety of different fiber blends, with variable levels of mineral filler and a range of finishing processes such as sizing, calendering, machine-glazing and watermarking. This grade includes as business forms, copier, computer, ink-jet paper, stationery and book papers, and greeting cards. Coated printing paper is also suitable for printing or other graphic purposes and coated on one or both sides with minerals such as clay or calcium carbonate. Coating may be done by a variety of methods, both on-machine and off-machine, and may be supplemented by super-calendering.

Tissue and toweling covers a wide range of tissue and toweling products for use in households or on commercial and industrial premises. Examples are toilet paper, facial tissues, kitchen towels, hand towels, sports wipes, and industrial wipes.

Examples of suitable sanitary wet laid products containing or obtained by the Composition include feminine hygiene, adult incontinence, sanitary cleaning wipes, and wound care. The parent stock is made from virgin pulp or waste/recycle fibers or mixtures of these.

Packaging wet laid material includes case materials, folding boxboard, paper bags, and wrappings. Case materials include paper board that can mainly be used in the manufacture of corrugated board. They are made from any combination of virgin and waste/recycle fiber and can be bleached, unbleached or mottled. Included are Kraftliner, testliner, semichemical fluting, and waste-based fluting.

Folding box board is often referred to as carton board, it may be single or multiple layers, coated or uncoated. It is made from virgin and/or recovered fiber and has good folding properties, stiffness and scoring ability.

Wrappings, up to 150 g/m2, is paper whose main use is wrapping or packaging made from any combination of virgin or recovered fiber and can be bleached or unbleached. They may be subject to various finishing and/or marking processes. Included are sack Kraft, other wrapping Krafts, sulphite and grease proof papers. Wrappings include wraps for straws, twisting applications such as for wrapping candy and chewing gum, gift wrap, and wrapping for mailed products.

Specialty papers is a category that includes other paper and board for industrial and special purposes, including cigarette wrapping papers (tipping, tobacco wrap, or plug wrap), air and liquid filters, as well as gypsum liners (or dry wall); special papers for waxing, insulating, roofing, asphalting; and other specific applications or treatments such as label products (for cans, jars, bottles, consumer printable labels, office labels), metallized paper, photographs, disposable bed sheeting and linens, acoustics, wallboard tape paper, playing cards, medical packaging paper, envelopes, blotter paper, sticky notes, medical tape, pipe jacket outside liner, tea bag envelope, gaskets, and sublimation papers for digital transfer printing onto such products such as shirts, textiles, promotional goods, skis and snowboards, curtains, bed linens, advertising banners, coffee filters, overlay papers as protective layers in flooring, kitchen countertops, and decorative wallcovering; battery separators; sausage wrapping paper; table cloths, disposable bed sheets and head rest sheets, vacuum cleaner bag paper, geotextiles, and covering for padding in pillows, upholstery, and mattresses.

The Compositions are also useful in a variety of other specialty paper applications. One such application is for use in greaseproof paper and glassine products. Greaseproof paper is subjected to high refining energy and/or intensity to cause the cellulose fibers to highly fibrillate, and the wet laid products made from these highly co-refined Compositions can then be calendered to increase their density and reduce pore size. Such wet laid products can be treated with sizing agents to make them fat or oil repellant. Such wet laid products are useful as wrappings for snacks, cookies, candy and other oily foods. The wet laid glassine products can be treated with sizing agents that also make them smooth and glossy. Such glassine products are good for use as liners for fast foods and baked goods. The Compositions can also be highly co-refined to make parchment paper utilizing acid treated cellulose pulp.

The Compositions are also useful in a variety of paperboard applications. For example, they wet laid products containing or obtained by the Compositions can be white board as inner liners to cardboard containers that can optionally be coated with wax or laminated with polyethylene; solid board particularly useful to make milk and juice containers as well as cups for fountain drinks; chipboard containing waste/recycle content as outer carton layers of containers such as for cereal boxes and tea cartons; and fiberboard having an outer Kraft layer and an inner white board layer to provide good impact and compression resistance, which when laminated with a polymer or metal, can provide good barrier properties to protect against moisture intrusion for such items and coffee and milk powders, and a variety of other bulk food and retail food products.

Bleached board products include gift wrap boxes, food packaging, electronics packaging.

Decorative laminate products include printed or embossed paper laminated to a rigid substrate, including as paper in saturated Kraft, or in the core sheet. Decorative laminates can be used as countertops, decorative wall coverings, and screens.

Security paper and currency products include checks, stock certificates, secure documents and printing paper, prescription pads, stamps, tamper evident seals, and currency.

Wide format graphics products include large poster boards, wall poster, wallcover bases, airport graphics, billboard graphics, signage, and vehicle graphics.

Disposable food and drink products include coated and uncoated paper products as lids, sealing paper, trays, cups, food casing papers (e.g. sausage casings), machine glaze base paper used in lidding or sealing, and any other food or drink containers and sealing/lidding. Optionally, these products are biodegradable and/or compostable.

Additional Disclosure

Figure 50:
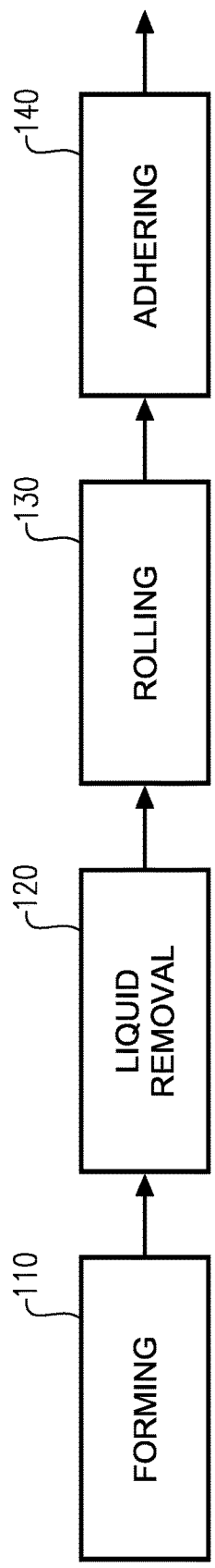
FIG. 50 is a block flow diagram of a process for forming a tubular member from a slurry.

Turning now to FIG. 50, the main steps of a process for forming an elongated tubular member from a wet-laid web are illustrated.

As shown in FIG. 50, the process includes forming a wet-laid fiber web from a slurry in a forming zone 110 and then removing at least a portion of the liquid from the wet-laid fiber web to form a fiber-containing sheet in the liquid removal zone 120. The fiber-containing sheet may then be rolled in a rolling zone 130 to form a tubular shape, and, while the fiber-containing sheet is in the tubular shape, the edges of the fiber-containing sheet can be adhered to one another to form a tubular member in the adhering zone 140.

Optionally, one or more treatment agents may be applied to the article during the process by, for example, introducing additives into the slurry and/or applying a treatment agent to at least one surface of the wet-laid web, fiber-containing sheet, or the tubular member, so that the tubular member may exhibit properties useful in one or more of a wide variety of end use applications. Examples of treatment agents can include, but are not limited to, water-proofing agents and plasticizers.

Referring again to FIG. 50, fibers may be combined with a liquid to form a slurry in forming zone 110. In some cases, the types and amounts of raw materials, the properties of the resulting slurry, and the processes used to form the slurry may be similar to those described previously with respect to the stock preparation zone 700 shown in FIG. 1. According to some embodiments, the slurry formed in forming zone 110 of FIG. 50 may include cellulose fibers, cellulose ester staple fibers, and at least one liquid.

The amount of cellulose ester staple fibers present in the slurry (and, in some cases, the tubular member) can be at least about 0.25, at least about 0.5, at least about 1, at least about 1.5, at least about 2, at least about 2.5, at least about 3, at least about 5, at least about 10, at least about 15, at least about 20, at least about 25, at least about 30, at least about 35, at least about 40, at least about 45, at least about 50, at least about 55, at least about 60, at least about 65, or at least about 75 weight percent, based on the total weight of the cellulose fibers and the cellulose ester staple fibers (or based on the total weight of the slurry).

Alternatively, or in addition, the slurry (or tubular member) can include not more than about 95, not more than about 90, not more than about 85, not more than about 80, not more than about 75, not more than about 70, not more than about 65, not more than about 60, not more than about 55, not more than about 50, not more than about 45, not more than about 40, not more than about 35, not more than about 30, not more than about 25, not more than about 20, not more than about 15, not more than about 10, not more than about 8, not more than about 5, not more than about 4, or not more than about 3 weigh percent of cellulose ester staple fibers based on the total weight of the cellulose fibers and the cellulose ester staple fibers (or based on the total weight of the slurry).

In some embodiments, the slurry (or tubular member) may include lesser amounts of cellulose ester staple fibers such as, for example, not more than about 10, not more than about 8, not more than about 5, not more than about 4, not more than about 3, or not more than about 2.5 weight percent. In such cases, the cellulose ester staple fiber may be present in an amount of at least about 0.25, at least about 0.5, or at least about 1 weight percent, based on the total weight of the cellulose fibers and the cellulose ester staple fibers (or based on the total weight of the slurry). In other cases, the maximum amount of cellulose ester staple fibers in the article or slurry may be not more than about 25, not more than about 20, or not more than about 15 weight percent, based on the total weight of the cellulose fibers and the cellulose ester staple fibers (or based on the total weight of the slurry). The cellulose ester staple fibers may be present in an amount of from about 0.25 to about 25 weight percent, about 0.5 to about 20 weight percent, about 0.5 to about 10 weight percent, or about 1 to about 5 weight percent, based on the total amount of said cellulose ester and said cellulose fibers.

In other embodiments, the slurry (or tubular member) may include greater amounts of cellulose ester staple fibers such as, for example, at least about 40, at least about 45, at least about 50, at least about 55, or at least about 60 weight percent and/or not more than about 95, not more than about 90, not more than about 85, not more than about 75, or not more than about 70. In some embodiments, the cellulose ester staple fibers may be present in the slurry (or tubular member) in an amount of from about 40 to about 85 percent, or about 55 to about 70 weight percent based on the total weight of said cellulose fibers and said cellulose ester staple fibers.

The cellulose ester staple fibers can be any of the staple fibers described herein previously. In some embodiments, the cellulose ester staple fibers can have a length of not more than about 6 mm and a denier per filament (DPF) of 3 or less, or 1.8 or less. In some embodiments, the cellulose ester staple fibers may be crimped and can have, for example, a crimp frequency of from 8 to 22 crimps per inch (CPI) or from 10 to 20 CPI and may also have a non-round cross-sectional shape. Additional details regarding suitable ranges for the length, DPF, and method of making the cellulose ester staple fibers are described in detail previously. Further, additional details about the crimp frequency and suitable cross-sectional shapes are also provided herein. The cellulose ester staple fibers suitable for use in embodiments of the present invention may also have one or more of the other properties discussed previously and may be formed and optionally coated with a spin finish as described previously.

Additionally, the cellulose ester staple fibers may be formed as dry fibers, may be solvent spun filaments, or both. Examples of suitable cellulose esters include, but are not limited to, cellulose acetate, cellulose diacetate, cellulose triacetate, cellulose propionate, cellulose butyrate, cellulose acetate formate, cellulose acetate propionate, cellulose acetate butyrate, cellulose propionate butyrate, and mixtures thereof. In some embodiments, the cellulose ester may have a degree of substitution of 2.5 or less, 2.45 or less, 2.4 or less, 2.35 or less, 2.3 or less, 2.25 or less, or 2.2 or less.

In addition to the cellulose ester staple fibers, the slurry can include cellulose fibers. Any suitable cellulose fiber may be used including one or more of those described herein in detail previously. In some embodiments, the amount of cellulose fibers in the slurry (or tubular member) can be at least about 5, at least about 10, at least about 15, at least about 20, at least about 25, at least about 30, at least about 35, at least about 40, at least about 45, at least about 50, at least about 55, at least about 60, at least about 65, at least about 70, at least about 75, at least about 85, at least about 90, at least about 92, at least about 95, at least about 96, or at least about 97 weight percent, based on the total weight of the cellulose fibers and the cellulose ester staple fibers (or based on the total weight of the slurry).

Alternatively, or in addition, the slurry (or tubular member) can include not more than about 99.75, not more than about 99.5, not more than about 99, not more than about 98.5, not more than about 98, not more than about 97, not more than about 95, not more than about 90, not more than about 85, not more than about 80, not more than about 75, not more than about 70, not more than about 65, not more than about 60, not more than about 55, not more than about 50, not more than about 45, not more than about 40, not more than about 35, not more than about 30, or not more than about 25 weight percent of cellulose fibers based on the total weight of the cellulose fibers and the cellulose ester staple fibers (or based on the total weight of the slurry). The cellulose fibers may comprise virgin fibers, recycled fibers, or combinations thereof.

The liquid used to form the slurry may be any suitable type of liquid compatible with (non-reactive or inert to) the cellulose ester staple fibers and cellulose fibers. In some cases, the liquid can comprise or be water and may be added in any amount needed to provide a slurry with desirable flow and drainage properties.

In some embodiments, the slurry may include other synthetic fibers and/or one or more additives. Typically, such components are usually present in amounts of not more than about 10, not more than about 8, not more than about 5, or not more than about 3, not more than about 2, not more than about 1, or not more than about 0.5 weight percent, based on the weight of the slurry. Such components may not be present at all.

Examples of other synthetic fibers that may be present include, but are not limited to, rayon, viscose, mercerized fibers or other types of regenerated cellulose such as Cupro, Modal, and Lyocell cellulose, acetates such as polyvinylacetate, glass, polyamides including nylon, polyesters such as those polyethylene terephthalate (PET), polycyclohexylenedimethylene terephthalate (PCT) and other copolymers, olefinic polymers such as polypropylene and polyethylene, polycarbonates, poly sulfates, poly sulfones, polyethers, polyacrylates, acrylonitrile copolymers, polyvinylchloride (PVC), polylactic acid, polyglycolic acid, and combinations thereof.

Examples of suitable additives include, but are not limited to fillers (e.g., talc or clay), internal sizing agents (e.g., rosin, wax, further starch, glue), process anti-foaming agents, colorants, stiffeners, strength agents, and optical modifiers such as precipitated calcium carbonate, clay, chalk or titanium dioxide. Other additives can include water-proofing agents, and/or plasticizers to improve the water impermeability and overall strength of wet-laid webs formed from the slurry.

The slurry may be formed in any suitable manner that sufficiently blends the cellulose ester staple fibers, cellulose, and liquid. In some cases, as described previously, the liquid and cellulose fibers may be blended and refined, and the cellulose ester staple fibers may be added to the refined stock (post-refining or add-after addition). When added after the cellulose slurry has been refined, the amount of cellulose ester staple fibers may be lower, but the final wet-laid web may still exhibit sufficient stiffness and other properties desirable for various end use applications. For example, in some cases, when the cellulose ester staple fibers are added post-refining, the cellulose ester staple fibers can be present in the slurry in an amount of at least about 0.25, at least about 0.5, at least about 1, or at least about 1.5 weight percent and/or not more than about 10, not more than about 8, not more than about 6, not more than about 5, not more than about 4, not more than about 3, or not more than about 2.5 weight percent, based on the total weight of the cellulose fibers and cellulose ester staple fibers in the slurry. When the cellulose ester staple fibers are added after the cellulose has been refined, the cellulose ester staple fibers may be crimped to a crimp frequency of at least 8, at least 10, or at least 12 CPI and/or not more than about 24, not more than about 22, or not more than about 20 CPI.

In other cases, the cellulose ester staple fibers may be added to the liquid with the cellulose fibers and the fiber blend may be co-refined. When co-refining is used to form the slurry, the amount of cellulose ester staple fibers in the slurry may be at least about 0.25, at least about 0.5, at least about 1, or at least about 1.5, at least about 2, at least about 5, at least about 8, or at least about 10 weight percent and/or not more than about 25, not more than about 20, not more than about 15, not more than about 12, not more than about 10 not more than about 8, not more than about 6, not more than about 5, not more than about 4, not more than about 3, or not more than about 2.5 weight percent, based on the total weight of the cellulose fibers and cellulose ester staple fibers in the slurry. Other ranges as described previously are also suitable. In some cases, co-refined cellulose ester staple fibers may have a DPF of not more than about 5, not more than about 4, not more than about 3, not more than about 2.5, not more than about 2, or not more than about 1.8.

Once formed, the slurry can have a total solids content of at least about 0.1, at least about 0.5, at least about 1, at least about 1.5, at least about 2, or at least about 5 weight percent and/or not more than about 25, not more than about 20, not more than about 15, not more than about 10, not more than about 8, not more than about 6, not more than about 5, or not more than about 3 weight percent. As used herein, the term "solids content" refers to the weight percent of solids based on the total weight of the slurry or mixture.

In forming zone 110 shown in FIG. 50, the slurry may be drained to remove at least a portion of its liquid and thereby form a wet-laid web. According to some embodiments, the slurry may exhibit a Williams Slowness of less than about 200 seconds and/or a Canadian Standard Freeness (CSF) of at least 200 ml. Alternatively, or in addition, the slurry may exhibit a Williams Slowness of less than 190, or less than 180, or less than 170, or less than 160, or less than 150, or less than 140, or less than 130 seconds. The slurry may also exhibit a CSF of at least 250, or at least 260, or at least 270, or at least 280, or at least 290, or at least 300, or at least 310, or at least 320, or at least 330, or at least 340, or at least 350, or at least 360 ml. As discussed previously, such values indicate improved drainage of slurries including blends of cellulose and cellulose ester staple fibers as compared to similar slurries that include only cellulose. As a result, the slurry as described herein may be drained faster, which may help facilitate lower energy costs and/or faster production rates as compared to conventional processing of similar wet-laid (cellulose only) webs. Specific steps for draining the fiber-containing slurry are described in detail previously.

Once drained, the wet-laid fiber web may have a total solids content of at least about 5, at least about 10, or at least about 15 percent, and/or not more than about 50, not more than about 45, or not more than about 40 percent. As discussed previously, the fiber-containing sheet may be subjected to further drying, pressing, finishing, and, optionally, conditioning to form a fiber-containing sheet having a solids content of at least about 60, at least about 65, at least about 70, at least about 75, or at least about 80 percent and/or not more than about 95, not more than about 90, not more than about 85, or not more than about 80 percent. The moisture content of the fiber-containing sheet can be at least about 5, at least about 10, at least about 15, or at least about 20 percent and/or not more than about 40, not more than about 35, not more than about 30, not more than about 25, or not more than about 20 percent. As used herein, the term "moisture content" refers to the weight percent of water based on the total weight of the web, sheet, or article.

In some cases, the fiber-containing sheet can have an average or maximum caliper thickness of at least about 0.01, at least about 0.025, at least about 0.04, at least about 0.05, or at least about 0.06 inches and/or not more than about 0.5, not more than about 0.3, not more than about 0.25, not more than about 0.1, not more than about 0.07 inches. The sheet can have an average density of at least about 0.4, at least about 0.45, or at least about 0.5 g/cm3 and/or not more than about 0.7, not more than about 0.65, or not more than about 0.6 g/cm3. In some cases, the sheet can have a basis weight of at least about 20, at least about 25, at least about 30, or at least about 35 g/m2 and/or not more than about 100, not more than about 90, not more than about 85, not more than about 75, not more than about 65, or not more than about 50 g/m2.

In some embodiments, the fiber-containing sheet may be both strong and sufficiently malleable. For example, the fiber-containing sheet may have at least one of a tensile strength of at least 2 kN/m and/or an elongation at break of at least 1.5%. In some cases, the tensile strength can be at least about 3, at least about 4, at least about 5, at least about 6, at least about 7, or at least about 8 kN/m, and/or the elongation at break can be at least about 2, at least about 2.5, at least about 3, at least about 3.5, at least about 4, at least about 4.5, at least about 5, at least about 6, at least about 6.5, or at least about 7%.

Tensile strength and elongation at break may be tested by first cutting test sheets to a width of 15 mm and a length of 250 mm, respectively, in the flow and cross directions. These test sheets may then be kept conditions of 23° C. and 50% RH for at least 24 hours for moisture control. The elongation at break of the test pieces can be determined with Strograph M2 tester (a product of Toyo Seiki Seisaku-sho, Ltd.) at a rate of pulling of 20 mm/min according to JIS-P 8113. The tensile strength of the test pieces was determined with Strograph M2 tester (a product of Toyo Seiki Seisaku-sho, Ltd.) at a rate of pulling of 20 mm/min according to JIS-P 8113.

After being formed, the fiber-containing sheet may be cut into smaller pieces suitable for rolling prior to being rolled in rolling zone 130. In some embodiments, the sheet may be cut into smaller, generally rectangular sheets, which can be longitudinally (or transversely) rolled into a tubular shape in the rolling zone 130.

In other embodiments, the fiber-containing sheet may be cut into narrow strips having a total width (second longest dimension perpendicular to the length, or longest dimension) of the strips of at least about 0.1, at least about 0.2, at least about 0.25, at least about 0.30, at least about 0.40, at least about 0.50, at least about 0.60, at least about 0.70, at least about 0.75, at least about 0.80, at least about 0.90 inches, or at least about 1 inch and/or not more than about 2.5, not more than about 2.4, not more than about 2.3, not more than about 2.25, not more than about 2.1, not more than about 2, not more than about 1.75, not more than about 1.5 or not more than about 1.25 inches. The strips can be of any suitable length and, in some cases, may be a continuous strip wound onto a roll. The thickness of each narrow strip can be the same as the thickness of the fiber-containing sheet as described previously.

In some embodiments, at least a portion of the wet-laid web, fiber-containing sheet, and/or strip may be may be treated with at least one plasticizer prior to being rolled into a tubular shape. Alternatively, all or a portion of the plasticizer may be applied to the sheet after it has been rolled into a tubular shape and/or prior to, or after, adhering it to form the tubular member. The plasticizer may be applied to at least about 50, at least about 60, at least about 70, at least about 75, at least about 80, or at least about 85 percent of one or more surfaces of the wet-laid web, sheet, strip, or tubular member, or it may be applied to all of one or more of the surfaces. The method of applying the plasticizer is not limited, and can include spraying, coating, dipping, dripping, immersing, rolling, brushing, and combinations thereof.

In some embodiments, the plasticizer may be applied to the wet-laid web, fiber-containing sheet (or strips) in an amount of at least about 1, at least about 2, at least about 5, or at least about 7 weight percent and/or not more than about 30, not more than about 20, not more than about 15, or not more than about 9 weight percent, based on the total weight of the fiber-containing sheet, web, or strip. Similar amounts may be added to the slurry during the forming process (with the basis of the percentages being the total weight of the fibers in the slurry), or to the tubular member after molding (with the basis of the percentage being the total weight of the tubular member).

The plasticizer employed may be any plasticizer composition that is compatible with cellulose esters and that will help facilitate the melting of at least a portion of the cellulose ester staple fibers with the subsequent application of heat and/or pressure. Examples of suitable plasticizers can include, but are not limited to, high boiling esters of polyhydric alcohols such as diacetin, triethylene glycol diacetate and triacetin; high boiling esters of carboxylic acid such as alkyl or aryl esters of citric acid, adipic acid, maleic acid and phthalic acid which include dimethyl phthalate and triethyl citrate; organic esters of inorganic acids such as tributyl phosphate, triethyl and tripropyl phosphate, and trichloroethyl phosphate; alkoxy alkyl esters of inorganic acids or of organic polybasic acids such as di(methoxy ethyl) phthalate, di(methoxy ethyl) adipate, di(methoxy ethoxy ethyl) adipate and methyl phthalyl ethyl glycolate, ortho- and para-N-ethyl toluene sulfonamides; and high boiling ethers such as butyl ether of ethylene glycol, methyl ether of ethylene glycol, etc. In some cases, the plasticizers may include diethyl phthalate, triethyl citrate, BENZOFLEX400™ plasticizer, KETJEN-FLEX 8™ plasticizer, KETJENFLEX 9S™ plasticizer, EASTMAN240™ plasticizer, triacetin, triacetin/1-3 weight percent cellulose acetate solution and triacetin/diethyl phthalate. The plasticizers may be added neat or diluted with a suitable solvent, such as an alcohol or water.

After being cut, the strips or pieces of the wet-formed fiber-containing sheet may then be rolled into a tubular shape. In some cases, this can include rolling the strips or pieces of paper around a mandrel or other rod of suitable size and shape. In other cases, no mandrel is used. The rolling can be performed manually or automatically. When wound around a mandrel, the strips may be oriented at an angle of at least about 20, at least about 25, at least about 30, at least about 35, or at least about 40° and/or not more than about 90, not more than about 85, not more than about 80, not more than about 75, not more than about 70, not more than about 65, not more than about 60, not more than about 55, or not more than about 50° relative to the direction of extension (or axis of elongation) of the mandrel.

Figure 51:
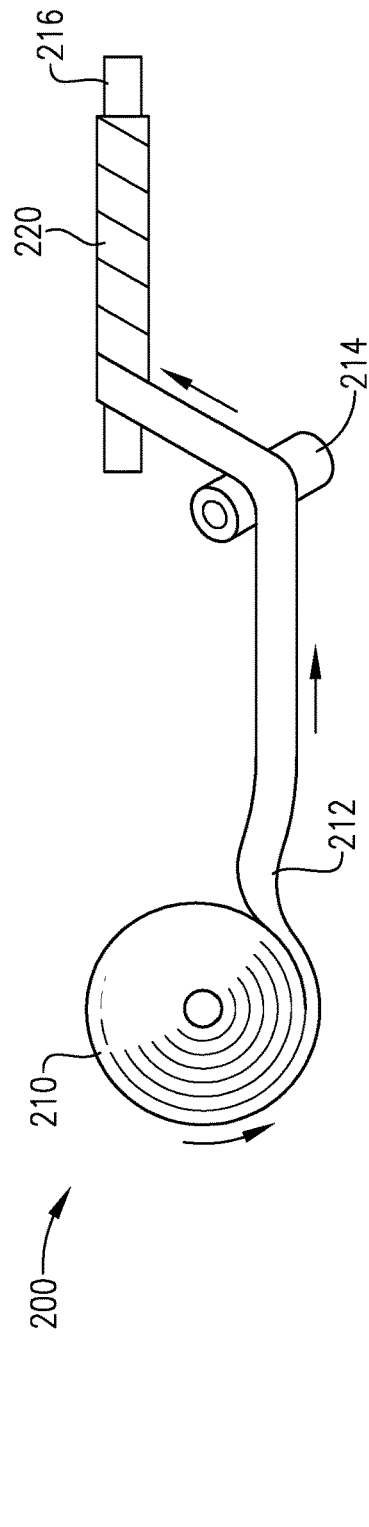
FIG. 51 is schematic depiction of a winding system for winding strips of fiber-containing sheet around a mandrel to form a tubular member.

A schematic depiction of one example of a winding system 200 for winding strips 212 of fiber-containing sheet 210 around a mandrel 216 to form a tubular member 220 is shown in FIG. 51. In the embodiment shown in FIG. 51, the movement of the narrow strips are further guided by a secondary roller 214, although this may or may not be present in all systems. Alternatively, additional rollers (not shown) may be used.

In some embodiments, two or more fiber-containing strips having different properties may be alternately rolled around the mandrel to provide a tubular member with a certain appearance or functionality. For example, in some cases, narrow fiber-containing strips of different colors may be alternated around the mandrel to provide a tubular member with a striped pattern. In other cases, strips having different widths may be wound around the mandrel so that some overlap occurs between adjacent strips to help seal the tubular member.

As shown in FIG. 50, while the fiber-containing sheet is in a tubular shape, the edges of the sheet may be adhered to one another to form a tubular member in the adhering zone 140. In some embodiments, an adhesive may be used. The adhesive may be applied to at least one side of the fiber-containing sheet before it is cut into strips, or it may be applied to the strips prior to rolling. In other embodiments, the adhesive may be applied to the sheet or strips after being rolled into a tubular shape, while, in still other embodiments, the adhesive may have been applied during formation of the wet-laid web. The adhesive can be a solid, a liquid, or a gas and can be applied by any suitable method including, but not limited to, spraying, coating, dipping, dripping, immersing, soaking, rolling, and combinations thereof, or any previously mentioned method. In some cases, the adhesive may be applied to the web, sheet, strip, or tubular member with a solvent by wet lamination, hot melt lamination, extrusion lamination, dry lamination, thermal lamination, and combinations thereof.

The adhesive can be any type of adhesive suitable for adhering the fiber containing sheet or strips to form a tubular member. Where the tubular member is used with food and/or beverages, the adhesive is preferably approved by applicable agencies, such as, for example, the U.S. Food & Drug Administration. Additionally, the adhesive may be non-toxic, odorless, colorless, and tasteless and may have the ability to withstand both hot (greater than 80° C.) and cold (not more than 10° C.) temperatures without delaminating. The adhesive is also preferably inert (non-reactive) with the fiber-containing sheet and any other coatings, when present.

The adhesive may be water soluble or water dispersible. Examples of suitable adhesives can include, but are not limited to, starch, polyvinyl alcohol (PVA), casein, vegetable starch-based adhesives, protein-based adhesives, animal glue, natural rubber latex, and resin emulsions such as stable suspensions of polyvinyl acetate particles in water.

The amount of adhesive added to the wet-laid paper or strips or the walls of the tubular member is not limited, but should be sufficient for the tubular member to retain its shape during use. In some cases, the amount of adhesive can be at least about 0.5, at least about 1, at least about 1.5, at least about 2, at least about 2.5, or at least about 5 weight percent and/or not more than about 25, not more than about 20, not more than about 15, or not more than about 10 weight percent, based on the total weight of the tubular member.

In some embodiments, adhering the fiber-containing sheet to form the tubular member can include applying pressure to the tubular member. At least a portion of the pressure applied can occur during the rolling step. The pressure can originate from an outside source, such as a pressing or rolling member, or can be applied by the tension applied to the strips being wound around the mandrel.

In some embodiments, the fiber-containing sheet may also be heated during the rolling and/or adhering steps. In some cases, the heating may be sufficient to soften the sheet and at least partially melt at least a portion of the cellulose ester staple fibers therein. In some embodiments, the heating may be carried out at a temperature of at least about 90, at least about 95, at least about 100, at least about 105, or at least about 110° C. and/or not more than about 200, not more than about 175, not more than about 150, or not more than about 140° C. The heating may be performed in an oven or using irradiation by electromagnetic energy or by heating the mandrel.

In other embodiments, no heating may be performed such that the fiber-containing sheet may have a temperature of not more than about 100, not more than about 95, not more than about 90, not more than about 75, not more than about 60, or not more than about 50° C. prior to, during, and after the rolling and adhering steps.

In some embodiments, when heating is performed, the fiber-containing sheet may have previously been coated with a plasticizer as discussed in detail previously. When used, the plasticizer may have been selected to provide the fiber-containing sheet with a desirable glass transition temperature, since the cellulose fibers and cellulose ester staple fibers do not themselves exhibit a glass transition temperature. In some cases, the heating may be carried out at a temperature at or near the glass transition temperature of the plasticized sheet. For example, the heating may increase the temperature of the fiber-containing sheet to a temperature within about 15, within about 10, within about 5, or within about 2° C. of the glass transition temperature of the plasticized sheet. This can be a temperature within the above ranges or not more than about 250, not more than about 240, not more than about 225, or not more than about 210° C.

As a result of this heating step, at least a portion of the cellulose ester staple fibers in the fiber-containing sheet may melt to provide a fiber-reinforced sheet of at least partially melted cellulose ester with cellulose fibers dispersed therein (if the sheet includes more than about 35 weight percent of cellulose ester staple fibers, based on the total fiber content) or a sheet of cellulose ester bonded cellulose fibers (if the sheet includes 35 weight percent or less of cellulose ester staple fibers, based on the total fiber content). The melted cellulose ester can provide additional strength, liquid impermeability, and/or adhesiveness to the tubular member. In some embodiments, when a plasticizer is used and the cellulose ester staple fibers are melted, the tubular member includes not more than about 1, not more than about 0.75, not more than about 0.5, not more than about 0.25, or not more than about 0.10 weight percent of adhesives and water-proofing agents, based on the weight of the tubular member.

In some embodiments, at least one treatment agent can be added or applied to a portion of the slurry, wet-laid web, sheet, or tubular member during a portion of the above-described process. The treatment agent may be a solid, a liquid, or a gas, and may be applied in any suitable manner. For example, when added to a slurry, the additive may be a solid or liquid mixed in with the slurry components, or a gas bubbled through the slurry. When the treatment agent is applied to a web, sheet, or the tubular member, the additive may be a liquid that is coated, sprayed, dipped, rolled, impregnated (by soaking or immersing), or brushed onto one or more surfaces, or it can be a solid applied to the surface in molten, emulsion, or dispersion form. When the treatment agent is a gas, it may be passed over a portion of the web, sheet, or article in order to coat at least a portion of its surface. The treatment agent can be applied with or without heat and with or without a solvent.

Examples of suitable treatment agents can include, but are not limited to, sizing agents such as alkyl ketene dimers, styrene/acrylic resin and rosin, strength additives and yield improvers including organic compounds such as polyacrylamide resin, polyamide epichlorohydrin resin, polyethyleneimine and derivatives thereof, polyethylene oxide, polyamine, polyamide, polyamide polyamine and derivatives thereof, cationic and amphoteric starches, oxidized starch, carboxymethylated starch, vegetable gum and polyvinyl alcohol; and inorganic compounds such as alumina sulfate, alumina sol, colloidal silica and bentonite. Other examples include strength additives, opacity modifiers, plasticizers, fillers, pH regulators, thickeners, colorants, and foaming agents formed of heat expanding microcapsules that release volatile gas when heated for density control. These agents can be used independently or in combination of two or more.

When added to the fiber slurry, the treatment agent can be present in an amount of not more than about 10, not more than about 8, not more than about 6, not more than about 5, not more than about 4, not more than about 3, not more than about 2, not more than about 1, or not more than about 0.5 weight percent, based on the total weight of the slurry. Examples of treatment agents that may be added to the slurry can include, but are not limited to, sizing agents, strength additives, foaming agents, opacity modifiers, plasticizers, fillers, pH regulators, thickeners, and colorants.

In some embodiments, at least one treatment agent can be applied to the wet-laid web, to the fiber-containing sheet, or to the tubular member itself. Examples of treatment agents added can include plasticizers or sizing agents as described herein, or even water. When water is added to the wet-laid web or film-containing sheet, it may increase the moisture content to an amount of at least about 5, at least about 8, at least about 9, at least about 10, at least about 11, at least about 12, or at least about 15 percent and/or not more than about 35, not more than about 30, not more than about 25, not more than about 20, not more than about 15, not more than about 12, or not more than about 10 percent.

According to some embodiments, the treatment agent can be a water-proofing agent. The water-proofing agent can be a solid, liquid, or gas and may be applied to the slurry, web, sheet, or tubular member in one or more of the ways discussed previously. In some cases, in addition to imparting water resistance or water-proofing, the water-proofing agent may also impart other features, such as acid resistance, stain resistance, act as an oxygen barrier, oil or grease resistance, and combinations thereof, to the web, sheet, or tubular member. In some embodiments, the wet-laid web or fiber-containing sheet (or strips) may be laminated or coated with the water-proofing agent to provide a water-resistant or water-proof sheet or web. The type of lamination is not limited and may include, for example, wet lamination, hot melt lamination, extrusion lamination, dry lamination, thermal lamination, and combinations thereof.

The water-proofing agent may comprise one or more of a wax, wax blend, a polymer, an oil, a polyolefin, a polymer dispersant, and combinations thereof. Examples of suitable water-proofing agents can include, but are not limited to, beeswax, sodium silicate (acid resistant), paraffin wax, microcrystalline wax, and biodegradable thermoplastic resins. In particular, the water-proofing agent can include emulsions such as microcrystalline waxes and paraffin waxes; latices such as SBR latex and polyvinylidene chloride latex; synthetic resin emulsions such as acrylic resin emulsions, self-emulsifiable polyolefin emulsions and polyethylene copolymer resin emulsions; polyolefin resins such as polyethylene, polypropylene and polymethylpentene; saturated polyester resins such as polyethylene terephthalate and polybutylene terephthalate; polyamide resins such as nylon; ethylene/vinyl alcohol copolymer; polystyrene resin; polyacrylonitrile resin; and biodegradable resins such as aliphatic polyesters such as 3-hydroxybutyrate/3-hydroxyvalerate copolymer, 3-hydroxybutyrate polymer and polycaprolactone; polyglycolides such as polylactic acid; polyvinyl alcohol; polyvinyl alcohol/starch composite; and cellulose derivatives such as cellulose acetate.

When used, the amount of water-proofing agent applied to the web, sheet, or tubular member can be sufficient to create a coating on the surface of the web, sheet, or tubular member. In some cases, the coating amount can be at least about 1, at least about 1.5, or at least about 2 and/or not more than about 20, not more than about 18, or not more than about 15 g/m2 after drying. The total thickness of the coating can be at least about 0.5, at least about 1, or at least about 1.5 and/or not more than about 8, not more than about 5, not more than about 3, not more than about 2, or not more than about 1.5 mils. The coating can be single or multiple layered and can cover all or a portion of the surface.

In some embodiments, when used, the water-proofing agent may be applied to the fiber-containing sheet, strips, or tubular member in an amount of at least about 1, at least about 2, at least about 5, or at least about 7 weight percent and/or not more than about 30, not more than about 20, not more than about 15, or not more than about 9 weight percent, based on the total weight of the fiber-containing sheet. In some embodiments, the water-proofing agent may be used in addition to other treatment agents such as plasticizers and adhesives as described previously. In other embodiments, the water-proofing agent may also function as a plasticizer and/or an adhesive such that additional ones of these types of treatment agents may not be needed.

Tubular members formed by processes described herein can comprise cellulose fibers and cellulose ester. In some embodiments, particularly when the tubular member is heated during or after rolling, the articles described herein may comprise at least one layer of (or be formed from sheets or webs that include) at least partially melted cellulose ester with cellulose fibers dispersed therein. In some cases, these layers, webs, and sheets may have thermoplastic properties and can have a total fiber content of not more than about 80, not more than about 75, not more than about 70, not more than about 65, not more than about 60, not more than about 55, not more than about 50, or not more than about 45 percent. As used herein, the term "total fiber content" refers to the total weight of all fibers in a given sheet, web, article, or slurry, based on the total weight of the sheet, web, article, or slurry.

Of the fibers in such an article, at least about 60, at least about 65, at least about 70, at least about 75, at least about 80, at least about 85, at least about 90, at least about 95, or at least about 99 percent are cellulose fibers. This may result because, for example, the cellulose ester staple fibers at least partially melted during heating before and/or during molding, as discussed above, but the cellulose fibers are not melted. The amount of cellulose ester present in these articles can be within the above ranges, although not more than about 40, not more than about 35, not more than about 30, not more than about 25, not more than about 20, not more than about 15, not more than about 10, or not more than about 5 percent of the total amount of cellulose ester may be in the form of staple fibers.

In some embodiments, tubular members as described herein may comprise at least one fibrous layer of (or be formed from sheets or webs that include a fibrous layer of) cellulose ester staple fibers and cellulose fibers. In some cases, these layers, webs, and sheets may have a total fiber content of at least about 70, at least about 75, at least about 80, at least about 85, at least about 90, or at least about 95 percent. The amounts of cellulose ester staple fibers and cellulose fibers may be within the ranges provided previously with respect to the slurry. Few, if any, of the cellulose ester staple fibers may be melted, since little or no heat was applied during the formation of such an article.

Figure 52:
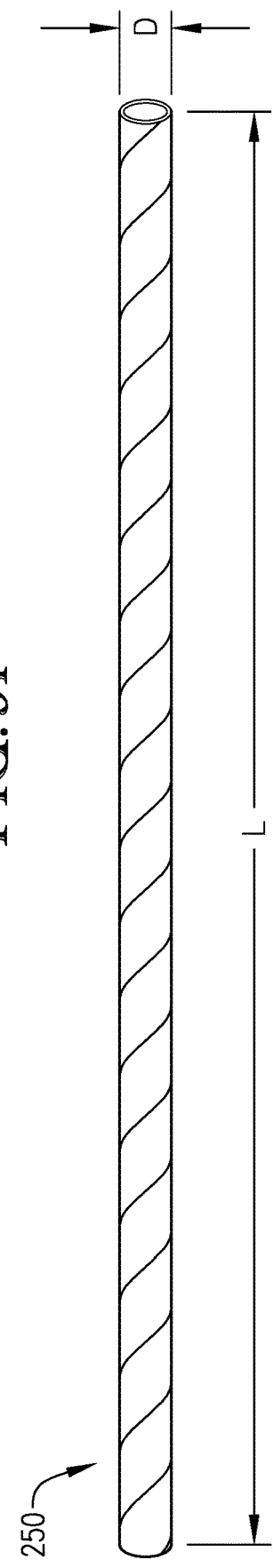
FIG. 52 is a diagram of one example of a tubular member particularly illustrating the length (L) and diameter (D) of the member.

Tubular members formed as described herein can have any suitable dimensions. One example of a tubular member 250 is shown in FIG. 52, illustrating its length, L, and its diameter, D.

As used herein, the term "length" refers to the maximum caliper dimension measured along an axis of elongation of the article. As used herein, the term "diameter" refers to the maximum caliper dimension measured perpendicular to the axis of elongation along a width axis. Although shown in FIG. 52 as having a circular cross-section, tubular members described herein can have any suitable cross-sectional shape such as square, rectangular, oval, and polygonal and the term "diameter" refers only to the dimension, and is not intended to imply a specific shape.

In some embodiments, the tubular members can have a length of at least about 1, at least about 2, at least about 3, at least about 4, at least about 5, at least about 6, at least about 7, at least about 8, at least about 9, or at least about 10 inches and/or not more than about 18, not more than about 16, not more than about 15, not more than about 13, not more than about 12, not more than about 10, or not more than about 8 inches. The tubular member may have a diameter of at least about 0.01, at least about 0.05, at least about 0.10, at least about 0.25, or at least about 0.35 inches and/or not more than about 1, not more than about 0.75, not more than about 0.50, or not more than about 0.45 inches. In some embodiments, the diameter of the tubular member stays substantially the same (within 5% of the average) along its length, while, in other embodiments, the diameter may vary by 5% or more along the length of the tubular member. In some cases, variation of the diameter may provide a cone shaped member.

In some embodiments, the ratio of the length to the average diameter (L:D) of the tubular member can be at least about 4:1, at least about 8:1, at least about 10:1, at least about 12:1 and/or not more than about 150:1, not more than about 120:1, not more than about 100:1, not more than about 80:1, not more than about 60:1, not more than about 50:1, not more than about 40:1, not more than about 30:1, or not more than about 25:1.

Tubular members formed as described herein are hollow. One or both ends may be open (unsealed), or one or both ends may be closed (sealed). In some cases, particularly when both ends are at least partially sealed, the tubular member can have a tab or other decorative item at one or both ends. Alternatively, or in addition, the hollow interior of the tubular member may be filled with edible or inedible items for providing flavor, nutrients, or other components to an end user. Depending on how the tubular member was rolled, it may include a seam running from one end to the other. Such a seam may be helical (as shown for example in FIG. 52), or it may be linear.

Figure 53:
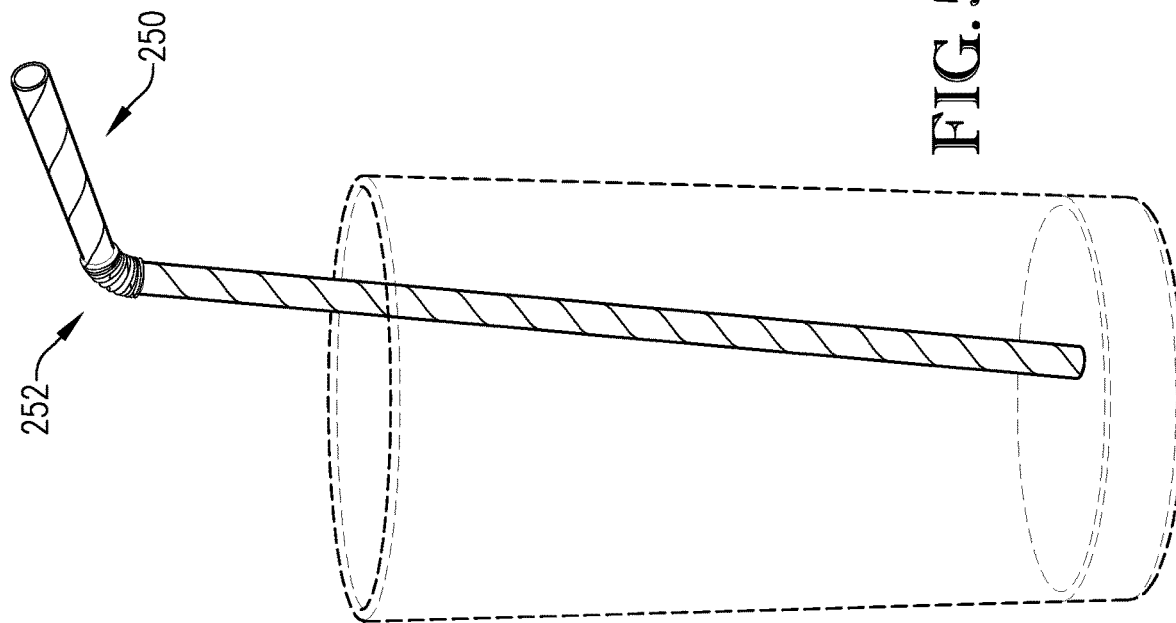
FIG. 53 is a diagram of another example of a tubular member having a corrugated segment.

In some cases, the tubular member can be substantially rigid along its length, while, in other cases, at least a portion of the tubular member may be flexible. When the tubular member includes a flexible portion, it may be corrugated to permit bending of the tubular member without breaking. When present, the corrugated segment may be closer to one end of the tubular member than the other. One example of a tubular member 250 having a corrugated segment 252 is shown in FIG. 53.

Figure 55:
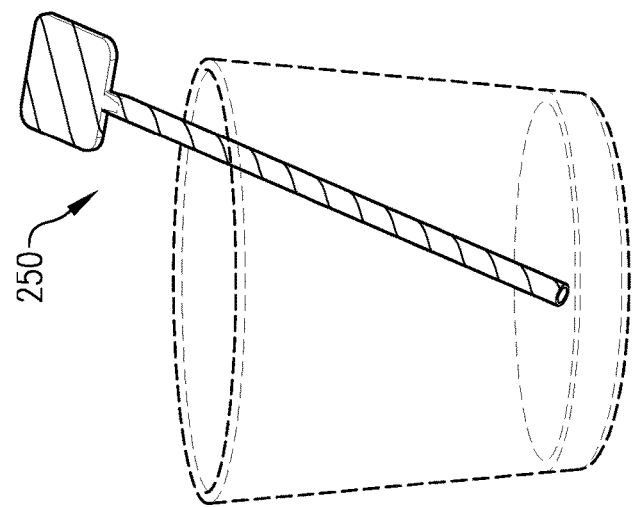
FIG. 55 is a diagram of still another example of a tubular member and, in particular, a beverage stirrer.
Figure 54:
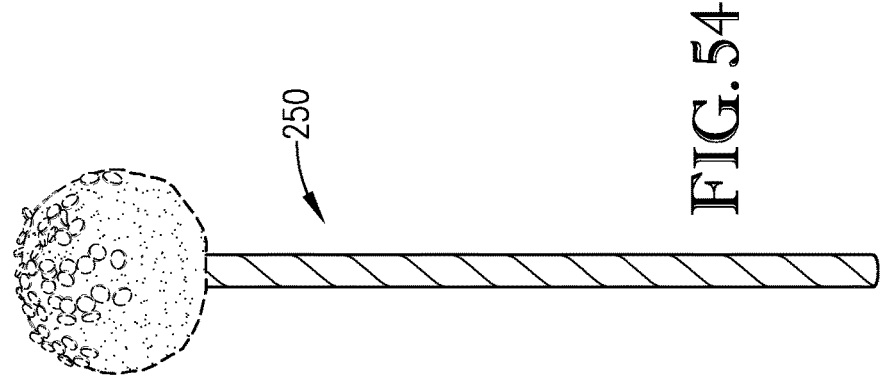
FIG. 54 is a diagram of yet another example of a tubular member and, in particular, a cake pop stick.

Tubular members formed as described herein can be used for a variety of end use applications, including food and/or beverages. In some embodiments, the tubular member can be a drinking straw as shown, for example, in FIGS. C and D. Other examples can include, but are not limited to, a cake pop stick (shown in FIG. 54), a popsicle stick, a lollipop stick, a candy holder, and a beverage stirrer (shown in FIG. 55). Additionally, tubular members described herein may be used in non-food applications such as, for example, as packaging.

EXAMPLES

Slurry Preparation and Handsheet Preparation:

In each of the examples, furnish and handsheets are prepared according to Method 1 by one lab (Lab 1) and furnish and handsheets are also prepared according to Method 2 by an external second lab (Lab 2). The preparation of handsheets by Method 1 use the furnish of Method 1, and the preparation of handsheets by Method 2 use the furnish of Method 2.

Method 1, Lab 1:

Refining for Half TAPPI Batch T200:

For refining of pulp, deionized water is used. The experiment utilizes Northern Bleached Softwood Kraft pulp (NBSK) marketed by Grand Prairie. For each sample, the appropriate mass of NBSK pulp (180 g for 100% pulp samples, 172.8 g cellulose fiber for 4% CE staple fiber samples, and cellulose fiber 151.2 g for 16% CE staple fiber samples) are together soaked over-night in 10 liters of deionized water. Before adding any fiber mixture to the Voith Valley Beater, the zero-load is set. Zero-load is set by filling the Valley Beater with deionized water and turning on the motor to circulate the water. Weight is added to the bedplate load arm and a sliding weight is adjusted until the bedplate made audible contact with the rotor bars. After setting the zero-load, the Valley Beater is emptied and the 10 L sample is poured into the Valley Beater. If the sample requires CE staple fiber for co-refining, the CE staple fiber is added at this point (7.2 g for the 4% samples and 28.8 g for the 16% samples). An additional 1.5 L of deionized water is added to bring the consistency to 1.56%. All weight is removed from the load arm and the mixture is circulated for 5 minutes with no-load to accomplish uniform mixing and dispersion of the fibers. The motor is stopped, and a sample is taken ($t_0$) for freeness testing then the zero-load weight is added to the load arm of the Valley Beater. In addition to the zero-load weight, an additional 5-pound weight is added for refining load. The motor is turned on and the mixture is refined for 5 minutes. The motor is stopped and another sample ($t_5$) is taken for freeness testing. The motor is turned on and the mixture is refined for 5 minutes. The motor is stopped and another sample ($t_{10}$) is taken for freeness testing. The motor is turned on and the mixture is refined for 5 minutes. The motor is stopped and another sample ($t_{15}$) is taken for freeness testing. An additional 6.5 liters of deionized water is added to the Voith Valley Beater to further dilute the sample. All weight is removed from the load arm and the mixture is circulated for 1 minute in the Valley Beater. For batches requiring Post-Addition fiber, the appropriate mass (7.2 g or 28.8 g) of unrefined CE staple fiber is added prior to the 1-minute circulation. The contents of each batch of slurry are drained into 5-gallon buckets and are ready to use for handsheets at 1.0% consistency.

Handsheet Forming Procedure:

From the 1.0% consistency pulp prepared with the Modified Refining Procedure for Half TAPPI Batch T 200, a volume of slurry expected to equal the OD dry target Grams Per Square Meter (GSM) is withdrawn. The volume of the slurry used ranged between 650 ml and 850 ml depending on the specific blend of pulp prepared. A consistency sheet is produced for each set of sheets to be produced. Each consistency sheet began with a charge of 7.432 grams dry equivalent fiber, or 743 ml of pulp slurry diluted to 1% consistency. Adjustments are calculated from this baseline to bring sheets into the target GSM range for each batch of slurry processed into hand sheets. The purpose of the consistency sheet is to calculate the exact volume needed to produce sheets that repeatedly weigh within the required GSM specifications of +/−5% of the 80 gsm target basis weight. To produce the consistency sheet, and all subsequent sheets, the volume of pulp slurry withdrawn is added to a blending apparatus, in this case, a TAPPI messemer disintegrator. The slurry added to the blender is diluted further aid in dispersion of the fibers prior to adding the slurry to the sheet-forming machine. For instance, if 500 ml of slurry is required to form a 60 GSM hand sheet, and the blender has capacity of 1.5 L, then 800-1000 ml of additional water is added to dilute the slurry and aid in dispersion during mixing. The slurry is disintegrated (mixed at a low sheer) for 60 seconds. The disintegrated slurry is then added to the head box of an AMC 12-inch×12-inch hand sheet-forming machine, which is prefilled with 26 liters of city water. This gives a consistency of <0.05% in the handsheet mold. The height of the fill line for the particular machine used is 11 inches. The diluted slurry is plunged 6 times within approximately 15 seconds and after the final plunge is pulled up and over the closest corner of the head box in order to prevent excessive dripping back into the head box which could potentially disturb the water column and result in undesired patterns forming on the surface of the sheet when "dropped." The hand sheet is then "dropped" by releasing the drain knife-valve such that the water level drops smoothly and evenly within 20-40 seconds. When all water has drained, the head box of the hand sheet-forming machine is opened and the forming wire with the wet sheet is transferred to a vacuum device (slotted pipe connected to a vacuum source. The wire and wet sheet are pulled across the vacuum slot to draw additional water out of the sheet through the wire. The vacuum-couched sheet is then covered with a single sheet of blotter paper on the non-wire side, and separated from the forming wire by flipping the wire side up and removing the forming wire. A second sheet of blotter paper is placed on the now exposed wire side of the sheet. This blotter-sample-blotter "sandwich" is placed to the side so that 3 additional sample "sandwiches" can be stacked together for pressing. When 4 sample sandwiches have been stacked together, an additional sheet of blotter paper is added to the top and to the bottom of the stack and the stack is transferred a 14"×14" Voith Sheet Press and compressed at 60 psig for 15 seconds, then at 120 psig for an additional 15 seconds. After a total of 30 seconds at the various pressures, the pressure is released and the hand sheets are removed for drying. Each hand sheet is dried for 30 seconds at 105° C. first on an AMC felted rotary drum dryer and then stripped the damp blotter paper. Teflon fabric sheets are added to each side of the partially dry hand sheets and then moved to a second dryer set to 80 C and dried for an additional 4 minutes. After each sheet has dried, they are weighed. The target weight for each 12 inches by 12-inch sheet is 7.432 grams. Sheets outside a specification of 7.060 grams-7.804 grams are rejected for testing. All sheets meeting specification are labeled and entered into a testing queue.

Method 2, Lab 2

Refining for Half TAPPI Batch T200:

For refining of pulp, city treated water, containing 2 ppm mineral content, is used. The cellulose fiber pulp is Northern Bleached Softwood Kraft pulp (NBSK) marketed by Hinton HiBrite. A cumulative quantity of 180 grams of fibers is employed, with either 100 percent wood pulp or a mixture of wood pulp and CE staple fibers, and the cumulative amount of fiber/water mixture is soaked over-night in 4 liters of water. After soaking over-night, the fiber/water mixture is diluted with 7.5 liters of water and pulped in a disintegrator on a high (5) setting for 10 seconds. The disintegrator is a low shear high speed blender manufactured by Breville with blunt agitator blades. Each disintegrated pulp/fiber mixture is added into a Voith Valley Beater. This mixture yields a half TAPPI batch at a consistency of 1.565% "pulp" to water. Each diluted mixture is circulated through the Voith Valley Beater with no load on the bedplate arm. First, a 4 lb. weight is added to load the bedplate arm until refiner bedplate "floats" slightly above its lowest position. With all fiber loaded and at correct dilution, the mixture is circulated for 30 seconds. A 5.5 Kg weight is added to end of load arm hook and an automatic shut-off timer is set for 15 minutes. The beater is turned on and allowed to refine the pulp mixture for 15 minutes and then stopped. An additional 6.5 liters of water is added to the Voith Valley Beater to bring the solids level down to 1%. For batches requiring Post-Addition CE staple fiber, the specified fibers are added at this point. For 4% Post-Addition CE staple fiber there exists 180 g cellulose to which 7.5 g CE staple fiber is added plus an additional 0.75 liter of water. For 16% Post-Addition CE staple fiber there exists 180 g cellulose to which 34.3 g CE staple fiber is added plus an additional 3.43 liter of water. After the additional of water or water and CE staple fiber, and, as applicable, the Post-Addition CE staple fibers, the slurry is mixed in the Voith Valley Beater with no load on the bedplate arm for 30 seconds. The contents of each batch of slurry are drained into 6-gallon buckets and are ready to use for handsheets at 1.0% consistency.

Handsheet Forming Procedure:

From the 1.0% consistency pulp, a volume of slurry expected to equal the OD dry target Grams Per Square Meter (GSM) is withdrawn. The volume of the slurry used ranged between 570 ml and 670 ml depending on the specific blend of pulp prepared. A consistency sheet is produced for each set of sheets to be produced. Each consistency sheet begins with a charge of 6.187 grams dry equivalent fiber, or 619 ml of pulp slurry is diluted to 1% consistency. Adjustments are calculated from this baseline to bring sheets into the target GSM range for each batch of slurry processed into hand sheets. The purpose of the consistency sheet is to calculate the exact volume needed to produce sheets that repeatedly weigh within the required GSM specifications of +/−5% of the gsm target basis weight. To produce the consistency sheet, and all subsequent sheets, the volume of pulp slurry withdrawn is added to a blending apparatus, in this case, a low shear high speed blender manufactured by Breville with blunt agitator blades. The slurry added to the blender is diluted further to 1500 ml to aid in dispersion of the fibers prior to adding the slurry to the sheet-forming machine. For instance, if 619 ml of slurry is required to form an 80 GSM handsheet, and the blender has capacity of 1.5 L, then 881 ml of additional water is added to dilute the slurry and aid in dispersion during mixing. The slurry is mixed at a low sheer setting for 45 seconds. The dispersed slurry is not left to sit more than 30 seconds after mixing, to prevent the fibers from settling. The mixed slurry is then added to the head box of a Williams 10-inch×12-inch hand sheet-forming machine, which is prefilled with 30 liters of city water. This gives a consistency of <0.05% in the handsheet mold. The height of the fill line for the particular machine used is 15¼ inches. The diluted slurry is stirred vertically three times with a perforated plate stirring implement designed by Williams to distribute the pulp evenly throughout the column of water held in the head box. The stirring implement is plunged 3 times within approximately 6 seconds and after the final plunge is pulled up and over the closest corner of the head box, in order, to prevent excessive dripping back into the head box which could potentially disturb the water column and result in undesired patterns forming on the surface of the sheet when "dropped." The hand sheet is then "dropped" by releasing the drain knife-valve such that the water level drops smoothly and evenly within 5-15 seconds. When all water drains and drop leg vacuum is no longer heard, the top of the head box of the hinged hand sheet-forming machine is opened and a single sheet of blotter paper is placed on the wet sheet formed on the restrained wire bottom. The handsheet solids are increased with a hand-held roller to absorb trapped water and a second blotter sheet is added and hand rolled also. The restrained wire bottom, handsheet and two blotter sheets of blotter paper are removed from the handsheet former bottom and laid on a flat surface with the blotter sheets down. The restrained wire bottom is then removed from the handsheet and two blotter sheets. Two dry blotter sheets are added to the exposed side of the wet sheet, the outside blotter paper from the downward facing side is replace with an additional dry sheet of blotter paper for a total of four blotter paper sheets during the couching process.

After couching, the sheets are moved to a Voith Sheet Press and compressed at 60 psig for 15 seconds, then at 120 psig for an additional 15 seconds. After a total of 30 seconds at the various pressures, the pressure is released and the hand sheets are removed for drying. Each hand sheet is dried for 30 seconds at 105 C first and then stripped of the damp blotter paper. Dry blotter paper sheets are added to each side of the partially dry hand sheets and then moved to a second dryer set to 80 C and dried for an additional 4 minutes. After each sheet dries, they are trimmed to 9 inches×9.5 inches and weighed. The target weight for each 9×9.5-inch trimmed sheet is 4.408 grams. Sheets outside a specification of 3.85 grams-4.63 grams are rejected from testing.

Five variants are prepared to evaluate the effect of various fiber properties on the properties of the Composition (furnish) and wet laid products made from the Compositions. With each variant, the same type of cellulose pulp (Northern Bleached Softwood Kraft) is employed, and each variant is refined at the target of 1.56 wt. % consistency, and each variant is diluted to a 1 wt. % consistency after refining before making a handsheet.

Using the procedures of Method 1, for each of the 5 variants, a furnish batch of 100% cellulose control is developed and reported as the Control, a furnish batch that is co-refined at 4 wt. % CE staple fiber concentration is developed, a furnish batch at 16 wt. % CE staple fiber concentration is developed, a furnish batch of a Post-Addition (CE staple fiber added after refining) at 4 wt. % CE staple fiber concentration is developed, and a furnish batch of a Post-Addition 16 wt. % CE staple fiber concentration is developed. Lab 1 prepared 10 handsheets from 2 of the five 'control' batches (20 control sheets total). Lab 2 prepared 10 handsheets from 1 of the five 'control' batches (10 control sheets total). Lab 1 prepared 10 handsheets each from every CE staple fiber batch of every variant of CE staple fiber (200 CE Staple blend sheets total). Lab 2 prepared 10 handsheets each from every CE staple fiber blend with every variant of CE staple fiber (200 CE Staple blend sheets total)).

Each set of 10 handsheets (combination of a given furnish blend and a given fiber variant) is divided into two sets of 5 handsheets with the intent to target the same average basis weight for each sub-set of 5 handsheets. One sub-set from each condition (combination of furnish blend and fiber variant) is analyzed in Lab 1 and the complementary sub-set is analyzed in Lab 2. In total, 220 handsheets are produced in Lab 1—20 control sheets (100% pulp, 0% CE Staple Fiber), plus 200 CE Staple sheets: 40 handsheets that are either 4% or 16% CE fiber blended with 96% or 84% pulp, and either co-refined or blended after refining—all repeated across 5 variants of CE staple fiber. 210 handsheets are produced in Lab 2—10 control sheets (100% pulp, 0% CE Staple Fiber), plus 200 CE Staple sheets: 40 handsheets that are either 4% or 16% CE fiber blended with 96% or 84% pulp, and either co-refined or blended after refining—all repeated across 5 variants of CE staple fiber.

In total, across both labs, 430 handsheets are developed for analysis.

The test methods described in the tables below, and the test methods described in the examples, and the modifications described to test methods, are employed in the example sets and are also the test methods to determine whether a wet laid product or pulp satisfies a stated property. Lab 1 uses the methods and contains a description of the test instruments as set forth in Table 7, and Lab 2 uses the methods and contains a description of the test instruments as set forth in Table 8. Further descriptions of the methods, where noted, are more fully set out in the examples.

TABLE 7

Lab 1

| Test Method | I. Property - Units | Instrument |
|---|---|---|
| Lab Balance | 12" × 12" handsheet mass - grams | Kern - PBS4200-2M |
| Calculated | Basis Weight - mass/area | N/A |
| T411 - modified | Single sheet Thickness - (mm) | TMI Digital Micrometer (Model 49-56-00-0007) |
| Calculated | Density - (g/cc) | (BW/10000)/(Thickness/10) |
| T543 | Stiffness - Gurley Units (mg-Force) | Gurley Precision Instruments (Model 4171D) |
| Air | | |
| T251 | Air Permeability (ft3/ft2/min at 125 Pa) | Textest Mark4 FX3300 |
| ASTMF316. | Mean Flow Pore size (microns) | PMI Advanced Capillary Flow Porometer Model (ACFP-1020ALS-CC) |
| Water | | |
| Modified T441 om-98 | Cobb Size (g water/m2) | TMI - W&L. E. Gurley - Cobb Size Tester |
| T227 | Canadian Standard Freeness (ml) | Regmed - Model CF-21 |
| Strength | | |
| T494 | Tensile Dry (kg/15 mm) | MTS model C42.503 |
| Toughness | | |
| T403 | Mullen Burst (psig) | Mullen Tester (B F Perkins) S/N: 8215 + 90 + 2815 |
| T414 | Elmendorf Internal Tear Resist (gf) | Elmendorf Tearing Tester (Thwing__Albert) Cat. 60-400 |

TABLE 8

Lab 2

| Test Method | I. Property - Units | Instrument |
|---|---|---|
| Lab Balance | Weight (9" × 9.5") (grams) | Mettler Toledo Balance - PJ300 MB to 0.001 g |
| Calculated | Basis Weight (gsm) | N/A |
| T411 - modified | Thickness (Single Sheet) (mm) | Ono Sokki EG233 with ST-022 Base to 0.001 mm |
| Calculated | Density (g/cc) | (BW/10000)/(Thickness/10) |
| T543 | Stiffness (Gurley Units(mg)) | Gurley Stiffness Tester - Teledyne Gurley Ser. #: NU0509 |
| | Air | |
| T460 | Gurley Air Porosity (seconds/100 ml) @1.22 KPa | W&L. E. Gurley - Gurley-Hill SPS Tester - Model 4190 |
| T251 | Air Permeability (l/min/cm2/bar) | Calculated From Gurley Air Porosity |
| ASTMF316. | Mean Flow Pore size (microns) | Wenman Scientific Inc. - Porometer - Micro -3G |
| | Water | |
| Modified T441 om-98 | Cobb Size (g water/m2) | TMI - W&L. E. Gurley - Cobb Size Tester |
| T227 | Canadian Standard Freeness (ml) | TMI - Schopper Riegler Beating and Freeness Tester ISO 5267-1, Correlates Closely to CSF = Read Value Off Chart |
| Described In The Example Below | Williams Slowness (seconds/100 ml) | Williams Slowness Drainage Tester |
| Described In The Example Below | Water Porosity (seconds/100 ml) | Williams Slowness Drainage Tester |
| Calculated | Water Permeability (ml/min/cm2/bar) | Calculated |
| Modified T441 om-98 | First Cobb Size, Wet Press, and Rewet Cobb Size | TMI - W&L. E. Gurley - Cobb Size Tester |
| | Strength | |
| T494 | Tensile Dry (kg/15 mm) | H. W. Theller, Mini Tensile Tester - Model D |
| | Toughness | |
| T403 | Mullen Burst (psig) | B. F. Perkins and Sons - Mullen Burst Tester (0-120 psig) Model 958-1 |
| T414 | Elmendorf Internal Tear Resist (gf) | Thwing Albert Instrument Co. - Elmendorf Tearing Tester - Catalog 60-400 |

Unless otherwise noted, in all instances the test methods described in the above tables are used as the test methods in the examples. Modifications or further elaboration on the test method are also noted in the examples.

In the bar charts for each figure, a designation of CR means co-refined, and a designation of AA means a Post-Addition case, and 0% CAF means the control as set forth in the tables.

The five variants are all CE staple fibers cut from tow lubed filaments having the following characteristics:

TABLE 9

| Variant | DPF | Cut Length (mm) | Cross Section Shape | Crimps |
|---|---|---|---|---|
| CA1 | 1.8 | 3 | Tri-lobal | Yes |
| CA2 | 1.8 | 3 | Round | Yes |
| CA3 | 1.8 | 6 | Tri-lobal | Yes |
| CA4 | 3 | 3 | Tri-lobal | Yes |
| CA5 | 1.8 | 3 | Tri-lobal | No |

Example 1: Pulp Drainage Analysis: Canadian Standard Freeness and Williams Slowness In this example, the effect of CA staple fibers on the Canadian Standard Freeness (CSF) of the furnish composition is reported. The CSF is a measure of the drainage performance of a pulp slurry.

Lab 1 analyzes the Lab1 finished pulp slurry samples via Canadian Standard freeness test. Lab 2 analyzes the Lab 2 finished pulp slurry samples via Schopper-Riegler Freeness and converts the results to the Canadian Standard Freeness using a TAPPI table.

Differences between Lab 1 and Lab 2 controls are designed to impart different refining energies to the controls. Lab 1 uses a 5 lb. weight while Lab 2 uses a 12 lb. weight (5.5 kg)—both for 15 minutes in a Valley Beater. The additional refining energy at Lab 2 results in lower Canadian Standard Freeness results—particularly in the control samples and the co-refined samples. The results are reported in Table 10.

The CSF value of the control for Method 1, Lab 1 is the average of the 5 control batches produced.

TABLE 10

| | Canadian Standard Freeness | | | | | | | | |
|---|---|---|---|---|---|---|---|---|---|
| | Method 1, Lab 1 | | | | Method 2, Lab 2 | | | | |
| Variant | 0% | 4% CR | 16% CR | 4% PA | 16% PA | 0% | 4% CR | 16% CR | 4% PA | 16% PA |
| Control | 478 | | | | | 252 | | | | |
| CA1 | | 529 | 589 | 530 | 567 | | 270 | 328 | 445 | 560 |
| CA2 | | 520 | 571 | 531 | 579 | | 259 | 324 | 392 | 526 |
| CA3 | | 495 | 515 | 489 | 560 | | 276 | 363 | 447 | 574 |
| CA4 | | 534 | 547 | 523 | 554 | | 260 | 231 | 375 | 459 |
| CA5 | | 471 | 458 | 437 | 491 | | 332 | 375 | 422 | 470 |

The percent increase in CSF of each variant relative to control is reported as follows.

Figure 8:
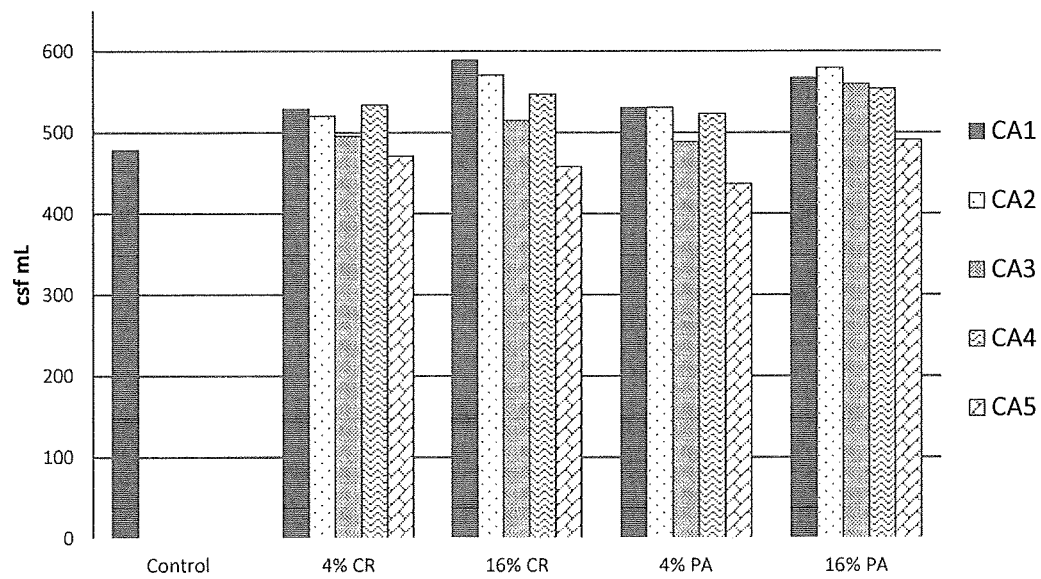
FIGS. 8-39 illustrate in bar chart format the data set from the tables under each corresponding example.

As shown in FIG. 8 for Method 1, Lab 1 at the lighter refining energy, the addition of a variety of CE staple fibers improves the CSF over the controls (no CE staple fibers) in both a co-refined and post addition case. An improvement in CSF over all the controls is not seen for CE staple fibers having a long fiber length at 6 mm (CA3) or if uncrimped (CA5). In the 16% quantity, co-refined CA1 variant using a CE fiber having a DPF of less than 3 (1.8) has a higher CSF value relative to all other co-refined fiber variants, including CA4 at 3 dpf.

Figure 9:
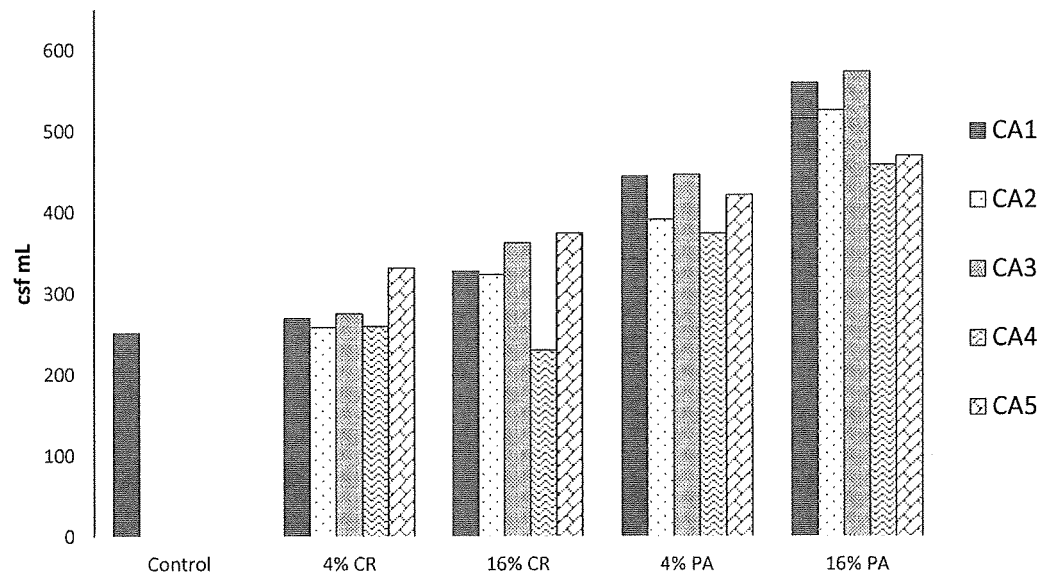

As shown in FIG. 9 for Method 2, Lab 2 where higher refining energy is applied, the control will have a lower CSF than the controls for Method 1, Lab 1. The CE staple fibers generally improve the CSF over the control value, except that the higher DPF co-refined CA4 does not show an improvement in CSF. Co-refining a lower denier fiber as shown with CA1 improves the CSF over the higher denier CA4 fiber at 3 DPF. This is the case even in a post addition condition.

Overall, at both lighter and heavier refining energies, lower DPF fibers are more desirable to improve CSF. While co-refined CA 4 at the 6 mm fiber length has a higher CSF than co-refined CA1 at the 3 mm fiber length with higher refining energy, at the lower refining energies, the performance of CA4 is inferior to that of CA1. Overall, lower fiber cut lengths have a wider processing window to improve CSF.

Example 2: Williams Slowness

The Williams Slowness test method is described as follows:

This method describes a procedure for determining the time (sec.) required for 1000 ml of 0.3% consistency pulp slurry to pass through a known square area of a screen. This method is generally applicable to any wet laid furnish useful in the making of a paper sheet. The Williams Slowness Drainage apparatus, shown in FIG. 39, permits water flow from one side of a Williams Drainage Screen through to the opposite side. The specimen holder is a metal square 10.16 cm×10.16 cm (4 in.×4 in.) which encloses a wire mesh circle 8.26 cm (3.25 in.) in diameter clamped to a flat base plate of the same or bigger size. The area of paper specimen exposed to water flow is 53.56 cm2 or (8.29 in2). The metal parts should preferably be a brass or other corrosion-resistant material.

A 2¹⁵⁄₁₆ in. diameter cork with a cord attached to top is provided to lower and remove from the apparatus cylinder. The timer measures seconds, a graduated 1000 mL cylinder marked in 10 ml increments, a 1000 ml pour spout beaker with handle, and water at a purity of <2 ppm is used.

From each test variant of pulp furnish prepared in accordance with Method 2, a 300 ml aliquot at 1% consistency equivalent to 3 dry grams is taken from the pulp slurry batch.

The volume of pulp slurry withdrawn is added to a blending apparatus, such as a low shear high speed blender manufactured by Breville with blunt agitator blades. The slurry added to the blender is diluted further to 1000 ml to aid in dispersion of the fibers prior to adding the slurry to the Williams Slowness Drainage Apparatus. For instance, if 300 ml of slurry is required to provide 3 grams dry equivalent weight, then 700 ml of additional water is added to dilute the slurry and aid in dispersion during mixing. The slurry is mixed at a low sheer setting for 45 seconds.

The Williams wire mesh screen support holder is stored in water such that it is already wetted. Place the wetted wire mesh screen support holder into the bottom of the Williams Instrument and center. Clamp the hinged Williams 1000 ml cylinder section onto bottom of unit wedging the drainage wire between the cylinder and the drain. Close the vacuum release stop cock and main drain valve on the Williams instrument. The instrument is filled to the 0 ml mark with ~250 ml water. Quickly pour the 1000 ml mixture from the blending apparatus. Open the vacuum release at the back of instrument. As rapidly as possible, open drain handle for the cylinder containing the 1000 ml furnish specimen. When the water meniscus passes the 1000 ml line on the cylinder start the timer immediately. Stop the timer as the water meniscus in cylinder passes the 0 ml water. Record the seconds required to pass 1000 ml of water. The Williams Instrument should not leak water except through drain line.

At the conclusion of the test, the seal at the base of the cylinder is broken, the cylinder drained, and the wire mesh support and specimen are removed. The screen is thoroughly cleaned and store under water.

The Williams Slowness Drainage Rate is recorded as seconds/1000 ml pulp furnish passage and reported in Table 11.

TABLE 11

| Williams Slowness (seconds): Method 2, Lab 2 | | | | | |
|---|---|---|---|---|---|
| Variant | 0% | 4% CR | 16% CR | 4% PA | 16% PA |
| Control | 204 | | | | |
| CA1 | | 135 | 121 | 109 | 60 |
| CA2 | | 136 | 117 | 127 | 88 |
| CA3 | | 131 | 126 | 93 | 51 |
| CA4 | | 175 | 171 | 110 | 69 |
| CA5 | | 141 | 110 | 91 | 77 |

In all cases where CE staple fiber is used, including co-refined conditions, the drainage behavior of the pulp slurry improves relative to the control. In a co-refined condition, the drainage rate of the higher DPF fiber at 3 DPF for CA4 is inferior to other fibers having a DPF of 1.8.

The percentage improvement in drainage rate over the controls is set forth in Table 12 below.

TABLE 12

| | Percent Increase in Drainage Rate Over Control | | | | |
|---|---|---|---|---|---|
| Variant | 0% | 4% CR | 16% CR | 4% PA | 16% PA |
| Control | 204 | | | | |
| CA1 | | 33.8% | 40.6% | 46.5% | 70.6% |
| CA2 | | 33.3% | 42.6% | 37.7% | 56.8% |
| CA3 | | 35.8% | 38.2% | 54.4 | 75% |
| CA4 | | 14.2% | 16.7% | 46.1% | 66.2% |
| CA5 | | 30.8% | 42.1% | 55.4% | 62.2% |

Example 3: Thickness

Thickness is measured in both Lab 1 and Lab 2 by averaging 4 thickness measurements at least 1 inch in from the edge near the midpoint of each side of the handsheet. The thickness of the handsheets is set forth in Tables 13-14.

TABLE 13

| | Thickness (mm) | | | | | | | | |
|---|---|---|---|---|---|---|---|---|---|
| | Method 1, Lab 1 | | | | | Method 2, Lab 1 | | | |
| Variant | 0% | 4% CR | 16% CR | 4% PA | 16% PA | 0% | 4% CR | 16% CR | 4% PA | 16% PA |
| Control | 0.156 | | | | | 0.125 | | | | |
| CA1 | | 0.170 | 0.210 | 0.180 | 0.231 | | 0.131 | 0.157 | 0.138 | 0.179 |
| CA2 | | 0.167 | 0.194 | 0.169 | 0.208 | | 0.134 | 0.150 | 0.148 | 0.154 |
| CA3 | | 0.170 | 0.204 | 0.174 | 0.253 | | 0.129 | 0.147 | 0.136 | 0.185 |
| CA4 | | 0.174 | 0.209 | 0.186 | 0.252 | | 0.134 | 0.157 | 0.152 | 0.184 |
| CA5 | | 0.164 | 0.189 | 0.167 | 0.217 | | 0.132 | 0.149 | 0.141 | 0.168 |

TABLE 14

| | Thickness (mm) | | | | | | | | |
|---|---|---|---|---|---|---|---|---|---|
| | Method 1, Lab 2 | | | | | Method 2, Lab 2 | | | |
| Variant | 0% | 4% CR | 16% CR | 4% PA | 16% PA | 0% | 4% CR | 16% CR | 4% PA | 16% PA |
| Control | 0.175 | | | | | 0.133 | | | | |
| CA1 | | 0.189 | 0.229 | 0.196 | 0.25 | | 0.139 | 0.169 | 0.151 | 0.192 |
| CA2 | | 0.179 | 0.211 | 0.187 | 0.227 | | 0.143 | 0.164 | 0.149 | 0.177 |
| CA3 | | 0.189 | 0.224 | 0.191 | 0.259 | | 0.144 | 0.160 | 0.145 | 0.199 |
| CA4 | | 0.194 | 0.227 | 0.195 | 0.262 | | 0.145 | 0.171 | 0.161 | 0.196 |
| CA5 | | 0.175 | 0.1994 | 0.179 | 0.2296 | | 0.134 | 0.155 | 0.151 | 0.175 |

Figure 10:
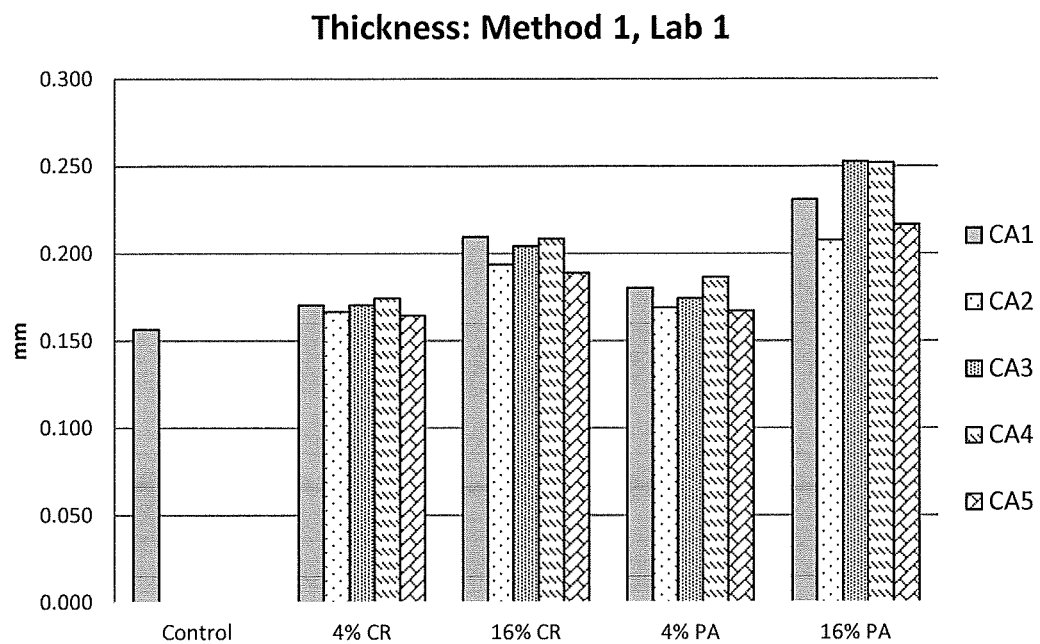
Figure 11:
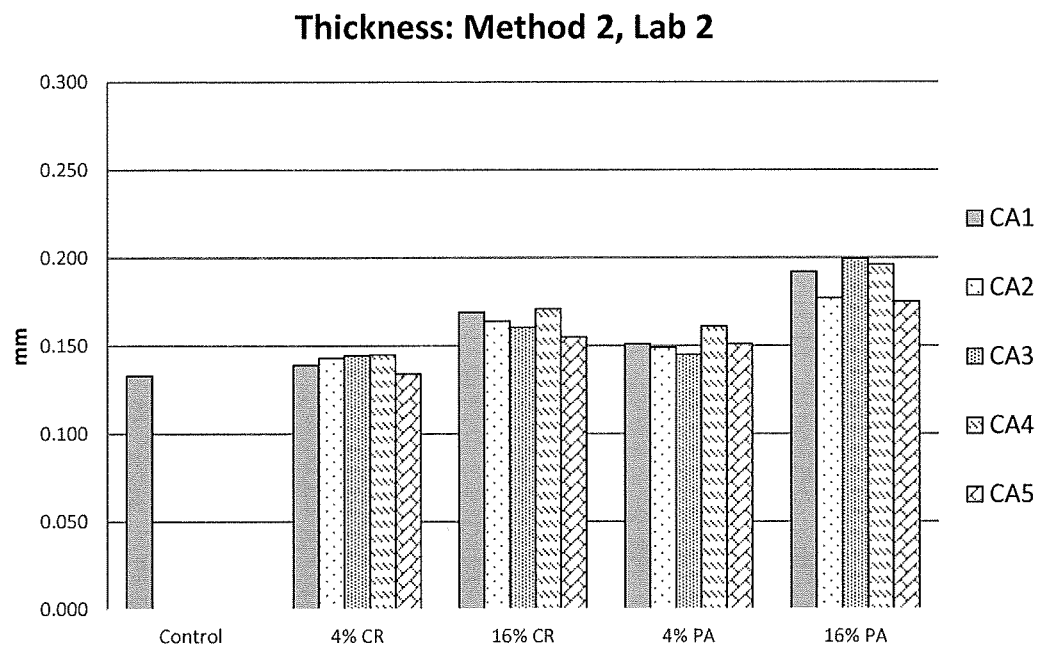

As can be seen from Tables 13-14 and from FIGS. 10-11, with the addition of Adding CE staple fibers, the thickness of the handsheets increases relative to the control without CE staple fibers.

Example 4: Density

In Lab 1 and Lab 2, the basis weight of conditioned samples is measured by weighing the sample handsheets and then converting to a $g/m^2$ basis weight by dividing into the size of the handsheet. The samples are conditioned overnight at TAPPI standard conditions. Thickness is measured as noted above. The $g/m^2$ basis weight is divided by 10,000 to convert to $g/cm^2$ and this value is divided by the thickness (in cm) to yield $g/cm^3$. The results are reported in Tables 15-16.

TABLE 15

| | Density (g/cm³) | | | | | | | | |
|---|---|---|---|---|---|---|---|---|---|
| | Method 1, Lab 1 | | | | Method 2, Lab 1 | | | | |
| Variant | 0% | 4% CR | 16% CR | 4% PA | 16% PA | 0% | 4% CR | 16% CR | 4% PA | 16% PA |
| Control | 0.549 | | | | | 0.645 | | | | |
| CA1 | | 0.499 | 0.392 | 0.480 | 0.358 | | 0.609 | 0.528 | 0.588 | 0.456 |
| CA2 | | 0.512 | 0.440 | 0.497 | 0.406 | | 0.612 | 0.549 | 0.545 | 0.523 |
| CA3 | | 0.500 | 0.409 | 0.475 | 0.344 | | 0.625 | 0.539 | 0.592 | 0.430 |
| CA4 | | 0.508 | 0.401 | 0.464 | 0.342 | | 0.601 | 0.512 | 0.551 | 0.438 |
| CA5 | | 0.514 | 0.450 | 0.517 | 0.391 | | 0.604 | 0.541 | 0.584 | 0.472 |

TABLE 16

| | Density (g/cm³) | | | | | | | | |
|---|---|---|---|---|---|---|---|---|---|
| | Method 1, Lab 2 | | | | Method 2, Lab 2 | | | | |
| Variant | 0% | 4% CR | 16% CR | 4% PA | 16% PA | 0% | 4% CR | 16% CR | 4% PA | 16% PA |
| Control | 0.486 | | | | | 0.602 | | | | |
| CA1 | | 0.449 | 0.355 | 0.438 | 0.333 | | 0.578 | 0.496 | 0.546 | 0.426 |
| CA2 | | 0.476 | 0.399 | 0.454 | 0.371 | | 0.570 | 0.510 | 0.543 | 0.470 |
| CA3 | | 0.449 | 0.376 | 0.438 | 0.332 | | 0.581 | 0.498 | 0.563 | 0.421 |
| CA4 | | 0.453 | 0.371 | 0.440 | 0.326 | | 0.572 | 0.481 | 0.520 | 0.416 |
| CA5 | | 0.481 | 0.427 | 0.476 | 0.370 | | 0.569 | 0.503 | 0.553 | 0.455 |

Figure 12:
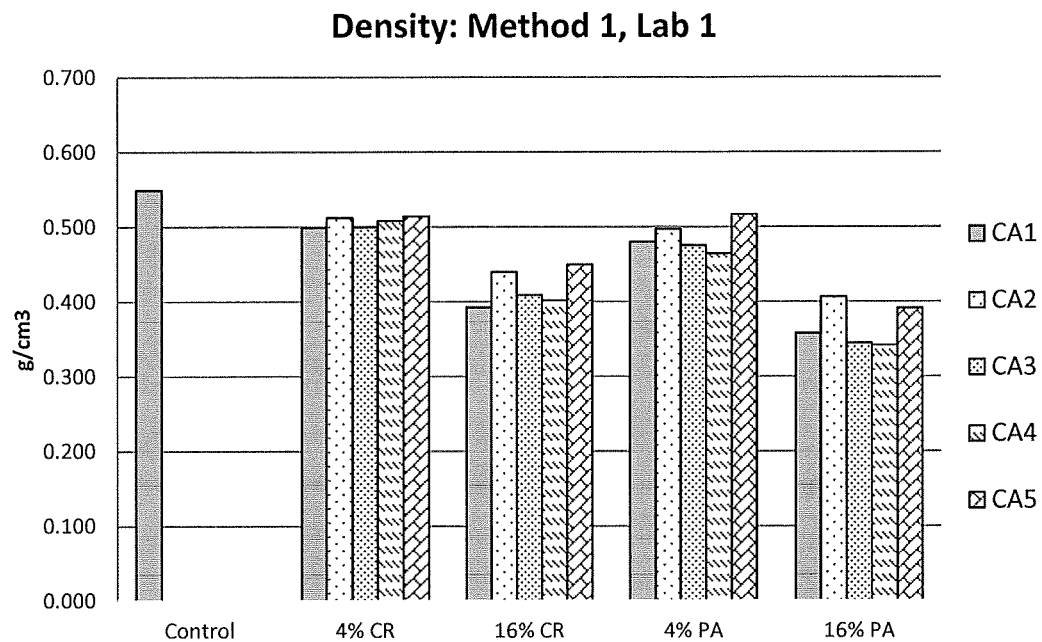
Figure 13:
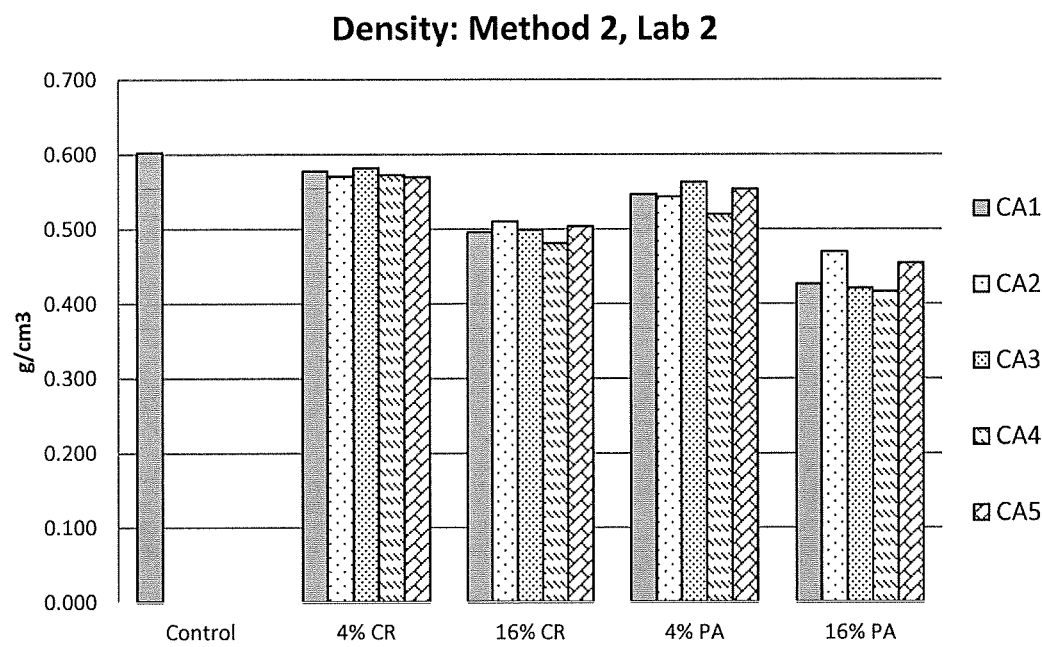

As shown in Tables 15-16 and in FIGS. 12-13, with the addition of CE staple fibers, density of the wet laid handsheet products decreases. The density decrease is also accompanied by an increase in bulk as shown in the thickness data.

Example 5: Stiffness

Handsheets are tested by the Gurley stiffness test method according to TAPPI T543. Lab 1 employs a 2-inch×3.5-inch sample size using a 5-gram weight at a 2-inch spacing from the pivot point. Lab 2 employs a Gurley Stiffness Tester—Teledyne Gurley Ser. #: NU0509 using a 1-inch square sample size using a 50-gram weight at a 2-inch spacing from the pivot point. The stiffness results are reported in Tables 17-18.

TABLE 17

| | Gurley Stiffness (mg) | | | | | | | | |
|---|---|---|---|---|---|---|---|---|---|
| | Method 1, Lab 1 | | | | Method 2, Lab 1 | | | | |
| Variant | 0% | 4% CR | 16% CR | 4% PA | 16% PA | 0% | 4% CR | 16% CR | 4% PA | 16% PA |
| Control | 248.03 | | | | | 194.69 | | | | |
| CA1 | | 238.25 | 247.14 | 282.70 | 267.58 | | 201.80 | 266.70 | 196.47 | 259.59 |
| CA2 | | 224.91 | 248.92 | 264.92 | 244.47 | | 184.02 | 204.47 | 244.47 | 192.02 |
| CA3 | | 265.81 | 241.81 | 234.70 | 312.93 | | 201.80 | 246.25 | 199.13 | 232.03 |
| CA4 | | 265.81 | 275.59 | 255.14 | 301.37 | | 197.35 | 187.58 | 257.81 | 227.58 |
| CA5 | | 226.69 | 252.47 | 269.36 | 287.15 | | 213.36 | 199.13 | 241.80 | 246.25 |

TABLE 18

Gurley Stiffness (mg)

| | Method 1, Lab 2 | | | | Method 2, Lab 2 | | | | |
|---|---|---|---|---|---|---|---|---|---|
| Variant | 0% | 4% CR | 16% CR | 4% PA | 16% PA | 0% | 4% CR | 16% CR | 4% PA | 16% PA |
| Control | 186.8 | | | | | 131.86 | | | | |
| CA1 | | 193.5 | 200.7 | 185.2 | 187.9 | | 167.84 | 241.52 | 194.04 | 244.20 |
| CA2 | | 214.6 | 194 | 187.9 | 215.7 | | 179.80 | 205.10 | 182.00 | 217.60 |
| CA3 | | 190.7 | 191.8 | 182.4 | 223.5 | | 228.22 | 204.24 | 237.54 | 297.48 |
| CA4 | | 170.14 | 197.94 | 194.36 | 194.04 | | 250.90 | 228.70 | 266.40 | 208.70 |
| CA5 | | 176.26 | 179.44 | 175.14 | 224.08 | | 158.50 | 184.30 | 215.30 | 230.90 |

Figure 14:
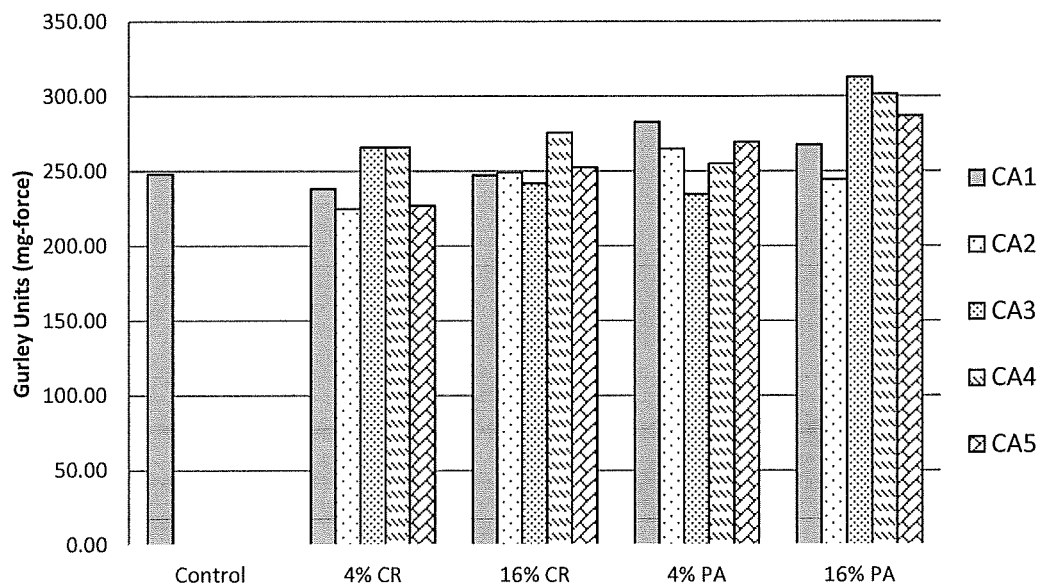
Figure 15:
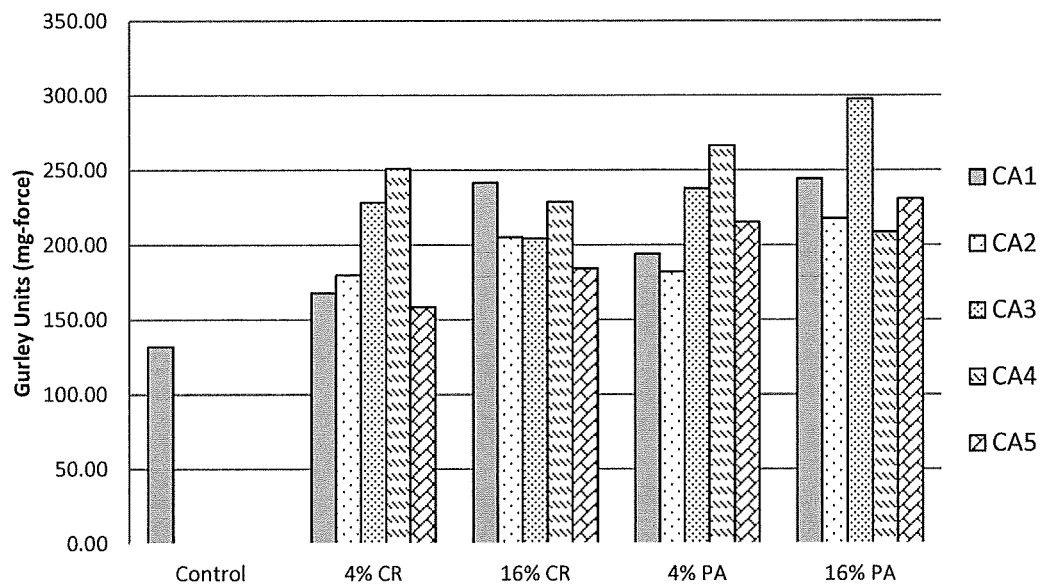

Stiffness is a function of sheet thickness, and as thickness/bulk improves, the stiffness also improves relative to the controls by the addition of CE staple fibers as reported in Tables 17-18 and as can be seen in FIGS. 14 and 15. The improvement in stiffness by the addition of CE staple fibers is more dramatic in a highly refined condition as shown in FIG. 14.

Example 6: Air Permeability

The air permeability of the handsheets is tested by both Labs 1 and 2. The Gurley Air Permeability report of Lab 2 in liters/min/cm$^2$/bar is calculated from experimental values obtained in a Gurley Air Porosity TAPPI test by converting seconds/100 ml/KPa through a 1-inch square orifice to l/min/cm$^2$/bar.

Tables 19-21 report the air permeability values.

TABLE 19

Air Permeability TexTest (ft$^3$/ft$^2$/min)

| | Method 1, Lab 1 | | | | Method 2, Lab 1 | | | | |
|---|---|---|---|---|---|---|---|---|---|
| Variant | 0% | 4% CR | 16% CR | 4% PA | 16% PA | 0% | 4% CR | 16% CR | 4% PA | 16% PA |
| Control | 0.54 | | | | | 0.04 | | | | |
| CA1 | | 0.91 | 3.75 | 1.20 | 5.77 | | 0.05 | 0.12 | 0.08 | 0.44 |
| CA2 | | 0.79 | 1.83 | 0.96 | 3.88 | | 0.08 | 0.11 | 0.16 | 0.20 |
| CA3 | | 0.65 | 1.54 | 0.74 | 5.00 | | 0.06 | 0.12 | 0.08 | 0.42 |
| CA4 | | 0.50 | 1.56 | 0.75 | 4.60 | | 0.05 | 0.10 | 0.08 | 0.32 |
| CA5 | | 0.38 | 0.66 | 0.35 | 2.00 | | 0.05 | 0.08 | 0.07 | 0.23 |

TABLE 20

Gurley Porosity (seconds/100 ml) at 1.22 KPa

| | Method 1, Lab 2 | | | | Method 2, Lab 2 | | | | |
|---|---|---|---|---|---|---|---|---|---|
| Variant | Control | 4% CR | 16% CR | 4% PA | 16% PA | Control | 4% CR | 16% CR | 4% PA | 16% PA |
| CA1 | 7.40 | 4.20 | 1.40 | 2.80 | 0.50 | 88.20 | 90.60 | 34.20 | 52.20 | 8.40 |
| CA2 | | 4.60 | 1.80 | 3.80 | 1.00 | | 53.20 | 39.20 | 47.00 | 16.20 |
| CA3 | | 6.20 | 2.00 | 4.80 | 0.80 | | 76.20 | 22.60 | 54.80 | 10.20 |
| CA4 | | 7.20 | 2.40 | 4.80 | 0.67 | | 87.20 | 51.20 | 60.40 | 14.20 |
| CA5 | | 9.80 | 5.40 | 10.80 | 1.40 | | 90.20 | 60.40 | 61.20 | 20.00 |

TABLE 21

| | Air Permeability Gurley (liters/min/cm²/bar) | | | | | | | | |
|---|---|---|---|---|---|---|---|---|---|
| | Method 1, Lab 2 | | | | Method 2, Lab 2 | | | | |
| Variant | 0% | 4% CR | 16% CR | 4% PA | 16% PA | 0% | 4% CR | 16% CR | 4% PA | 16% PA |
| Control | 10.69 | | | | | 0.86 | | | | |
| CA1 | | 18.30 | 60.98 | 69.88 | 152.46 | | 0.85 | 2.32 | 1.49 | 9.21 |
| CA2 | | 16.77 | 45.74 | 20.33 | 76.23 | | 1.45 | 2.00 | 1.64 | 4.91 |
| CA3 | | 12.63 | 38.12 | 16.01 | 106.49 | | 1.01 | 3.39 | 1.40 | 7.52 |
| CA4 | | 10.71 | 33.03 | 16.01 | 121.74 | | 0.89 | 1.50 | 1.28 | 5.61 |
| CA5 | | 7.85 | 14.23 | 7.07 | 60.98 | | 0.85 | 1.28 | 1.26 | 3.89 |

Figure 16:
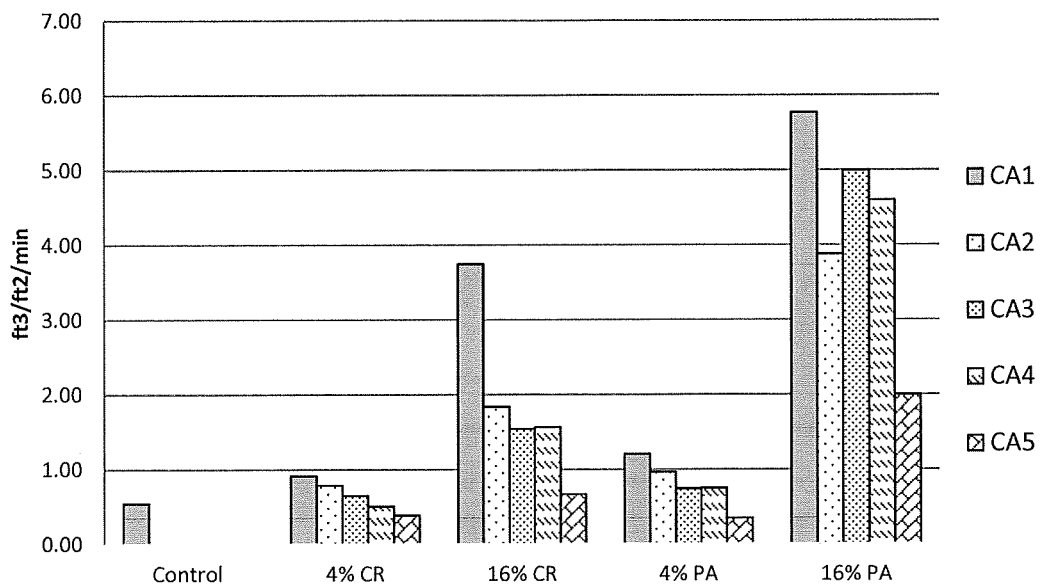

As shown in Table 19 and as illustrated in FIG. 16, under Method 1, Lab 1 conditions, the air permeability of handsheets containing CA1 fibers is dramatically increased over any other fibers CA2-5. The increase in air permeability is far more than one would expect due to the difference in density. For example, CA 1 and CA 4 have similar densities, shape, and DPF, yet the air permeability of CA 1 is significantly better than that of CA 4, leading one to conclude that the improvement in air permeability (the CA1 case) is not solely a function of density as would be expected from a typical wet laid pulp. This effect can also be seen in the PA cases. PA CA 1 has a higher air permeability than PA CA 4 or PA CA5 even though PA CA1 has a higher density than CA 4 or 5.

Figure 17:
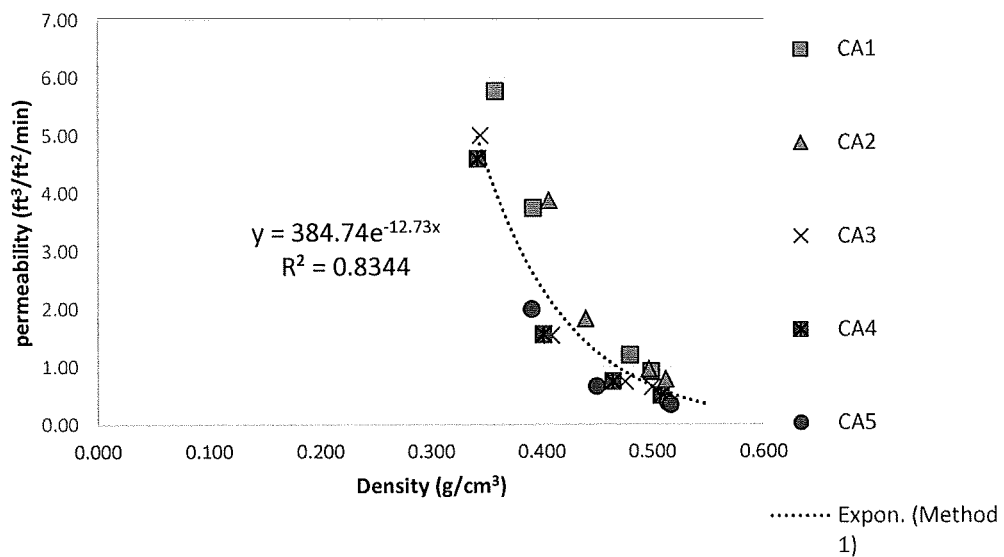

These effects are more readily visible as shown in FIG. 17 which looks at air permeability as a function of density for Method 1, Lab 1. One would expect a fairly linear relationship between density and air permeability. A first observation is that the linear relationship between density and air permeability is now broken and is better defined as an exponential relationship with the use of the some of the CE staple fibers.

A second observation is that the CA1 staple fibers are all to the right of the predicted curve, meaning that at a given density, the air permeability of the CA1 fibers are higher than predicted even on an exponential curve. Notably, the higher 3 DPF fiber case of CA4 has lower air permeability that what is predicted. While the round fibers of CA2 also have a higher than predicted air permeability at a given density, as shown in FIG. 16, the absolute air permeability values of CA1 fibers is far superior to those of CA2.

We also observe that one skilled in the art would expect a higher DPF fiber like a 3 DPF CA4 fiber to provide a superior air permeability by opening up larger channels, yet, the lower 1.8 DPF fiber CA1 provides a superior air permeability to the higher DPF fiber CA4.

Figure 18:
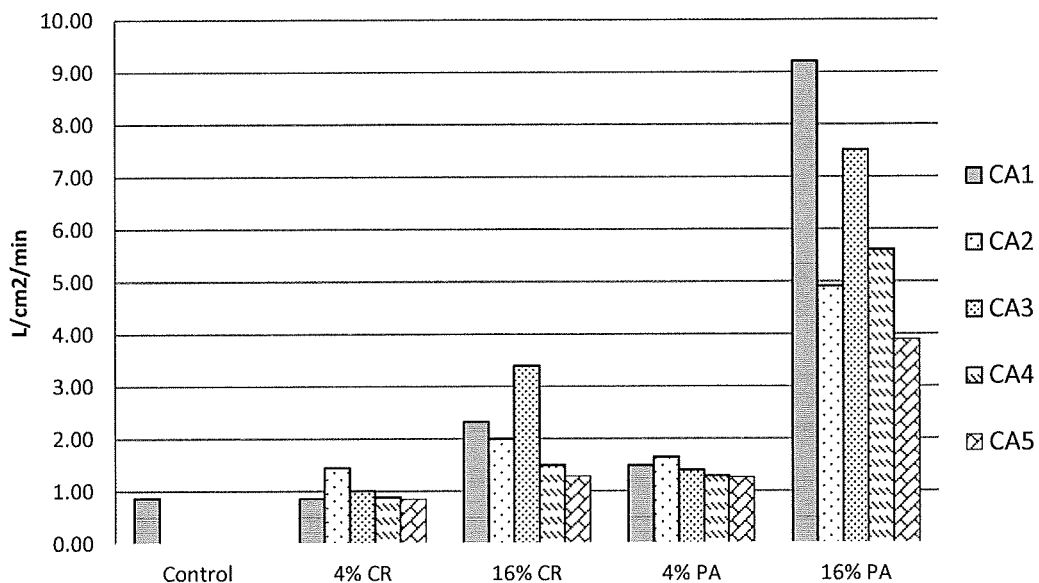
Figure 19:
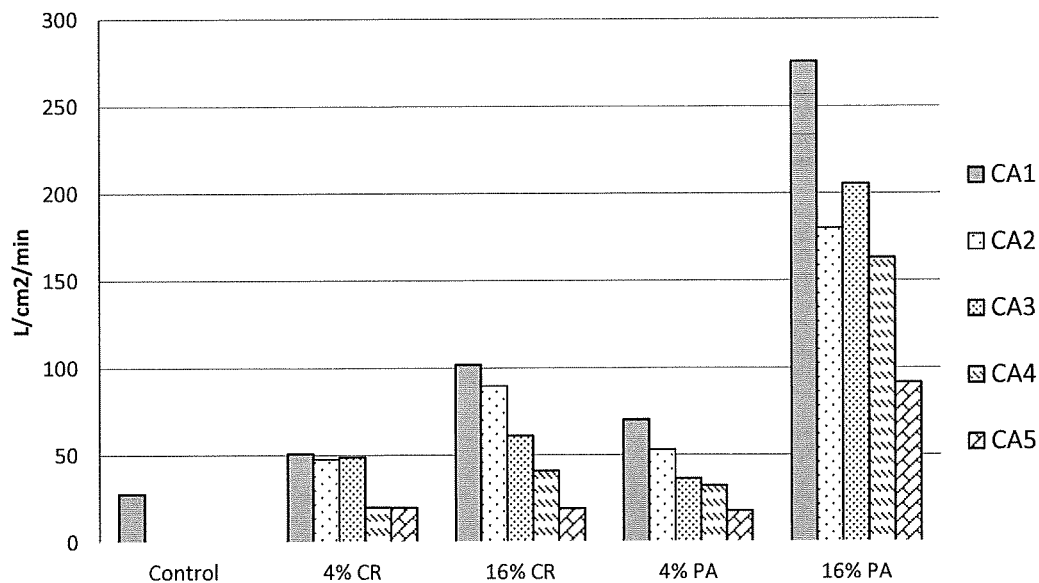
Figure 20:
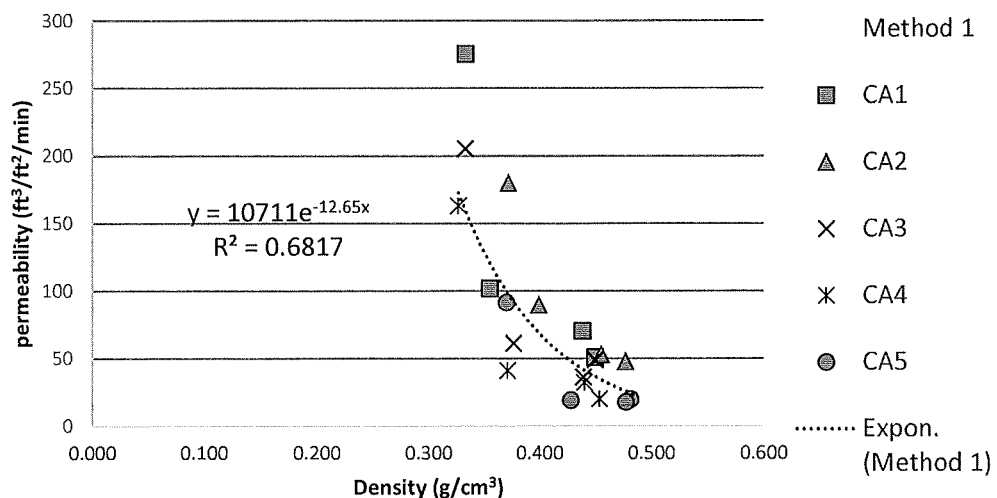
Figure 21:
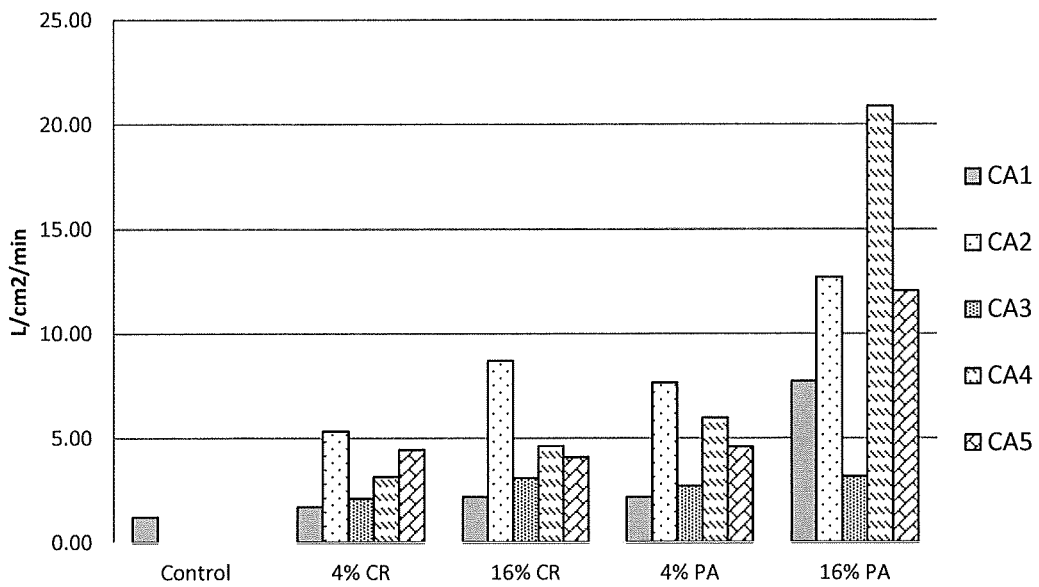

In the highly refined case of Method 2, Lab 2, the effect of CE staple fibers is an improvement over the control, and the effect of CA 1 is not superior to all other CA fiber cases as shown in FIG. 18 and Table 21. However, the performance of the CA fibers in this refining realm are not a concern where air permeability is a target performance factor, such as when making tissues, toweling, and air filters, as one would employ a lighter degree of refining closer to that of Method 1, Lab 1 for these kinds of products.

Example 7: Water Permeability

Water permeability is not measured at Lab 1. Water permeability is calculated from water porosity, which is measured at Lab 2. The procedure for measuring water porosity, is as follows:

The method describes a procedure for determining the quantity of water which passes through a known square area of a formed and dried sheet of paper with known hydraulic head. Water porosity is defined as the time in seconds for 100 ml of water to pass through a sheet of paper supported on a Williams Drainage Screen under specified conditions in a Williams Slowness Drainage Instrument. The Williams Slowness Drainage apparatus is the same apparatus as described above, which permits water flow from one side of the paper sheet specimen through to the opposite side. The specimen holder comprises a metal square 10.16 cm×10.16 cm (4 in.×4 in.) which encloses a wire mesh circle 8.26 cm (3.25 in.) in diameter clamped to a flat base plate of the same or bigger size. The area of paper specimen exposed to water flow is 53.56 cm2 or (8.29 in2). On the base plate is a rubber mat, larger than the outside dimensions of the circular wire mesh, on which the specimen is clamped. Above the base plate is a graduated glass cylinder 10 inches high by 3 inches in diameter. A 2$^{15}$/$_{16}$ in. diameter cork with a cord is attached to top to provide lowering and removal from the apparatus cylinder. The graduated 1000 ml cylinder is marked in 10 ml increments. Water is used a pure at 2 ppm.

A sample of the handsheet (paper) is obtained in accordance with TAPPI T 400 "Sampling and Accepting a Single Lot of Paper, Paperboard, Containerboard, or Related Product." From each test unit, specimens are cut to a size slightly greater than the outside dimensions of the base of the wire mesh metal square 10.16 cm×10.16 cm (4 in.×4 in.). The specimens are free from folds, wrinkles, or other blemishes not commonly inherent in the paper. The specimens are condition by dropping them quickly into pure water in the 1000 ml beaker for 5 minutes, removed, and placed on the wetted Williams wire mesh screen support holder. The wetted wire mesh screen is placed on a support holder into the bottom of the Williams Instrument and center. A Williams 1000 ml cylinder section is clamped onto bottom of unit wedging the specimen between cylinder and drain. A large cork is gently lowered onto surface of the specimen to prevent water disruption of sheet. 1100 mL of water (23±1 C (73.4 F)) is poured into the cylinder onto the center of the cork. The cork is removed from the cylinder after delivery of 900 ml of water. The vacuum release is opened at the back of instrument. As rapidly as possible, the drain handle is opened for the cylinder full of water. When the water meniscus passes the 1000 ml line on the cylinder, the stopwatch is started immediately. The stopwatch is stopped as the water meniscus in cylinder passes the 900 ml water mark. The seconds required to pass 100 ml of water are recorded. The Williams Instrument should not leak water except through drain line. The seal at the base of cylinder is broken, the cylinder drained and the wire mesh support and specimen are removed. The specimen can be saved and air dried for later thickness measurement of rewet thickness response. The water porosity is recorded as seconds/100 ml water passage. The water permeability is calculated from water porosity by converting seconds/100 ml through 53.56 cm2 at a pressure of 2.13 kPa. The water permeability is reported in Table 22.

TABLE 22

Water Permeability (liters/min/cm$^2$/bar)

| | | Method 1, Lab 2 | | | | Method 2, Lab 2 | | | |
|---|---|---|---|---|---|---|---|---|---|
| Variant | Control | 4% CR | 16% CR | 4% PA | 16% PA | Control | 4% CR | 16% CR | 4% PA | 16% PA |
| Control | 27.795 | | | | | 1.22 | | | | |
| CA1 | | 50.807 | 101.785 | 70.377 | 275.53 | | 1.71 | 2.20 | 2.19 | 7.72 |
| CA2 | | 47.68 | 89.74 | 52.87 | 179.98 | | 5.34 | 8.71 | 7.66 | 12.70 |
| CA3 | | 48.98 | 61.21 | 36.34 | 205.39 | | 2.09 | 3.10 | 2.71 | 3.18 |
| CA4 | | 20.075 | 41.011 | 32.279 | 163.038 | | 3.16 | 4.63 | 5.98 | 20.88 |
| CA5 | | 19.88 | 19.23 | 17.84 | 91.55 | | 4.45 | 4.08 | 4.59 | 12.05 |

Similar conclusions can be reached for water permeability as noted above in Example 6 for air permeability, and the same fiber, CA1, can be used to obtain improved air and water permeability at a given density. In addition, we note that in the highly refined condition, the round fiber performance of CA2 is superior to other CA fiber cases. This is an instance where a round fiber can be useful in applications where higher refining is needed, such as higher-pressure liquid filtration.

Example 8: Dry Tensile Strength

Lab 1 and Lab 2 perform the dry tensile strength test without modification of the TAPPI standards. The results are reported in Tables 23-24.

Figure 22:
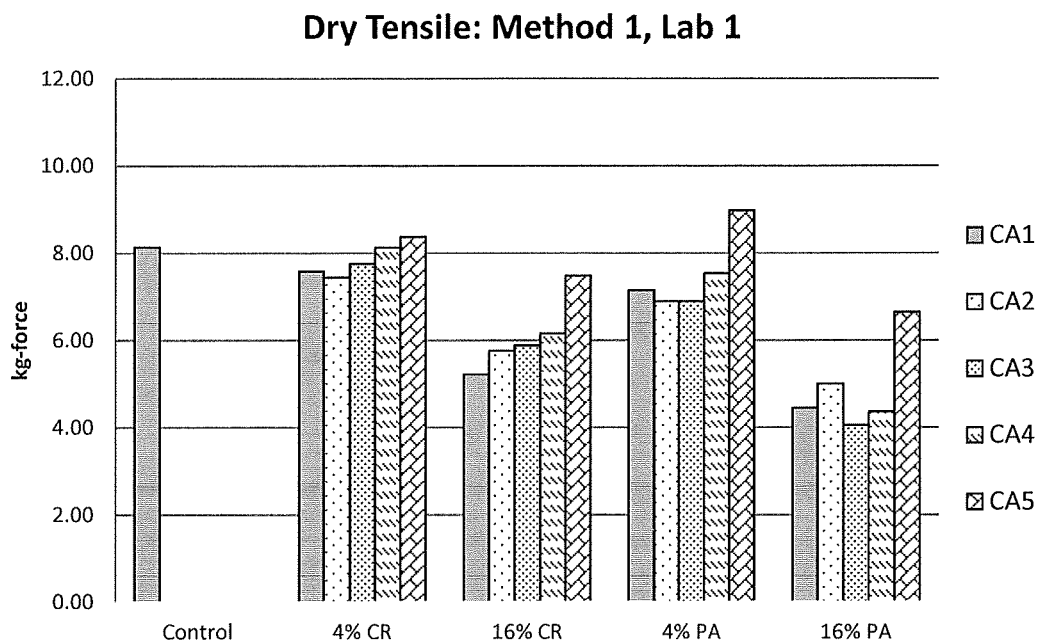

One expects that with the addition of a synthetic fiber, the dry tensile strength of a wet laid product such as a handsheet is decreased relative to a 100% cellulose product. As shown in Table 23 and FIG. 22, the loss in tensile using a co-refined composition is less than an add after case, except for CA5 case.

Figure 23:
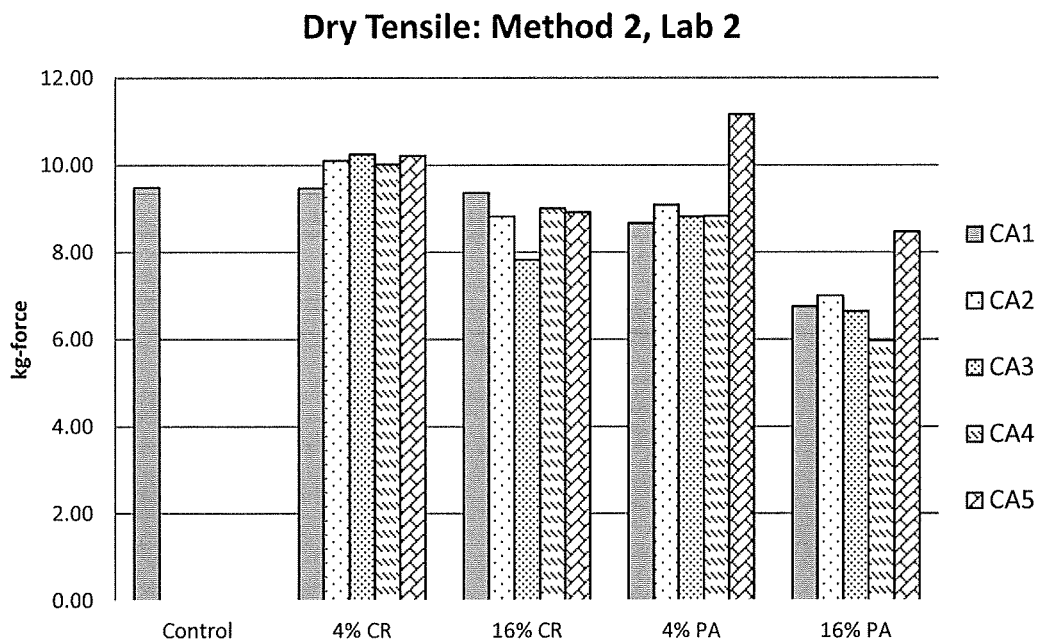

A surprising result is that a condition exists at which the tensile strength of a 100% cellulose composition can be increased with the addition of a CE staple fiber. As shown in Table 24 and FIG. 23, at high refining energy (Method 2), and low amounts of co-refined CE staple (e.g. 4%), the tensile strength can be increased relative to a 100% cellulose composition control. Further, this increase in dry tensile strength when co-refining low amounts of CE staple fiber is observed even through the CA variants have a lower density that the 100% cellulose control.

Example 9: Burst Strength

Lab 1 and Lab 2 perform the Mullen Burst Strength without modification of the TAPPI standards. The results are reported in Tables 25-26.

TABLE 23

Dry Tensile Strength (kg-force/15 mm)

| | | Method 1, Lab 1 | | | | Method 2, Lab 1 | | | |
|---|---|---|---|---|---|---|---|---|---|
| Variant | Control | 4% CR | 16% CR | 4% PA | 16% PA | Control | 4% CR | 16% CR | 4% PA | 16% PA |
| Control | 8.13 | | | | | 9.68 | | | | |
| CA1 | | 7.58 | 5.22 | 7.15 | 4.45 | | 10.57 | 9.25 | 9.42 | 6.40 |
| CA2 | | 7.44 | 5.76 | 6.89 | 5.01 | | 10.49 | 8.95 | 9.38 | 7.28 |
| CA3 | | 7.76 | 5.88 | 6.89 | 4.05 | | 10.68 | 8.52 | 8.38 | 5.83 |
| CA4 | | 9.40 | 8.12 | 6.15 | 7.53 | | 10.34 | 8.74 | 9.34 | 6.09 |
| CA5 | | 8.38 | 7.48 | 8.98 | 6.64 | | 11.00 | 9.93 | 11.06 | 9.17 |

TABLE 24

Dry Tensile Strength (kg-force/15 mm)

| | | Method 1, Lab 2 | | | | Method 2, Lab 2 | | | |
|---|---|---|---|---|---|---|---|---|---|
| Variant | Control | 4% CR | 16% CR | 4% PA | 16% PA | Control | 4% CR | 16% CR | 4% PA | 16% PA |
| CA1 | 8.08 | 7.27 | 5.52 | 7.37 | 4.42 | 9.48 | 9.47 | 9.36 | 8.66 | 6.75 |
| CA2 | | 7.57 | 6.00 | 7.55 | 5.58 | | 10.10 | 8.82 | 9.08 | 7.00 |
| CA3 | | 7.70 | 6.12 | 7.06 | 4.05 | | 10.24 | 7.82 | 8.81 | 6.64 |
| CA4 | | 8.20 | 6.10 | 7.46 | 4.49 | | 10.02 | 9.00 | 8.83 | 5.97 |
| CA5 | | 8.90 | 7.39 | 9.66 | 6.84 | | 10.21 | 8.91 | 11.16 | 8.46 |

TABLE 25

Mullen Burst Strength (psig)

| | | Method 1, Lab 1 | | | | | Method 2, Lab 1 | | | |
|---|---|---|---|---|---|---|---|---|---|---|
| Variant | Control | 4% CR | 16% CR | 4% PA | 16% PA | Control | 4% CR | 16% CR | 4% PA | 16% PA |
| Control | 70.8 | | | | | 60.0 | | | | |
| CA1 | | 63.4 | 40.0 | 59.1 | 33.0 | | 74.4 | 67.6 | 64.0 | 44.4 |
| CA2 | | 63.5 | 48.2 | 59.5 | 36.8 | | 77.2 | 62.8 | 64.8 | 47.6 |
| CA3 | | 66.2 | 49.0 | 60.0 | 32.2 | | 75.6 | 58.4 | 56.4 | 35.6 |
| CA4 | | 80.3 | 68.4 | 46.2 | 60.2 | | 73.2 | 61.6 | 70.8 | 40.8 |
| CA5 | | 72.2 | 60.4 | 72.2 | 51.2 | | 80.0 | 66.0 | 82.0 | 62.0 |

TABLE 26

Mullen Burst Strength (psig)

| | | Method 1, Lab 2 | | | | | Method 2, Lab 2 | | | |
|---|---|---|---|---|---|---|---|---|---|---|
| Variant | Control | 4% CR | 16% CR | 4% PA | 16% PA | Control | 4% CR | 16% CR | 4% PA | 16% PA |
| Control | 70.2 | | | | | 82.1 | | | | |
| CA1 | | 64.3 | 41.5 | 60.4 | 34.4 | | 85.2 | 80.6 | 75.6 | 50.0 |
| CA2 | | 71.1 | 47.0 | 61.6 | 39.4 | | 80.2 | 76.1 | 75.2 | 47.1 |
| CA3 | | 80.5 | 55.0 | 62.4 | 33.9 | | 91.9 | 63.1 | 76.2 | 37.2 |
| CA4 | | 67.6 | 53.0 | 63.4 | 36.2 | | 81.1 | 73.8 | 69.3 | 46.2 |
| CA5 | | 74.4 | 55.2 | 81.4 | 58.6 | | 84.8 | 74.5 | 88.7 | 68.1 |

Figure 24:
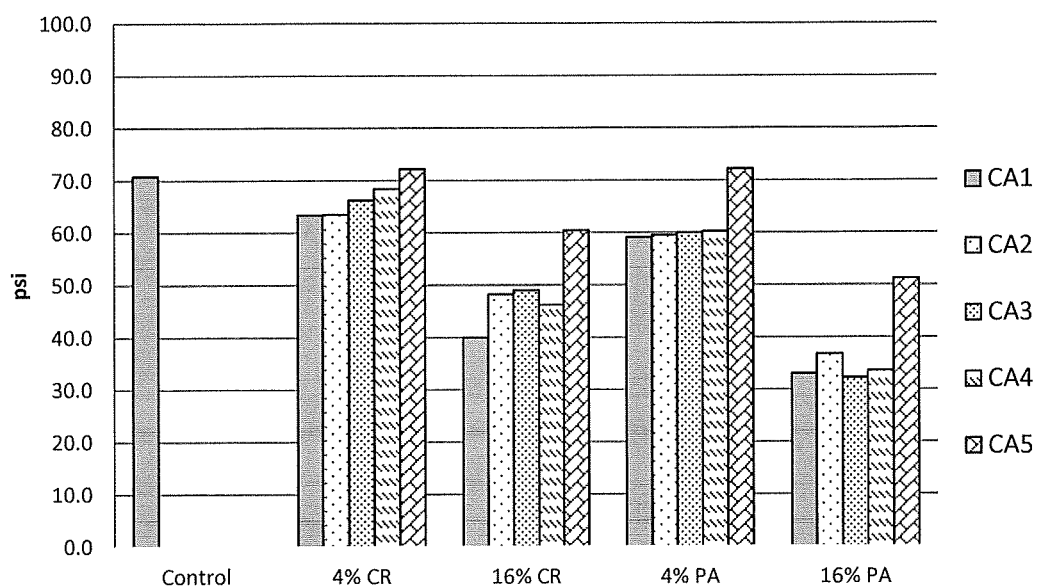
Figure 25:
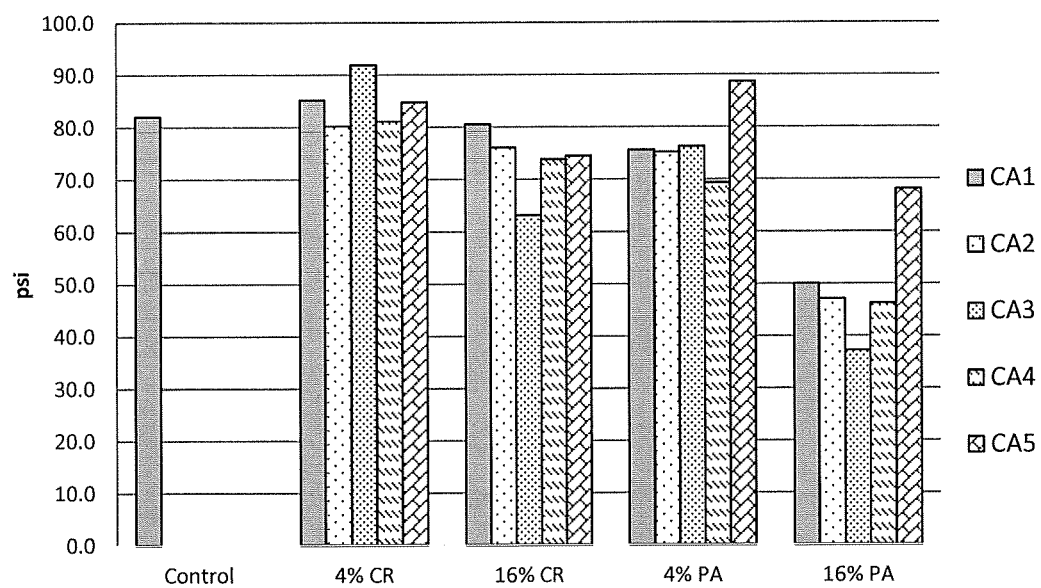

The observations and trends with respect to dry tensile strength generally also apply to the results of the Mullen Burst Strength tests, with the exception of CA5 fibers. The results are more apparent in FIGS. 24 and 25.

Example 10: Tear Strength

The Elmendorf Tear Strength tests are performed differently between Lab 1 and Lab 2.

In Lab 1, 1 sample is taken from each of 5 handsheets, the 5 samples are stacked, 3 tear tests on each stack of 5 are performed, and each of the three results are divided by 5, and those results are averaged together as a first set. This method is repeated on the same handsheets for a second set.

In Lab 2, 3 samples are taken from one handsheet, the 3 samples are stacked and a tear test is performed on the stack, the result is divided by 3, and the result is recorded. The method is repeated on each of the remaining handsheets out of a total of 5 handsheets.

The Elmendorf Tear Strength values obtained are reported in Tables 27-28.

TABLE 27

Elmendorf Tear Strength (gram-force)

| | | Method 1, Lab 1 | | | | | Method 2, Lab 1 | | | |
|---|---|---|---|---|---|---|---|---|---|---|
| Variant | Control | 4% CR | 16% CR | 4% PA | 16% PA | Control | 4% CR | 16% CR | 4% PA | 16% PA |
| Control | 134.0 | | | | | 99.3 | | | | |
| CA1 | | 146.7 | 159.3 | 153.7 | 172.3 | | 100.3 | 107.3 | 113.0 | 131.3 |
| CA2 | | 143.0 | 144.3 | 137.0 | 163.7 | | 107.3 | 114.7 | 111.0 | 116.3 |
| CA3 | | 137.7 | 152.0 | 136.0 | 191.0 | | 110.0 | 102.7 | 109.3 | 137.3 |
| CA4 | | 129.0 | 147.3 | 148.7 | 142.3 | | 93.3 | 98.7 | 112.3 | 129.0 |
| CA5 | | 128.0 | 135.7 | 125.0 | 141.3 | | 98.3 | 101.3 | 110.7 | 114.0 |

TABLE 28

| | Elmendorf Tear Strength (gram-force) | | | | | | | | |
|---|---|---|---|---|---|---|---|---|---|
| | Method 1, Lab 2 | | | | Method 2, Lab 2 | | | | |
| Variant | Control | 4% CR | 16% CR | 4% PA | 16% PA | Control | 4% CR | 16% CR | 4% PA | 16% PA |
| Control | 109.0 | | | | | 108.0 | | | | |
| CA1 | | 117.0 | 121.0 | 123.0 | 132.0 | | 100.0 | 106.0 | 120.0 | 128.0 |
| CA2 | | 117.0 | 121.0 | 121.0 | 122.0 | | 108.0 | 108.0 | 98.0 | 124.0 |
| CA3 | | 132.0 | 126.0 | 126.0 | 152.0 | | 102.0 | 102.0 | 108.0 | 134.0 |
| CA4 | | 134.0 | 123.3 | 134.0 | 148.6 | | 100.0 | 100.0 | 120.0 | 122.0 |
| CA5 | | 106.0 | 117.4 | 113.3 | 120.0 | | 94.0 | 96.0 | 100.0 | 104.0 |

Figure 26:
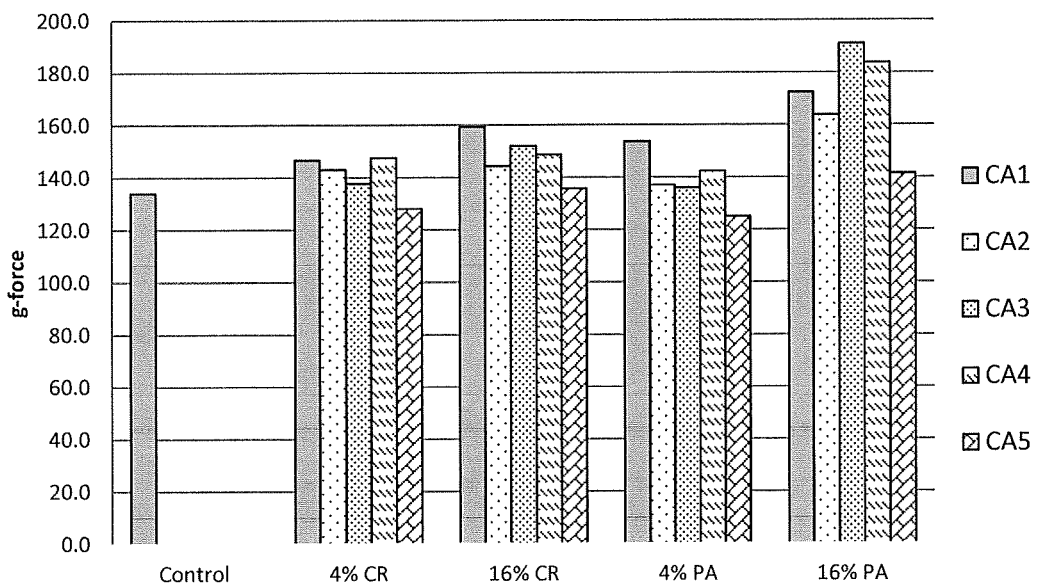
Figure 27:
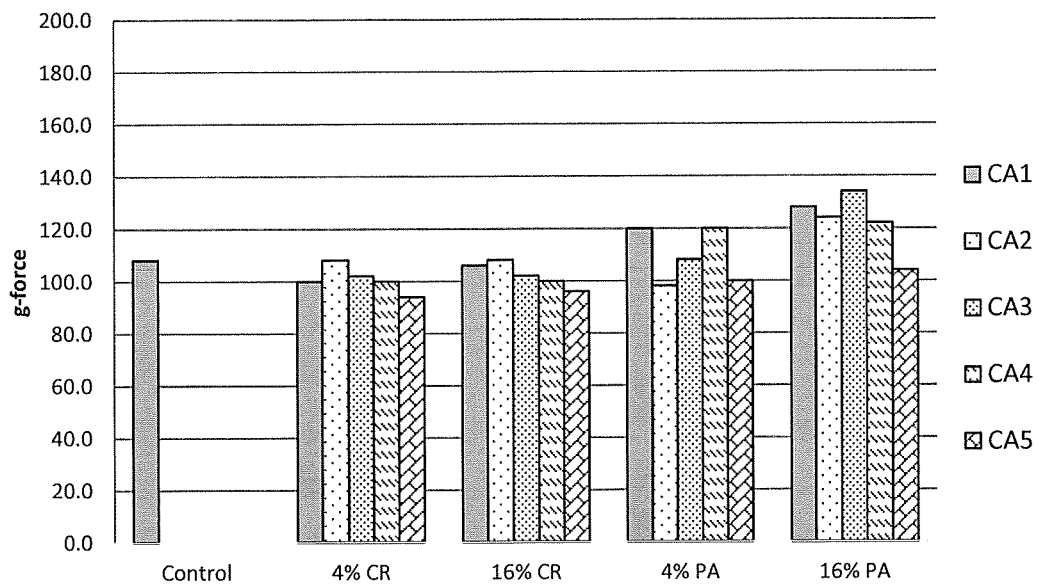

One would expect that a longer fiber length has a better tear strength. However, as can be more readily seen in FIG. 26, the CA1 variant having a 3 mm fiber length has a better tear strength in a co-refined condition than the longer 6 mm CA 4 variant. This would not be as expected. This result is also observable at the 16% condition when more highly refined as shown in FIG. 27.

Further, as shown further below, the expectation of tear is a function of fiber length. In a co-refined condition where the fiber lengths of CA1-5 variants are substantially the same, nevertheless, CA1 has a better tear resistance than CA5 and most other CA variants.

Example 11: Absorbance (Cobb Size)

Lab 1 and Lab 2 employ the following Cobb size modification to the TAPPI T441 om-98 standard, modified as follows:

Both Labs employ a modified TAPPI T 441 om-98 method to determine water absorptiveness by the Cobb test. This method is modified to be applicable to unsized paper, paperboard and corrugated fiberboard. The modifications to or further details under the TAPPI T 441 test standard are noted as follows:

The water absorption apparatus is a W.&L.E. Gurley-Cobb Size Tester, Troy, N.Y., USA. The metal roller is stainless steel, having a smooth face 20 cm wide and weighing 10.0±0.5 kg (22+1.1 lb) for Lab 2 and weighing 13.0±0.5 kg (28.6+1.1 lb) for Lab 1. The timer/stopwatch is a Marcel & Cie having a reading in seconds. The 100 ml graduated cylinder is a Pyrex cylinder. The balance is a Mettler Toledo balance. Blotting paper is made by Ahlstrom. From each test unit, specimens are cut to a size slightly greater than the outside dimensions of the ring of the apparatus, i.e., circles 13.34 cm (5.25 in.) in diameter. For soft-sized papers (absorbing more than 100 g/m (0.22 lb/10.76 ft)), at least 2 specimens per variant are used.

Leakage between the ring and the specimen cannot be prevented when CE staple fibers are included, and therefore, the specimen samples are cut exactly the size of the circular gasket to hold the sample in place. 100 mL of water (23±1 C (73.4 F)) are poured into the ring as rapidly as possible to give a head of 1.0±0.1 cm (0.39 in.). The stopwatch is started immediately. At 15±2 seconds of the predetermined test period, the water is poured quickly from the ring, (circular sample specimens will overcome under gasket wetting impact). Samples will show leakage under the holding gasket and should be completely wetted. Liquid will pass through the sheet to the rubber mat on a highly absorbent sheet in a very short time. Unless otherwise reported, an exposure period of 15 s on a single-sheet thickness is employed.

Results are reported below in Tables 29-30.

TABLE 29

| | Cobb Size (g/m$^2$) | | | | | | | | |
|---|---|---|---|---|---|---|---|---|---|
| | Method 1, Lab 1 | | | | | Method 2, Lab 1 | | | |
| Variant | Control | 4% CR | 16% CR | 4% PA | 16% PA | Control | 4% CR | 16% CR | 4% PA | 16% PA |
| Control | 169.35 | | | | | 112.00 | | | | |
| CA1 | | 148.90 | 130.85 | 140.40 | 136.75 | | 115.05 | 135.75 | 116.85 | 129.30 |
| CA2 | | 132.90 | 127.70 | 121.15 | 123.75 | | 127.45 | 128.70 | 136.65 | 122.50 |
| CA3 | | 130.85 | 136.90 | 133.20 | 141.25 | | 116.55 | 122.30 | 110.70 | 125.95 |
| CA4 | | 130.65 | 121.40 | 135.05 | 127.65 | | 107.90 | 117.70 | 127.55 | 125.70 |
| CA5 | | 131.25 | 130.20 | 130.85 | 123.35 | | 114.95 | 114.15 | 116.90 | 127.15 |

TABLE 30

| | Cobb Size (g/m²) | | | | | | | | |
|---|---|---|---|---|---|---|---|---|---|
| | Method 1, Lab 2 | | | | Method 2, Lab 2 | | | | |
| Variant | Control | 4% CR | 16% CR | 4% PA | 16% PA | Control | 4% CR | 16% CR | 4% PA | 16% PA |
| Control | 156.3 | | | | | 115.25 | | | | |
| CA1 | | 163.1 | 169.9 | 171.7 | 161.9 | | 119.50 | 136.85 | 118.65 | 146.35 |
| CA2 | | 164.1 | 168.6 | 168 | 170.9 | | 125.60 | 127.20 | 134.50 | 134.00 |
| CA3 | | 166 | 181.6 | 174 | 179.4 | | 121.60 | 126.00 | 117.45 | 130.30 |
| CA4 | | 167.75 | 171.35 | 167.4 | 182.6 | | 125.60 | 128.40 | 126.30 | 134.90 |
| CA5 | | 161.1 | 170.75 | 165.35 | 183.85 | | 122.60 | 125.90 | 123.40 | 143.00 |

Figure 29:
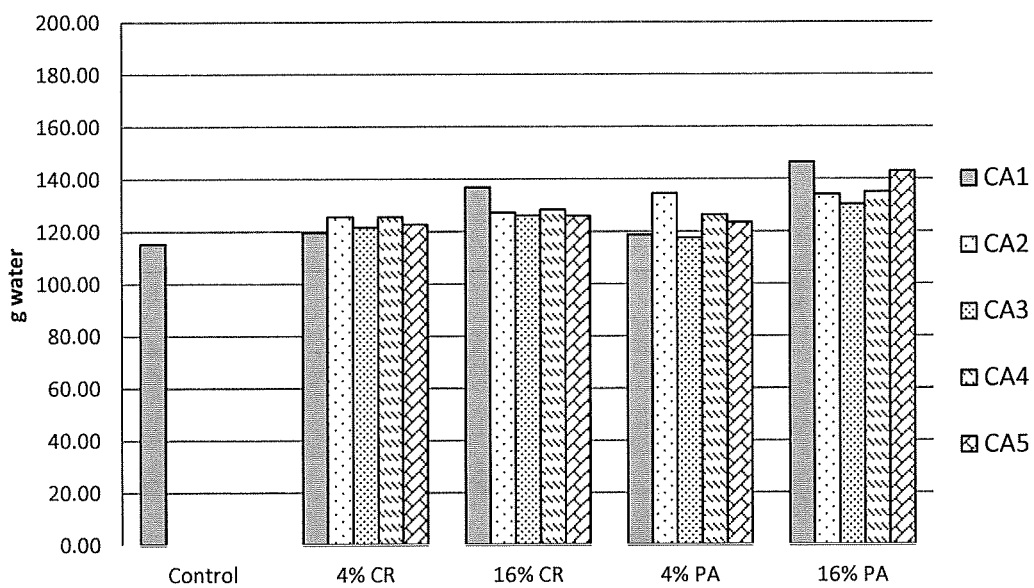

As shown in Table 30 and FIG. 29, with higher density sheet as would be obtained with heavier refining, Cobb size is improved over the 100% cellulose control with the use of CE staple fibers, and the CA 1 variant has an improved Cobb size relative to CA2-6 at higher quantities of CE staple.

Figure 28:
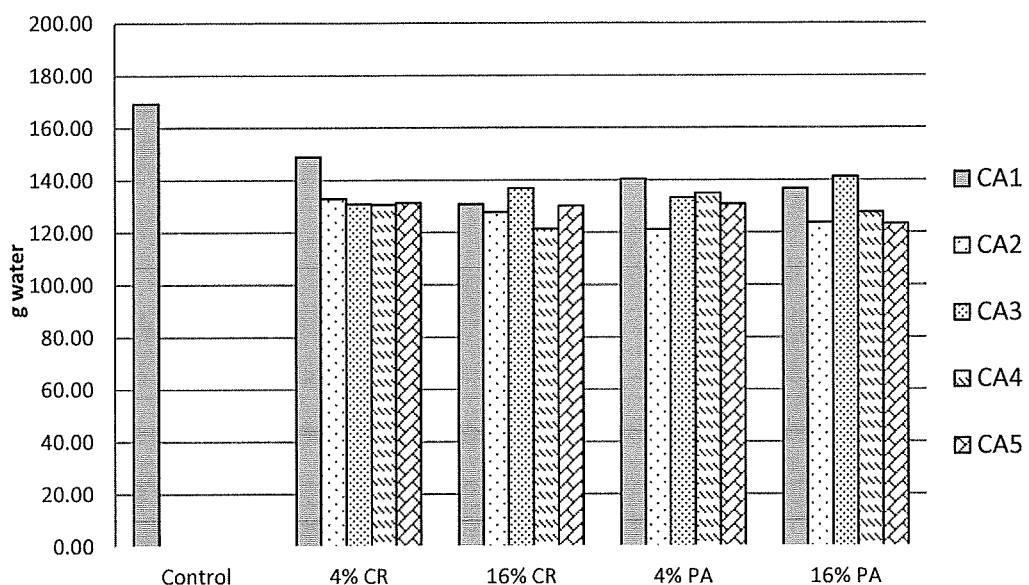

As shown in Table 29 and FIG. 28, the cobb size of all CA variants is less than the 100% cellulose control, and comparing those results against Table 30, FIG. 29, the difference is attributable at least in part to the use by Lab 1 of a higher weight when rolling out the handsheet.

Example 12: Curl

Lab 1 performs a curl test on the Method 1 pulp slurries and the results are reported in Table 31. The Metso FS5 analyzes 20,000 fibers. Curl measures a fiber's deviation from straight. With a higher curl, one can expect improvements in one or more of higher thickness, lower density, and better tear strength.

TABLE 31

| | Metso FS5 | | | | |
|---|---|---|---|---|---|
| | Method 1, Lab 1 | | | | |
| Variant | Control | 4% CR | 16% CR | 4% PA | 16% PA |
| Control | 7.90 | | | | |
| CA1 | | 10.10 | 15.73 | 9.66 | 13.87 |
| CA2 | | 9.62 | 13.94 | 9.41 | 13.28 |
| CA3 | | 9.56 | 14.43 | 9.39 | 18.56 |

TABLE 31-continued

| | Metso FS5 | | | | |
|---|---|---|---|---|---|
| | Method 1, Lab 1 | | | | |
| Variant | Control | 4% CR | 16% CR | 4% PA | 16% PA |
| CA4 | | 9.17 | 15.26 | 9.20 | 13.40 |
| CA5 | | 8.60 | 11.38 | 7.53 | 7.53 |

Figure 30:
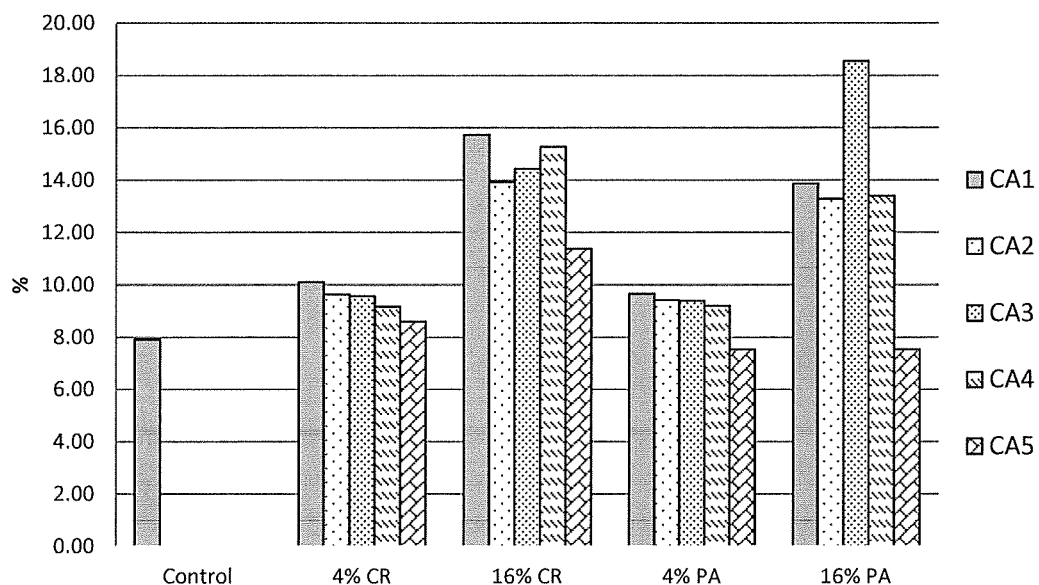

As shown in Table 31 and FIG. 30, while curl of CA 3 having a higher fiber length in a PA case is understandably larger than the other CA variants at both 4% and 16% quantities (the longer fibers have more crimps), upon co-refining, this relationship changes and the CA1 curl at 3 mm fiber length is higher than CA3, indicating that refining may shorten the fiber length of CA3 (as shown in the fiber length chart). However, the curl of CA1 variant is higher than CA3 even though the fiber lengths between the two are substantially the same. The curl of CA1 is also better than the higher 3 DPF fiber of CA 4. The uncrimped CA5 fibers consistently measure the lowest Curl values reflecting the straight CE fibers pulling down the average of those Compositions.

Example 13: Mean Flow Pore Size

Both Labs conform to the ASTM F316 method. Lab 1 employs a PMI Advanced Capillary Flow Porometer, Model (ACFP-1020ALS-CC), and Lab 2 employs a Wenman Scientific Inc.—Porometer—Micro-3G. Results are reported in Table 32-33

TABLE 32

| | Mean Flow Pore Size (microns) | | | | | | | | |
|---|---|---|---|---|---|---|---|---|---|
| | Method 1, Lab 1 | | | | | Method 2, Lab 1 | | | |
| Variant | Control | 4% CR | 16% CR | 4% PA | 16% PA | Control | 4% CR | 16% CR | 4% PA | 16% PA |
| Control | 4.04 | | | | | 1.26 | | | | |
| CA1 | | 4.82 | 8.92 | 5.74 | 12.17 | | 1.18 | 1.46 | 1.31 | 3.32 |
| CA2 | | 4.80 | 7.98 | 5.70 | 10.23 | | 1.17 | 1.73 | 2.44 | 1.82 |
| CA3 | | 4.28 | 8.97 | 4.60 | 14.23 | | 1.41 | 1.35 | 1.28 | 3.31 |
| CA4 | | 2.21 | 4.39 | 10.00 | 5.59 | | 1.36 | 1.67 | 1.28 | 2.50 |
| CA5 | | 2.99 | 5.50 | 3.38 | 8.97 | | 1.18 | 1.23 | 1.24 | 3.33 |

TABLE 33

| | Mean Flow Pore Size (microns) | | | | | | | | |
|---|---|---|---|---|---|---|---|---|---|
| | Method 1, Lab 2 | | | | | Method 2, Lab 2 | | | |
| Variant | Control | 4% CR | 16% CR | 4% PA | 16% PA | Control | 4% CR | 16% CR | 4% PA | 16% PA |
| Control | 4.33 | | | | | 1.03 | | | | |
| CA1 | | 4.80 | 9.17 | 7.65 | 11.85 | | 1.17 | 1.26 | 1.07 | 1.64 |
| CA2 | | 5.18 | 8.03 | 6.04 | 10.58 | | 1.07 | 1.26 | 1.36 | 1.45 |
| CA3 | | 4.90 | 7.56 | 5.37 | 12.60 | | 1.07 | 1.26 | 1.36 | 1.45 |
| CA4 | | 2.90 | 4.80 | 6.61 | 5.47 | | 0.98 | 1.17 | 1.07 | 1.30 |
| CA5 | | 4.33 | 5.09 | 3.76 | 7.75 | | 1.02 | 1.14 | 1.17 | 1.26 |

Figure 31:
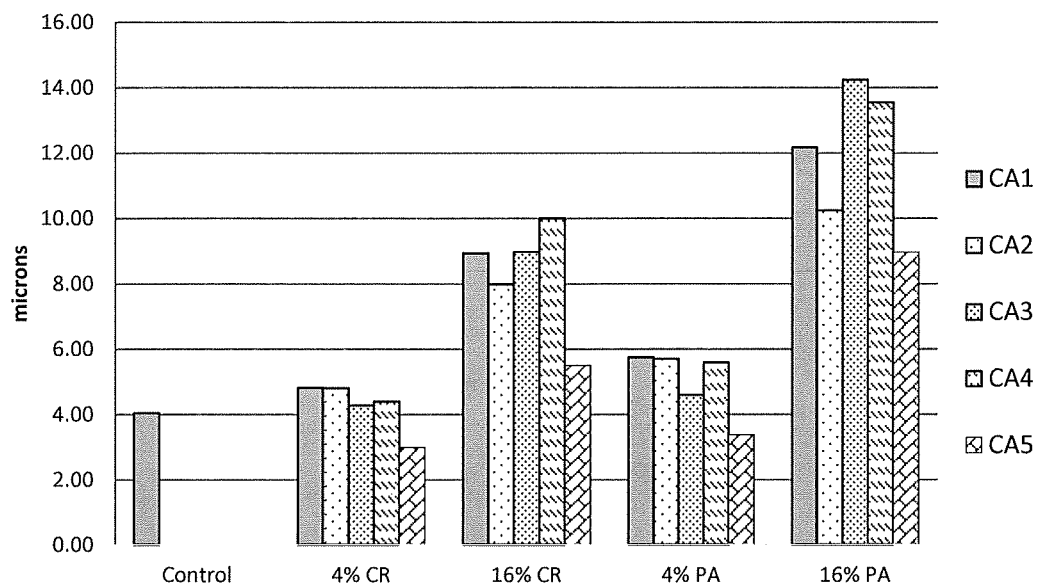

As shown in Table 32 and FIG. 31, in the Method 1 case for lighter refining energy, the MFP size of the PA 16% CA 3 variant is larger than that of the PA 16% CA1 variant, yet surprisingly, the air permeability of CA1 at this condition is larger.

Figure 32:
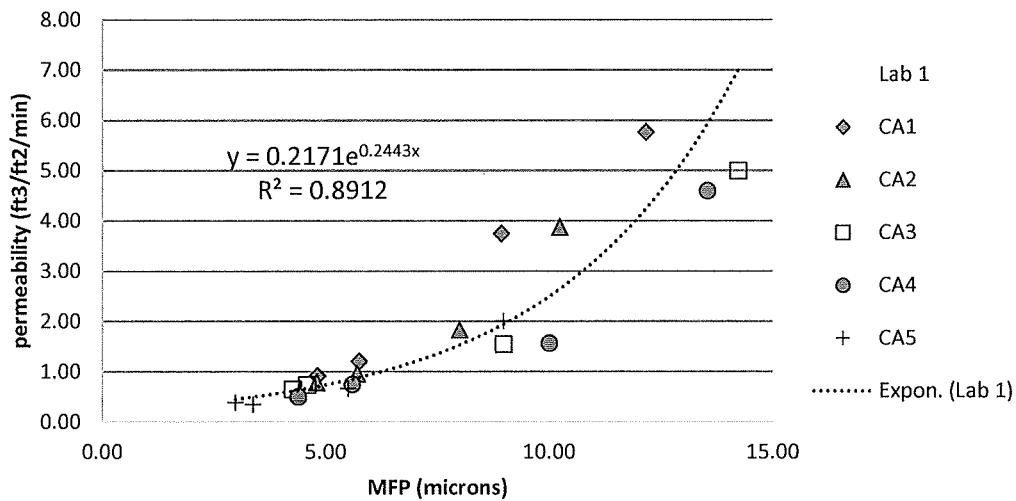
Figure 38:
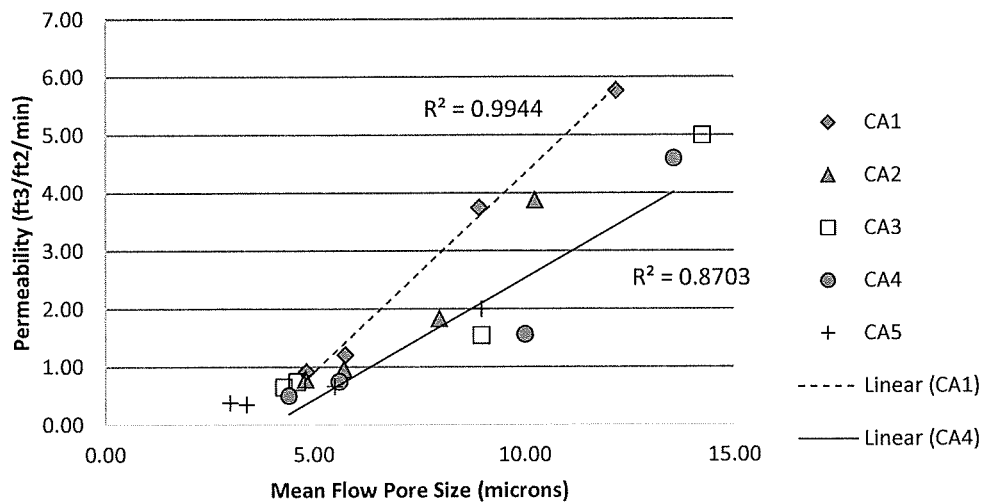

We also evaluate the air permeability of the variants as a function of mean flow pore size, and observe that across all pore sizes above 5 microns in Method 1, the air permeability of CA 1 and CA2 variants trend on a steeper slope and higher than CA 3-5 at a given pore size as shown in FIG. 32. On a linear scale, the separation between CA1 and CA2 variants vs. CA3-5 is more evident as seen in FIG. 38.

Additionally, we observe that although the CA 1 variant has somewhat similar pore size to CA 2, the air permeability of the CA1 variant is substantially better than that of CA2 as shown in FIG. 16.

Figure 33:
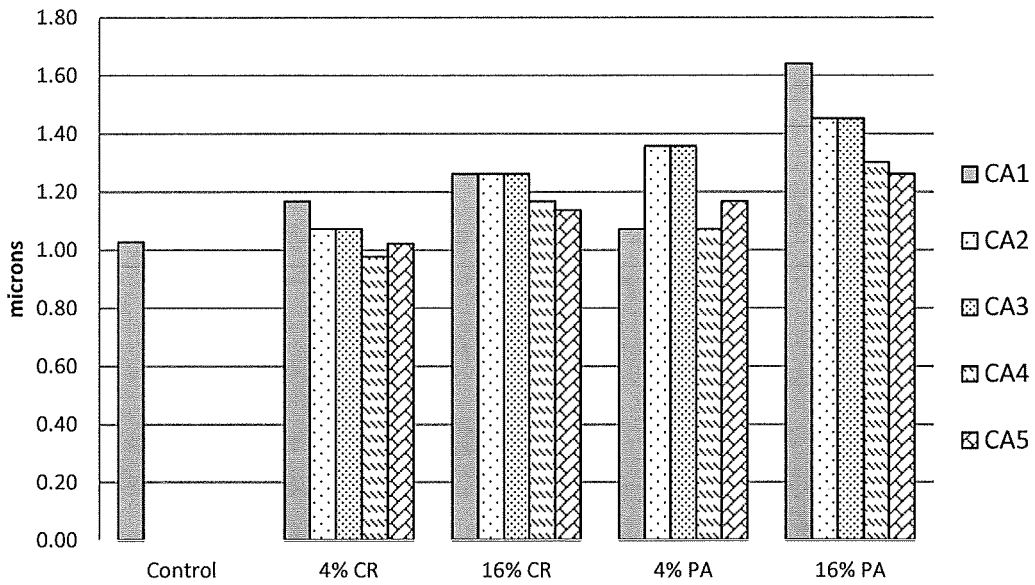
Figure 39:
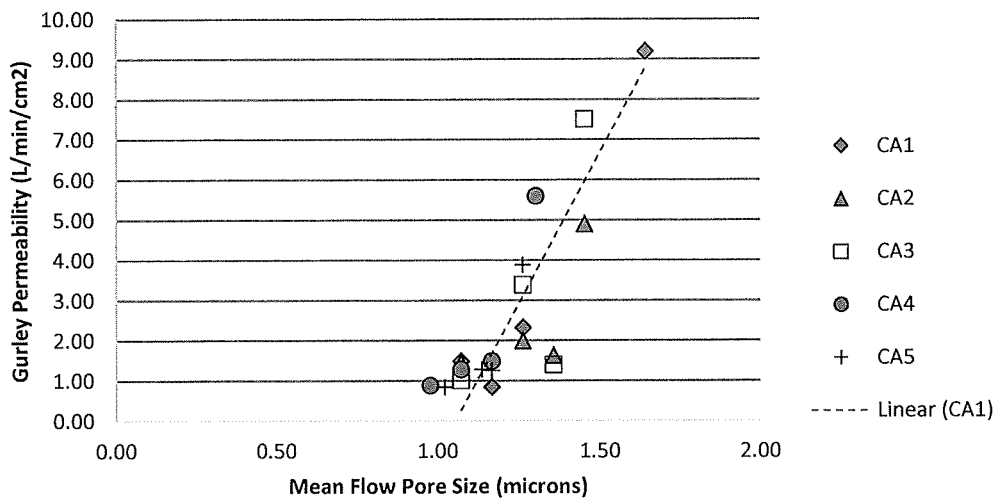
Figure 40:
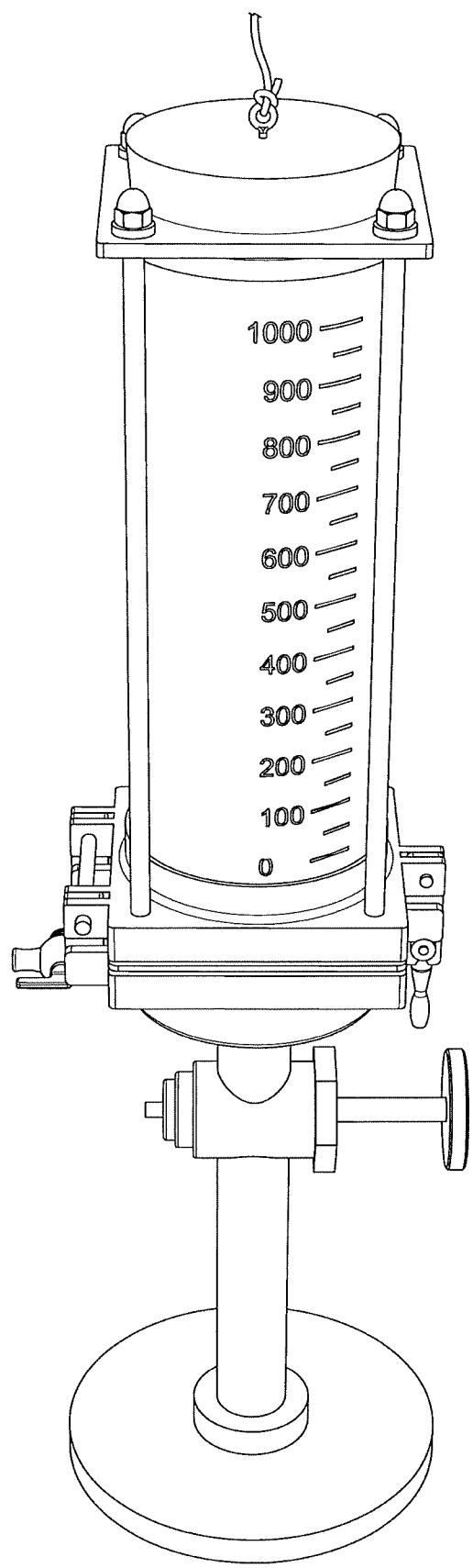
FIG. 40 illustrates a Williams Slowness Drainage apparatus.

The more highly refined MFP size is reported in Table 33 and is illustrated in FIG. 33. For many applications where air permeability is a factor, we anticipate that a lighter refining would be employed. The differentiation between CA1/CA2 vs. CA3-5 seen in the more lightly refined case of Method 1 is not seen for the more heavily refined case of Method 2 as seen in FIG. 39, further demonstrating that the application of random refining energy would not necessarily reveal a benefit of higher air permeability at a given pore size.

Example 14: Fiber Width

Fiber width is determined by the Metso FS5 fiber analyzer at Lab 1. The results are reported in Table 34.

TABLE 34

| | Metso Fiber Width (microns) | | | |
|---|---|---|---|---|---|
| | Method 1, Lab 1 | | | | |
| Variant | Control | 4% CR | 16% CR | 4% PA | 16% PA |
| Control | 18.61 | | | | |
| CA1 | | 18.45 | 18.45 | 18.45 | 18.15 |
| CA2 | | 18.45 | 18.40 | 18.40 | 17.90 |
| CA3 | | 18.70 | 18.90 | 18.60 | 18.30 |
| CA4 | | 18.70 | 19.20 | 18.65 | 19.45 |
| CA5 | | 18.75 | 18.95 | 18.60 | 18.45 |

Figure 34:
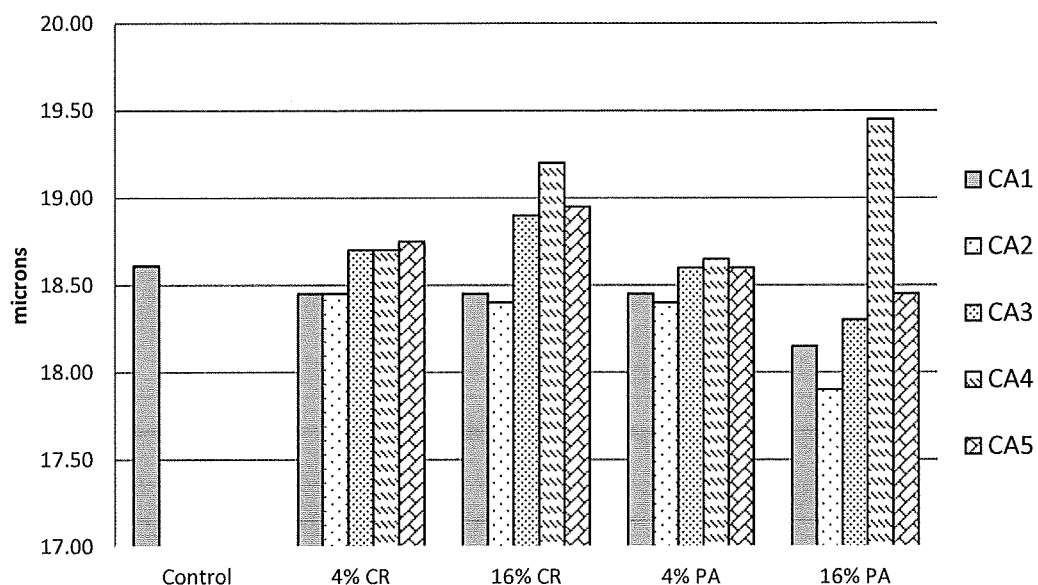

The results are illustrated in FIG. 34. The width of the higher DPF 3 mm fiber stands out in variant CA4.

Figure 35:
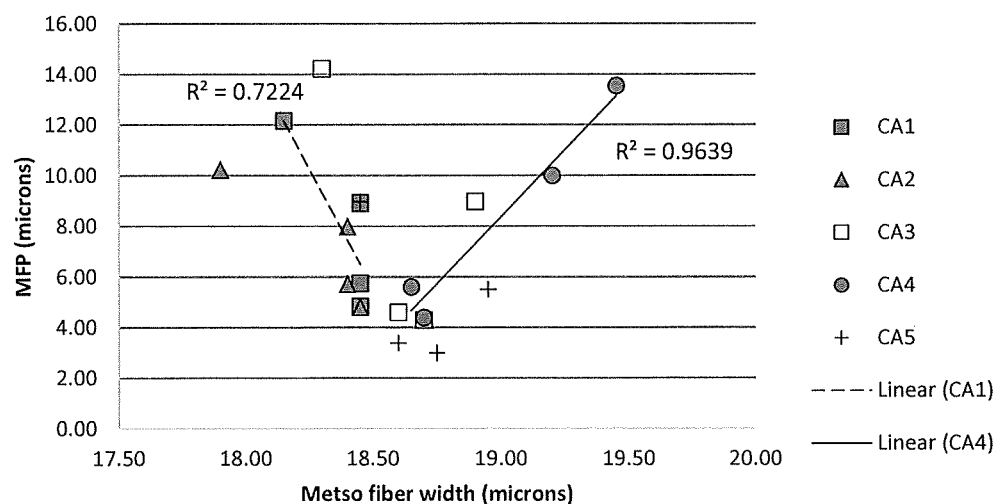

We observe that as the width of the CA 1 variant is held constant, the mean flow pore size can decrease under different conditions as shown in FIG. 35 which plots MFP size as a function of fiber width.

Figure 36:
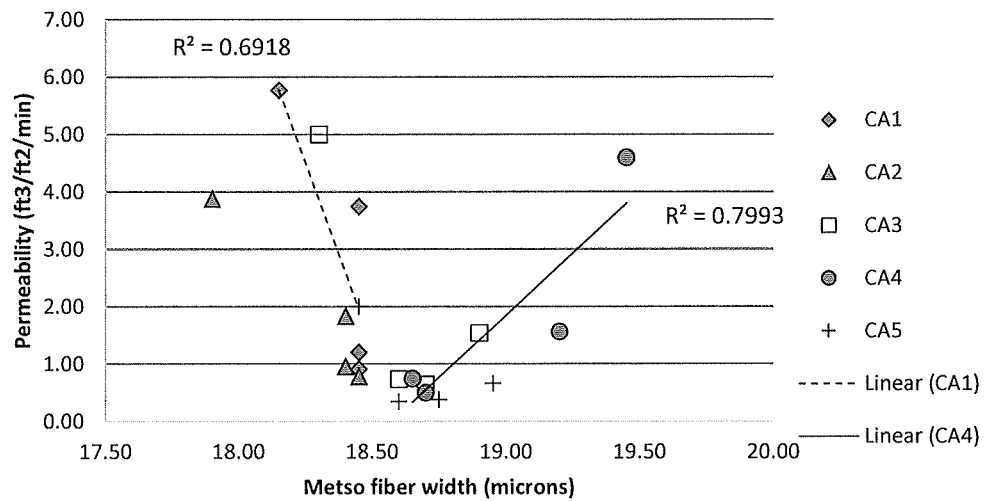

We also observe that variant CA1 has a smaller fiber width at 1.8 DPF than CA4 variant at a 3 DPF. We would expect that larger fiber widths would open up the pore sizes and increase air permeability. However, as shown in FIG. 36, although the fiber width of CA1 is smaller across the board than the fiber width of the CA 4 high DPF variant, the CA 1 has improved air permeability over CA 4 within each condition as noted above. The same is true of CA 1 relative to all other variants; that is, within each group of conditions, CA 1 has the same or smallest fiber width yet the highest air permeability.

Example 15: Fiber Length

The fiber length is analyzed in Lab 1 using the Metso FS5 fiber analyzer. The results are reported in Table 35.

TABLE 35

| | Metso Fiber Length (mm) | | | | |
|---|---|---|---|---|---|
| | Method 1, Lab 1 | | | | |
| Variant | Control | 4% CR | 16% CR | 4% PA | 16% PA |
| Control | 2.52 | | | | |
| CA1 | | 2.56 | 2.58 | 2.58 | 2.60 |
| CA2 | | 2.54 | 2.55 | 2.55 | 2.59 |
| CA3 | | 2.57 | 2.62 | 2.67 | 3.14 |
| CA4 | | 2.55 | 2.60 | 2.58 | 2.67 |
| CA5 | | 2.47 | 2.51 | 2.46 | 2.53 |

Figure 37:
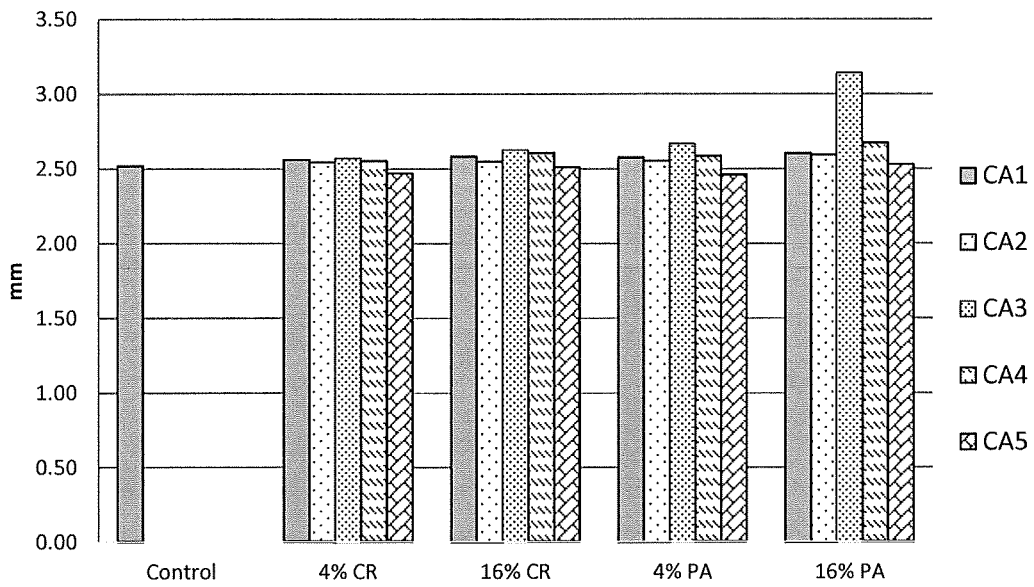

The results of fiber length are also illustrated in FIG. 37. The fiber lengths on average are equalized when the compositions are co-refined. Even with similar fiber lengths in a 16% co-refine condition, the CA 1 has a better tear strength. Although tear strength is related to fiber length, the CA 1 variant outperforms other variants.

Example 16: Rewet Wet Thickness Response

The Rewet Thickness response measures the change in the sheet's thickness after 2 saturations and can predict the available volume of toweling to absorb liquid after one absorption and 'wringing out' cycle.

Lab 2 determines Rewet Thickness Response by measuring the thickness of the handsheet sample, evaluating Cobb Size and Water Permeability of the sample (both tests saturating the sample with water), drying the sample, and measuring the rewet thickness (thickness of the dried sample after two saturation cycles).

The results of the thickness response to wetting, pressing, and rewetting are reported in Table 36. Two percentage increase values are calculated for each condition as follows: % Relative to Dry Control is calculated by subtracting the dry single sheet thickness of the 100% cellulose control from the rewet thickness of the CE staple variant and dividing the result by the dry thickness of the 100% cellulose control; % Relative to Dry Variant is calculated by subtracting the dry single sheet variant thickness from the rewet thickness of the same variant and dividing by the dry single sheet variant thickness. These calculated values are reported in Table 37 in %.

TABLE 36

Rewet Thickness Response (mm) Method 2, Lab 2

| Variant | Thickness (mm) | Control | 4% CR | 16% CR | 4% PA | 16% PA |
|---|---|---|---|---|---|---|
| Control | Dry Single Sheet | 0.133 | | | | |
| | Rewet 2x Single Sheet | 0.147 | | | | |
| CA1 | Dry Single Sheet | | 0.139 | 0.169 | 0.151 | 0.192 |
| | Rewet 2x Single Sheet | | 0.153 | 0.187 | 0.168 | 0.210 |
| CA2 | Dry Single Sheet | | 0.143 | 0.164 | 0.149 | 0.177 |
| | Rewet 2x Single Sheet | | 0.160 | 0.175 | 0.158 | 0.189 |
| CA3 | Dry Single Sheet | | 0.144 | 0.16 | 0.145 | 0.199 |
| | Rewet 2x Single Sheet | | 0.134 | 0.163 | 0.148 | 0.182 |
| CA4 | Dry Single Sheet | | 0.145 | 0.171 | 0.161 | 0.196 |
| | Rewet 2x Single Sheet | | 0.164 | 0.193 | 0.171 | 0.199 |
| CA5 | Dry Single Sheet | | 0.134 | 0.155 | 0.151 | 0.175 |
| | Rewet 2x Single Sheet | | 0.145 | 0.168 | 0.171 | 0.180 |

TABLE 37

Rewet Thickness Response (%) Method 2, Lab 2

| Variant | % Increase In Thickness (mm): | 4% CR | 16% CR | 4% PA | 16% PA |
|---|---|---|---|---|---|
| Control | 10.53% Increase over Dry | | | | |
| CA1 | % Relative to Dry Control Sheet | 15.04 | 40.60 | 26.32 | 57.89 |
| | % Relative to Dry Variant Sheet | 10.07 | 10.65 | 11.26 | 9.37 |
| CA2 | % Relative to Dry Control Sheet | 20.30 | 31.58 | 18.80 | 42.11 |
| | % Relative to Dry Variant Sheet | 11.89 | 6.71 | 6.04 | 6.78 |
| CA3 | % Relative to Dry Control Sheet | 0.75 | 22.56 | 11.28 | 36.84 |
| | % Relative to Dry Variant Sheet | −7.52 | 2.26 | 2.26 | −12.78 |
| CA4 | % Relative to Dry Control Sheet | 23.31 | 45.11 | 28.57 | 49.62 |
| | % Relative to Dry Variant Sheet | 14.29 | 16.54 | 7.52 | 2.26 |
| CA5 | % Relative to Dry Control Sheet | 9.02 | 26.32 | 28.57 | 35.34 |
| | % Relative to Dry Variant Sheet | 7.91 | 7.69 | 13.25 | 2.60 |

The CA 3 variant, with an initial higher fiber length, has the smallest rewet thickness over its dry sheet, and even became thinner in the 4% CR and 16% PA variants.

Example 17: Pilot Scale Wet Laid Production Trial

Trials were conducted on a continuous pilot scale Fourdrinier production line with a wet press, size press, and in-line calender capable of operating at 100-150 ft/minute at 30" wide rolls. A three-day trial was run where we produced zero, five and fifteen percent CE Staple fiber content roll goods at 35, 80, and 150 gsm basis weights at roll weights up to 448 lbs. The first wet press was set to 20,000 psig. This machine was fed by a stock preparation zone where the furnishes were refined through a double disc refiner to approximately 400 csf freeness. The following roll goods were made:
1. Control: 100% Cellulose: wood pulp was a 50/50 blend of SBSK/Eucalyptus run at 150 gsm, 80 gsm, and 35 gsm. This is the same wood pulp used for all runs with CA fiber.
2. Box 5% CA-1 fiber from a Gaylord box (95% wood pulp—equal parts SBSK/Eucaplytus) at 150 gsm, 80 gsm, 35 gsm taken from loose fiber packaging
3. High Press Box 5% CA-1 fiber from a Gaylord box (95% wood pulp-equal parts SBSK/Eucaplytus) made only at 150 gsm and double the wet press pressure setting: to 40,000 psig.
4. Box 15% CA-1 fiber from a Gaylord box (85% wood pulp—equal parts SBSK/Eucalyptus) at 150 gsm, 80 gsm, 35 gsm taken from loose fiber packaging
5. Bale 15% CA-1 fiber from a compressed bale (85% wood pulp—equal parts SBSK/Eucalyptus) at 150 gsm, 80 gsm, 35 gsm Rolls from the trial were evaluated by the TAPPI methods mentioned above that characterized the form, water, air, strength, and toughness of the sheets produced. Each of the following examples is with reference to the rolls produced at the pilot plant trial.

Example 18: Thickness

Thickness is measured in Lab 1 by averaging 4 thickness measurements at least 1 inch in from the edge near the midpoint of each side of the handsheet, and averaging 6 thickness measurements at Lab 2. The thickness of the handsheets is set forth in Table 38.

TABLE 38

| | Thickness (mm) | | | | | |
|---|---|---|---|---|---|---|
| | Lab 1 | | | Lab 2 | | |
| Variant | 35 gsm | 80 gsm | 150 gsm | 35 gsm | 80 gsm | 150 gsm |
| 0% Control | 0.083 | 0.155 | 0.266 | 0.086 | 0.157 | 0.252 |
| 5% Box | 0.090 | 0.158 | 0.270 | 0.092 | 0.166 | 0.276 |
| High Press 5% Box | | | 0.263 | | | 0.262 |
| 15% Box | 0.092 | 0.157 | 0.264 | 0.096 | 0.162 | 0.279 |
| 15% Bale | 0.087 | 0.155 | 0.278 | 0.090 | 0.160 | 0.281 |

Figure 41:
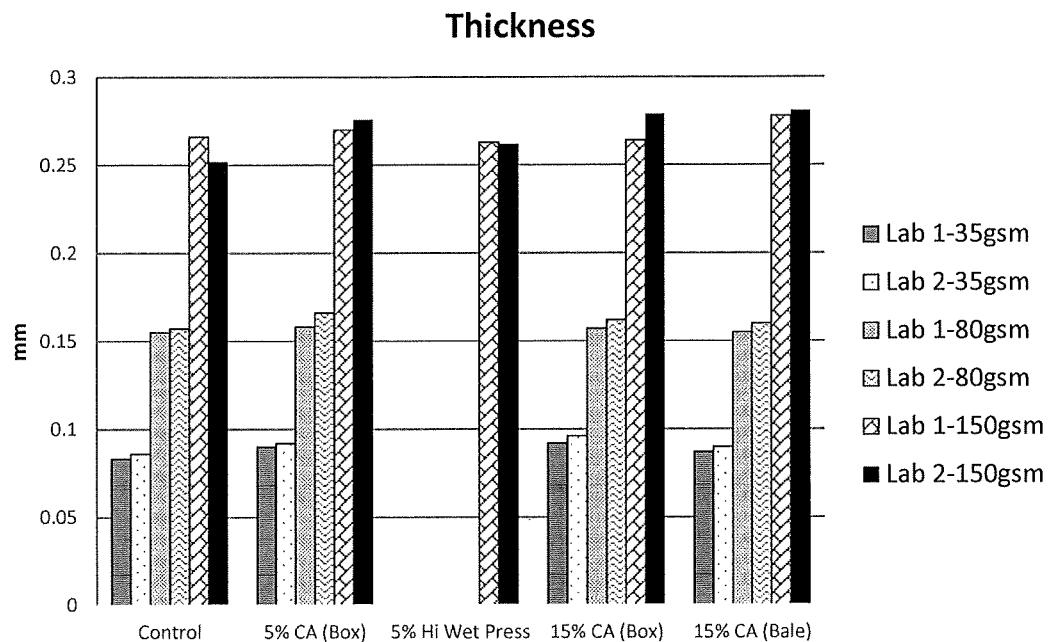
FIGS. 41-49 illustrate in bar chart format the data set from the tables under each corresponding example.

As can be seen from Table 38 and from FIG. 41, with the addition of adding CE staple fibers, the thickness of the handsheets increases relative to the control without CE staple fibers. Increasing the wet press pressure did decrease the thickness of the sheet at the same basis weight.

Example 19: Density

In Lab 1 and Lab 2, the basis weight of conditioned samples is measured by weighing the sample sheets and then converting to a g/m² basis weight by dividing into the size of the sheet. The samples are conditioned overnight at TAPPI standard conditions. Thickness is measured as noted above. The g/m² basis weight is divided by 10,000 to convert to g/cm² and this value is divided by the thickness (in cm) to yield g/cm³. The results are reported in Table 39.

TABLE 39

| | Density (g/cm³) | | | | | |
|---|---|---|---|---|---|---|
| | Lab 1 | | | Lab 2 | | |
| Variant | 35 gsm | 80 gsm | 150 gsm | 35 gsm | 80 gsm | 150 gsm |
| 0% Control | 0.433 | 0.564 | 0.585 | 0.409 | 0.547 | 0.611 |
| 5% Box | 0.411 | 0.554 | 0.592 | 0.399 | 0.522 | 0.585 |
| High Press 5% Box | | | 0.597 | | | 0.607 |
| 15% Box | 0.40 | 0.511 | 0.555 | 0.383 | 0.483 | 0.571 |
| 15% Bale | 0.42 | 0.539 | 0.590 | 0.391 | 0.511 | 0.572 |

Figure 42:
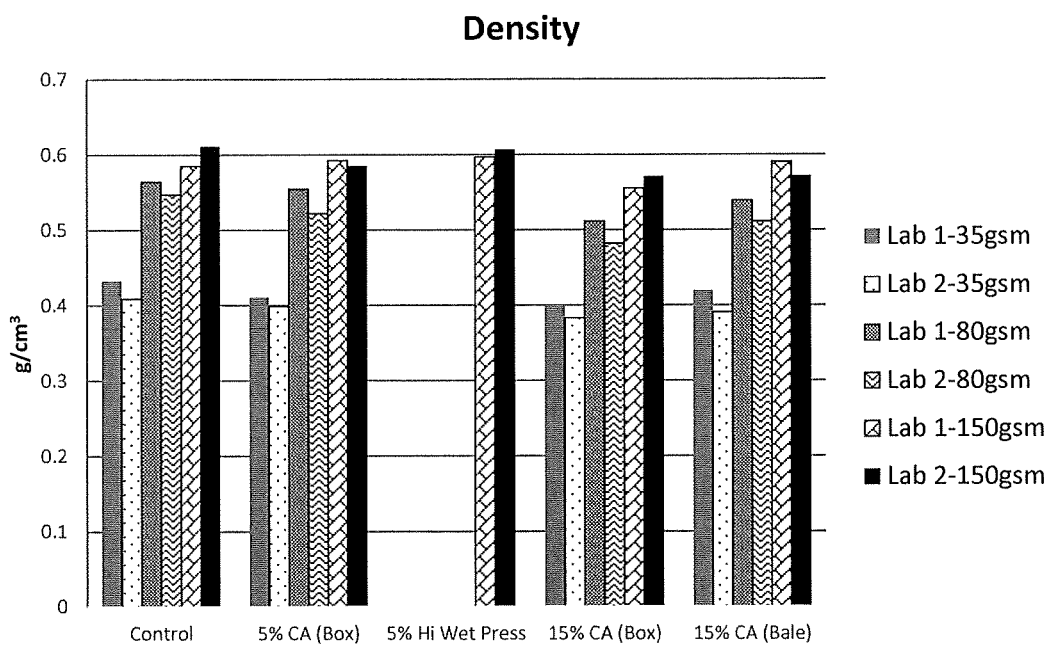

As shown in Table 39 and FIG. 42, with the addition of CE staple fibers, density of the wet laid sheet products generally decreases. The density decrease is also accompanied by an increase in bulk as shown in the thickness data. The density also increased with increased wet size pressure.

Example 20: Stiffness

The roll sheets were tested by the Gurley stiffness test method according to TAPPI T543. Lab 1 employs a 2-inch× 3.5-inch sample size using a 5-gram weight at a 2-inch spacing from the pivot point. Lab 2 employs a Gurley Stiffness Tester—Teledyne Gurley Ser. #: NU0509 using a 2-inch×3.5-inch sample size. Mass and position of counter-weights varied according to and in keeping within the test range. The MD stiffness results are reported in Table 40.

TABLE 40

| | MD Gurley Stiffness (mg) | | | | | |
|---|---|---|---|---|---|---|
| | Lab 1 | | | Lab 2 | | |
| Variant | 35 gsm | 80 gsm | 150 gsm | 35 gsm | 80 gsm | 150 gsm |
| 0% Control | 28 | 277 | 1283 | 38 | 253 | 1219 |
| 5% Box | 24 | 241 | 1381 | 41 | 261 | 1292 |
| High Press 5% Box | | | 1354 | | | 1374 |
| 15% Box | 26 | 201 | 1035 | 40 | 206 | 1095 |
| 15% Bale | 24 | 221 | 1598 | 36 | 238 | 1391 |

Figure 43:
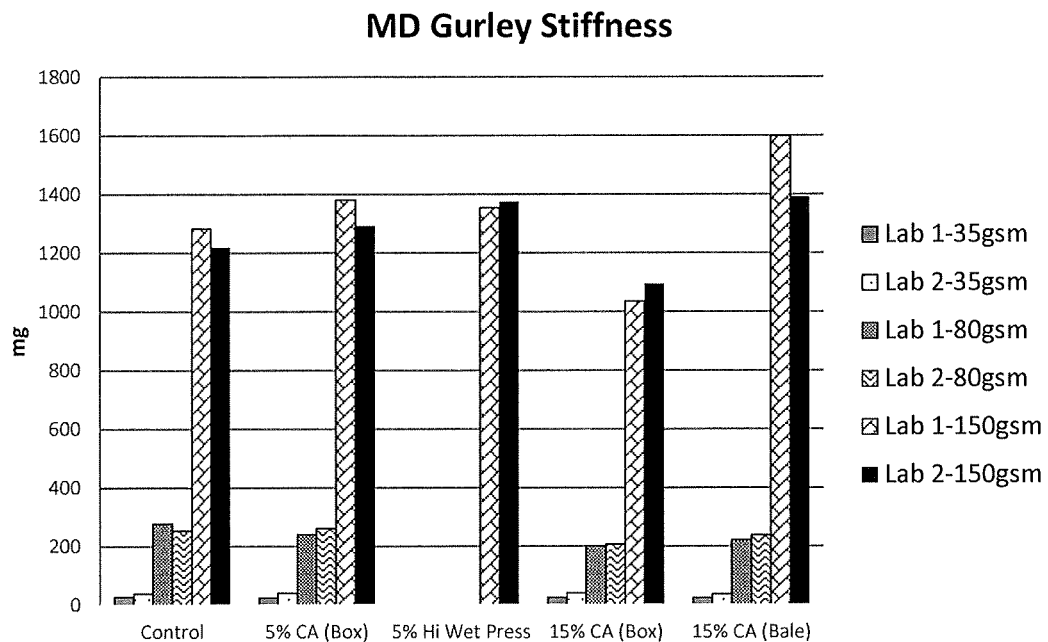

As shown in Table 40 and FIG. 43, stiffness at the higher basis weight improved over the control, and a remarkable improvement is shown by using CE Staple Fiber from the compressed bale relative to using CE Staple Fiber from the Gaylord Box.

Example 21: Air Permeability

The air permeability of the sheets is tested by both Labs 1 and 2. The Gurley Air Permeability report of Lab 2 in liters/min/cm$^2$/bar is calculated from experimental values obtained in a Gurley Air Porosity TAPPI test by converting seconds/100 ml/KPa through a 1-inch square orifice to l/min/cm$^2$/bar.

Table 41 reports the air permeability values.

TABLE 41

| | Air Permeability | | | | | |
|---|---|---|---|---|---|---|
| | Lab 1 (ft$^3$/ft$^2$/min) | | | Lab 2 (liters/min/cm$^2$/bar) | | |
| Variant | 35 gsm | 80 gsm | 150 gsm | 35 gsm | 80 gsm | 150 gsm |
| 0% Control | 0.865 | 0.242 | 0.142 | 16.73 | 5.76 | 2.61 |
| 5% Box | 0.924 | 0.274 | 0.146 | 25.41 | 6.11 | 2.86 |
| High Press 5% Box | | | 0.144 | | | 2.82 |
| 15% Box | 1.48 | 0.520 | 0.292 | 38.11 | 11.49 | 6.27 |
| 15% Bale | 0.470 | 0.174 | 0.124 | 9.40 | 3.99 | 2.43 |

Figure 44:
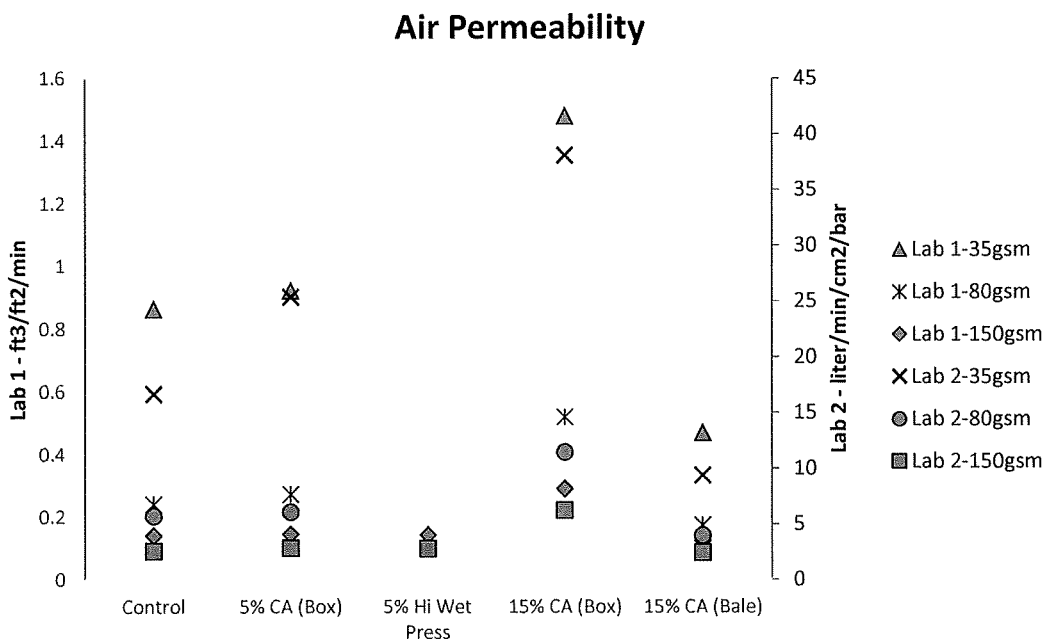

As shown in Table 41 and as illustrated in FIG. 44, the air permeability of sheets containing the CE Staple Fibers is increased over the Control and dramatically so at higher fiber content. It was also surprising to find that this effect was not observed when the fiber used was taken from a compressed bale. The form of the fiber fed to the stock preparation zone influenced the air permeability of the formed sheets.

Example 22: Water Permeability

Water permeability is not measured at Lab 1. Water permeability is calculated from water porosity, which is measured at Lab 2. The procedure for measuring water porosity, is as follows:

The method describes a procedure for determining the quantity of water which passes through a known square area of a formed and dried sheet of paper with known hydraulic head. Water porosity is defined as the time in seconds for 100 ml of water to pass through a sheet of paper supported on a Williams Drainage Screen under specified conditions in a Williams Slowness Drainage Instrument. The Williams Slowness Drainage apparatus is the same apparatus as described above, which permits water flow from one side of the paper sheet specimen through to the opposite side. The specimen holder comprises a metal square 10.16 cm×10.16 cm (4 in.×4 in.) which encloses a wire mesh circle 8.26 cm (3.25 in.) in diameter clamped to a flat base plate of the same or bigger size. The area of paper specimen exposed to water flow is 53.56 cm2 or (8.29 in2). On the base plate is a rubber mat, larger than the outside dimensions of the circular wire mesh, on which the specimen is clamped. Above the base plate is a graduated glass cylinder 10 inches high by 3 inches in diameter. A 2$^{15}$/$_{16}$ in. diameter cork with a cord is attached to top to provide lowering and removal from the apparatus cylinder. The graduated 1000 ml cylinder is marked in 10 ml increments. Water is used as pure at 2 ppm mineral hardness.

A sample of the sheet is obtained in accordance with TAPPI T 400 "Sampling and Accepting a Single Lot of Paper, Paperboard, Containerboard, or Related Product." From each test unit, specimens are cut to a size slightly greater than the outside dimensions of the base of the wire mesh metal square 10.16 cm×10.16 cm (4 in.×4 in.). The specimens are free from folds, wrinkles, or other blemishes not commonly inherent in the paper. The specimens are condition by dropping them quickly into pure water in the 1000 ml beaker for 5 minutes, removed, and placed on the wetted Williams wire mesh screen support holder. The wetted wire mesh screen is placed on a support holder into the bottom of the Williams Instrument and center. A Williams 1000 ml cylinder section is clamped onto bottom of unit wedging the specimen between cylinder and drain. A large cork is gently lowered onto surface of the specimen to prevent water disruption of sheet. 1100 mL of water (23±1 C (73.4 F)) is poured into the cylinder onto the center of the cork. The cork is removed from the cylinder after delivery of 900 ml of water. The vacuum release is opened at the back of instrument. As rapidly as possible, the drain handle is opened for the cylinder full of water. When the water meniscus passes the 1000 ml line on the cylinder, the stopwatch is started immediately. The stopwatch is stopped as the water meniscus in cylinder passes the 900 ml water mark. The seconds required to pass 100 ml of water are recorded. The Williams Instrument should not leak water except through drain line. The seal at the base of cylinder is broken, the cylinder drained and the wire mesh support and specimen are removed. The specimen can be saved and air dried for later thickness measurement of rewet thickness response. The water porosity is recorded as seconds/100 ml water passage. The water permeability is calculated from water porosity by converting seconds/100 ml through 53.56 cm2 at a pressure of 2.13 kPa. The water permeability is reported in Table 42.

TABLE 42

Water Permeability (liters/min/cm²/bar)

| | Lab 1 | | | Lab 2 | | |
|---|---|---|---|---|---|---|
| Variant | 35 gsm | 80 gsm | 150 gsm | 35 gsm | 80 gsm | 150 gsm |
| 0% Control | | | | 48.48 | 22.29 | 8.4 |
| 5% Box | | | | 52.5 | 22.12 | 9.53 |
| High Press 5% Box | | | | | | 9.57 |
| 15% Box | | | | 85.03 | 35.51 | 20.57 |
| 15% Bale | | | | 20.16 | 10.30 | 7.73 |

Figure 45:
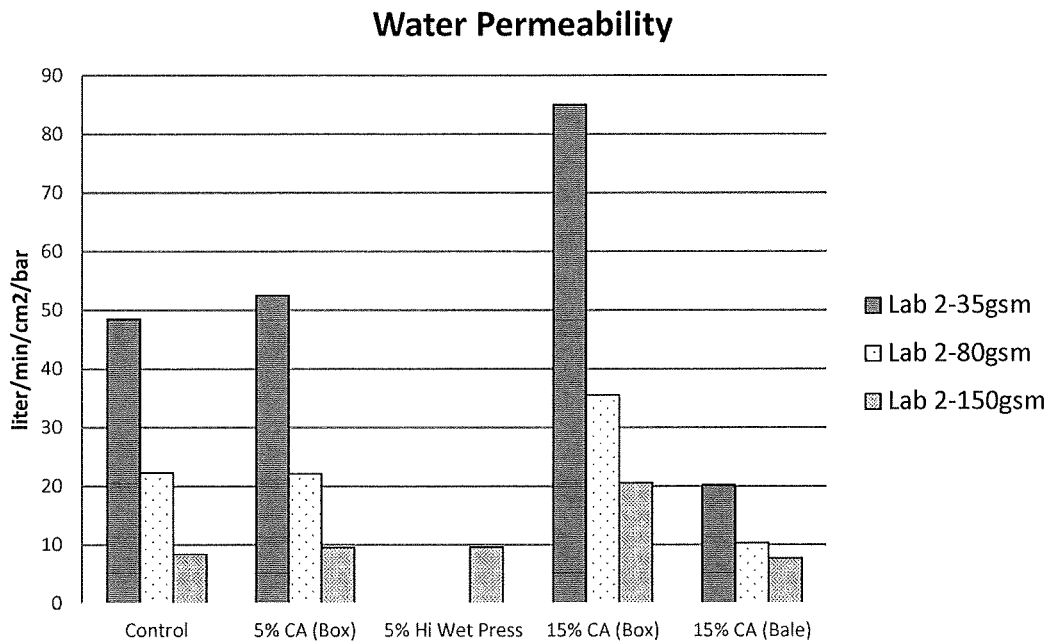

As shown in Table 42 and as illustrated in FIG. 45, similar conclusions can be reached for water permeability as noted above in Example 21 for air permeability, and the same fiber, CA1, can be used to obtain improved air and water permeability at a given density. Additionally, the difference in air permeability from rolls with 15% CA1 obtained from a box vs. a bale is surprising.

Example 23: Dry Tensile Strength

Lab 1 and Lab 2 perform the dry tensile strength test without modification of the TAPPI standards. The results are reported in Table 43.

TABLE 43

MD Dry Tensile Strength (g-force/15 mm)

| | Lab 1 | | | Lab 2 | | |
|---|---|---|---|---|---|---|
| Variant | 35 gsm | 80 gsm | 150 gsm | 35 gsm | 80 gsm | 150 gsm |
| 0% Control | 1792 | 6224 | 8297 | 2111 | 5974 | 8973 |
| 5% Box | 2075 | 5967 | 8478 | 2431 | 6292 | 9196 |
| High Press 5% Box | | | 8593 | | | 9608 |
| 15% Box | 2122 | 4555 | 8588 | 2021 | 4658 | 8554 |
| 15% Bale | 2280 | 6161 | 11325 | 2320 | 6362 | 10771 |

Figure 46:
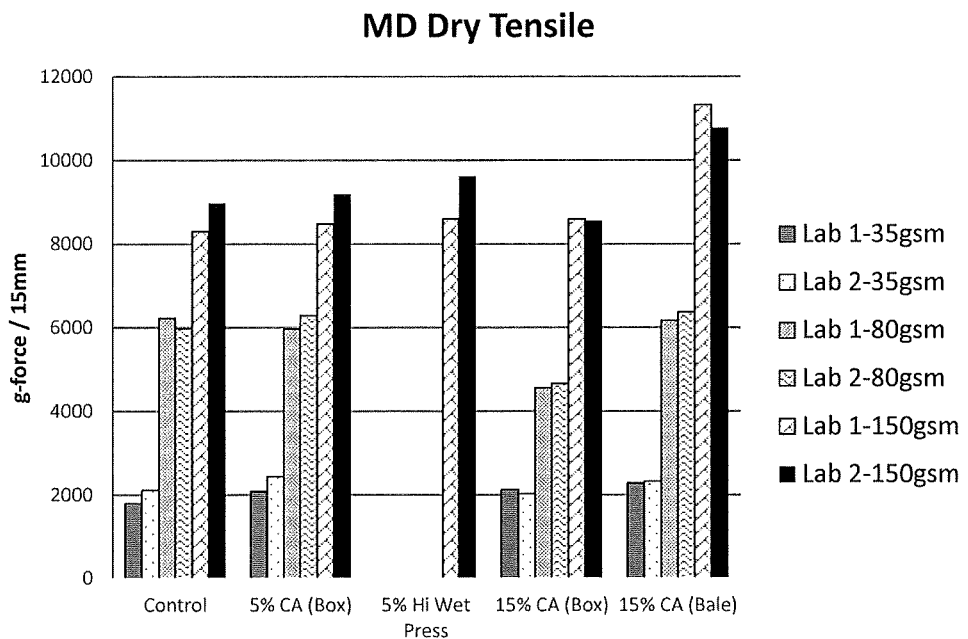

One expects that with the addition of a synthetic fiber, the dry tensile strength of a sheet is decreased relative to a 100% cellulose product. As shown in Table 43 and as illustrated in FIG. 46, the tensile strength of a 100% cellulose composition can be increased with the addition of a CE staple fiber. As shown in Table 43 and FIG. 46, the tensile strength can be increased relative to a 100% cellulose composition control. Further, this increase in dry tensile strength is dramatically increased when using fiber from a bale relative to the same amount of the fiber from a box, and the tensile strength from the bale at high loadings of 15% was usually higher than the control.

Example 24: Burst Strength

Lab 1 and Lab 2 perform the Mullen Burst Strength without modification of the TAPPI standards. The results are reported in Table 44.

TABLE 44

Mullen Burst Strength (psig)

| | Lab 1 | | | Lab 2 | | |
|---|---|---|---|---|---|---|
| Variant | 35 gsm | 80 gsm | 150 gsm | 35 gsm | 80 gsm | 150 gsm |
| 0% Control | 6.9 | 27.2 | 43.5 | 6 | 28.1 | 40 |
| 5% Box | 7.3 | 28.9 | 46.7 | 8.8 | 29.2 | 48 |
| High Press 5% Box | | | 45.7 | | | 48 |
| 15% Box | 7.4 | 19.9 | 41.2 | 7.4 | 23.6 | 51.6 |
| 15% Bale | 8.5 | 28.5 | 57.5 | 12.9 | 34.4 | 75.2 |

Figure 47:
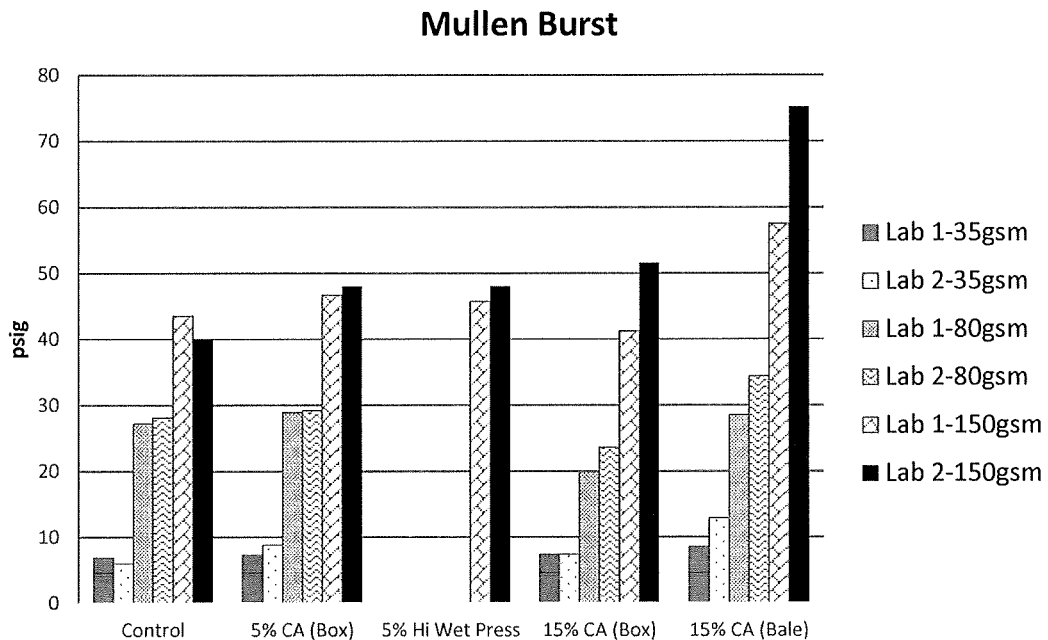

As shown in Table 44, the observations and trends with respect to dry tensile strength generally also apply to the results of the Mullen Burst Strength tests. The results are more apparent in FIG. 47. The fiber used from the bale was significantly improved over both the fiber used from the box at the same quantity and over the Control.

Example 25: Mean Flow Pore Size

Both Labs conform to the ASTM F316 method. Lab 1 employs a PMI Advanced Capillary Flow Porometer, Model (ACFP-1020ALS-CC), and Lab 2 employs a Wenman Scientific Inc.—Porometer—Micro-3G. Results are reported in Table 45

TABLE 45

Mean Flow Pore Size (microns)

| | Lab 1 | | | Lab 2 | | |
|---|---|---|---|---|---|---|
| Variant | 35 gsm | 80 gsm | 150 gsm | 35 gsm | 80 gsm | 150 gsm |
| 0% Control | 2.594 | 1.809 | 1.955 | 3.85 | 2.52 | 2.20 |
| 5% Box | 2.644 | 1.998 | 1.996 | 3.47 | 2.71 | 2.39 |
| High Press 5% Box | | | 1.918 | | | 2.14 |
| 15% Box | 3.678 | 2.669 | 2.624 | 4.61 | 3.47 | 2.71 |
| 15% Bale | 2.419 | 1.904 | 1.847 | 2.90 | 2.33 | 2.33 |

Figure 48:
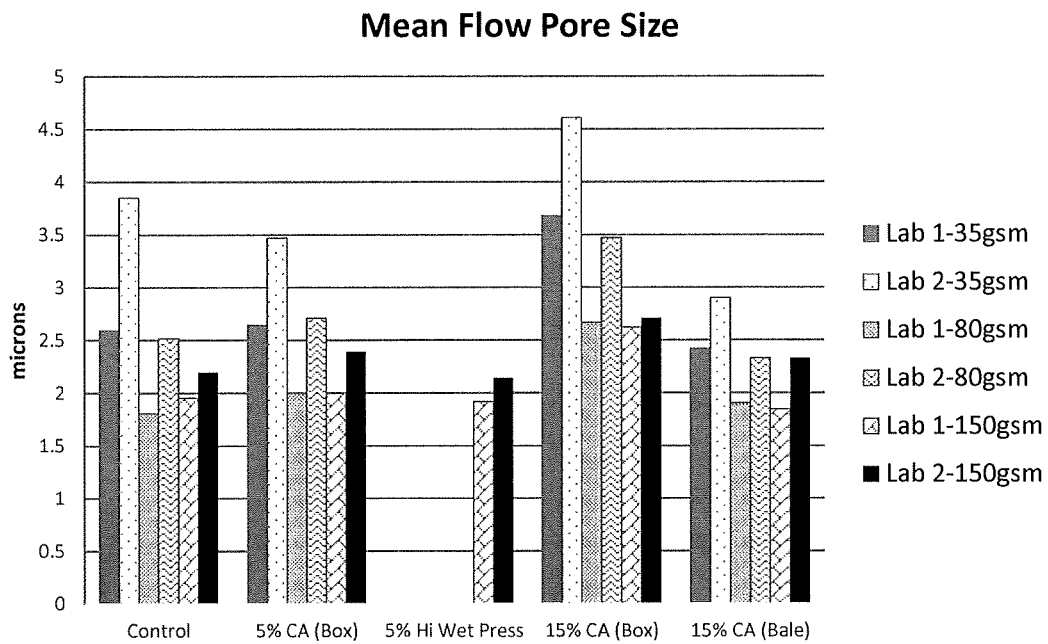

As shown in Table 45 and as illustrated in FIG. 48, the CA-1 fiber opened up the pore size in most instances, except when the fiber was taken from the bale.

Example 26: Water Absorbency

The roll products at the three different basis weights were measured for water absorbency at Lab 2 and reported below in Table 46. The water absorbency values are in $gH_2O/m^2$.

TABLE 46

Water Absorbency (grams $H_2O$ per $m^2$)

| | Lab 2 | | |
|---|---|---|---|
| Variant | 35 gsm | 80 gsm | 150 gsm |
| 0% Control | 136.6 | 200.5 | 292.2 |
| 5% Box | 128.6 | 197.2 | 296.2 |
| High Press 5% Box | | | 287.8 |
| 15% Box | 115.2 | 183.7 | |
| 15% Bale | 111.5 | 153.7 | |

Figure 49:
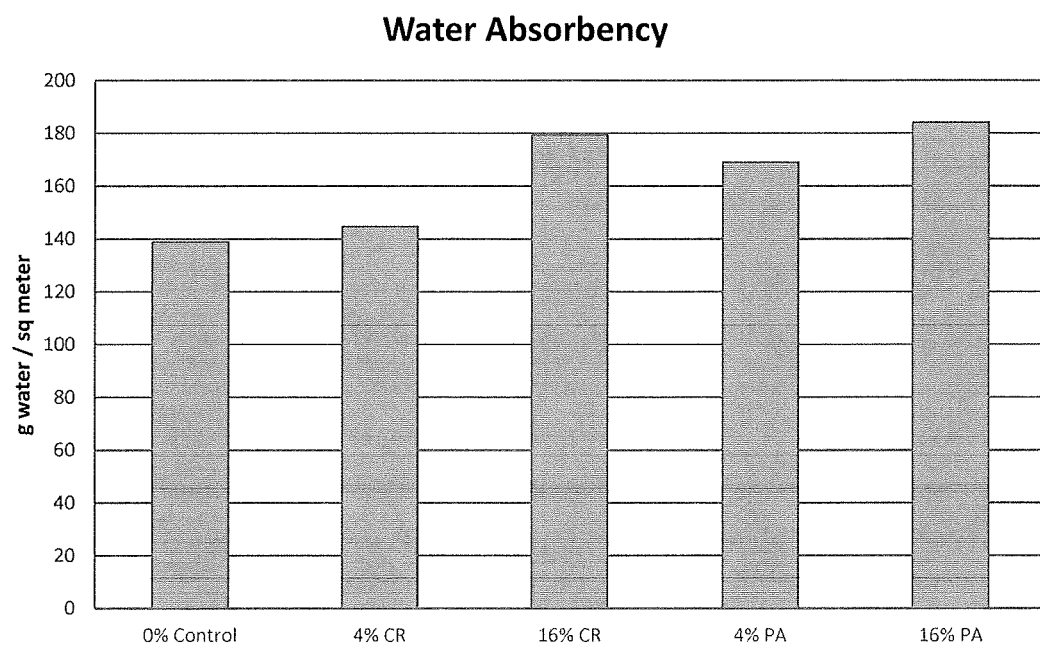

As shown in Table 46 and as illustrated in FIG. 49, water absorbency at lower basis weights was reduced relative to their respective controls. At the 150 gsm basis weight, the increased pressure at the wet press resulted in a decreased water absorbency for the 5% Box sample versus the High Press 5% Box sample.

Example 27: Water Absorbency

Handsheets at 80 gsm basis weight (prepared in Lab 2 by Method 2 of the designed experiment) were measured for water absorbency at Lab 2 and reported below in Table 47. The water absorbency values are in $gH_2O/m^2$.

TABLE 47

| Water Absorbency (grams $H_2O$ per $m^2$) | |
|---|---|
| Variant | 80 gsm |
| 0% Control | 138.9 |
| 4% CR | 144.8 |
| 16% CR | 179.4 |
| 4% PA | 169 |
| 16% PA | 184.2 |

As shown in Table 46 and as illustrated in FIG. 49, water absorbency increases with increased CA-1 Fiber content and with post refining addition versus co-refining.

What we claim is:

1. A method of forming an elongated tubular member from a wet-laid fiber web, said method comprising:
    (a) forming a wet-laid fiber web from a slurry comprising cellulose ester staple fibers, cellulose fibers, and at least one liquid;
    (b) removing at least a portion of said liquid from said wet-laid fiber web to form a fiber-containing sheet;
    (b1) applying a plasticizer to at least one side of said fiber-containing sheet;
    (c) rolling said fiber-containing sheet into a tubular shape; and
    (d) while said fiber-containing sheet is in said tubular shape, adhering the edges of said fiber-containing sheet to one another to form a tubular member.

2. The method of claim 1, further comprising, prior to said rolling, applying an adhesive agent to one side of said fiber-containing sheet.

3. The method of claim 1, wherein said adhering comprises applying heat and/or pressure to said fiber-containing sheet to bond the edges of said fiber-containing sheet to one another.

4. The method of claim 1, wherein a plasticizer is present on said fiber-containing sheet in an amount in the range of from about 5 to about 15 weight percent.

5. The method of claim 1, wherein said slurry has a Williams Slowness of less than 200 and/or a Canadian Standard Freeness of at least 200.

6. The method of claim 1, further comprising adding at least one water-proofing agent such that the walls of said tubular member are substantially impermeable to water, wherein said adding includes one or more of the following steps (i) through (iii):
    (i) adding said water-proofing agent to a slurry used to make said wet-laid fiber web,
    (ii) adding said water-proofing agent to said wet-laid fiber web and/or said fiber-containing sheet,
    (iii) adding said water-proofing agent to said tubular member.

7. The method of claim 1, wherein said cellulose ester staple fibers have a length of not more than 6 mm and a denier per filament (DPF) of 3 or less, and wherein said cellulose ester staple fibers are either dry, obtained from solvent spun filaments, or both, wherein said cellulose ester staple fibers are crimped at a crimp frequency in the range of from 8 to 22 crimps per inch (CPI) and have a non-round cross-section, and wherein said cellulose ester is cellulose acetate and has a degree of substitution of 2.5 or less.

8. A method of forming an elongated tubular member from a wet-laid fiber web, said method comprising:
    (a) forming a wet-laid fiber web from a slurry comprising cellulose ester staple fibers, cellulose fibers, and at least one liquid;
    (b) removing at least a portion of said liquid from said wet-laid fiber web to form a fiber-containing sheet;
    (c) rolling said fiber-containing sheet into a tubular shape; and
    (d) while said fiber-containing sheet is in said tubular shape, adhering the edges of said fiber-containing sheet to one another to form a tubular member,
    wherein said cellulose ester staple fibers have a length of not more than 6 mm and a denier per filament (DPF) of 3 or less,
    wherein said cellulose ester staple fibers are either dry, obtained from solvent spun filaments, or both,
    wherein said cellulose ester staple fibers are crimped at a crimp frequency in the range of from 8 to 22 crimps per inch (CPI) and have a non-round cross-section, and
    wherein said cellulose ester is cellulose acetate and has a degree of substitution of 2.5 or less.

\* \* \* \* \*